US011465101B2

(12) United States Patent
Diallo et al.

(10) Patent No.: US 11,465,101 B2
(45) **Date of Patent: *Oct. 11, 2022**

(54) MIXED MATRIX MEMBRANES WITH EMBEDDED POLYMERIC PARTICLES AND NETWORKS AND RELATED COMPOSITIONS, METHODS, AND SYSTEMS

(71) Applicants: CALIFORNIA INSTITUTE OF TECHNOLOGY, Pasadena, CA (US); KOREA ADVANCED INSTITUTE OF SCIENCE AND TECHNOLOGY, Daejeon (KR)

(72) Inventors: Mamadou S. Diallo, Pasadena, CA (US); Madhusudhana Rao Kotte, Daejeon (KR)

(73) Assignees: CALIFORNIA INSTITUTE OF TECHNOLOGY, Pasadena, CA (US); KOREA ADVANCED INSTITUTE OF SCIENCE AND TECHNOLOGY, Daejon (KR)

(*) Notice: Subject to any disclaimer, the term of this patent is extended or adjusted under 35 U.S.C. 154(b) by 221 days.

This patent is subject to a terminal disclaimer.

(21) Appl. No.: 16/459,299

(22) Filed: Jul. 1, 2019

(65) Prior Publication Data

US 2020/0188862 A1 Jun. 18, 2020

Related U.S. Application Data

(63) Continuation-in-part of application No. 15/497,174, filed on Apr. 25, 2017, now Pat. No. 10,532,330, (Continued)

(51) Int. Cl.

*B01D 69/14* (2006.01)
*B01D 71/34* (2006.01)

(Continued)

(52) U.S. Cl.

CPC ....... *B01D 69/141* (2013.01); *B01D 67/0079* (2013.01); *B01D 69/10* (2013.01);

(Continued)

(58) Field of Classification Search

CPC .... B01D 67/0079; B01D 69/10; B01D 69/12; B01D 69/141; B01D 71/022; B01D 71/34;

(Continued)

(56) References Cited

U.S. PATENT DOCUMENTS

| | | | |
|---|---|---|---|
| 8,277,664 | B2 | 10/2012 | Frechet et al. |
| 10,369,529 | B2 | 8/2019 | Diallo et al. |

(Continued)

OTHER PUBLICATIONS

Chiang, Y-C, et al., "Nanofiltration Membranes Synthesized from Hyperbranched Polyethyleneimine" Journal of Membrane Science, 326, pp. 19-26 (2009) (Year: 2009).*

(Continued)

*Primary Examiner* — Jason M Greene
*Assistant Examiner* — Eric J McCullough
(74) *Attorney, Agent, or Firm* — Steinfl + Bruno LLP

(57) ABSTRACT

Described herein are mixed matrix filtration membranes and related, compositions, methods and systems and in particular mixed matrix filtration membranes with an embedded polymer network and/or embedded polymeric micro/nanoparticles functionalized with a functionalization polymer covalently and/or non covalently linked to the micro/nanoparticles and related compositions, methods, and systems.

24 Claims, 96 Drawing Sheets

Related U.S. Application Data which is a continuation of application No. 14/447,574, filed on Jul. 30, 2014, now Pat. No. 10,369,529, and a continuation-in-part of application No. 13/754,883, filed on Jan. 30, 2013, now Pat. No. 9,302,922, and a continuation of application No. 13/570,221, filed on Aug. 8, 2012, now abandoned.

(60) Provisional application No. 61/983,131, filed on Apr. 23, 2014, provisional application No. 61/860,170, filed on Jul. 30, 2013, provisional application No. 61/711,021, filed on Oct. 8, 2012, provisional application No. 61/601,410, filed on Feb. 21, 2012, provisional application No. 61/592,409, filed on Jan. 30, 2012, provisional application No. 61/521,290, filed on Aug. 8, 2011.

(51) Int. Cl.

| | |
|---|---|
| ***B01D 67/00*** | (2006.01) |
| ***B01D 69/10*** | (2006.01) |
| ***B01D 69/12*** | (2006.01) |
| ***C02F 1/44*** | (2006.01) |
| ***D01F 1/10*** | (2006.01) |
| ***B01D 71/02*** | (2006.01) |
| ***B01D 71/40*** | (2006.01) |
| ***B01D 71/60*** | (2006.01) |
| *C02F 103/08* | (2006.01) |

(52) U.S. Cl.

CPC ............. *B01D 69/12* (2013.01); *B01D 71/34* (2013.01); *C02F 1/44* (2013.01); *D01F 1/10* (2013.01); *B01D 71/022* (2013.01); *B01D 71/40* (2013.01); *B01D 71/60* (2013.01); *B01D 2323/30* (2013.01); *B01D 2323/39* (2013.01); *C02F 1/441* (2013.01); *C02F 1/444* (2013.01); *C02F 2103/08* (2013.01)

(58) Field of Classification Search

CPC .... B01D 71/40; B01D 71/60; B01D 2323/30; B01D 2323/39; C02F 1/44; C02F 1/441; C02F 1/444; C02F 2103/08; D01F 1/10

See application file for complete search history.

(56) References Cited

U.S. PATENT DOCUMENTS

| | | | | |
|---|---|---|---|---|
| 10,532,330 | B2 | 1/2020 | Diallo et al. | |
| 11,090,616 | B2 | 8/2021 | Diallo et al. | |
| 2002/0001571 | A1* | 1/2002 | Wu | B01D 69/141 424/61 |
| 2012/0018382 | A1* | 1/2012 | Stein | C02F 1/488 210/663 |
| 2015/0053610 | A1 | 2/2015 | Diallo et al. | |
| 2019/0046934 | A1 | 2/2019 | Diallo et al. | |

OTHER PUBLICATIONS

Madani et al., "Aureole Nanofibers by Electrospinning of PAMAM-PEO Solution" Journal of Applied Polymer Science (2009), 113:3005-3011. (Year: 2009).*

Chapter 11 "Solutions and Colloids" from the Open Stax Chemistry Textbook, Feb. 14, 2019, pp. 595-650.

Chemistry OpenStax Textbook Table of Contents 2017, 9 pages.

Li, J. et al. Characterizations of Core-Shell Tecto-(Dendrimer) Molecules by Tapping Mode Atomic Force Microscopy. Langmuir, 1999, 15, 7347-7350.

Menjoge, A.R. et al. Dendrimer-based drug and imaging conjugates: design considerations for nanomedical applications. Drug Discovery Today, vol. 15, No. 5/6, Mar. 2010. pp. 171-185. http://www.drugdiscoverytoday.com.

Non-Final Office Action for U.S. Appl. No. 16/039,160, filed Jul. 18, 2018 on behalf of California Institute of Technology dated Sep. 10, 2020. 8 pages.

Notice of Allowance for U.S. Appl. No. 16/039,160, filed Jul. 18, 2018 on behalf of California Institute of Technology, dated Jul. 31, 2020. 9 Pages.

Song, C. et al. Superstructured poly(amidoamine) dendrimer-based nanoconstructs as platforms for cancer nanomedicine: A concise review. Coordination Chemistry Reviews, 421, 2020, 213463. 11 pages.

Tomalia, D.A. Birth of a new macromolecular architecture: dendrimers as quantized building blocks for nanoscale synthetic polymer chemistry. Prog. Polym. Sci., 30, 2005, pp. 294-324.

Tomalia, D.A. et al. Partial shell-filled core-shell tecto(dendrimers): A strategy to surface differentiated nano-clefts and cusps. PNAS, Apr. 16, 2002, vol. 99, No. 8, pp. 5081-5087.

Uppuluri, S. et al. Core-Shell Tecto(dendrimers): I. Synthesis and Characterization of Saturated Shell Models. Adv. Mater, 2000, 12, No. 11, pp. 796-800.

Wikipedia "Triethyl phosphate" (TEP). Jan. 29, 2014. 2 pages.

Final Office Action for U.S. Appl. No. 15/011,547, filed Jan. 30, 2016 on behalf of California Institute of Technology, dated Oct. 13, 2020. 47 pages.

Notice of Allowance for U.S. Appl. No. 16/039,160, filed Jul. 18, 2018 on behalf of California Institute of Technology, dated Jan. 15, 2021. 9 Pages.

Non-Final Office Action for U.S. Appl. No. 15/011,547, filed Jan. 30, 2016 on behalf of California Institute of Technology dated Mar. 23, 2020. 65 pages.

Non-Final Office Action for U.S. Appl. No. 16/039,160, filed Jul. 18, 2018 on behalf of California Institute of Technology dated Apr. 17, 2020. 26 pages.

Notice of Allowance for U.S. Appl. No. 15/497,174, filed Apr. 25, 2017 on behalf of California Institute of Technology, dated Sep. 3, 2019. 19 Pages.

Wikipedia—"Suspension (chemistry)", Downloaded Dec. 20, 2019, https://en.wikipedia.org/wiki/Suspension_(chemistry), 3 pages.

Alexeev, et al., "EXAFS characterization of dendrimer—pt nanocomposites used for the preparation of Pt/ç-Al2O3 Catalysts", J. Phys. Chem. B,2006, 110, 24903-24914.

Balogh, L. and Tomalia, D.A. "Poly(Amidoamine) Dendrimer-Templated Nanocomposites. 1. Synthesis of Zerovalent Copper Nanoclusters" J. Am. Chem. Sci.1998, 120, 7355-7356.

Busch M. et al., "Boron Removal in Sea Water Desalination" *International Desalination Association* May 25, 2013. BAH03-039. 16 pages.https://web.archive.org/web/2013*/http://www.idswater.com/Common/Paper/Paper_58/Paper_MarkusBusch.pdf.

Diallo, et al., "Mining critical metals and elements from seawater: opportunities and challenges", Environ. Sci. Technol.2015, 49, 9390-9399.

Diallo, M.S., et al. "Nanotechnology for Sustainability: Environment, Water, Food, Minerals and Climate". In Nanotechnology Research Directions for Societal Needs in 2020: Retrospective and Outlook, Eds: Roco, M. C, Mirkin, C and Hersham, M. Science Policy Reports, Springer, 221-259.2011.

Final Office Action for U.S. Appl. No. 15/011,547, filed Jan. 30, 2016 on behalf of California Institute of Technology, dated Jul. 2, 2019. 29 Pages.

Helfferich, F. Ion Exchange. MacGraw-Hill Book Company: New York, 1962.

Kai, et al., "Development of commercial-sized dendrimer composite membrane modules for CO2 removal from flue gas", Separation and Purification Technology 63 (2008), 524-530.

Kotte, et al, A facile and scalable route to the preparation of catalytic membranes with in-situ synthesized supramolecular dendrimer particle hosts for pt(0) nanoparticles using a low generation pamam dendrimer (g1-nh2) as precursor, ACS Appl. Mater. Interfaces,Sep. 10, 2018, 57 pages.

(56) References Cited

OTHER PUBLICATIONS

Kotte, et al., "Mixed Matrix PVDF Membranes With In Situ Synthesized PAMAM Dendrimer-Like Particles: A new class of sorbents for CU(II) recovery from agueous solutions by ultrafiltration", EEWS KAIST. Environ. Sci Technology, 49, 16, 9341-9442. Published Web:Jul. 29, 2015. 27 pages.

Lin et al. "Thermodynamic Stability of Zimmerman Self-Assembled Dendritic Supramolecules from Atomistic Molecular Dynamics Simulations" *Journal of Physical Chemistry B, American Chemical Society*.2004. vol. 108. pp 10041-10052. 12 pgs.

Non-Final Office Action for U.S. Appl. No. 15/497,174, filed Apr. 25, 2017 on behalf of the California Institute of Technology, dated Mar. 4, 2019. 30 pages.

Puniredd, et al., "Covalent molecular assembly of multilayer dendrimer ultrathin films in supercritical medium", Journal of Colloid and Interface Science, 306 (2007), 118-127.

Rader, H.J., et al., "MALDI-TOF Mass Spectrometry of Polyphenylene Dendrimers up to the Megadalton Range. Elucidating Structural Integrity of Macromolecules at Unrivaled High Molecular Weights," Macromolecules,2014 (47) 1240-48. 9 Pages.

Ramakrishna S, Fujihara K, Teo W-E, Lim T-C, Ma Z (2005) "An introduction to electrospinning and nanofibers" *Tables 2.3(d) and 2.3(3). Electrospun polymer fibers*. World Scientific Publishing Co., Singapore, pp. 46-47.

Takke, et al, "Surface and adhesion properties of poly(ethylene glycol) on polyester(polyethylene terephthalate) fabric surface: effect of air-atmospheric plasma treatment", Journal of applied polymer science, vol. 122, 2621-2629 (2011).

Teoh, et al., "Micelle-like macrovoids in mixed matrix PVDF-PTFE hollow fiber membranes", Journal of Membrane Science 338,2009, 5-10.

Tomalia, D., "Dendritic effects: dependency of dendritic nano-periodic property patterns on critical nanoscale design parameters (CNDPs)", New J. Chem.,2012, 36, 264-281.

Tomalia, D., "Dendrons/dendrimers: guantized, nano-element like building blocks for soft-soft and soft-hard nano-compound synthesis", Soft Matter,2010, 6, 456,474.

WaveMetrics. IGOR Pro 6. Retrieved Jul. 16, 2019, Available online at http://www.wavemetrics.com/. 1 page.

Wikipedia "Poly(methyl methacrylate)" Downloaded Jan. 20, 2015. http://en.wikipedia.org/wiki/Poly(methyl_methacrylate). 14 pages.

Xiao, et al., "Surface characterization, modification chemistry, and separation of performance of polyimide and polyamidoamine dendrimer composite films", Langmuir 2004, 20, 8230-8238.

Zhang, B. et al. "Synthetic regimes due to packing constraints in dendritic molecules confirmed by labelling experiments", Nature Communications, Published Jun. 13, 2013. 9 pages. Doi: 10.1038/ncomms2993.

* cited by examiner

A. Barrett-Joyner-Halenda adsorption pore volume

B. Barrett-Joyner-Halenda desorption pore volume

A. Barrett-Joyner-Halenda adsorption pore volume

B. Barrett-Joyner-Halenda desorption pore volume

MIXED MATRIX MEMBRANES WITH EMBEDDED POLYMERIC PARTICLES AND NETWORKS AND RELATED COMPOSITIONS, METHODS, AND SYSTEMS

CROSS REFERENCE TO RELATED APPLICATIONS

The present application is a Continuation of U.S. application Ser. No. 14/447,574 filed on Jul. 30, 2014, which is incorporated herein by reference it its entirety, which in turn claims priority to U.S. Provisional Application No. 61/860,170, entitled "Mixed Matrix Membranes with In-Situ Generated Polymeric Particles and Networks" filed on Jul. 30, 2013 and to U.S. Provisional Application No. 61/983,131, entitled "Mixed Matrix Membranes with In-Situ Generated Polymeric Particles and Networks" filed on Apr. 23, 2014, the disclosure of each of which is incorporated by reference in its entirety. The U.S. application Ser. No. 14/447,574 is also a continuation in part of U.S. application Ser. No. 13/754,883 entitled "Filtration Membranes and Related Compositions, Methods and Systems" filed on Jan. 30, 2013 which in turn claims priority to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, to U.S. Provisional Application No. 61/711,021, entitled "Composite and Multifunctional Polymeric Membranes with Embedded Polymeric Micro/Nanoparticles: Compositions, Methods, Systems and Applications" filed on Oct. 8, 2012 and a continuation in part of U.S. application Ser. No. 15/497,174 filed on Apr. 25, 2017, which is a continuation of U.S. application Ser. No. 13/570,221 filed on Aug. 8, 2012, which in turn claims priority to U.S. Provisional Application No. 61/521,290, entitled "Low-Pressure Ion-Selective Membranes for Water Treatment and Desalination: Synthesis, Characterization and Multiscale Modeling" filed on Aug. 8, 2011, to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, and to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, each of the above mentioned applications is incorporated herein by reference in its entirety.

STATEMENT OF GOVERNMENT GRANT

This invention was made with government support under contract 0948485 awarded by the National Science Foundation. The government has certain rights in the invention.

FIELD

The present disclosure relates to filtration membranes and related compositions, methods and systems. In particular the present disclosure relates to mixed matrix membranes with embedded microparticles and/or nanoparticles and related compositions methods and systems.

BACKGROUND

Development of efficient membranes has been a challenge in the field of fluid filtration, in particular when aimed at environmental and industrial separations (e.g. water purification and resource recovery).

Filtration membranes have become components of a broad range of sustainability applications and technologies including (i) energy conservation and storage (e.g. fuel cells and batteries), (ii) water reuse and desalination (e.g. reverse osmosis, nanofiltration and ultrafiltration) and (iii) gas separations (e.g. $CO_2$ and $H_2$ separations). Current commercial polymeric membranes often carry a single function, i.e. salt rejection by a reverse osmosis membrane or proton transport by a polymer electrolyte membrane.

Whether for human consumption, agriculture or industry, several methods are commonly used for filtration including reverse osmosis (RO), nanofiltration (NF), ultrafiltration (UF) and microfiltration (MF) and additional methods identifiable by a skilled person.

Despite production and elaboration during the past 20 years of several filtration concepts/technologies proposed as improvements or alternatives to the above mentioned approaches, development of efficient, cost-effective and/or environmental friendly filtration methods and system has been a challenge in particular when directed at selective filtration.

SUMMARY

Provided herein are mixed matrix filtration membranes with embedded polymeric particles and networks along with related compositions, methods, and systems that allow in several embodiments to perform selective filtration of a liquid and in particular of water or aqueous solutions, which can have various applications such as industrial and environmental separations.

According to a first aspect, a filtration membrane is described. The filtration membrane comprises embedded polymeric particles and in particular comprises polymeric microparticles and/or nanoparticles (MNPs) embedded in a polymer matrix comprising a porous polymeric aggregate and a polymeric network. In the filtration membrane, the porous polymeric aggregate is formed by a base polymer and the polymeric network is formed by a functionalizing polymer. In the filtration membrane, the polymeric microparticles and/or nanoparticles are attached to the functionalizing polymer forming the polymeric network of the polymer matrix. In particular, in the filtration membrane, the polymeric microparticles and/or nanoparticles can be reacted with functionalizing monomers and/or functionalizing polymers to form the polymeric network attached to the microparticle and/or nanoparticles. In some embodiments, the functionalizing polymer is covalently attached and in particular crosslinked to the MNPs.

According to a second aspect, a filtration membrane is described. The filtration membrane comprises a base polymer forming a porous polymeric aggregate or polymeric fibers, polymeric microparticles and/or nanoparticles embedded in the base polymer and a functional polymer covalently and/or non-covalently linked to the embedded microparticles and/or nanoparticles to form a polymer network of the filtration membrane.

According to a third aspect, a system of making a filtration membrane with in-situ synthesized polymeric particles and polymer networks is described. The system comprises a base polymer for the membrane matrix substantially soluble in a base polymer solvent, a polymeric particle precursor partially soluble in the base polymer solvent the base polymer solvent, a polymeric particle precursor capable to form a dispersion of segregated domains in the base polymer solvent, a crosslinker and/or an initiator capable of reacting with the polymer particle precursor, and a polymer network precursor. In some embodiments, the system also comprises the base polymer solvent or a mixture of solvents compatible with the base polymer solvent capable of dissolving the base polymer and/or a non-solvent substantially incompatible with base polymer solvent or a mixture of non-solvents substantially incompatible with the base polymer solvent for the membrane polymer to promote phase separation and subsequent membrane formation.

According to a fourth aspect, a method of making a filtration membrane with in-situ generated polymeric particles is described. The method comprises: providing a base polymer substantially soluble in a base polymer solvent; providing a particle precursor having a portion substantially soluble in the base polymer solvent and a portion substantially insoluble in the base polymer solvent the polymeric particle precursor able to provide a dispersion of segregated domains in the base polymer solvent; contacting the base polymer, the polymeric particle precursor, and the base polymer solvent to provide a blend, contacting the blend with a functionalizing polymer and/or a functionalizing polymer precursor and a crosslinker and/or an initiator capable of reacting with the polymer particle precursor, for a time and under a condition to permit the in situ formation of microparticles and/or nanoparticles attaching a functionalizing polymer thus providing a dope solution. The method further comprises casting the dope solution to provide a filtration membrane with embedded microparticles and/or nanoparticles presenting the functionalizing polymer to form a polymeric network component of the filtration membrane.

According to a fifth aspect a filtration membrane is described. The filtration membrane comprises a plurality of nanofibers and/or micro fibers each nanofiber comprising polymer nanoparticles embedded therein, each microfiber comprising polymeric nanoparticles and/or microparticles embedded therein. In the filtration membrane, each nanofiber and microfiber of the plurality of nanofibers and/or micro fibers comprises a base polymer and a functionalizing polymer, the functionalizing polymer attaching the polymeric nanoparticles and/or microparticles to form a polymeric network in the nanofibers and/or micro fibers. In the filtration membrane, the polymeric nanoparticles and/or microparticles and/or polymeric network present a reactive site on the nanofibers and/or micro fibers to allow selective filtration of a chemical capable of interaction with the reactive site. In some embodiments, in the filtration membrane, the plurality of nanofibers and/or microfibers is arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers or microfibers are hollow.

According to a sixth aspect, a process for providing a nanofiber or microfiber is described. The process comprises mixing a base polymer substantially soluble in a base polymer solvent with a polymeric particle precursor, and the base polymer solvent to provide a blend. The process further comprises mixing the blend with a functionalizing polymer, a crosslinker and/or an initiator capable of reacting with the polymer particle precursor, for a time and under a condition to permit the in situ formation of crosslinked dendritic microparticles and/or nanoparticles attaching the functionalizing polymer thus providing a dope solution and electrospraying and/or electrospinning the liquid mixture to provide a nanofiber or microfiber According to a seventh aspect a bicomposite membrane is described. The bicomposite membrane comprises a plurality of nanofibers and/or microfibers attached to a polymer matrix formed by a porous polymeric aggregate comprising a polymeric network component embedded in the polymeric aggregate and presented on polymeric nanoparticles attaching one or more functionalizing polymer forming the network component. In some embodiments the plurality of nanofibers and/or nano fibers of the bicomposite membrane comprise nanofibers and/or nano fibers with embedded microparticles and/or nanoparticles attaching a functionalizing polymer forming a polymeric network in the matrix of the fibers herein described.

Filtration membranes with embedded polymeric micro/nanoparticles and related methods and systems herein described can be used in connection with applications wherein water filtration in particular when aimed at selective filtration is desired. Exemplary applications comprise fluid purification, and in particular water filtration, water purification and in particular water desalination and additional applications associated with industrial/environmental separations, including chemical and/or biological purifications, which are identifiable by a skilled person. Additional applications comprise gas separations, additional chemical and/or biological purifications and catalysis wherein selective absorption, inclusion or removal/conversion of one or more solutes/compounds is desired.

Mixed matrix membranes (MMMs) and related methods and systems herein described allow in some embodiments to carry out multiple functions (e.g. retention, sorption and catalysis) with higher permselectivity and flux, greater mechanical strength and lower fouling propensity.

In matrix membranes and related methods and systems herein described, polymeric micro/nanoparticles (MNPs) can provide in some embodiments flexibility for the preparation of MMMs with improved particle-matrix compatibility, particle loading, flux and/or permselectivity.

In matrix membranes and related methods and systems herein described, polymeric MNPs can be prepared with different sizes (e.g. 10 nn-10 μm), shapes (e.g. spherical) and morphologies (e.g. core-shell). Their chemistry can be tuned to produce functional particles (e.g. crosslinked polyamine beads) that could serve as organic sorbents, ion exchange media and affinity/chelating media making them particularly attractive as building blocks for multifunctional membranes.

Filtration membranes with embedded polymeric micro/nanoparticles and related methods and systems herein described can be used in connection with applications wherein water filtration in particular when aimed at selective filtration is desired. Exemplary applications comprise fluid purification, and in particular water filtration, water purification and in particular water desalination and additional applications associated with industrial/environmental separations, including chemical and/or biological purifications, which are identifiable by a skilled person. Additional applications comprise gas separations, additional chemical and/or biological purifications and catalysis wherein selective absorption, inclusion or removal/conversion of one or more solutes/compounds is desired.

It is expected that this versatile, flexible and tunable membrane platform can be used to prepare a new generation of high performance membranes, modules and systems for a broad range applications including water treatment, catalysis, gas separations, chemical and biological purifications, and energy generation, conversion and storage The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 3A shows a schematic illustration of the Mixed Matrix Membrane Preparation Methodology according to an embodiment herein described. FIGS. 3B-C show a schematic illustration of the reaction schemes related to the methodology of FIG. 3A.

FIG. 4A and FIG. 4B show neat PVDF control membrane. FIG. 4C and FIG. 4D show PPNM-1, FIG. 4E and FIG. 4F show PPNM-2, FIG. 4G and FIG. 4H show PPNM-3.

FIG. 5A and FIG. 5B show neat PVDF control membrane. FIG. 5C and FIG. 5D show PPNM-1, FIG. 5E and FIG. 5F show PPNM-2, FIG. 5G and FIG. 5H show PPNM-3.

FIG. 6A and FIG. 6B show NSM-1. FIG. 6C and FIG. 6D show NSM-2. FIG. 6E and FIG. 6F show NSM-3.

FIG. 7A shows NSM-1, top surface. FIG. 7B shows NSM-2, bottom surface. FIG. 7C shows NSM-2, top surface. FIG. 7D shows NSM-2, bottom surface. FIG. 7E shows NSM-3, top surface. FIG. 7F shows NSM-3, bottom surface. It can be observed that HPEI particles are visible at bottom surface. Top surface morphology of NSM-3 shows more number of pores than NSM-1 and NSM-2 but not much change in basic morphology. Inset shows the magnified view to observe the PEI particles presence at bottom surface (FIGS. 7B, 7D and 7F) of respective membranes.

FIG. 8A shows main absorption bands of the mid IR region. FIG. 8B shows main absorption bands of the near IR region.

FIG. 13A shows a schematic illustration of the Mixed Matrix Membrane Preparation Methodology according to an embodiment herein described. FIG. 13B shows a schematic illustration of the reaction schemes related to the methodology of FIG. 13A.

FIG. 17A shows a graph illustrating Mid IR Spectra. FIG. 17B shows a graph illustrating Mid IR Spectra.

FIG. 36A shows a graph illustrating the Barrett-Joyner-Halenda adsorption pore volume. FIG. 36B shows a graph illustrating the Barrett-Joyner-Halenda desorption pore volume.

FIG. 37A shows a graph illustrating the Barrett-Joyner-Halenda adsorption pore volume. FIG. 37B shows a graph illustrating the Barrett-Joyner-Halenda desorption pore volume.

FIG. 38A shows a graph illustrating the Barrett-Joyner-Halenda adsorption pore volume. FIG. 38B shows a graph illustrating the Barrett-Joyner-Halenda desorption pore volume.

FIG. 39A shows a graph illustrating the Barrett-Joyner-Halenda adsorption pore volume. FIG. 39B shows a graph illustrating the Barrett-Joyner-Halenda desorption pore volume.

DETAILED DESCRIPTION

Figure 1:
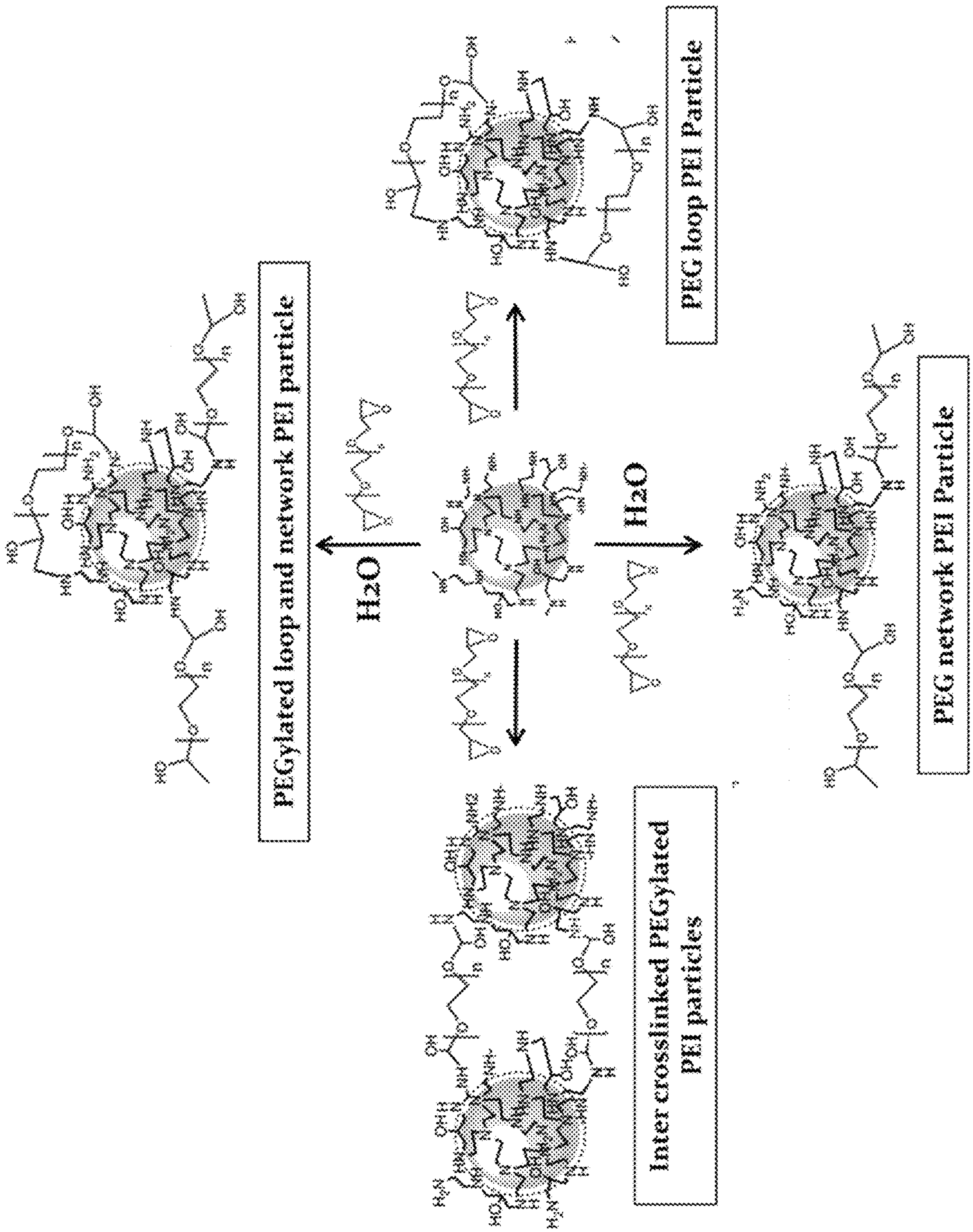
FIG. 1 shows a schematic illustration of various possible reactions of epoxide with amines in PEI particle and water according to embodiments herein described.

Provided herein are mixed matrix filtration membranes with embedded polymeric particles and networks along with related compositions, methods and systems that allow in several embodiment to perform selective filtration of a liquid and in particular of water.

The term "filtration" as used herein refers to the mechanical or physical operation which can be used for separating components of a homogeneous or heterogeneous solutions. Types of filtration can be classified by the approximate sizes of chemicals to be separated and can include particle filtration, or PF (>10 μm); microfiltration, or MF (0.1-10 μm); ultrafiltration, or UF (0.01-0.1 μm); nanofiltration, or NF (0.001-0.01 μm); and reverse osmosis, or RO (<0.001 μm).

The term "chemicals" as used herein indicates a substance with a distinct composition that is produced by or used in a chemical process. Exemplary chemicals comprise particles, molecules, metals, ions, organic compounds, inorganic compounds and mixture thereof as well as any additional substance detectable through chemical means identifiable by a skilled person. In particular, in some embodiments, the chemicals can comprise solutes dissolved in a fluid (e.g. water), and in particular dissolved ions.

The term "membrane" as used herein refers to a porous structure that is capable of separating components of a homogeneous or heterogeneous fluid. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thicknesses, with homogeneous or heterogeneous structure. Membranes can be comprised within, for example, flat sheets or bundles of hollow fibers. Membranes can also be in various configurations, including but not limited to spiral wound, tubular, hollow fiber, and other configurations identifiable to a skilled person upon a reading of the present disclosure (see, for example the web page kochmembrane.com/Learning-Center/Configurations.aspx). Membrane can also be classified according to their pore diameter. According to IUPAC, there are three different types of pore size classifications: microporous (dp<2 nm), mesoporous (2 nm<dp<50 nm) and macroporous (dp>50 nm). In particular, in some instances, membranes can have pores with a 0.5 nm to 1.0 mm diameters. Membranes can be neutral or charged, and particles transport can be active or passive. The latter can be facilitated by pressure, concentration, chemical or electrical gradients of the membrane process.

In several embodiments, a filtration membrane herein described comprises a polymer matrix formed by a porous polymeric aggregate and by a polymeric network.

The term "polymer matrix" as used herein refers to three-dimensional network of a polymer component of the membrane. The term "polymer component" as used herein refers to one or more linear polymers forming a polymeric aggregate of the polymer matrix and comprising repeating structural unit forming long chains without branches or cross-linked structures. The polymer component also comprise one or more linear or branched polymers forming a polymeric network component of the polymer matrix and comprising repeating structural unit forming chains of various lengths (e.g. 10 nm and 100 nm chain length) with or without branches or cross-linked structures. In some instances molecular chains of a linear polymer can be intertwined, but in absence of modification or functionalization the forces holding the polymer together are physical rather than chemical and thus can be weakened by energy applied in the form of heat. In particular, polymers forming the polymeric component in the sense of the disclosure comprise substituted or unsubstituted aliphatic polymer, a substituted or unsubstituted unsaturated polymer and a substituted or unsubstituted aromatic polymer identifiable by a skilled person upon reading of the present disclosure.

The term "polymer aggregate" or "polymeric aggregate" or "aggregate" as used herein refers to aggregations of linear polymer molecules that form an amorphous network structure. The amorphous network structure can provide structural support to the filtration membranes and pores through which desired substances can pass from one side of the membrane to the other. Exemplary polymer aggregates can be seen, for example, in FIGS. 4A-H, FIGS. 5A-H, FIGS. 6A-F and FIGS. 7A-F. In particular, in some embodiments, the pores provided by the polymer aggregate of the polymer matrix can permit the passage of some molecules (e.g. solvent molecules such as water) while preventing the passage of others (e.g. solute molecules such as proteins) thus configuring the membrane to act as a size-exclusion membrane.

The term "polymeric network", "polymeric network component" as used herein refers to an arrangement of interconnected polymers which is comprised in the polymer matrix embedded in the polymeric aggregate to form an interlaced polymeric structure within the polymeric aggregates. In particular, the functionalizing polymer is formed by a linear or branched polymers presenting functional groups capable of covalently or non-covalently attach polymeric microparticles and/or nanoparticles embedded in the polymer matrix and more particularly in the polymeric porous aggregate of the matrix. In some embodiments, the functionalizing polymer can be hydrophilic Exemplary polymer matrices with aggregate, polymeric network and microparticles and/or nanoparticles can be seen for example, in FIGS. 4A-H, FIGS. 5A-H.

The term "polymeric nanoparticles", "polymeric nanoparticles" "polymeric nanomaterial" or as used herein refers to particles of covalently linked and in particular cross-linked polymeric molecules in which the covalently linked or cross-linked polymeric molecules form aggregate nanostructures and/or microstructure with a controlled composition, architecture, and/or size. In particular, in some embodiments, the polymeric molecules forming the polymeric particle precursor to be covalently linked or cross-linked to form particles can be linear polymeric molecules such as, for example, poly(methacrylic acid). In other embodiments, the polymeric molecules forming the polymeric particle precursor can be or further include dendritic nanomaterials such as, for example, poly(ethyleneimine) (PEI) or 2,2-bis(methylol) propionic acid (MPA) hyperbranched macromolecule.

The term "dendritic nanomaterial" or "dendritic nanoparticles" 'or "dendritic microparticles" refers to highly branched dendritic macromolecules linked in aggregate nanostructures and/or microstructure with a controlled composition, architecture, and/or size. The term "highly branched dendritic macromolecule" as used herein indicates a macromolecule whose structure is characterized by a high degree of branching that originates from a central core region. Exemplary highly branched dendritic macromolecules comprise dendrimers, hyperbranched polymers, dendrigraft polymers, dendronized linear polymers, tecto-dendrimers, core-shell (tecto) dendrimers, hybrid linear dendritic copolymers, dendronized polymers and additional molecule identifiable by a skilled person (see e.g. US 2006/0021938, US 2008/0185341, US 2009/0001802, US 2010/0181257, US 2011/0315636, and US 2012/0035332 each incorporated by reference in its entirety, also describing method of making highly branched dendritic macromolecules). Exemplary dendritic nanomaterials can include, for example, any highly branched dendritic macromolecules or mixtures thereof, in dendrimer-based supramolecular assemblies, 3-D globular nanoparticles or dendritic nano/microparticles identifiable by a skilled person (see, for example, US 2006/0021938, US 2008/0185341, US 2009/0001802, US 2010/0181257, US 2011/0315636, and US 2012/0035332 each incorporated by reference in its entirety).

In particular in some embodiments of the filtration membranes herein described a polymeric nanomaterial forming particles (e.g. polymeric and/or dendritic microparticles and/or nanoparticles) can be embedded in the porous polymer aggregate of the polymer matrix.

The term "embed" or "embedded" as used herein refers to a spatial relationship of an item relative to a structure in which the item is at least partially enclosed within the structure. In particular, when used in connection to spatial relationship of nanoparticle with reference to a polymer matrix the term "embed" refers to the nanoparticles being at least partially enclosed by the matrix in a suitable configuration within the polymeric aggregate. In particular, in some embodiments the nanoparticles can be attached (e.g. through covalent bonds or through non-covalent interactions such as, for example, van Der Waals forces) to the polymer molecules forming the porous aggregate in particular in correspondence to pores of the porous aggregate structure of the polymer matrix. (see e.g. FIGS. 4A-H).

In embodiments herein described, at least one polymer of the polymers forming the polymer component of the polymer matrix has a functional group capable of interacting with a corresponding functional group on the polymeric microparticles and/or nanoparticle.

The term "functional group" as used herein indicates specific groups of atoms within a molecular structure that are responsible for the characteristic chemical reactions and chemical properties of that structure. Exemplary functional groups include hydrocarbons, groups containing halogen, groups containing oxygen, groups containing nitrogen and groups containing phosphorus and sulfur all identifiable by a skilled person. In particular, functional groups in the sense of the present disclosure include a halide, carboxylic acid, amine, triarylphosphine, azide, acetylene, sulfonyl azide, thio acid and aldehyde. In particular, for example, the first functional group and the second functional group can be selected to comprise the following binding partners: carboxylic acid group and amine group, carboxylic acid and ether group, amine group and nitrile group, azide and acetylene groups, azide and triarylphosphine group, sulfonyl azide and thio acid, aldehyde and primary amine, and an amine group and a fluorine. Additional functional groups can be identified by a skilled person upon reading of the present disclosure. As used herein, the term "corresponding functional group" refers to a functional group that can react or interact (e.g. through non-covalent electrostatic attraction) with another functional group. Thus, functional groups that can react or interact with each other can be referred to as corresponding functional groups. In embodiments where the corresponding functional groups are in the polymer forming the polymer matrix and in the polymer forming the nanoparticle, the corresponding functional groups react to form a covalent bond, a hydrogen bond or other bond functional to the attachment of the polymer forming the polymer matrix and the polymer forming the nanoparticle identifiable by a skilled person upon reading of the present disclosure.

The term "attach" or "attachment" as used herein, refers to connecting or uniting by a bond, link, force or tie in order to keep two or more components together, which encompasses either direct or indirect attachment such that, for example, a first compound is directly bound to a second compound or material, and the embodiments wherein one or more intermediate compounds, and in particular molecules, are disposed between the first compound and the second compound or material. In particular, in some embodiments, the polymeric nanomaterial can be associated with the polymer matrix by, for example, by being physically embedded in the polymer matrix, by being covalently bonded to the polymeric component, or through a combination of both.

In embodiments herein described, polymeric material forming the microparticles and/or the nanoparticles is attached to the functionalizing polymer through covalent link between corresponding functional groups presented on the functionalizing polymer and polymeric material of the particle. In some embodiments the attachment between functionalizing polymer and polymeric material of the microparticles and/or nanoparticles can occur by crosslinking. In some embodiments polymeric material forming the microparticles and/or the nanoparticles is attached to the functionalizing polymer through non-covalent interactions between moieties and in particular functional groups presented in the microparticles and/or nanoparticles and the functionalizing polymer.

In some embodiments herein described nanoparticles are functionalized with one or more functionalizing polymers forming the polymer network of the polymeric matrix in accordance with the disclosure, wherein the functionalizing polymers attach the microparticles and/or nanoparticles through covalent link of one or more functional groups to the microparticle and/or nanoparticles polymer. In particular, terminal functional groups or other functional groups presented on the functionalizing polymer can be covalently linked and/or crosslinked to the polymeric material forming the particles.

Figure 2A:
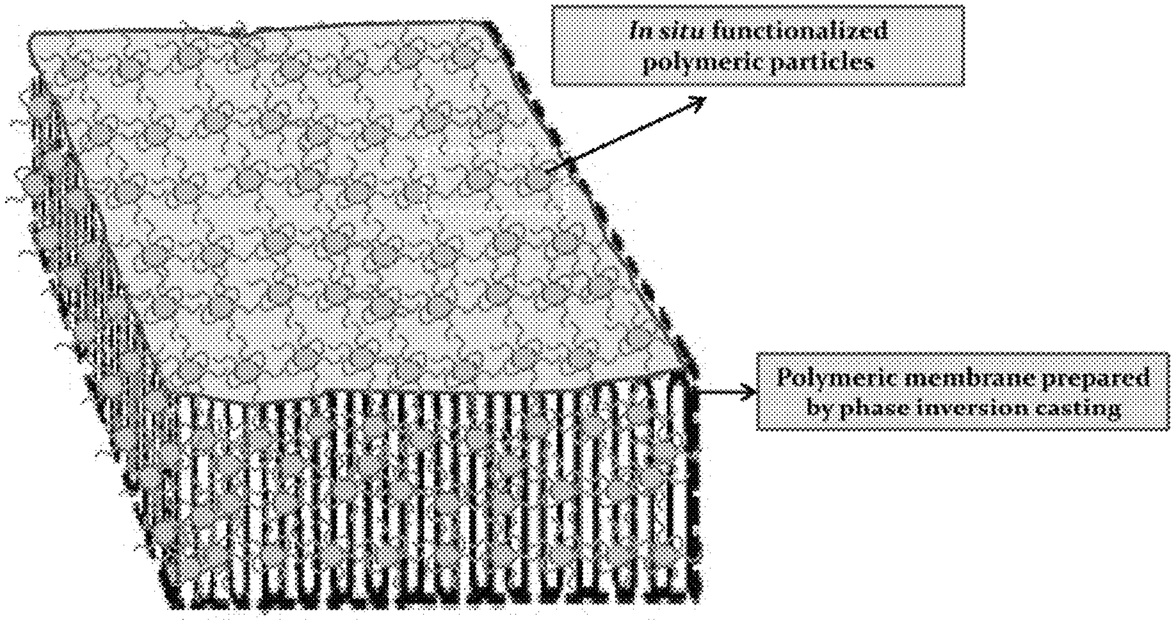
FIG. 2*a* shows a general schematic representation of an organic polymeric mixed matrix membrane and its components according to embodiments herein described.
Figure 2B:
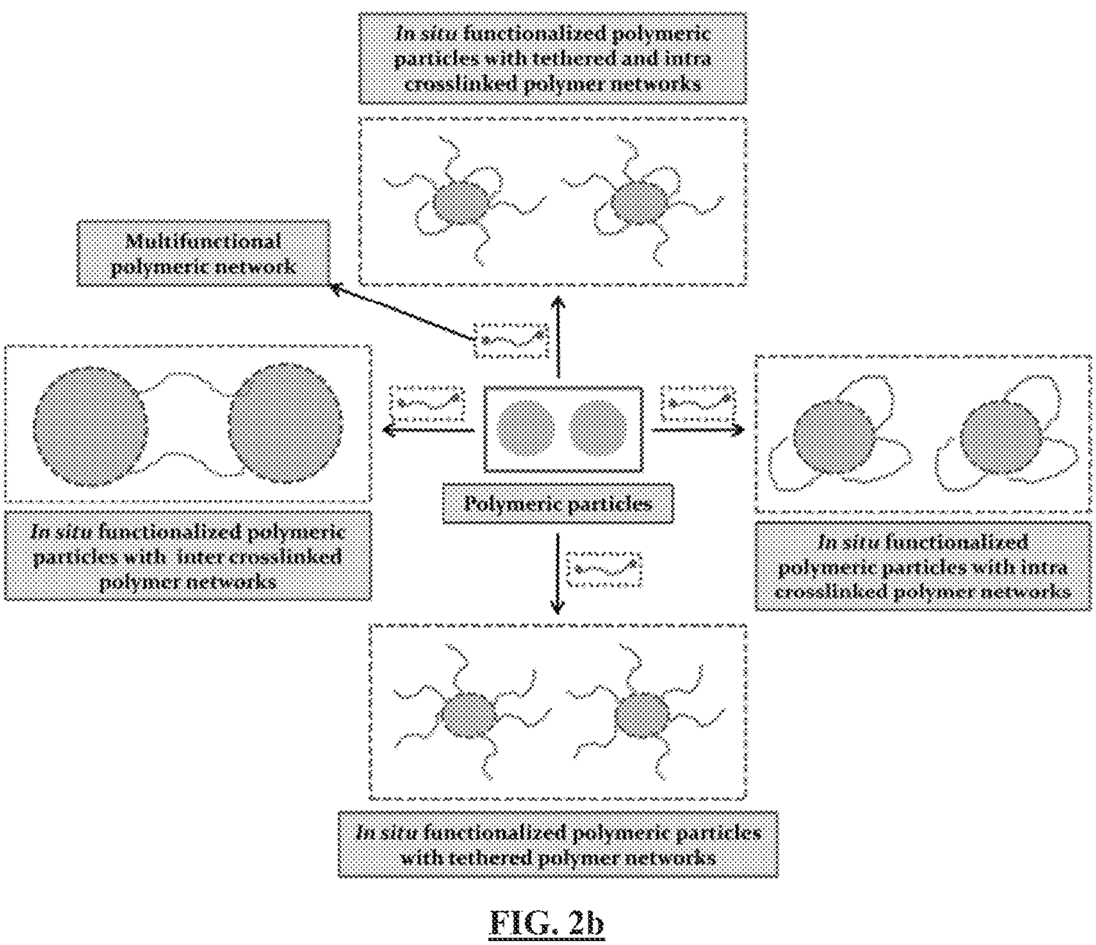
FIG. 2*b* shows a general schematic representation of various reactions of polymeric particles with multifunctional polymeric networks according to embodiments herein described.

The illustration of FIG. 1 and FIG. 2 provides a schematic representation of possible configurations of functionalizing polymer with nanoparticles herein described. In particular, in the illustration of FIGS. 1 and 2, a configuration is shown wherein the functionalizing polymer can have terminal ends linked to a same microparticle or nanoparticle (intra crosslinked polymeric network of FIG. 2) or different microparticle or nanoparticle (inter crosslinked polymeric network of FIG. 2), or having one end linked to the microparticle (tethered polymeric network of FIG. 2).

The configuration of the polymeric network on the microparticles and/or nanoparticles depends on the relative dimension between functionalizing polymer and microparticle or nanoparticle. In particular a dimension of the polymeric particles in the filtration membrane herein described range from about 10-100 nm to about 2-4 micron and in particular can be from 10 to 100 nm or from 500 nm to 2 micron or 4 micro, depending on the specific combination of base polymer network polymer and polymeric particle precursor as well as related solvents and condition of preparation as will be understood by a skilled person upon reading of the present disclosure.

In some embodiments, the functional group covalently linking to microparticles and/or nanoparticles can be at one or both terminal ends of a linear functionalizing polymer. In some embodiments the functional group covalently linking to microparticles and/or nanoparticles can be at at least one end of a branched functionalizing polymer.

In some embodiments, the functional groups of the functionalizing polymer covalently attaching the microparticles and/or nanoparticles can be an acrylate, a methacrylate, an epoxide, an halide, an isocyanate, an acyl chloride, an anhydride, preferably epoxides, halides, acyl chlorides and anhydrides functional groups.

In some embodiments the functionalizing polymer can be a hydrophilic polymer, wherein a hydrophilic polymer is a polymer substantially soluble in water.

In embodiments herein described, the concentration of microparticles and/or nanoparticles functionalized with a polymeric network in the membranes can be between about 1 and 50 wt % of the membrane weight as determined by, for example, x-ray photoelectron spectroscopy of the membranes (see, e.g. Examples section). In particular, in some embodiments, the concentration of microparticles and/or nanoparticles in the matrix can be between about 1 and 10 wt %. In particular, in other embodiments, the concentration of the microparticles and/or nanoparticles in the matrix can be greater than about 10 wt %, and more particularly greater than about 20 wt %, and more particularly greater than about 40 wt %. in some embodiments the microparticles and/or nanoparticles concentration can be up to about 50%. In some embodiments, the concentration of microparticles and/or nanoparticles can be between about 25% to about 50%, above 50%, and also between about 50% and about 60%. In some embodiments, the concentration of microparticles and/or nanoparticles can be between about 35 to 57 wt. percent (see Examples section).

In some embodiments, the microparticles and/or nanoparticles can have a homogeneous distribution throughout the membrane wherein similar numbers of nanoparticles are observed within same sized areas (e.g. in SEM images at the same magnification) throughout different portions of the membrane (see, e.g. Example section). In particular, in some embodiments, some (greater than about 5%) the microparticles and/or nanoparticles can be present as clusters of nanoparticles as can be observed by imaging the membrane (e.g. with SEM images of the membrane). In other embodiments, the particles can be discrete and not detectable as clusters (see, e.g. Example section).

In particular, in some embodiments, the filtration membranes can have nanoparticles approximately 1-3000 nm in size as can be determined, for example, by SEM and AFM imaging (see e.g. Examples section).

In particular, in some embodiments, the filtration membranes herein described can have pores formed by the polymer aggregates forming the polymer matrix that range in size from approximately 0.5 microns to 10 microns as can be observed by imaging the membrane, for example, by SEM (see e.g. Example section).

The functionalizing polymer can be comprised in some embodiments in a length from 10 nm to 100 nm in length and is attached to the related microparticles and/or nanoparticles in configurations (e.g. loop, network and/or interparticles crosslinking) which are dependent on the relative proportion between functional polymer length and particles dimensions as will be understood by a skilled person. In particular the higher the ratio between particles dimension and functional polymer length the higher the percentage of the functionalizing polymer in an interparticle crosslinking configuration, where instead lower ratios increase the percentage of functionalizing polymer in a network or loop configuration as will be understood by a skilled person.

In some embodiments, the polymer matrix and polymeric nanoparticles can be brought together to form membranes comprising the polymer matrix and polymeric microparticles and/or nanoparticles such that the polymeric microparticles and/or nanoparticles are embedded in the polymer matrix. In particular, in some embodiments, the formation of the membranes with embedded polymeric nanoparticles can be accomplished by allowing formation of polymeric nanoparticle in situ.

In particular, in some of those embodiments, a method for making a filtration membrane in situ herein described comprises preparing a blend comprising the base polymer that will form the polymeric aggregate and the polymer that will form the polymeric microparticle and/or nanoparticles in a suitable solvent or mixture of solvents; adding to the blend a functionalizing polymer that will form the polymeric network for a time and under condition to allow the related attachment e.g. crosslinking to the polymeric microparticles and/or nanoparticles Embodiments wherein formation of polymeric nanoparticles is performed in situ allow under appropriate conditions formation of homogeneous membrane having a concentration of particles up to about 50% and/or in which fractal formation of nanoparticle is not detectable. In addition or in the alternative to the particle distribution, concentration and configuration, filtration membrane obtainable by in situ formation can have further controllable features identifiable by a skilled person upon reading of the present disclosure.

In some embodiments, the method to prepare a filtration membrane herein described in situ comprises preparing a base polymer solution by dissolving the target amount of base polymer in a suitable and good/compatible solvent. In particular, in in situ method a good/compatible solvent is a solvent where the base polymer is substantially soluble wherein the term "substantially soluble" as used herein with reference to a polymer and a solvent and/or a composition indicates the ability of the polymer to dissolve in the solvent and/or composition. Accordingly, the backbone of the base polymers as herein described can be substantially soluble in a good solvent when the polymer backbone and the good solvent have similar Hildebrand solubility parameters (δ) which is the square root of the cohesive energy density:

$$\delta = \sqrt{\frac{\Delta H_v - RT}{V_m}}$$

wherein $\Delta H_v$ is equal to the heat of vaporization, R is the ideal gas constant, T is the temperature, and $V_m$ is the molar volume. Similarly two solvents or more solvents are compatible when they have similar solubility parameters. In particular, similar solubility parameters between a polymer or a portion thereof and a solvent and/or composition, and similar solubility parameters between two or more solvents can be found when the absolute value of the difference between their solubility parameters is within 1-10% (see also Tables 1 to 3 herein).

A polymer or portion thereof in accordance with the present disclosure is partially soluble in a certain solvent or composition, when the polymer or portion thereof has partially similar solubility parameters with the solvent or compositions. Analogously two or more solvents are partially compatible one with the other when the two or more solvents have partially similar solubility parameters. Partially similar solubility parameters are found when the absolute value of the difference between their solubility parameters is within 5 to 10% (see also Tables 1 to 3 herein).

A polymer or portion thereof in accordance with the present disclosure is substantially insoluble in a certain solvent or composition, when the polymer or portion thereof has dissimilar solubility parameters with the solvent or compositions. Analogously two or more solvents are substantially incompatible one with the other when the two or more solvents have dissimilar solubility parameters. Dissimilar solubility parameters are found when the absolute value of the difference between their solubility parameters is higher than 10% (see also Tables 1 to 3 herein).

A skilled person will realize that the ability of the backbone to dissolve in the solvent can be verified, for example, by placing an amount of the homopolymer or copolymer to be used in the solvent or composition as herein described, and observing whether or not it dissolves under appropriate conditions of temperature and agitation that are identifiable to a skilled person.

In particular, an exemplary reference providing solubility parameters is the website www.sigmaaldrich.com/etc/medialib/docs/Aldrich/General_Information/polymer_solutions.Par.0001.File.tmp/polymer_solutions.pdf [1] at the time of filing of the present disclosure (see Tables 1-3). More particularly, a skilled person will know that Sigma-Aldrich and other chemical companies provide exemplary tables showing exemplary solubility parameter values for various non-polar compositions and polymers. A skilled person can also refer to sources such as the Polymer Handbook to find solubility parameter values Brandrup, J., et al., "Polymer handbook". Vol. 1999. 1999: Wiley New York [2].

TABLE 1

Solubility Parameters for Plasticizers and Solvents (Alphabetical sequence)

| Solvent | δ $(cal/cm^3)F$ | H-Bonding Strength[3] | Solvent | δ $(cal/cm^3)^{1/2}$ | H-Bonding Strength[3] |
|---|---|---|---|---|---|
| Acetone | 9.9 | m | Dioctyl sebacate | 8.6 | m |
| Acetonitrile | 11.9 | p | 1,4-Dioxane | 10.0 | m |
| Amyl acetate | 8.5 | m | Di(propylene glycol) | 10.0 | s |
| Aniline | 10.3 | s | Di(propylene glycol) monomethyl ether | 9.3 | m |
| Benzene | 9.2 | p | | | |
| Butyl acetate | 8.3 | m | Dipropyl phthalate | 9.7 | m |
| Butyl alcohol | 11.4 | s | Ethyl acetate | 9.1 | m |
| Butyl butyrate | 8.1 | m | Ethyl amyl ketone | 8.2 | m |
| Carbon disulfide | 10.0 | p | Ethyl n-butyrate | 8.5 | m |
| Carbon tetrachloride | 8.6 | p | Ethylene carbonate | 14.7 | m |
| Chlorobenzene | 9.5 | p | Ethylene dichloride | 9.8 | p |
| Chloroform | 9.3 | p | Ethylene glycol | 14.6 | s |
| Cresol | 10.2 | s | Ethylene glycol diacetate | 10.0 | m |
| Cyclohexanol | 11.4 | s | Ethylene glycol diethyl ether | 8.3 | m |
| Diamyl ether | 7.3 | m | Ethylene glycol dimethyl ether | 8.6 | m |
| Diamyl phthalate | 9.1 | m | Ethylene glycol monobutyl ether (Butyl Cellosolve ®) | 9.5 | m |
| Dibenzyl ether | 9.4 | m | | | |
| Dibutyl phthalate | 9.3 | m | Ethylene glycol monoethyl ether (Cellosolve ®) | 10.5 | m |
| Dibutyl sebacate | 9.2 | m | | | |
| 1,2-Dichlorobenzene | 10.0 | p | Furfuryl alcohol | 12.5 | s |
| Diethyl carbonate | 8.8 | m | Glycerol | 16.5 | s |
| Di(ethylene glycol) | 12.1 | s | Hexane | 7.3 | p |
| Di(ethylene glycol) monobutyl ether (Butyl Carbitol ®) | 9.5 | m | Isopropyl alcohol | 8.8 | m |
| | | | Methanol | 14.5 | s |
| Di(ethylene glycol) monoethyl ether (Carbitol ®) | 10.2 | m | Methyl amyl ketone | 8.5 | m |
| | | | Methylene chloride | 9.7 | p |
| Diethyl ether | 7.4 | m | Methyl ethyl ketone | 9.3 | m |
| Diethyl ketone | 8.8 | m | Methyl isobutyl ketone | 8.4 | m |
| Diethyl phthalate | 10.0 | m | Propyl acetate | 8.8 | m |
| Di-n-hexyl phthalate | 8.9 | m | 1,2-Propylenecarbonate | 13.3 | m |
| Diisodecyl phthalate | 7.2 | m | Propylene glycol | 12.6 | s |
| N,N-Dimethylacetamide | 10.8 | m | Propylene glycol methyl ether | 10.1 | m |
| Dimethyl ether | 8.8 | m | Pyridine | 10.7 | s |
| N,N-Dimethylformamide | 12.1 | m | 1,1,2,2-Tetrachloroethane | 9.7 | p |
| Dimethyl phthalate | 10.7 | m | Tetrachloroethylene (perchloroethylene) | 9.3 | p |
| Dimethylsiloxanes | 4.9-5.9 | p | | | |
| Dimethyl sulfoxide | 12.0 | m | Tetrahydrofuran | 9.1 | m |
| Dioctyl adipate | 8.7 | m | Toluene | 8.9 | p |
| Dioctyl phthalate | 7.9 | m | Water | 23.4 | s |

[2]"Polymer Handbook", Eds. Brandrup, J.; Immergut, E. H.; Grulke, E. A., 4th Edition, John Wiley, New York, 1999, VII/675-711. Aldrich Catalog Number Z41, 247-3.
[3]H-Bonding: p = poor; m = moderate; s = strong

TABLE 2

Solubility Parameters (δ) for Plasticizers and Solvents (Increasing δ value sequence)

| Solvent | δ $(cal/cm^3)^{1/2}$ | H-Bonding Strength[4] | Solvent | δ $(cal/cm^3)^{1/2}$ | H-Bonding Strength[4] |
|---|---|---|---|---|---|
| Dimethylsiloxanes | 4.9-5.9 | P | Di(ethylene glycol) monobutyl ether (Butyl Carbitol ®) | 9.5 | m |
| Diisodecyl phthalate | 7.2 | m | | | |
| Hexane | 7.3 | p | Chlorobenzene | 9.5 | p |
| Diamyl ether | 7.3 | m | Methylene chloride | 9.7 | p |
| Diethyl ether | 7.4 | m | Dipropyl phthalate | 9.7 | m |
| Dioctyl phthalate | 7.9 | m | 1,1,2,2-Tetrachloroethane | 9.7 | p |

TABLE 2-continued

Solubility Parameters (δ) for Plasticizers and Solvents (Increasing δ value sequence)

| Solvent | δ $(cal/cm^3)^{1/2}$ | H-Bonding Strength[4] | Solvent | δ $(cal/cm^3)^{1/2}$ | H-Bonding Strength[4] |
|---|---|---|---|---|---|
| Butyl butyrate | 8.1 | m | Ethylene dichloride | 9.8 | p |
| Ethyl amyl ketone | 8.2 | m | Acetone | 9.9 | m |
| Ethylene glycol diethyl ether | 8.3 | m | 1,2-Dichlorobenzene | 10.0 | p |
| Butyl acetate | 8.3 | m | Diethyl phthalate | 10.0 | m |
| Methyl isobutyl ketone | 8.4 | m | Ethylene glycol diacetate | 10.0 | m |
| Methyl amyl ketone | 8.5 | m | Di(propylene glycol) | 10.0 | s |
| Amyl acetate | 8.5 | m | Carbon disulfide | 10.0 | p |
| Ethyln-butyrate | 8.5 | m | 1,4-Dioxane | 10.0 | m |
| Ethylene glycol dimethyl ether | 8.6 | m | Propylene glycol methyl ether | 10.1 | m |
| Carbon tetrachloride | 8.6 | p | Di(ethylene glycol) monoethyl ether (Carbitol ®) | 10.2 | m |
| Dioctyl sebacate | 8.6 | m | | | |
| Dioctyl adipate | 8.7 | m | Cresol | 10.2 | s |
| Isopropyl alcohol | 8.8 | m | Aniline | 10.3 | s |
| Diethyl carbonate | 8.8 | m | Ethylene glycol monoethyl ether (Cellosolve ®) | 10.5 | m |
| Propyl acetate | 8.8 | m | | | |
| Diethyl ketone | 8.8 | m | Pyridine | 10.7 | s |
| Dimethyl ether | 8.8 | m | Dimethyl phthalate | 10.7 | m |
| Toluene | 8.9 | p | N,N-Dimethylacetamide | 10.8 | m |
| Di-n-hexyl phthalate | 8.9 | m | Cyclohexanol | 11.4 | s |
| Ethyl acetate | 9.1 | m | Butyl alcohol | 11.4 | s |
| Diamyl phthalate | 9.1 | m | Acetonitrile | 11.9 | p |
| Tetrahydrofuran | 9.1 | m | Dimethyl sulfoxide | 12.0 | m |
| Dibutyl sebacate | 9.2 | m | Di(ethylene glycol) | 12.1 | s |
| Benzene | 9.2 | p | N,N-Dimethylformamide | 12.1 | m |
| Tetrachloroethylene (perchloroethylene) | 9.3 | p | Furfuryl alcohol | 12.5 | s |
| | | | Propylene glycol | 12.6 | s |
| Di(propylene glycol) monomethyl ether | 9.3 | m | 1,2-Propylenecarbonate | 13.3 | m |
| | | | Methanol | 14.5 | s |
| Chloroform | 9.3 | p | Ethylene glycol | 14.6 | s |
| Dibutyl phthalate | 9.3 | m | Ethylene carbonate | 14.7 | m |
| Methyl ethyl ketone | 9.3 | m | Glycerol | 16.5 | s |
| Dibenzyl ether | 9.4 | m | Water | 23.4 | s |
| Ethylene glycol monobutyl ether (Butyl Cellosolve ®) | 9.5 | m | | | |

[4]H-Bonding: p = poor; m = moderate; s = strong

Carbitol and Cellosolve are registered trademarks of Union Carbide Corp.

TABLE 3

Solubility Parameters for Homopolymers[5]

| Repeating Unit (Alphabetical Sequence) | δ $(cal/cm^3)^{1/2}$ | Repeating Unit (Increasing δ Value Sequence) | δ $(cal/cm^3)^{1/2}$ |
|---|---|---|---|
| Acrylonitrile | 12.5 | Tetrafluoroethylene | 6.2 |
| Butyl acrylate | 9.0 | Isobutyl methacrylate | 7.2 |
| Butyl methacrylate | 8.8 | Dimethylsiloxane | 7.5 |
| Cellulose | 15.6 | Propylene oxide | 7.5 |
| Cellulose acetate (56% Ac groups) | 27.8 | Isobutylene | 7.8 |
| Cellulose nitrate (11.8% N) | 14.8 | Stearyl methacrylate | 7.8 |
| Chloroprene | 9.4 | Ethylene | 8.0 |
| Dimethylsiloxane | 7.5 | 1,4-cis-Isoprene | 8.0 |
| Ethyl acrylate | 9.5 | Isobornyl methacrylate | 8.1 |
| Ethylene | 8.0 | Isoprene, natural rubber | 8.2 |
| Ethylene terephthalate | 10.7 | Lauryl methacrylate | 8.2 |
| Ethyl methacrylate | 9.0 | Isobornyl acrylate | 8.2 |
| Formaldehyde (Oxymethylene) | 9.9 | Octyl methacrylate | 8.4 |
| Hexamethylene adipamide (Nylon 6/6) | 13.6 | n-Hexyl methacrylate | 8.6 |

TABLE 3-continued

Solubility Parameters for Homopolymers[5]

| Repeating Unit (Alphabetical Sequence) | δ $(cal/cm^3)^{1/2}$ | Repeating Unit (Increasing δ Value Sequence) | δ $(cal/cm^3)^{1/2}$ |
|---|---|---|---|
| n-Hexyl methacrylate | 8.6 | Styrene | 8.7 |
| Isobornyl acrylate | 8.2 | Propyl methacrylate | 8.8 |
| 1,4-cis-Isoprene | 8.0 | Butyl methacrylate | 8.8 |
| Isoprene, natural rubber | 8.2 | Ethyl methacrylate | 9.0 |
| Isobutylene | 7.8 | Butyl acrylate | 9.0 |
| Isobornyl methacrylate | 8.1 | Propyl acrylate | 9.0 |
| Isobutyl methacrylate | 7.2 | Propylene | 9.3 |
| Lauryl methacrylate | 8.2 | Chloroprene | 9.4 |
| Methacrylonitrile | 10.7 | Tetrahydrofuran | 9.4 |
| Methyl acrylate | 10.0 | Methyl methacrylate | 9.5 |
| Methyl methacrylate | 9.5 | Ethyl acrylate | 9.5 |
| Octyl methacrylate | 8.4 | Vinyl chloride | 9.5 |
| Propyl acrylate | 9.0 | Formaldehyde (Oxymethylene) | 9.9 |
| Propylene | 9.3 | Methyl acrylate | 10.0 |
| Propylene oxide | 7.5 | Vinyl acetate | 10.0 |
| Propyl methacrylate | 8.8 | Methacrylonitrile | 10.7 |

TABLE 3-continued

| Solubility Parameters for Homopolymers[5] | | | |
|---|---|---|---|
| Repeating Unit (Alphabetical Sequence) | δ (cal/cm$^3$)$^{1/2}$ | Repeating Unit (Increasing δ Value Sequence) | δ (cal/cm$^3$)$^{1/2}$ |
| Stearyl methacrylate | 7.8 | Ethylene terephthalate | 10.7 |
| Styrene | 8.7 | Vinylidene chloride | 12.2 |
| Tetrafluoroethylene | 6.2 | Acrylonitrile | 12.5 |
| Tetrahydrofuran | 9.4 | Vinyl alcohol | 12.6 |
| Vinyl acetate | 10.0 | Hexamethylene adipamide (Nylon 6/6) | 13.6 |
| Vinyl alcohol | 12.6 | Cellulose nitrate (11.8% N) | 14.8 |
| Vinyl chloride | 9.5 | Cellulose | 15.6 |
| Vinylidene chloride | 12.2 | Cellulose acetate (56% Ac groups) | 27.8 |

[5]Values reported are for homopolymers of the Repeating Unit. Reported δ values vary with the method of determination and test conditions. Averaged values are given in this table.

Additional exemplary empirical solubility parameters (e.g. Flory Huggins are identifiable by a skilled person (see, e.g., Brandrup, J., et al., "Polymer handbook". Vol. 1999. 1999: Wiley New York [2]. and other available references known or identifiable by one skilled in the art)) Exemplary good solvents for the exemplary base polymer PVDF comprise Tetrahydrofuran, Methyl EThyl Ketone, Dimethyl formamide, Dimethyl acetamide, Tetramethyl urea, Dimethyl Sulfoxide, Trimethyl phosphate, N-Methyl-2-Pyrrolidone. Additional indication concerning good solvents for a PVDF polymer can be found in F. Liu et al./Journal of Membrane Science 375 (2011) 1-27 [3]. A skilled person can determine if other solvents would be good solvents for PVDF or if other base polymers or other polymers (e.g. functionalizing polymers their precursor, polymeric particle precursors) would be substantially soluble in these solvents or other solvents or compositions by applying the same calculations using the particular solubility parameters for the particular solvent and/or composition.

Exemplary linear polymers that can be used as building blocks for the base polymer of membranes with in-situ generated polymeric particles and polymeric networks include polyvinylidene fluoride (PVDF), polyethersulfone (PES), polysulfone (PSf), polyacrylonitrile (PAN) and polyamides (PAM) and additional polymer of formula (I) herein described. Good solvents for these polymers are expected to comprise n-methyl-2-pyrrolidone (NMP), dimethyl formamide (DMF), dimethyl acetamide (DMAc), triethyl phosphate (TEP) and dimethyl sulfoxide (DMSO).

The method further comprises adding a particle precursor in the base polymer solution to obtain a blend and in particular a dispersion of particle precursor in the base polymer solution. Given a certain base polymer solution a particle precursor can be selected to have: a portion substantially soluble in a solvent (or mixture of solvents) compatible with that used to dissolve the base polymer and a portion substantially insoluble with said solvent. Accordingly, the particle precursor can be selected for the ability to form dispersed/segregated domains and in particular aggregates of surfactant molecules (e.g. micelles) dispersed in the base polymer solution as will be understood by a skilled person. Exemplary expected membrane particle precursors include functional monomers/polymers, block copolymers: branched polymers/dendrimers and in particular can include a polymer according to Formula (I), Formula (XI) or Formula (XVI). Preferred particle precursors include aliphatic amines, aromatic amines, anhydrides, polyamines (linear, branched and dendritic) and epoxides and other compound presenting hydroxyl groups.

In some embodiments preparing a base polymer solution and adding a particle precursor is performed to control the sizes of the segregated domains of precursor particles, which on their turn control the sizes of the in-situ synthesized microparticles and/or nanoparticles. In particular, with the in situ method microparticles and/or nanoparticles can be synthesized which have a diameter in a range of from approximately 10-100 nm to approximately 2-4 μm and depend on several factors including the (i) chemistry and molecular weight of the particle precursor, (ii) intensity and duration of mixing (e.g. sonication versus slow stirring) and (ii) the addition of a dispersion stabilizer (e.g. surfactant). For example, a mixture of (i) base polymer and solvent, (ii) particle precursor formed by a monomer/oligomer of [molecular weight ($M_n$) of 100-1000] and (iii) a surfactant (e.g. sodium dodecyl sulfate) is expected to be sonicated to prepare a membrane casting solution containing segregated domains of particle precursors of 10-100 nm in sizes. In contrast, the slow stirring of a mixture of base polymer and solvent and (ii) monomer/polymer [Molecular weight ($M_n$) of 300-100000] is expected to be required to prepare a membrane dope containing segregated domains of particle precursors of sizes ranging from 0.5 to 4 μm depending on the specific combination of based polymer, polymer particles precursor and/or stirring conditions.

The method to prepare an in situ membrane with functionalized polymer further comprises adding crosslinker and/or an initiator capable of reacting with the polymer particle precursor to the blend to synthesize the polymeric particles in a membrane casting solution formed by a base polymer a solvent, polymeric particle precursor and the crosslinker and/or/initiator.

A cross-link is a bond that links one polymer chain to another. They can be covalent bonds or ionic bonds. Exemplary crosslinkers include diacrylates, dimethacrylates, diepoxides, dihalides, diisocyanates, diacyl chlorides, dianhydrides.

Preferred crosslinkers include diepoxides, dihalides, diacyl chlorides and dianhydrides with small molecular weights (Mn of 90-300). Preferred crosslinker monomers include epoxides, acrylics, amines, acid chlorides and others that can be used to prepare polymeric particles in solutions herein described. Exemplary crosslinkers for particle formation herein described comprise the compounds described in Table 4 corresponding to Table 2 of U.S. Pat. No. 7,459,502 [4].

TABLE 4

| Structure | Mw |
|---|---|
| 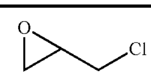 | 92.52 |
| 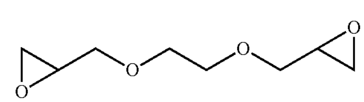 [SMILES: C(COCC1CO1)OCC1CO1] | 174.39 |
| 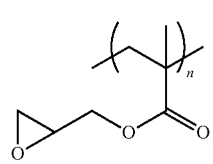 | |

TABLE 4-continued
| Structure | Mw |
|---|---|
| 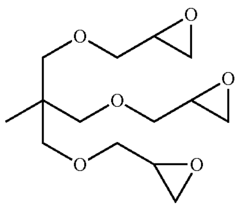 [SMILES: CC(COCC1CO1)(COCC1CO1)COCC1CO1] | 302.37 |
| 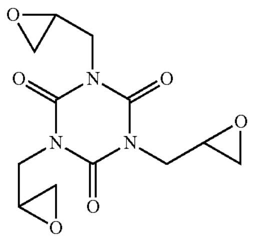 [SMILES: O=c1n(CC2CO2)c(=O)n(CC2CO2)c(=O)n1CC1CO1] | 297.27 |
| 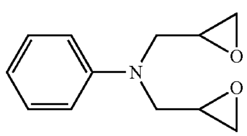 [SMILES: c1ccc(N(CC2CO2)CC2CO2)cc1] | 277.32 |
| 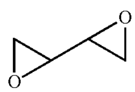 | 86.09 |
| 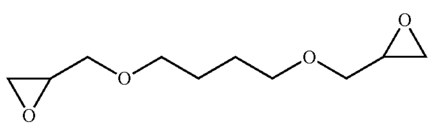 [SMILES: C(CCOCC1CO1)COCC1CO1] | 202.23 |
| 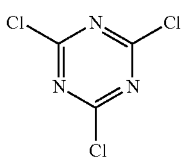 | 184.41 |
| 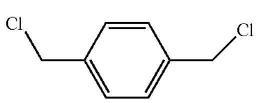 | 175.06 |
| 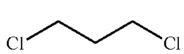 | 112.93 |
| 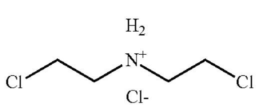 | 178.49 |
| 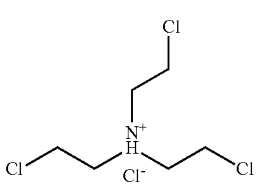 | 240.99 |
| 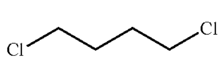 | 127.01 |
TABLE 4-continued
| Structure | Mw |
|---|---|
| 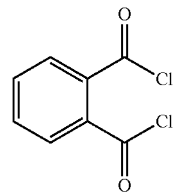 [SMILES: O=C(Cl)c1ccccc1C(=O)Cl] | 203.02 |
| 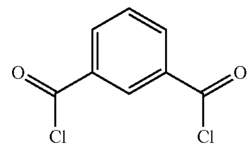 [SMILES: O=C(Cl)c1cccc(C(=O)Cl)c1] | 203.02 |
| 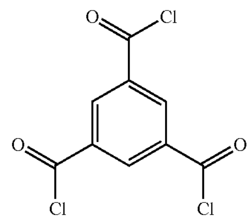 [SMILES: O=C(Cl)c1cc(C(=O)Cl)cc(C(=O)Cl)c1] | 265.48 |
| 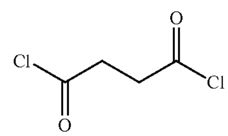 | 154.98 |
| 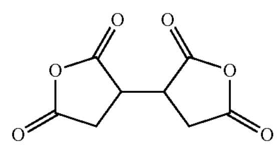 [SMILES: O=C1CC(C2CC(=O)OC2=O)C(=O)O1] | 198.13 |
| 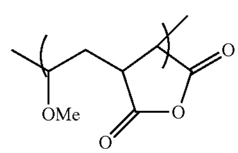 | 132.08 |
| 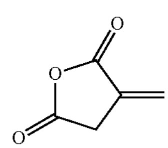 | |
| 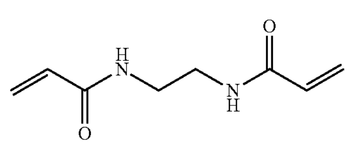 | 168.2 |
| 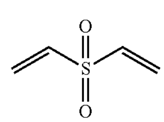 | 108.36 |

TABLE 4-continued

| Structure | Mw |
|---|---|
| 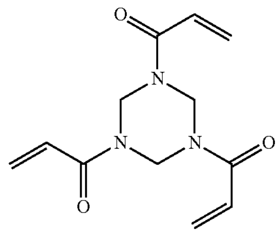 [SMILES: C=CC(=O)N1CN(C(=O)C=C)CN(C(=O)C=C)C1] | 249.27 |
| 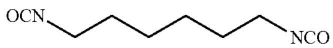 | 168.39 |
| 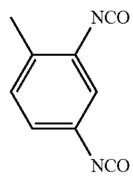 | 174.36 |
| 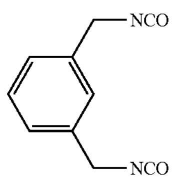 | 188.18 |
| 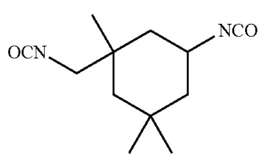 | 222.26 |
| 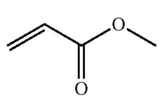 | 86.00 |
| 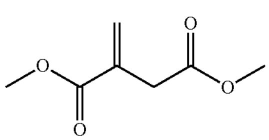 | 158.36 |
| 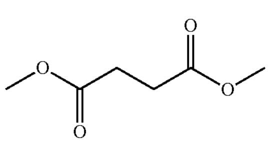 | 146.14 |
| 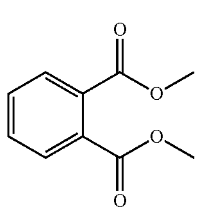 | 194.19 |
| 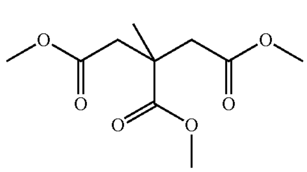 | 234.2 |

TABLE 4-continued

| Structure | Mw |
|---|---|
| 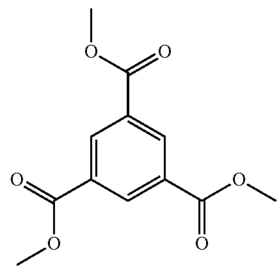 [SMILES: COC(=O)c1cc(C(=O)OC)cc(C(=O)OC)c1] | 262.22 |
| 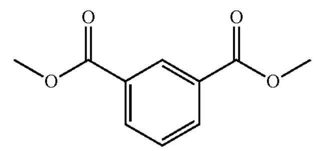 | 194.49 |
| 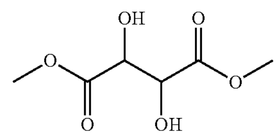 | 178.14 |
| 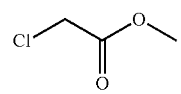 | 108.53 |

An initiator, indicates a source of any chemical species that reacts with a monomer (single molecule that can form chemical bonds) to form an intermediate compound capable of linking successively with a large number of other monomers into a polymeric compound. The most widely used initiators produce free radicals (reactive atoms or groups of atoms that contain odd numbers of electrons); examples include peroxides and aliphatic azo compounds used to polymerize vinyl chloride, methyl methacrylate, and other monomers. Acid-forming systems such as boron trifluoride with traces of water react with a monomer to produce a positively charged (cationic) intermediate. Such initiation is used in the conversion of isobutylene to butyl rubber. Reaction of metallic sodium and biphenyl produces an anionic initiator that causes formation of polymer chains with reactive sites at both ends; these may be further treated with a different monomer to yield block copolymers. For example, Polypropylene and high-density polyethylene are prepared by use of Ziegler catalysts, which are initiators composed of organometallic compounds and metallic halides, such as triethylaluminum and titanium tetrachloride.

An exemplary initiator capable of reacting with a polymeric particle precursor herein described is benzyl chloride. Additional initiators can be identified by a skilled person in view of information known to a skilled person (see e.g. M. Talha Gokmen, Filip E. Du Prez*Progress in Polymer Science 37 (2012) 365-405 [5]) and the content of the present disclosure. Additional methods and techniques to make polymeric particles known to a skilled person (e.g. Strathmann, Introduction to Membrane Science and Technology.Wiley-VCH Verlag: Weinheim, 2011, and V. Mittal, (Ed). Advanced Polymer Nanoparticles-Synthesis and Surface Modifications. CRC Press; Boca Raton (Florida), 2011, Chap 1, 1-28 [6]) can also be adapted to in situ particle formation by modifications that allow to avoid precipitation.

In some embodiments, the method further comprises adding a functionalizing polymer precursor to the blend, and/or to the membrane casting solution comprising the polymeric microparticles and/or nanoparticles to obtain a dope wherein the microparticles and/or nanoparticles are linked to the functional polymers forming a polymeric network. Addition of the functionalizing polymer can be performed concurrently or preferably following addition of the crosslinker and/or initiator and in particular following beginning of the particle formation, Expected polymer network precursors include acrylates, epoxides, isocyanates, acyl chlorides and anhydrides. Preferred functionalizing polymers include diepoxides, diacrylates and diacyl chlorides and others that be can be polymerized in the membrane dope solutions to prepare polymer networks that are linked to the larger molecular weights (e.g. $M_n$ of 1000-1000, 000+).

In some embodiments, the polymer network precursor can have a molecular weight ($M_n$) of 100-1000. In some embodiments, the polymer network precursor can have a smaller molecular weight (e.g. (Mn of 90-300)) included at higher concentration to form the network polymer. In some embodiments the polymer network precursor are also crosslinkers with respect to the particle formation. In some embodiments the polymer network formed in situ is covalently linked to the polymeric particles. In some embodiments the polymer network formed in situ is crosslinked to the polymeric particles. In some embodiments the polymer network formed in situ is non-covalently linked to the polymeric particles through interactions between moieties and in particular functional groups of the network polymer and the polymeric material of the polymeric particles.

In some embodiments, the method further comprises performing membrane preparation by phase inversion casting by mixing the dope with a non-solvent, (a solvent substantially incompatible with the base polymer solvent) Note that the membrane can be casted onto a suitable support (e.g. s glass plate) and then peeled off to form a self-supporting membrane. Alternatively, the membrane can be casted onto a microporous [e.g. polyethylene terephthalate (PET)] support, a layer of a multilayered membrane or another membrane (e.g. a mesh) to form a bicomposite membrane herein described.

In some embodiments, the concentration of base polymer in the membrane is not less than about 40%, and preferable not less that about 50%, In some embodiments the concentration of polymeric particles and functional polymer network is about 50% possibly about 60%. In some embodiments the concentration of polymeric particles and functional polymer network not more than 60% to conserve the support to the membrane provided by the porous polymeric aggregate formed by the base polymer.

In some embodiments, determination and control of the concentration of the various membrane components can be performed based on the reactivity of the functional groups presented on those components and in particular on the functionalizing polymer and polymeric particles. In particular, calculation of the final concentration of base in the can be performed by calculating the proportion of the molar amounts of based on the reactive groups presented in the various component of the membrane according to reaction occurring stoichiometrically (see Example 25). Exemplary stoichiometric reactions among functional groups comprise reaction between epoxy groups and amine groups and various types of click chemistry as will be understood by a skilled person.

In some embodiments, the polymer that will form the porous polymer aggregate can be selected based on desired features such as morphology, structural strength, and others known to a skilled person [7] as well as compatibility based on thermodynamic parameters identifiable to a skilled person. For example, one desired feature can be the presence of skin layers on either side of the membrane when observed in cross section (see e.g. FIGS. 4A-H, FIGS. 5A-H, FIGS. 6A-F and FIGS. 7A-F of the instant application and FIG. 6 of related application U.S. Ser. No. 13/754,883 published as US20130213881). In particular, the thickness of one of the skin layers can be decreased by increasing the amount of polymer to form the polymeric nanoparticles in the blend of polymer to form the polymeric nanoparticles and polymer to form the polymer matrix (see, e.g. Example 1 and FIGS. 4A-H, FIGS. 5A-H, FIGS. 6A-F and FIGS. 7A-F of the instant application and Example 2 and FIG. 6 of related application U.S. Ser. No. 13/754,883 published as US20130213881). For example, another desired feature can be particle size. In particular, the size of the nanoparticles can be decreased by increasing the amount of polymer to form the polymeric nanoparticles in the blend of polymer to form the polymeric nanoparticles and polymer to form the polymer matrix (e.g. membranes made with 7.45 wt % PEI in the blend showed particle size as low as 400 nm whereas membranes formed with 5.39 wt % and 3.49 wt % in the blend showed particle sizes ranging from 1000-3000 nm; see, e.g. Example 1 and FIGS. 4A-H, FIGS. 5A-H, FIGS. 6A-F and FIGS. 7A-F of the instant application and Example 2 and FIG. 6 and FIG. 7 of related application U.S. Ser. No. 13/754,883 published as US20130213881). For example, another desired feature can be porosity as determined by imaging (e.g. with SEM) of the surface of the membrane. In particular, the number of pores can be increased by increasing the amount of polymer to form the polymeric nanoparticles in the blend of polymer to form the polymeric nanoparticles and polymer to form the polymer matrix (see, e.g., Example 1 and FIGS. 4A-H, FIGS. 5A-H, FIGS. 6A-F and FIGS. 7A-F of the instant application Example 2 and FIG. 7 of related application U.S. Ser. No. 13/754,883 published as US20130213881).

Factors to be considered comprise having a solubility parameter (see, e.g., [1, 8, 9]) similar to that of polymer that will form the polymeric nanoparticles, as well as favorable interactions between the comprising the polymer that will form the polymer matrix and the polymer that will form the polymeric nanoparticles. In particular, the similarity of solubility parameters can ensure that the polymer forming the polymeric nanoparticles is sufficiently distributed in the blend of polymer that will form the polymeric nanoparticles and polymer that will form the polymer matrix (as determined, for example, by inspection of the turbidity and viscosity of the blend) such that a membrane with a desired concentration of nanoparticles is obtained. For example, in embodiments, wherein a concentration of greater than about 20 wt % is desired, PVDF or other fluorinated polymer can be chosen as the polymer for the polymer matrix. In another example wherein a membrane with similar features is desired a poly(ether sulfone) polymer or other polymer with ether groups and/or sulfonyl and/or carbonyl groups can be chosen as the polymer for the polymer matrix thus providing a homogeneous blend adapted to form particles, and in particular discrete particles, in situ when a cross-linker is added to the blend form a dope with homogeneously distributed discrete to form the membrane as described herein (see, e.g., Example 1 and 2 of the instant application and Examples 1-3 and 21 of related application U.S. Ser. No. 13/754,883 published as US20130213881).

In particular, the in situ formation of the microparticles and/or nanoparticles can be controlled by parameters such as relative concentration of the polymers to form the matrix and nanoparticles and cross linker (see, e.g. Examples 1 and 2 of the instant application and Example 21 of related application U.S. Ser. No. 13/754,883 published as US20130213881) such that the membranes produced have discrete particles in which formation of nanoparticle clusters is minimized (see e.g. FIG. 58B of related application U.S. Ser. No. 13/754,883 published as US20130213881) as well as fractal growth as can occur in membranes when the particles are preformed and blended with the polymer that will form the polymer matrix. In particular, the membranes with in situ generated nanoparticles can have nanoparticles in concentrations exceeding about 20 wt % and in particular, exceeding about 40 wt %. For example, when a blend of 3.49 wt % PEI and 13.45 wt % PVDF is combined with 2.30 wt % ECH cross-linker, membranes with a concentration of nanoparticles greater than about 30 wt % are produced, and when the amount of PEI is increased (with a constant ratio of cross linker) to a blend of 7.45 wt % PEI and 12.42 wt % PVDF which is combined with 4.90 wt % ECH cross-linker, the concentration of nanoparticles in the membrane produced increases to about 50 wt % (see, e.g. Example 2 and FIG. 7 of related application U.S. Ser. No. 13/754,883 published as US20130213881). In addition, the membranes formed with the 3.49 wt % PEI and 13.45 wt % PVDF blend combined with 2.30 wt % ECH cross-linker and with the 7.45 wt % PEI and 12.42 wt % PVDF blend combined with 4.90 wt % ECH cross-linker both show discrete particles embedded in the polymer matrix without homogeneous distribution of particles and discrete particles devoid of clustering by fractal growth (see, e.g. Example 2 and FIG. 6 of related application U.S. Ser. No. 13/754,883 published as US20130213881).

In particular, in some embodiments, membrane compositions, methods and applications herein described comprise (i) a linear polymer (e.g. poly(vinylidinefluoride) [PVDF]) as base membrane polymer, (ii) a polyamine (e.g. branched polyethyeleneimine [PEI]) as polymeric particle precursor, (iii) a crosslinker, (e.g. an epoxide such as epichlrohydrin [ECH])) (iv) an initiator (e.g. hydrochloric acid (HCl)0 and (v) a linear or branched polymer functionalized at the ends (e.g. a diepoxide such as poly(ethylene glycol) diglycidyl ether (PEGDE) and 4-arm polyethylene gycol (PEG) branched polymer as polymer network precursors.

In other embodiments, filtration membranes herein described can be formed by a process wherein nanoparticles can be added to the membrane ex situ in addition or in the alternative to nanoparticles formed with the in situ method. In particular, in some of these embodiments, the nanoparticles can be performed by cross linking suitable polymeric nanomaterial separately from the polymer forming the matrix (see e.g. Examples 4, 5, and 14 of related application U.S. Ser. No. 13/754,883 published as US20130213881) and then mixed with the polymer that will form the polymer matrix to form a dope with preformed polymeric nanoparticles. The method can further comprise casting the dope to form the membranes as described herein (see, e.g., Examples 1 and 20). In particular, the membranes made with preformed nanoparticles in the dope can have clusters of nanoparticles (see e.g. FIG. 58B of related application U.S. Ser. No. 13/754,883 published as US20130213881) from fractal growth. In particular, the membranes with ex situ generated preformed nanoparticles can have nanoparticles in concentrations between about 1 wt % and about 10 wt %.

In some embodiments, the polymer aggregate of the polymer matrix can be formed by a polymer having a formula $$-\!\!\left[ (Q)_m - (Y)_l - (Z)_k \right]_j\!\!- \quad \text{(I)}$$

wherein:

Q, Y, and Z comprise saturated aliphatic hydrocarbon, aromatic hydrocarbon, or unsaturated aliphatic hydrocarbons;

m, l, and k independently are integers ranging between 0-50;

at least one of m, l, k is not equal to zero;

j is an integer ranging between 50-500; and at least one of Q (when Q≠0), Y (when Y≠0), or Z (when Z≠0), comprises the polymer corresponding functional group.

The term "saturated aliphatic hydrocarbon" as used herein refers to a hydrocarbon comprising, carbon atoms that are joined together in straight chains, branched chains, or non-aromatic rings in which the carbon-carbon bonds are saturated with hydrogen (e.g. methane, ethane, propane, isobutane, and butane). For example, in saturated aliphatic hydrocarbons have a general formula of $C_nH_{2n+2}$ for acyclic saturated aliphatic hydrocarbons and $C_nH_{2n}$ cyclic saturated aliphatic hydrocarbons. Saturated aliphatic hydrocarbon can be substituted with one or other elements, for example, N, O, S, P, F, Cl, Br, and I.

The term "aromatic hydrocarbon" as used herein refers to a hydrocarbon comprising a conjugated ring of unsaturated bonds, lone pairs, and/or empty orbitals which can exhibit a stabilization stronger than expected by the stabilization by conjugation alone. An exemplary aromatic compounds is benzene which is a six-membered ring having alternating double and single bonds between carbon atoms. Aromatic hydrocarbons can be monocyclic (MAH) (e.g. benzene) or polycyclic (PAH) (e.g. naphthalene, anthracene, pyrene). Aromatic hydrocarbons can be substituted with one or other elements, for example, N, O, S, P, F, Cl, Br, and I.

The term "unsaturated aliphatic hydrocarbon" as used herein refers to a hydrocarbon comprising carbon atoms that are joined together in straight chains, branched chains, or non-aromatic rings and comprise at least one of a double or a triple bond between adjacent carbon atoms, referred to as "alkenes" and "alkynes", respectively. An unsaturated hydrocarbon can comprise one or more of double or triple bonds. In hydrocarbons having more than one double or triple bond, the unsaturated hydrocarbon can be conjugated (e.g. 1,4-hexadiene) or can be isolated (e.g. 1,5-hexadiene). In hydrocarbons comprising internal alkenes, the alkenes can be in a "cis" or a "trans" configuration (e.g. trans-2-butene or cis-2-butene). Unsaturated aliphatic hydrocarbon can be substituted with one or other elements, for example, N, O, S, P, F, Cl, Br, and I.

In particular in some embodiments, Q, Y, and Z in formula (I) can independently selected from the following formulas:

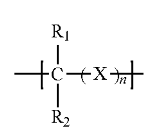

(II)

-continued (III)

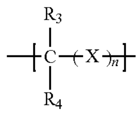

(IV)

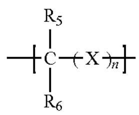

(V)

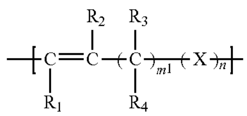

(VI)

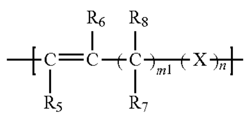

(VII)

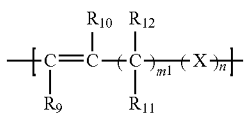

(VIII)

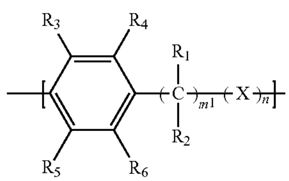

(IX)

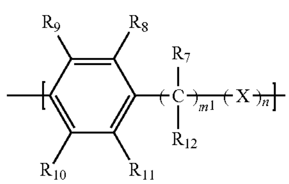

(X)

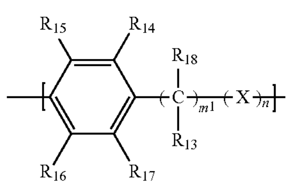

wherein:

n=0 or 1;

$m_1$ is an integer ranging from 0-15;

X is a functional group comprising an atom selected from O, S, N, P, or F; and $R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P;

and at least one of $R_1$-$R_{18}$ is the polymer corresponding functional group attaching the dendrimer component.

Exemplary linear polymer materials for producing a polymeric aggregate made from linear polymers herein described comprise polysulfone (PS), polyether sulfone (PES), poly (vinylidene) fluoride (PVDF), poly(tetrafluoroethylene) (PTFE), poly(acrylonitrile) (PAN), poly(methacrylic acid) (PMAA), poly(acrylic acid) (PAA), poly(vinyl methyl ketone), and poly(ethylene terephthalate) (PET).

In some embodiments herein described, the polymeric network of the polymer matrix is formed by a functional polymer of formula (XVI)

$$R_{18}-\left[(Q_1)_{n_1}-(Y_1)_{l_1}-(Z_1)_{k_1}\right]_{j_1}-R_{19} \quad \text{(XVI)}$$

wherein:

$R_{18}$ and $R_{19}$ are selected from (XVII)

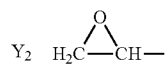

(XVIII)

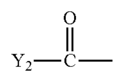

(XIX)

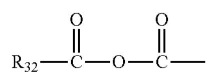

(XX)

$$O{=}C{=}N-$$

in which Y2 is F, Cl, Br or I $R_{32}$ is H or CH3

$n_1$, $l_1$, and $k_1$ independently are integers ranging between 0-50;

at least one of $n_1$, $l_1$, and $k_1$ is not equal to zero;

$j_1$ is an integer ranging between 50-500; and and wherein

Q1, Y1, and Z1 independently comprise saturated aliphatic hydrocarbon, aromatic hydrocarbon, or unsaturated aliphatic hydrocarbons optionally independently substituted with hydrophilic such as COOH and OH groups or are independently selected from the following formulas (XXI)

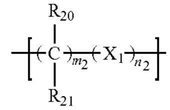

(XXII)

$$-O-\left[(CH_2-CH_2)_{m_3}-(X_1)_{n_3}\right]-$$

(XXIII)

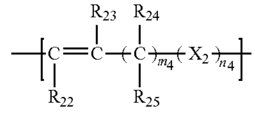

(XXIV)

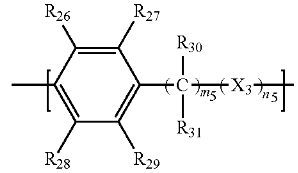

in which $n_2$ $n_3$ $n_4$ and $n_5$=are independently 0 or 1;

$m_2$ $m_3$ and $m_4$ are independently an integer ranging from 0-15;

$X_1$, $X_3$ and $X_3$ is a functional group comprising an atom selected from O, S, N, or P, and $R_{20}$-$R_{31}$ are independently selected from: a polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P, or substituted with one or more groups selected from or can be Y2, or a group of Formulas (XXI) to (XXIV);

and optionally at least one of $R_{20}$-$R_{31}$ is a polymer corresponding functional group attaching the dendrimer component.

In some embodiments $R_{20}$-$R_{31}$ can be a $C_1$-$C_{20}$ linear, branched, saturated, unsaturated, or aryl hydrocarbon can independently comprise one or more groups selected from: —COOH, —$CH_2$—$CH_2OH$, —$(CHOH)_2$—$CH_2OH$, —$CH_2$—CHOH—$CH_2OH$, —C(O)O—$NH_2$, —C(O)—N$(CH_3)_2$ and

XXVII

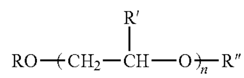

wherein R is H, $CH_3$ or an alkyl group, R' is H, $CH_3$ or an alkyl group, R" is H or an alkyl group In some embodiments, the functionalizing polymers can have formula

XXVIII

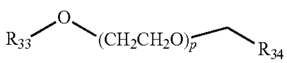

XXIX

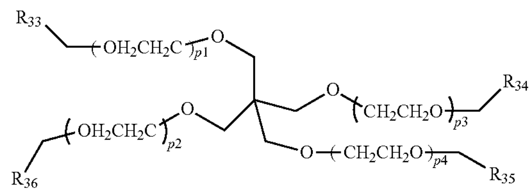

XXX

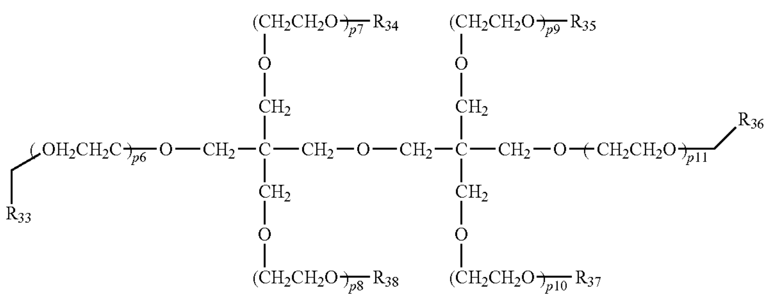

XXXI

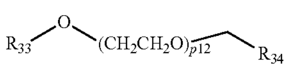

XXXII

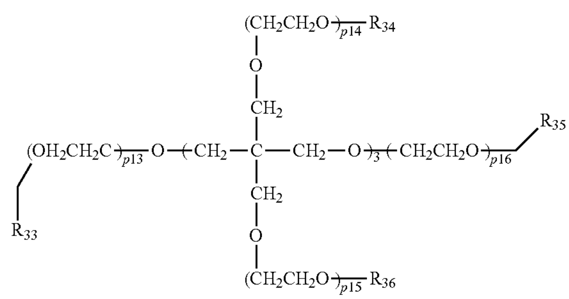

XXXIII

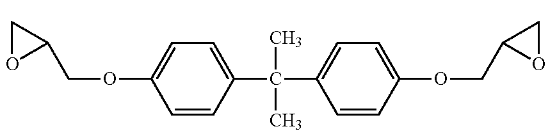

XXXIV

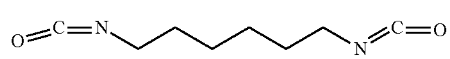

XXXV

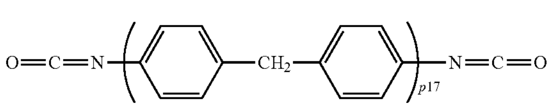

XXXVI

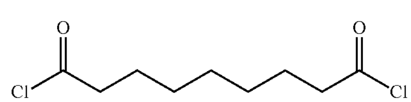

-continued

XXXVII

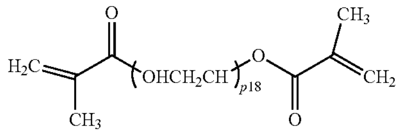

XXXVIII

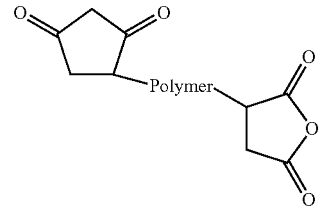

XXXIX

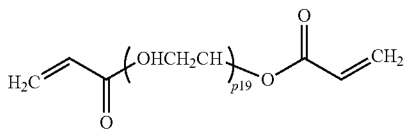

wherein p1 to p19 can independently be 50 to 500 and in particular 100 to 300

R33 to R35 can independently be (XVII)

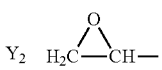

(XVIII)

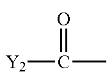

(XIX)

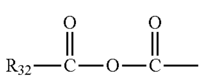

(XX)

$O{=}C{=}N{-}$ in which Y2 is F, Cl, Br or I $R_{32}$ is H or CH3

In some embodiments the functionalizing polymer is a hydrophilic polymer. In some of those embodiments, Q1, Y1 and Z1 can be selected to form a Poly(N-isopropylacrylamide) (PNIPAM), a Polyacrylamide (PAM), a Poly(2-oxazoline), a Polyethylenimine (PEI), a Poly(acrylic acid), a polymethacrylate and/or other Acrylic Polymers, Poly(ethylene glycol), Poly(ethylene oxide), Poly(vinyl alcohol) (PVA) and/or copolymers, Poly(vinylpyrrolidone) (PVP) and/or copolymers, Poly(styrenesulfonate) (PSS) and/or copolymers, Polyacrylamide (PAM)-based Polyelectrolytes, Poly(acrylic acid) (PAA), Poly(allylamine hydrochloride), Poly(vinyl acid), Maleic Anhydride Copolymers, and/or Polyethers.

In some embodiments, at least one functional group of the functionalizing polymer, in particular two or possibly three functional groups can be independently selected from or can be Y2, or a group of Formulas (XXI) to (XXIV). In some embodiments, functional group of the functionalizing polymer can be selected from or can be Y2, or a group of Formulas (XXI) to (XXIV). In some embodiments the functional groups presented in the functionalizing polymer are the same In some embodiments, functionalizing polymer R18 and R19 or other terminal functional groups can be selected to provide a functionalizing polymer which is a diacrylate, dimethacrylate, diepoxide, dihalide, diisocyanate, diacyl halide, triacyl halides, and dianhydride.

In some embodiments functionalizing polymers can be formed by epoxy resins (see the Polymeric Materials Encyclopedia © 1996 CRC Press Inc. and in particular Epoxy resins overview section [10], and Epoxy Handbook Nils Malmgreen Ab third edition 2004 [11], and Dow Liquid Epoxy resins product literature available at the website epoxy.dow.com/resources/literature.htm at the date of filing of the present disclosure) [12].

In some embodiments, the polymer forming the polymeric microparticles and/or nanoparticles embedded in the polymer matrix can be one or more polymers of formula (I) covalently linked (e.g. by a suitable initiator to form microparticles and/or nanoparticles). In particular, exemplary linear polymer materials for producing polymeric nanoparticles made from linear polymers herein described comprise polysulfone (PS), polyether sulfone (PES), poly (vinylidene) fluoride (PVDF), poly(tetrafluoroethylene) (PTFE), poly(acrylonitrile) (PAN), poly(methacrylic acid) (PMAA), poly(acrylic acid) (PAA), poly(vinyl methyl ketone), and poly(ethylene terephthalate) (PET). Additional polymers suitable as a polymer component herein described comprise polymers which can be used as base polymers in the fabrication of commercial UF/MF membranes, polymer which is either partially soluble or can be dispersed in solvents with different physicochemical properties together with nanoparticles according to the disclosure, and polymers which can be functionalized, which are identifiable by a skilled person upon reading of the present disclosure (see e.g. [1, 6, 8]).

Suitable polymeric nanoparticles according to embodiments herein described can be selected for a given polymer matrix based on compatibility with the polymer aggregate and polymeric network components of the matrix which can be determined based on the presence of corresponding functional group capable of attachment as well as possibly other features such as solubility of the polymer that forms the polymeric nanoparticles for in situ nanoparticle formation (or solubility of the preformed polymeric nanoparticles for preformed nanoparticle formation) together with the polymer that forms the polymer matrix in a particular solvent or mixture of solvents, affinity of the dendritic component for polymeric component, and/or stability of the dendritic component in a solvent to be used in the fabrication of the membrane. By way of example, compatibility can be determined by the polymeric nanoparticle possessing functional groups (e.g. amine groups or carboxylic acid or hydroxyl groups) capable of interacting with functional groups on the polymer matrix (e.g. fluoride atoms or oxygen atoms) and/or by the polymers used to make the polymer matrix and polymeric nanoparticles having similar solubility parameters (see e.g. [1, 6, 8]). In particular, if the polymeric nanoparticle possesses amine groups (e.g. PMAM, PPI, or PEI) then a polymer to form the polymer matrix can be chosen which possesses fluoride atoms; if the polymeric nanoparticle possesses carboxylic acid or hydroxyl groups (e.g. MPA or bis-MPA polyester-16-hydroxyl) then a polymer to form the polymer matrix can be chosen which possesses oxygen atoms (e.g. a poly(sulfone) or poly(ether sulfone) polymer).

In some embodiments the polymers to form the polymeric microparticles and/or nanoparticles can be a highly branched dendritic macromolecule forming the dendritic nanomaterial and in particular to the highly branched dendritic macromolecule according to general formula (XI)

(XI)

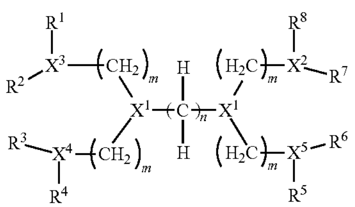

wherein:

n and m are integers ranging from 2-5;

$R^1$-$R^8$ are independently selected from hydrogen or hyperbranched polymer moieties;

$X^1$ is N; and $X^2$-$X^5$ are selected from amine, amide, imide, and carbamate.

In particular, in some embodiments, the highly branched dendritic macromolecule according to some embodiments have the general formulas XII and XIII below:

(XII)

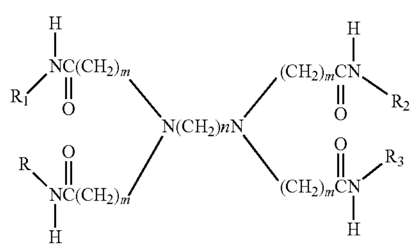

(XIII)

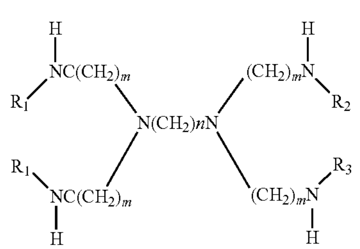

wherein n and in are integers from 2-5, and wherein $R_1$-$R_4$ can be independently hydrogen or hyperbranched polymer moieties including, but not limited to, polyethyleneimine (PEI) and derivatives thereof.

In some embodiments, the highly branched dendritic macromolecule to form polymeric nanoparticles according to some embodiments comprises a core, a plurality of arms extending from the core, the arms having a hyperbranched structure, and within the hyperbranched structure, a plurality of units satisfying having the formula:

(XIV)

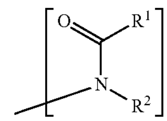

where $R^1$ comprises no nitrogen atoms that are simultaneously bound to two or more carbon atoms, for example, secondary and tertiary amines or amides.

In some embodiments the dendritic component comprises the formula:

(XV)

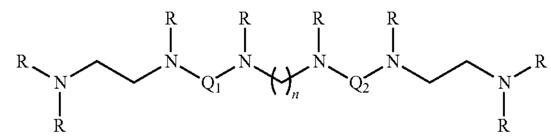

where n is an integer ranging from 2-5, each of $Q_1$ and $Q_2$ comprises hyperbranched polymer moiety, and R is selected from hydrogen, an alkyl group, or a 2-hydroxyalkyl group.

In particular, in some embodiments, when groups $R^1$-$R^8$ and Q of formulas XI-XV comprise hyperbranched polymer moieties with amino and/or alcohol groups, the molecules can be converted to nano/microparticles by cross linking the molecules with cross-linking reagents described herein (e.g. 1,3-dibromopropane or epichlorohydrin) using inverse micelles as described herein (see e.g. Example 14). In particular, in some embodiments, the formation of the particles can occur by blending polymers that comprise the polymer matrix with polymers that form the polymeric nanoparticles, an in particular dendritic nanoparticles to form a blend, and adding a cross-linker to form a dope with in situ generated polymeric nanoparticles, and in particular dendritic nanoparticles as described herein (see, e.g. Examples 1 and 2).

Figure 29:
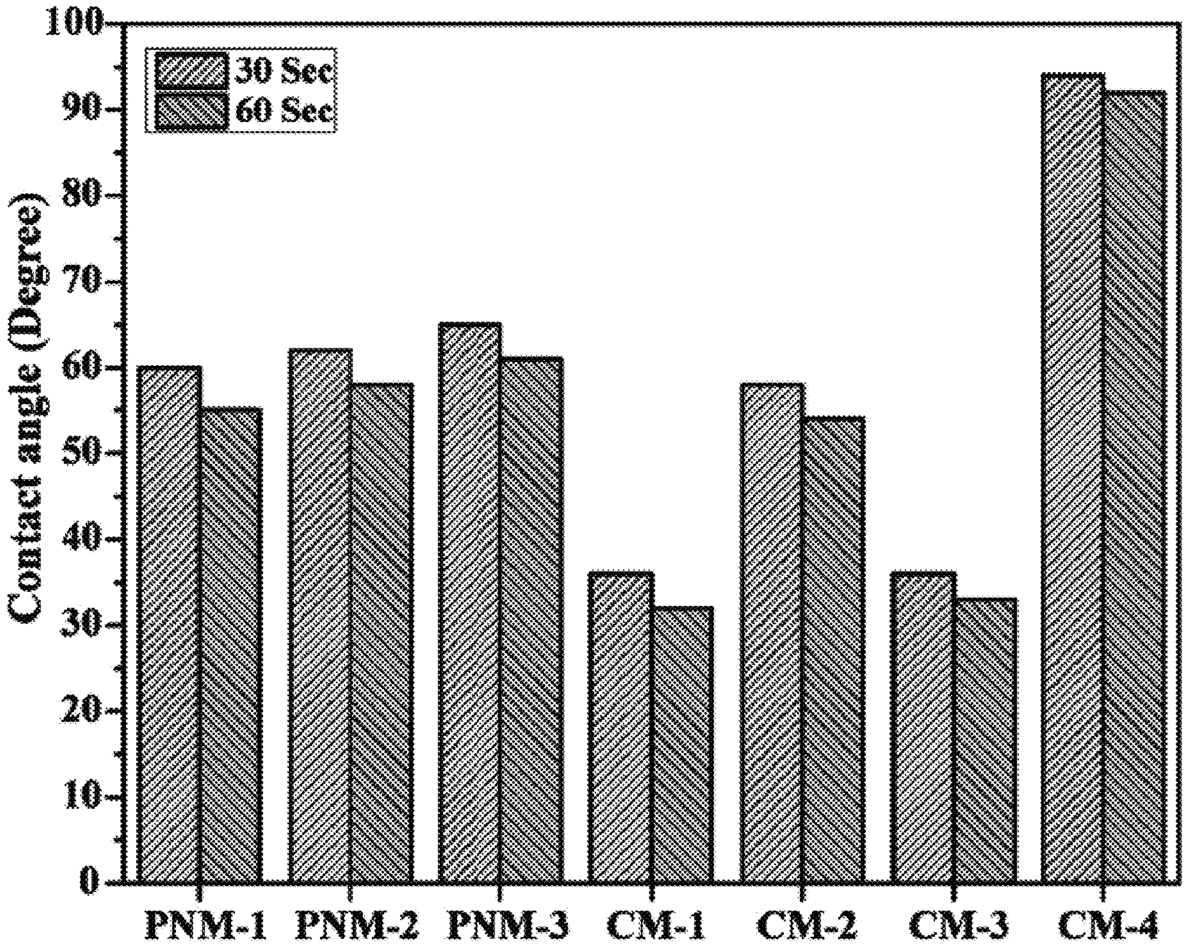
FIG. 29 shows contact angle measurements of control PVDF membranes and polymer network embedded PVDF membranes PNM-1, PNM-2 and PNM-3 as herein described at a drop ageing of 30 and 60 seconds.
Figure 30:
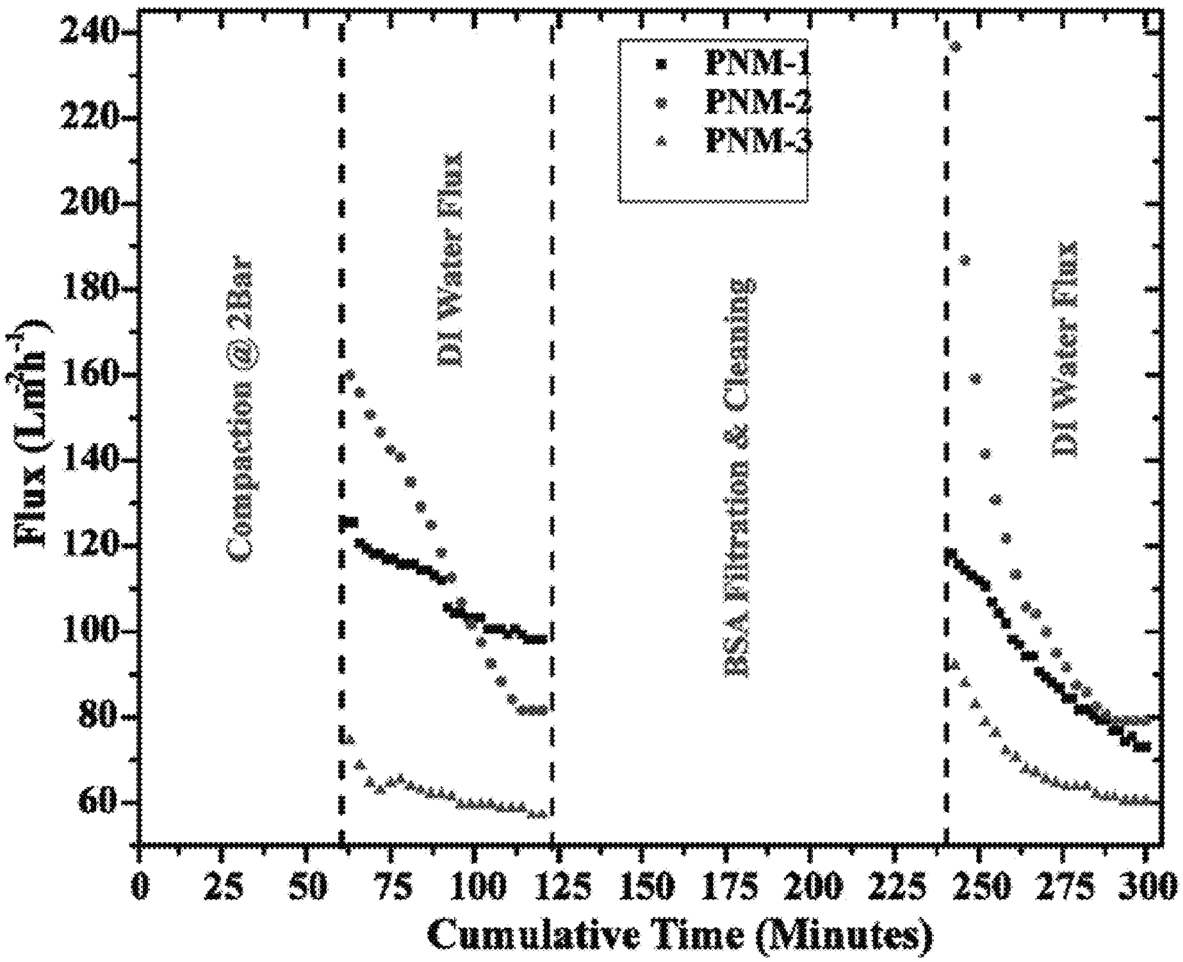
FIG. 30 shows permeate flux measurements for DI water as a function of cumulative filtration time of PNM-1, PNM-2 and PNM-3 polymer network membranes.
Figure 31:
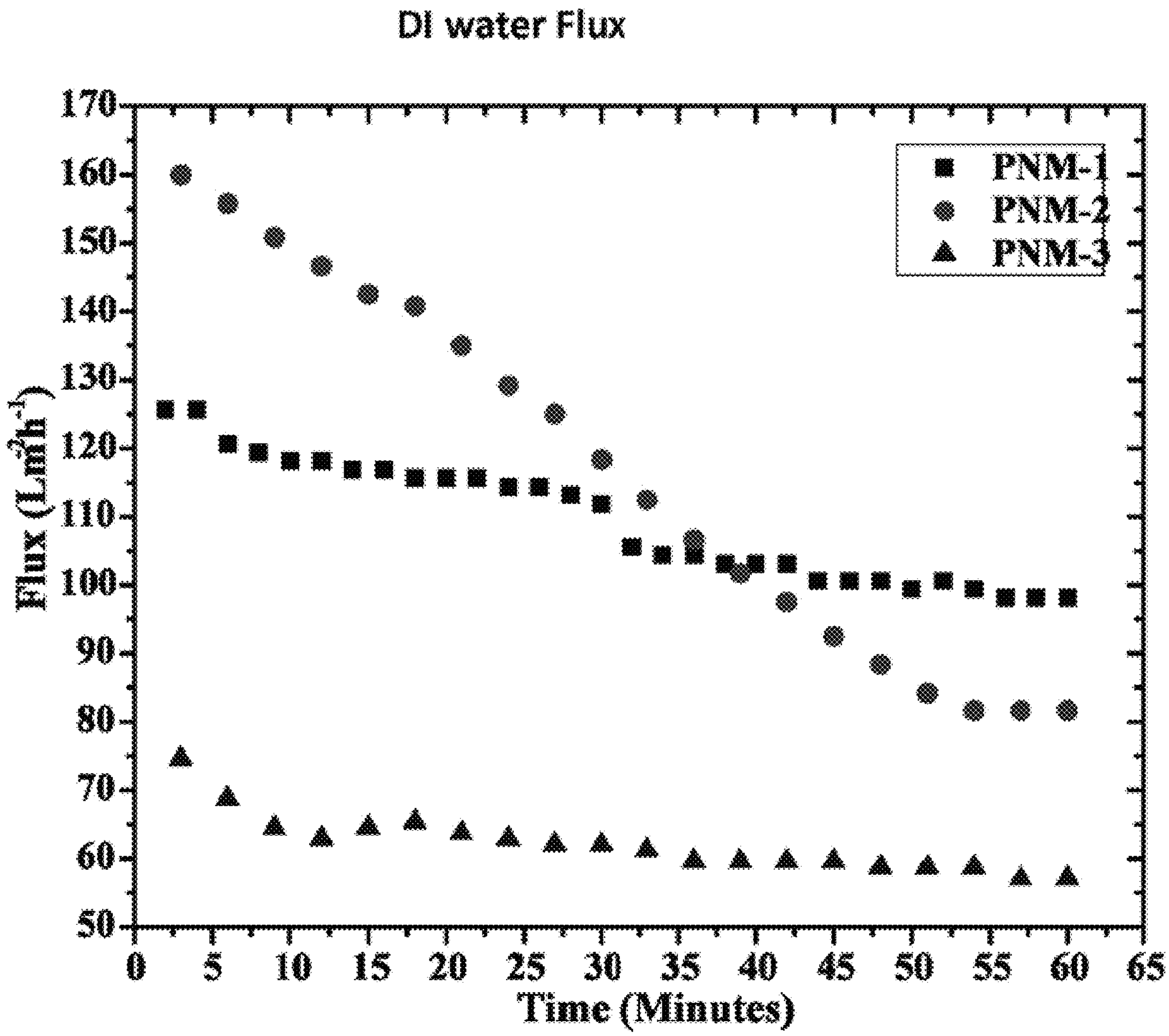
FIG. 31 shows permeate flux measurements for first DI water run as a function of cumulative filtration time of PNM-1, PNM-2 and PNM-3 polymer network membranes.
Figure 32:
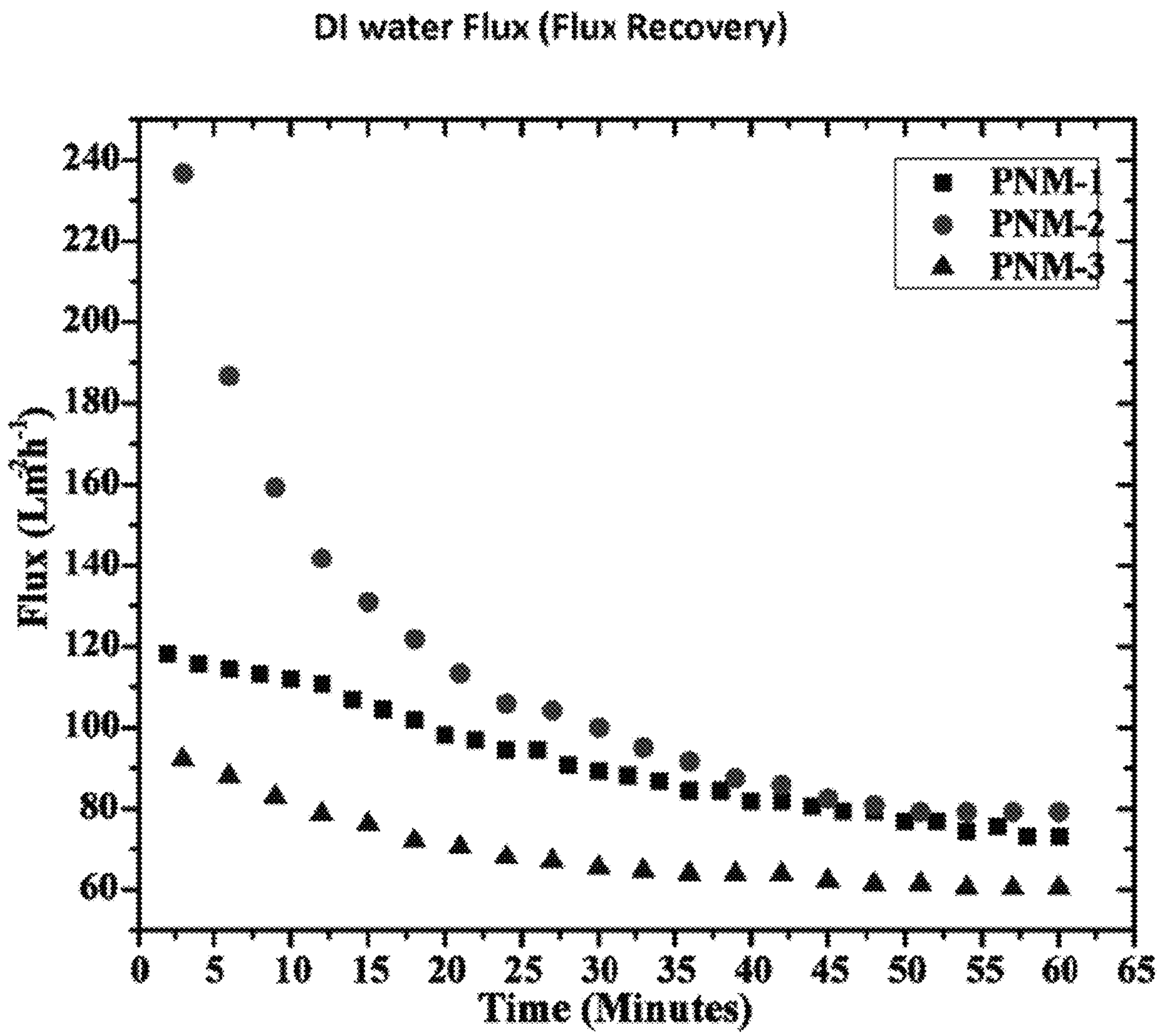
FIG. 32 shows permeate flux measurements for second DI water run as a function of cumulative filtration time of PNM-1, PNM-2 and PNM-3 polymer network membranes.
Figure 33:
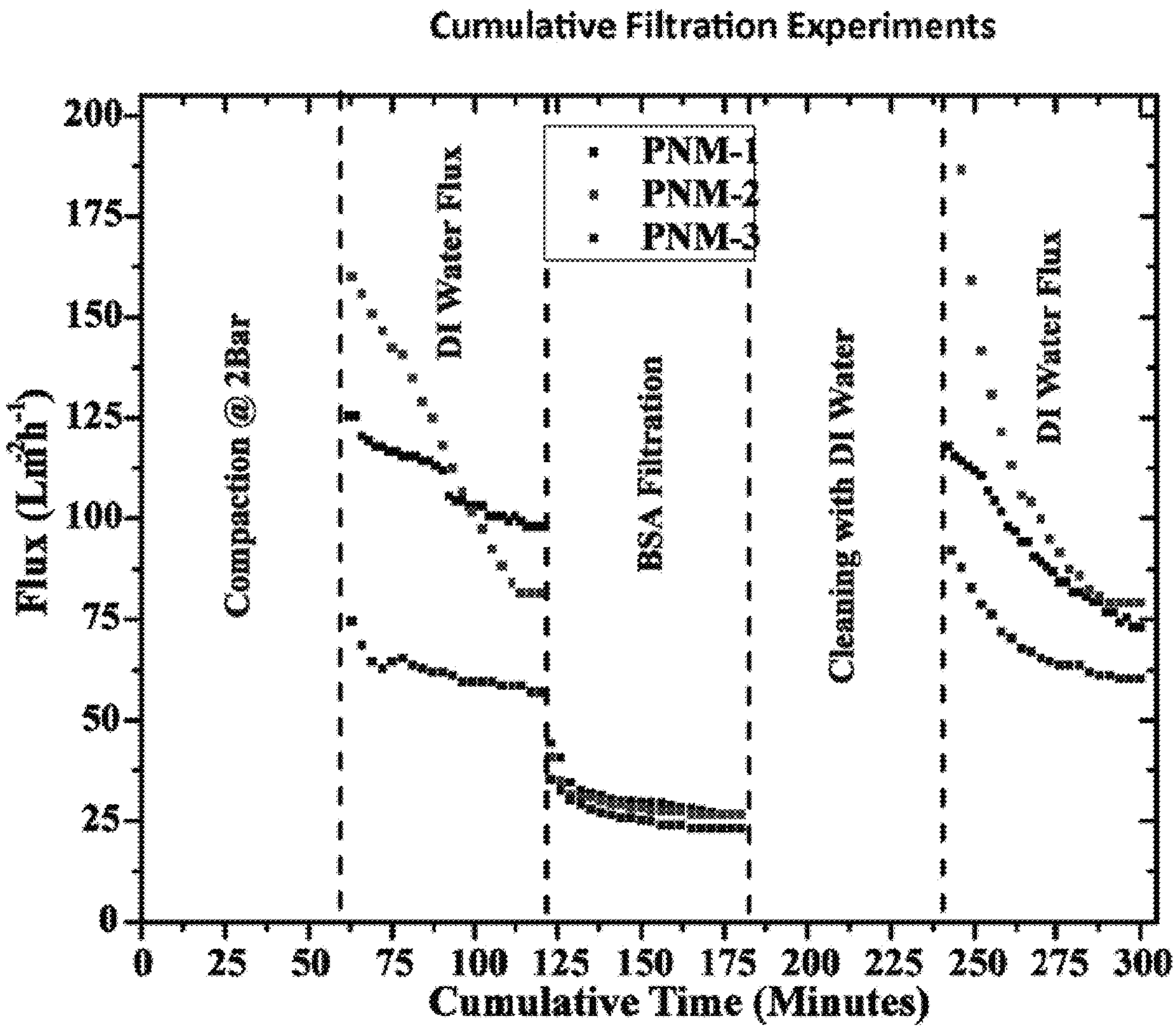
FIG. 33 shows permeate flux measurements for DI water and BSA filtration as a function of cumulative filtration time of PNM-1, PNM-2 and PNM-3 polymer network membranes.
Figure 34:
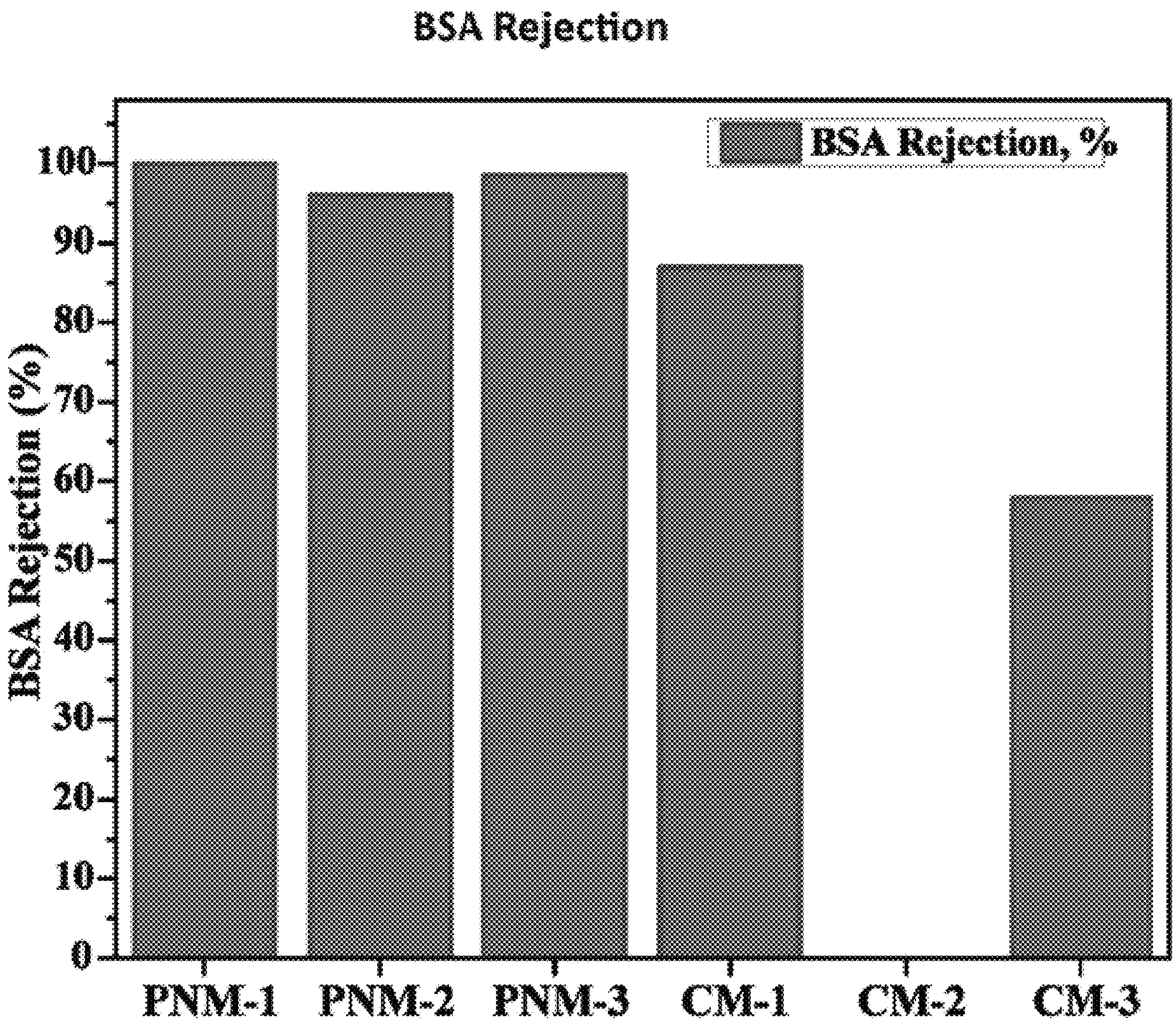
FIG. 34 shows a graph of BSA rejection of control and polymer network embedded PVDF membranes PNM-1, PNM-2 and PNM-3.
Figure 35:
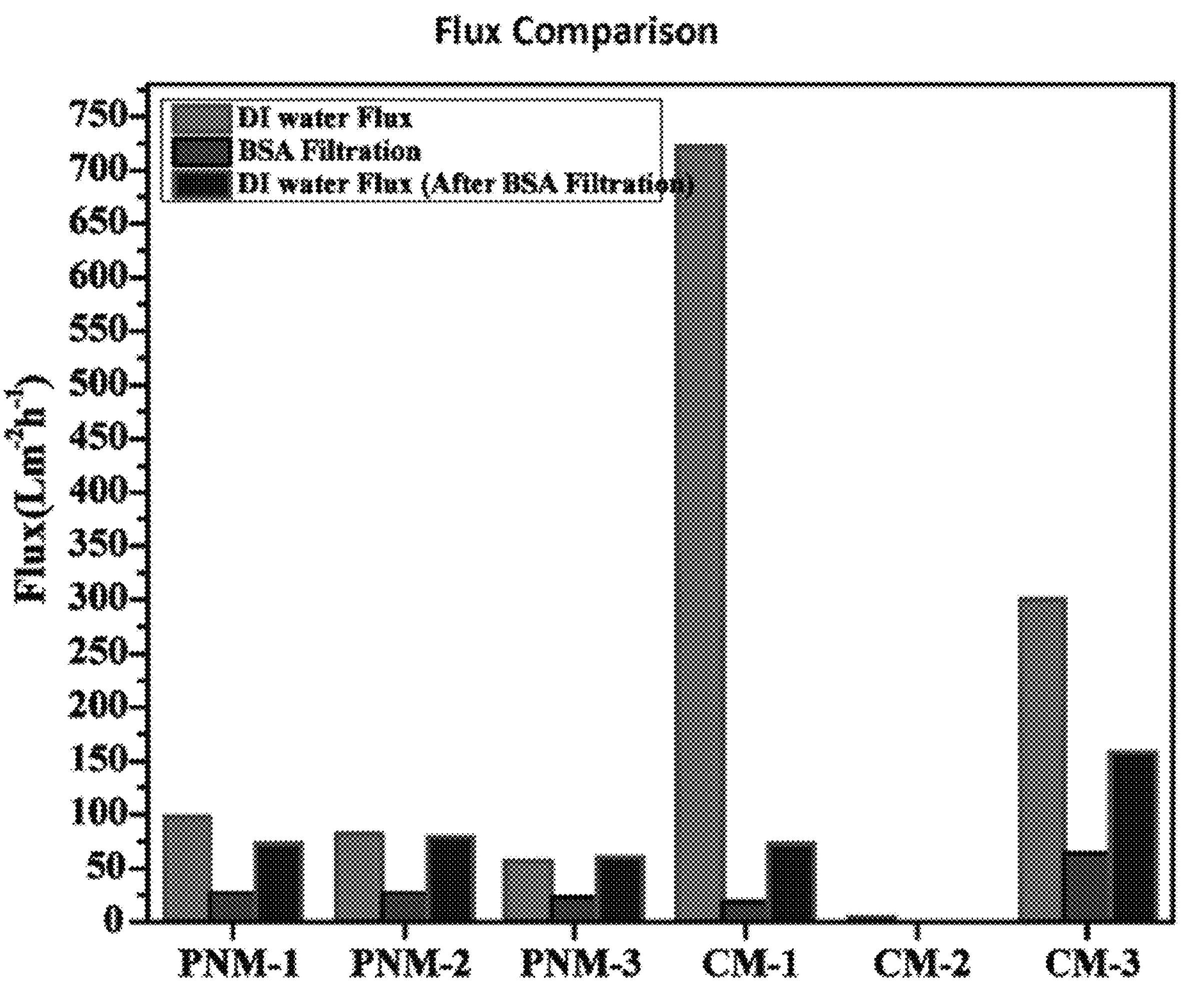
FIG. 35 shows a graph of average flux of control and polymer network embedded PVDF membranes PNM-1, PNM-2 and PNM-3 as herein described.
Figure 36:
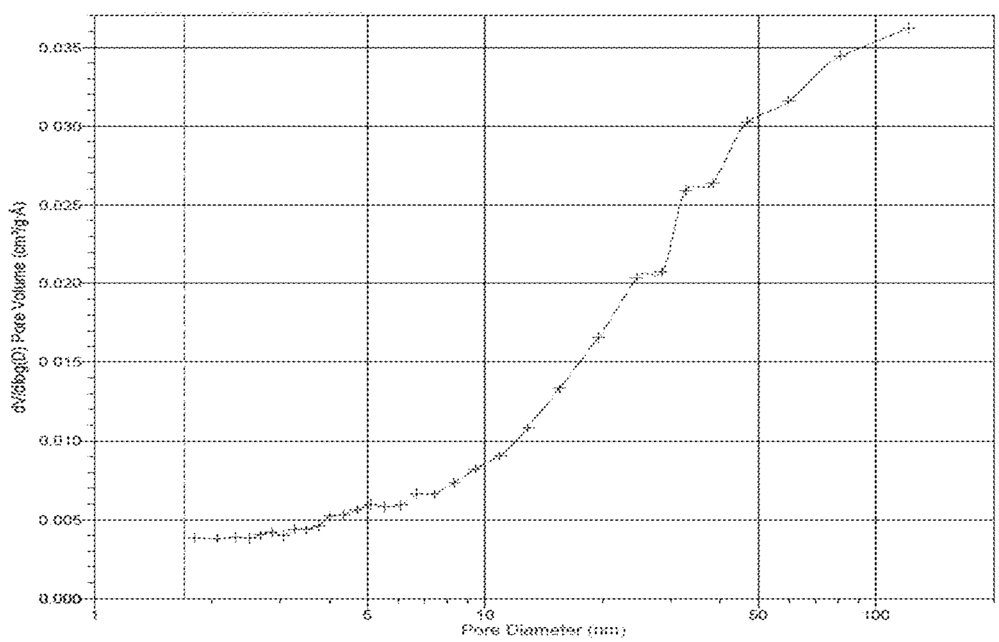
FIG. 36 shows a graph illustrating the characterization of the PPNM-1 membrane by $N_2$ adsorption permporometry. The pore diameters were estimated experiments using the Barrett-Joyner-Halenda (BJH) methodology.
Figure 36:
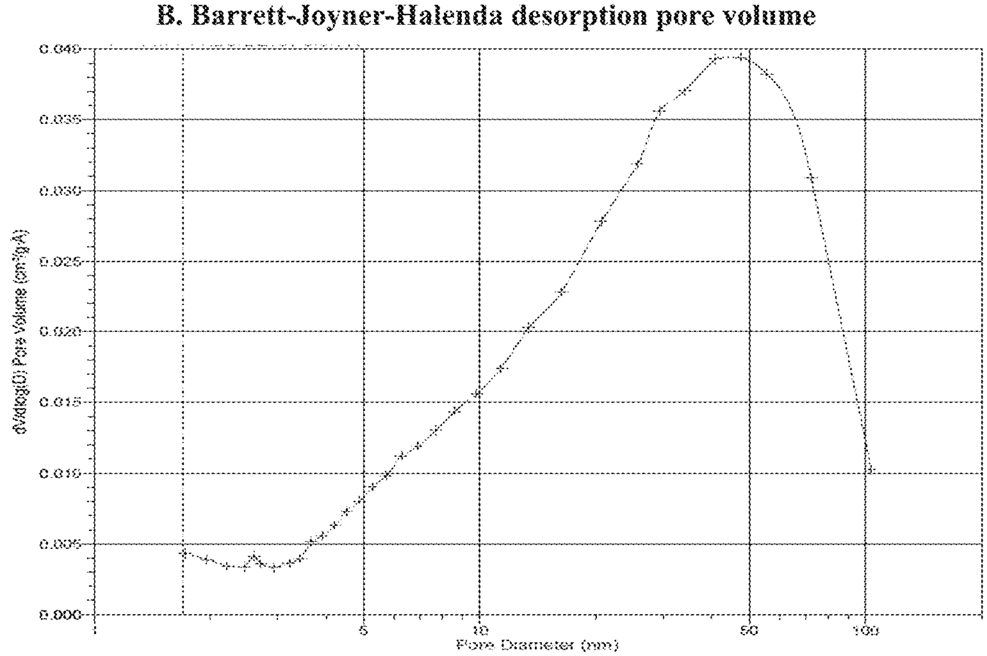
Figure 37:
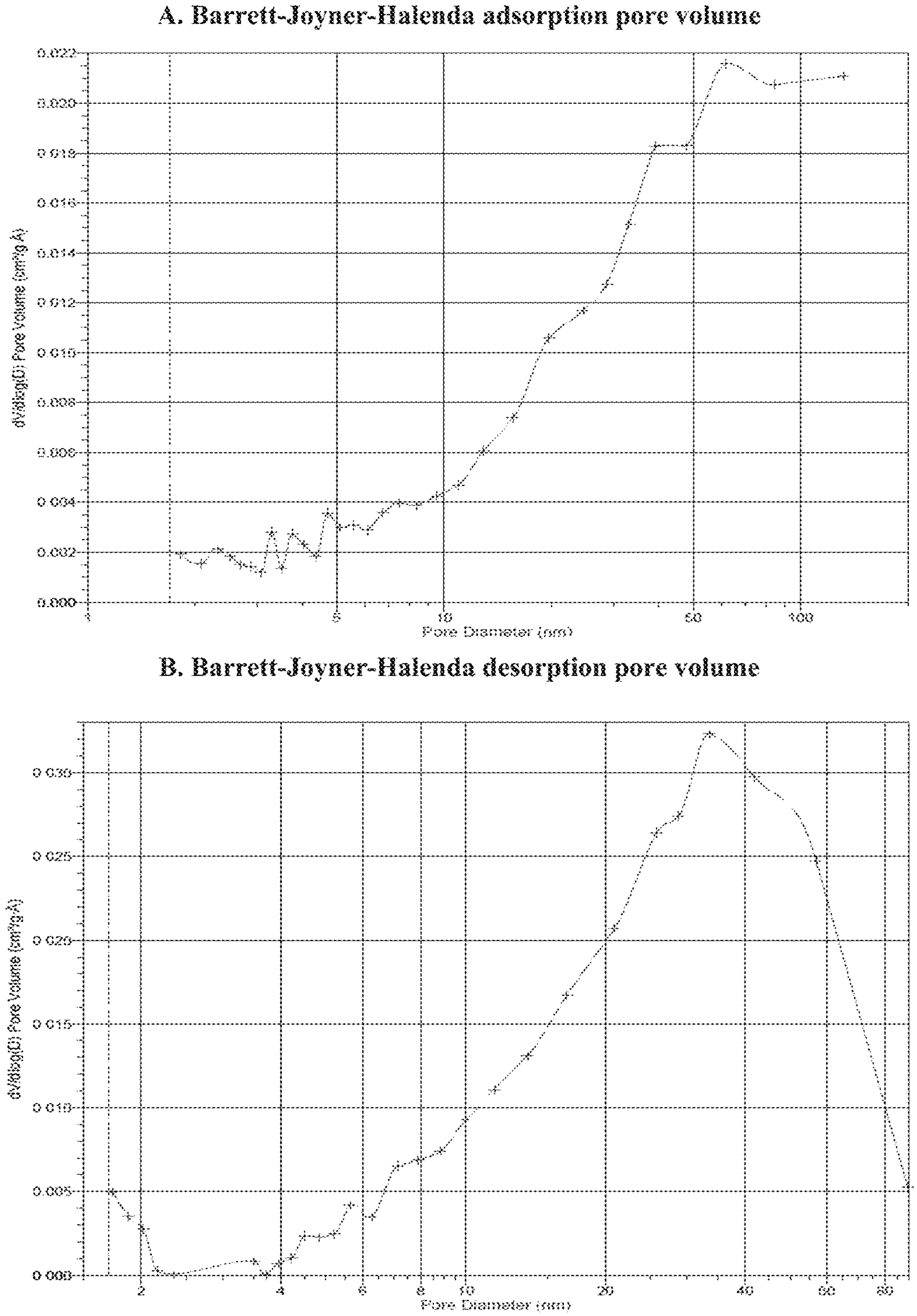
FIG. 37 shows a graph illustrating the characterization of the PPNM-2 membrane by $N_2$ adsorption permporometry. The pore diameters were estimated experiments using the Barrett-Joyner-Halenda (BJH) methodology.
Figure 38:
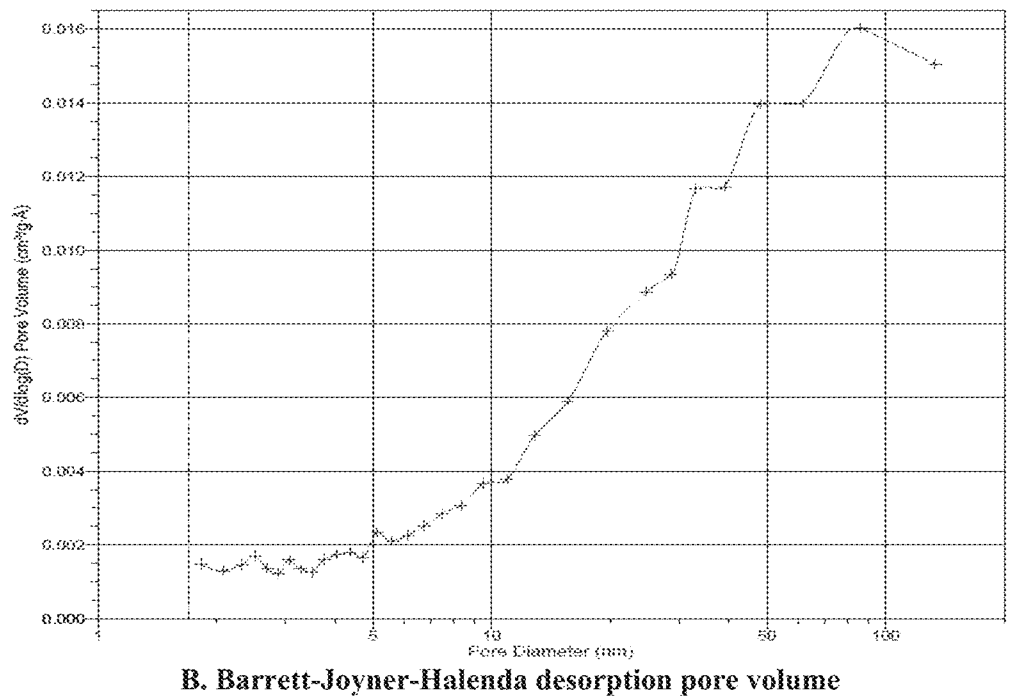
FIG. 38 shows a graph illustrating the characterization of the PPNM-3 membrane by $N_2$ adsorption permporometry. The pore diameters were estimated experiments using the Barrett-Joyner-Halenda (BJH) methodology.
Figure 38:
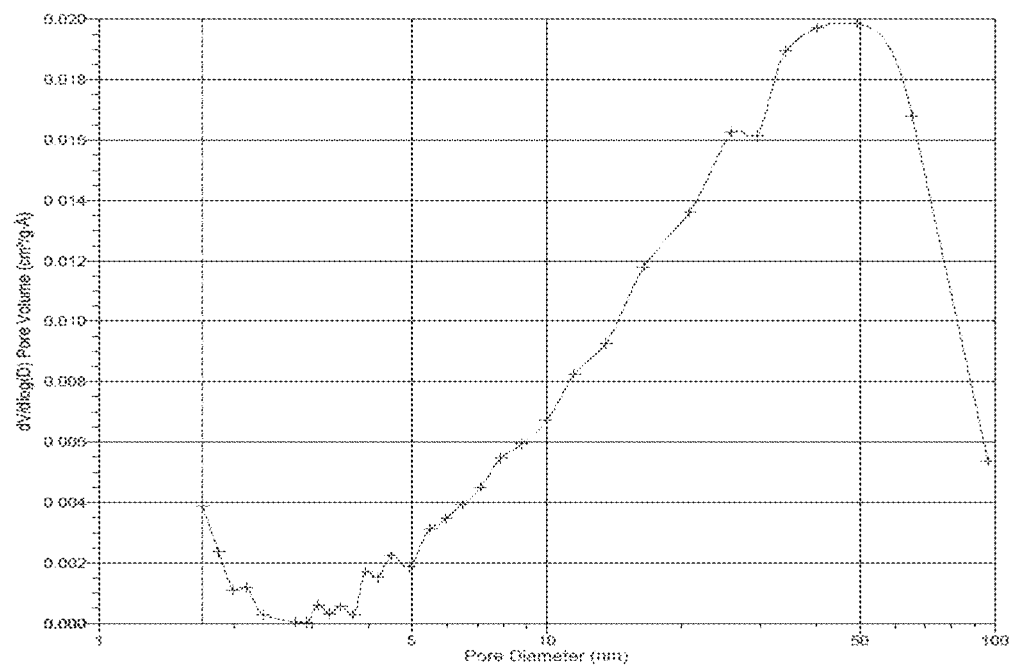
Figure 39:
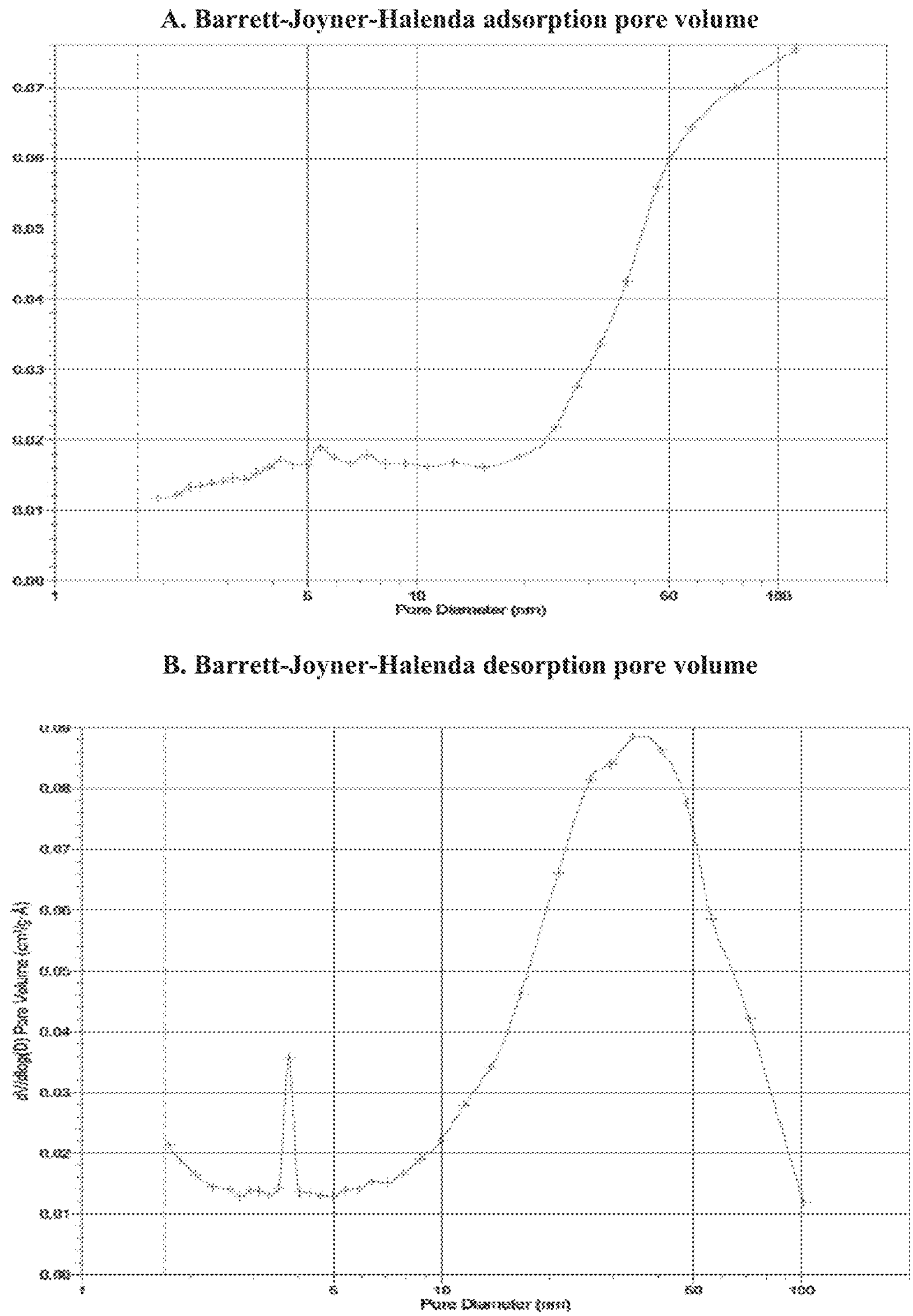
FIG. 39 shows a graph illustrating the characterization of the PVDF membrane by $N_2$ adsorption permporometry. The pore diameters were estimated experiments using the Barrett-Joyner-Halenda (BJH) methodology.

In particular, in some embodiments, the highly branched dendritic macromolecule to form polymeric nanoparticles can comprise various monodisperse generations of poly (amidoamine) (PAMAM) dendrimers (for example, G3, G4, or G5 PAMAM; see e.g. FIG. 29 of related application U.S. Ser. No. 13/754,883 published as US20130213881) or micro and/or nano aggregates thereof; monodisperse generations of poly(propyleneimine) (PPI) (for example, G3, G4, or G5 PPI; see e.g. FIG. 29 of related application U.S. Ser. No. 13/754,883 published as US20130213881) or micro and/or nano aggregates thereof; monodisperse generations of poly (bis(methylol)propionic acid) (MPA) (for example, G3, G4, or G5 MPA) or micro and/or nano aggregates thereof; or monodisperse generations of poly(ethyleneimine) (PEI) (for example, G3, G4, or G5 PEI) or micro and/or nano aggregates thereof. In other embodiments, the dendritic component can be polydisperse hyperbranched PEI. Hyperbranched PEI can be prepared, for example, by ring opening polymerization of aziridine also known as ethylene imine. Additional dendritic components can be selected, for example, based on compatibility with a polymeric component as described herein (see, e.g., FIG. 34 of related application U.S. Ser. No. 13/754,883 published as US20130213881.

Suitable polymer components comprising the polymer matrix can be selected for a given dendrimer component based on compatibility which can be determined based on the presence of corresponding functional group capable of attachment as well as possibly other features such as thermodynamic parameters such as solubility of the polymer component together with the dendrimer component in a particular solvent or mixture of solvents, affinity of the polymer component for the dendrimer component (e.g. the ability to hydrogen bond or have an electrostatic attraction), and/or stability of the polymer component in a solvent to be used in the fabrication of the membrane.

In filtration membranes herein described, nanoparticles formed by a linear or dendritic polymers, are attached to the polymer component of the polymer matrix typically through a covalent and/or a hydrogen bond. For example, in some embodiments, when the polymeric components of formulas I-XI comprise fluorine and/or sulfonyl groups (e.g. PVDF or PES), dendritic components of formulas XII-XV comprising amino groups can attach to the polymeric component through hydrogen bonds from the amino hydrogen atoms to the fluorine or carbonyl oxygen atoms. In other embodiments, when the polymeric components comprise oxygen groups (e.g. ethers, carbonyls, and sulfonyls), dendritic components comprising hydroxyl or carboxylic acid groups can attach to the polymeric component through formation of hydrogen bonds.

In particular in embodiments of the filtration membrane herein described, the nanomaterial and in particular nanoparticles and/or the polymeric network component of the matrix are embedded in the polymer aggregate of the polymer matrix to present reactive sites in the membrane.

The term "present" as used herein with reference to a compound or functional group indicates attachment performed to maintain the chemical reactivity of the compound or functional group as attached. Accordingly, a functional group presented on a surface, is able to perform under the appropriate conditions the one or more chemical reactions that chemically characterize the functional group.

The term "reactive site" as used herein refers to a chemical functional group capable of attracting, rejecting, and/or binding to a chemical of interest. In particular, reactive sites herein described are able to attract, reject or bind selectively a chemical to be filtered. Exemplary functional groups suitable as reactive sites include, but are not limited to, amines, quaternary ammonium groups, amides, hydroxyl groups, ethers, carboxylates, esters, sulfonates, sulfiniates, sulfonate esters, sulfinate esters, sulfonamides, sulfonamides, phosphates, carbamates, ureas, imidines, guanidines, oximes, imidazoles, pyridines, thiols, thioethers, thiocarboxylates, and phosphines.

In particular, in some embodiments, the reactive sites can be located on the functional groups of the linear polymer forming the polymeric nanoparticles. By way of example, the reactive sites can comprise carboxylic acid groups in polymeric nanoparticles formed with a linear polymer such as poly(methacrylic acid).

In particular, in some embodiments, the reactive site can be located on a highly branched dendritic macromolecule forming the polymeric nanoparticles (for example, amino groups on PEI or carboxylic acid groups on MPA) without any chemical transformation being necessary. In other embodiments, one or more reactive sites can be introduced into the dendritic component after a chemical transformation. Exemplary chemical transformations suitable for the introduction of a reactive site comprise reductive amination of amine groups to form alkylated amino groups, alkylation of amines to form quaternary ammonium groups, alkylation of hydroxyl groups to form ethers, reaction of amines or hydroxyls with haloalkyl carboxylic acids and/or derivatives (such as, for example, 2-chloroacetic acid or methyl 2-chloroacetate) to form carboxylic acids and/or derivatives, reaction of amines or hydroxyls with haloalkyl sulfonic acids and/or derivatives (such as, for example, 2-(chloromethyl) sulfonic acid or methyl 2-(chloromethyl)sulfonate to form sulfonic acids and/or derivatives, and reaction of amines with epoxides to form alcohols. Other transformations are identifiable to a skilled person upon a reading of the present disclosure (see, for example, US 2010/0181257 and US 2011/0315636 each incorporated by reference in its entirety). In some embodiments, the chemical transformation of the reactive site on the dendritic component can be performed before the dendritic component is associated with the polymeric component as herein described. In other embodiments, the chemical transformation of the reactive site on the dendritic component can be performed after the dendritic component is associated with the polymeric component as herein described.

In particular, in some embodiments where dendritic nanoparticles are formed in situ, the dendritic nanoparticles can be functionalized when the particles are formed in the polymer blend and before casting of the membrane. In other embodiments where dendritic nanoparticles are formed in situ, the dendritic nanoparticles can be functionalized after the casting of the membranes, for example by contacting the membrane with the functionalization reagents to functionalize the nanoparticles and then rinsing the membrane. For example, if a cation-rejecting membrane with a cation-rejecting nanoparticle concentration of greater than about 20 wt % is desired, PEI nanoparticles or other polymeric nanoparticles with amine groups can be formed in situ in the dope and the particles quaternized using an alkyl iodide or bromide (see, e.g. FIG. 49 and Example 15 of related application U.S. Ser. No. 13/754,883 published as US20130213881) by treating the dope with the alkyl iodide or bromide, casting the membrane and rinsing the membrane to produce a cation-rejecting membrane with a nanoparticle concentration of greater than about 20 wt %. If a cation-rejecting membrane with a cation-rejecting nanoparticle concentration of between about 1 and about 10 wt % is desired, PEI nanoparticles or other polymeric nanoparticles with amine groups can be formed ex situ (see, e.g., Example 14 of related application U.S. Ser. No. 13/754,883 published as US20130213881) and quaternized using an alkyl iodide or bromide (see, e.g. FIG. 49 and Example 15 of related application U.S. Ser. No. 13/754,883 published as US20130213881) and then mixed with the polymer to form the polymer matrix to form a dope for casting a membrane with a cation-rejecting nanoparticle concentration of between about 1 and about 10 wt % (see, e.g. Examples 3 and 19). As another example, if a cation-selective membrane with a cation-selective nanoparticle concentration of greater than about 20 wt % is desired, PEI nanoparticles or other polymeric nanoparticles with amine groups can be formed in situ in the dope and the particles functionalized with N, O, and S donors (see, e.g., Example 17 and FIG. 51 of related application U.S. Ser. No. 13/754,883 published as US20130213881).

In particular, in some embodiments, the cross-linking of polymers in the polymer blend herein described to form polymeric nanoparticles as described herein can result in the formation of additional reactive sites in addition to those already present on the polymer forming the polymeric nanoparticle. For example, if the polymer comprises carboxylic acids groups (e.g., as in poly(methacrylic acid) or MPA) and the cross-linker used is a diamine, the cross-linking can give rise to amide reactive sites in addition to the carboxylic acid reactive sites.

In some embodiments reactive sites can be introduced in the functionalizing polymer, and/or polymeric particles post membrane formation e.g., as described I related application U.S. Ser. No. 13/754,883 published as US20130213881

In embodiments herein described of filtration membrane herein described the reactive site can be selected and configured on the polymer forming the polymeric nanoparticles and/or the polymeric network component of the matrix to provide selective filtration of one or more chemicals of interest. In particular, in some embodiments, the reactive site can be selected to separate the one or more chemicals of interest in the rejection stream, permeate stream and/or retentate of the membrane. In particular, the dimension, chemical nature, and electrical charge of the reactive site as well as the location on the dendrimer component can be selected based on the dimensions, chemical nature and electrical charge of the chemical to be selectively filtered.

For example, in embodiments wherein selective filtration is desired to include anions in rejection stream and 2s metal ions cations such as $Ca^{2+}$ and $Mg^{2+}$ in the retentate of the membrane, reactive sites having negatively charged O donors [13] can be presented on the dendrimer component of the membrane. As another example, polymeric nanoparticles having neutral oxygen donors can be used to coordinate selective retention of is metal ions such as $Na^{+}$ [13]. As another example, polymeric nanoparticles, and in particular dendritic nanoparticles having positively charged nitrogen atoms (e.g. quaternary ammonium groups) can be used to selectively reject cations. As another example, polymeric nanoparticles, and in particular dendritic nanoparticles, comprising vicinal diol groups can be used to coordinate selective retention of boron.

In some embodiments, reactive sites retaining one or more chemical of interest can then be subjected to further reactions to selectively release some or all of the chemicals forming the retentate in a permeate stream, and/or to further modify the retentate as will be understood by a skilled person upon reading of the present disclosure.

In particular, membranes herein described including a suitable retentate can be treated to convert the retentate into a catalyst thus forming a catalytic membrane. For example, in some embodiments, a retentate form by metals can be treated with suitable active agents to change the oxidation state and/or ligation state to convert the metal to a catalytically active form. For example, in an embodiment dendritic components having groups capable of retention of palladium (e.g. amines and phosphines) can be subjected to reduction (e.g. $H_2$ or other reducing agents) to reduce the Pd atoms to produce catalytically active Pd(0) sites. Additional suitable metals or other materials suitable for preparation of catalytic membrane and related activating agents and/or suitable treatments will be identifiable by a skilled person.

In some embodiments, the retentate can be subjected to a selective release before or after an additional treatment. For example dendritic components having negatively charged O donors and tertiary amine groups can be used to selectively bind $Ca^{2+}$ and $Mg^{2+}$ ions at pH ~7.0, and the ions can later be released from the dendritic component by washing the dendritic component with an acidic solution containing a small ligand such as citric acid.

In some embodiments, the polymeric nanoparticles of the membranes herein described in any configuration, can be formed by polymeric nanomaterials according to the present disclosure that can range from approximately 1-3000 nm in size and can in some embodiments can selectively encapsulate and release a broad range of solutes in water including but not limited to cations (e.g., copper, silver, gold and uranium), anions (e.g., chloride, perchlorate and nitrate) and organic compounds (e.g., pharmaceuticals) [14, 15].

In particular in some embodiments, the highly branched dendritic macromolecule forming the polymeric nanoparticles can comprise hyperbranched PEI macromolecules, water-soluble branched macromolecules with functional N groups including for example, Gx-$NH_2$ PPI dendrimers, Gx-$NH_2$ PAMAM dendrimers, hyperbranched and dendrigraft lysine macromolecules, Hybrane hyperbranched polymers can be used as building blocks separation layers for the filtration membranes disclosed in this disclosure. Similarly, polymers such as polysulfone (PS), polyethersulfone (PES), and/or poly(vinyl) alcohol can be used in making polymer matrix of the filtration membranes described herein.

In some embodiments, polymeric nanomaterials can be selected to retain chemicals and to be used as nanoscale reactors and catalysts [14, 15]. In some embodiments, dendritic nanomaterial can be selected to be selective for cells, or other biological material (e.g. to reject or retain such material). For example, in some embodiments, filtration membranes herein described can be configured to bind bacteria and viruses possibly followed by a deactivation of the same [15]. In other embodiments, the dendritic nanomaterials can be used as scaffolds and templates for the preparation of metal-bearing nanoparticles with controllable electronic, optical and catalytic properties [14, 15]. Dendritic nanomaterials can also be used as delivery vehicles or scaffolds, for example for bioactive compounds [16].

According to embodiments herein described, the polymeric nanomaterials, and in particular dendritic nanomaterials, can be functionalized with surface groups can make the polymeric nanomaterial soluble in selected media or bind to surfaces. According to some embodiments, a first dendritic nanomaterial can be covalently linked to one or more further dendritic nanomaterials or associated with one or more macromolecules to form supramolecular assemblies.

According to some embodiments, a polymeric nanomaterial can be used as functional materials, for example, for water treatment [17-22]. According to some embodiments, the dendritic component comprises a carbon based structure functionalized with N or O. In particular, in some embodiments, the dendritic macromolecules comprise amines, carbonyls, and/or amides. In these embodiments, the N and O groups can sorb anions and/or cations. Exemplary dendritic components with N and O groups which can function as anion and cation sorbents include but is not limited to poly(amidoamine) [PAMAM], poly(propyleneimine) and bis (methylol) propionic acid (MPA) dendrimers (see, e.g. FIG. 25 of related application U.S. Ser. No. 13/754,883 published as US20130213881). Syntheses of dendritic nanomaterials according to the present disclosure can be carried out, for example, by cross linking of dendritic macromolecules to form dendritic nano- and/or microparticles. Further syntheses of dendritic nanomaterials will be apparent to a skilled person upon reading of the present disclosure (see, for example, [17-26]).

According to some embodiments, the polymeric nanomaterials, and in particular dendritic nanomaterials can bind and release cations such as $Cu^{2+}$, $Co^{2+}$, $Fe^{3+}$, $Ni^{2+}$ and $U^{6+}$] and anions such as $Cl^{-}$. $ClO_4^{-}$ and $SO_4^{2-}$, for example, through a change of solution pH [17-22]. In particular PAMAM, PPI, and MPA particles can in some embodiments bind and release cations such as $Cu^{2+}$· $Co^{2+}$· $Fe^{3+}$· $Ni^{2+}$ and $U^{6+}$, and anions such as $Cl^-$ $ClO_4^-$ and $SO_4^{2-}$. In some embodiments PAMAM dendrimers are used and the dendrimer can present for example, an amide, a primary amine, a secondary amine, and/or a tertiary amine group. In some embodiments PPI dendrimers are used. In embodiments where PPI dendrimers are used, the PPI dendrimers have only primary and tertiary amine groups. In some embodiments MPA dendrimers are used. MPA dendrimers can have carbonyl and/or carboxyl groups which can allow for membranes to have a high capacity, selective, and/or recyclable ligands for $Ca^{2+}$, $Mg^{2+}$ and $Na^+$ [13].

Figure 24:
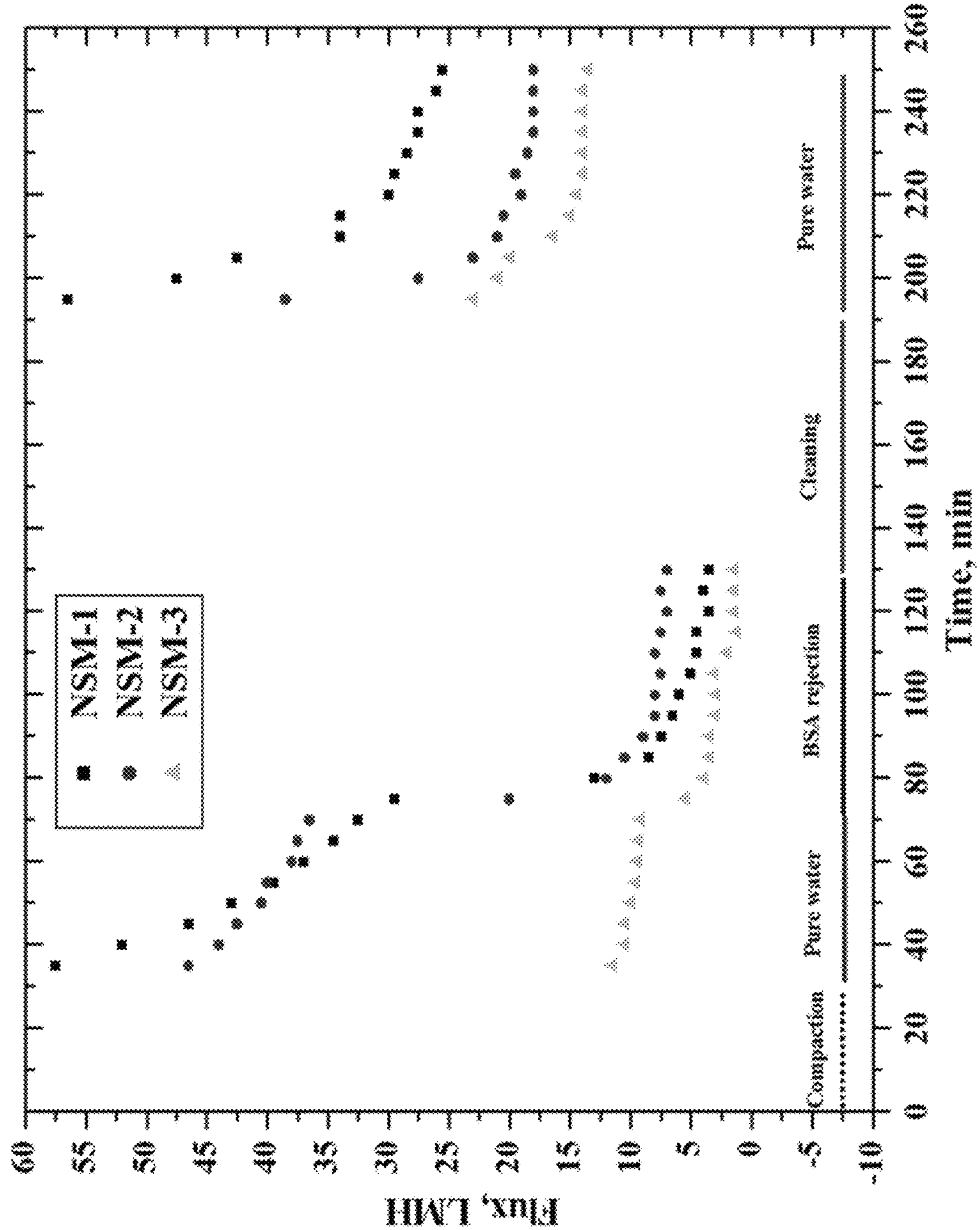
FIG. 24 shows a graph of pure water flux of polymeric nanocomposite membranes NSM-1, NSM-2 and NSM-3 described in related application U.S. Ser. No. 13/754,883 published as US20130213881.

According to further embodiments, polymeric nanomaterials and in particular dendritic nanomaterials according to the present disclosure (e.g. PAMAM, PPI and MPA) can be functionalized with terminal groups which can allow the dendrimer to be soluble in a particular solvent to type of solvent, bind onto one or more targeted surfaces, or cross-link with other dendrimers to form multifunctional supramolecular assemblies [14, 15] (See e.g. FIG. 24 of related application U.S. Ser. No. 13/754,883 published as US20130213881).

In some embodiments, the polymeric nanomaterials and in particular dendritic macromolecules (e.g., PAMAM, PEI, and PPI dendrimers) can provide selective and recyclable high capacity macroligands for anions (for example $Cl^-$, $Br^-$; $SO_4^{2-}$; $NO_3^-$; and $ClO_4^-$) and cations (for example, $Na^+$, $Ca^{2+}$, and $Mg^{2+}$) in aqueous solutions [19-22]. Such dendritic macromolecules can be suitable, for example, in making filtration membranes for water purification as $Na^+$, $Ca^{2+}$, and $Mg^{2+}$ cations and anions $Cl^-$ and $SO_4^{2-}$ anions make-up more than 98% of the total dissolved solids (TDS) in brackish water and seawater [27].

In some embodiments, the polymeric nanomaterials, and in particular dendritic nanomaterials comprise hyperbranched macromolecules, such as polyethyleneimine (PEI) which can behave similarly to corresponding, dendrimers [27]. Hyperbranched PEI has a degree of branching at approximately 65-70%. Hyperbranched PEI are generally soluble (e.g. 5-20 wt %) in solvents such dimethyl formamide (DMF) and dimethyl acetamide (DMAc) [22, 28]. Hyperbranched polyethyleneimine (PEI) can be useful as a monomer of interfacial polymerization due at least in part to its high amine density. Generally, hyperbranched PEI have a large number of amine groups per molecule (e.g. primary, secondary, and tertiary amine groups in a ratio of approximately 1:2:1), each nitrogen atom is linked each other by an ethylene group (FIG. 44 of related application U.S. Ser. No. 13/754,883 published as US20130213881) [29] which can allow for a number of unreacted amine groups, which can be sources of charges (e.g. by pH change in aqueous solution [30] or post-functionalization), for example, for enhancing Donnan exclusion effects.

In some embodiments, the dendritic nanomaterials are capable of rejecting cations and anions. For example, dendritic components having negatively charged O donors can be used to coordinate 2s metal ions such as $Ca^{2+}$ and $Mg^{2+}$ [13]. As another example, dendritic components having neutral oxygen donors can be used to coordinate with is metal ions such as $Na^+$ [13].

In some embodiments, dendritic nanomaterials containing negatively charged O donors and tertiary amine groups can be used to selectively bind $Ca^{2+}$ and $Mg^{2+}$ ions at pH ~7.0. The $Ca^{2+}$ and $Mg^{2+}$ ions can then be released from the dendritic component by washing the dendritic component with an acidic solution containing a small ligand such as citric acid. As another example, dendritic nanomaterials containing neutral O donors and tertiary amine groups can selectively bind $Na^+$ ions at pH ~7.0. The $Na^+$ ions can then be released from the dendritic nanomaterial by washing the dendritic component with an acidic solution containing a small complexing ligand such as citric acid. These examples are based on established trends in coordination chemistry [13] and accordingly other methods of making and using dendritic components based on such trends as will be understood by a skilled person, can be implemented without departing from the scope of the present disclosure.

In some embodiments, the dendritic nanomaterial can be made by cross-linking highly branched dendritic macromolecules by using a cross linking agent. For example, a dendritic nanomaterial comprising amine groups can be combined with a cross linking agent which is capable of cross linking proximate amine groups (amine-amine cross linking agents). The amine-amine cross linking agents can be bifunctional (e.g. two sites which can form covalent bonds with amines) or multifunctional (e.g. three or more sites which can form covalent bonds with amines). The cross linking agents can include but are not limited to primary bifunctionalized alkanes having the general formula (XXV) or (XXVI) below:

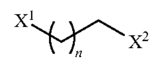

(XXV)

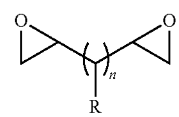

(XXVI)

wherein $X^1$ and $X^2$, by way of example, can be independently selected from (COCl, COBr, COI, Cl, Br, I, $OSO_3CH_3$, $OSO_3C_7H_7$, n can range from 1-15, and wherein R can be H, alkyl, or epoxy substituted alkyl. Crosslinking agents can also include imidoesters (e.g. dimethyl adipimidate • 2HCl (DMA), dimethyl pimelimidate • 2HCl (DMP), dimethyl suberimidate •2HCl (DMS), dimethyl 3,3'-dithiobispropionimidate • 2HCl (DTBP)), N-hydroxy succinimide (NHS)-esters (e.g. disuccinimidyl suberate (DSS), bis(sulfosuccinimidyl) suberate (BS3), disuccinimidyl glutarate (DSG)), and 1,5-difluoro-2,4-dinitrobenzene (DFDNB). Exemplary amine cross linking agents comprise in particular, trimesoyl chloride (TMC), 1,3-dibromopropane (DBP), and epichlorohydrin (EPC) to form dendritic nanoparticles.

In some embodiments, membranes can be fabricated by casting a mixture of the polymer component, the dendrimer component, one or more solvents, and a cross-linking agent onto porous polymeric MF membrane supports [31].

Targeted atomistic molecular dynamics (MD) simulations of anion and/or cation binding to a dendritic component (e.g. PAMAM, PPI, and MPA) can be carried out using a Dreiding III force field (FIG. 26 of related application U.S. Ser. No. 13/754,883 published as US20130213881) [7] to develop and validate a computer-aided molecular design framework that can be used to guide the synthesis of high capacity and recycle low-cost ion-selective dendritic polymers.

In some embodiments, the membranes with embedded nanoparticles as described herein can comprise a polymeric matrix with polymeric nanoparticles made from cross-linked linear polymers. In some embodiments, the membranes with embedded nanoparticles as described herein can comprise a polymeric matrix made from poly(vinylidene) fluoride (PVDF) with polymeric nanoparticles made from cross-linked linear polymers (e.g. polyamine) functionalized with an epoxy polyacrylate forming the polymer network of the matrix.

In some embodiments, the membranes with embedded nanoparticles as described herein can comprise a polymeric matrix made from poly(vinylidene) fluoride (PVDF) with polymeric nanoparticles made from cross-linked poly(methacrylic acid) (PMAA) and functionalized with epoxy polyacrylate as a functionalizing polymer forming the polymer network of the matrix.

In some embodiments, the membranes with embedded nanoparticles as described herein can comprise a polymeric matrix made from poly(tetrafluoroethylene) (PTFE) with polymeric nanoparticles made from cross-linked linear polymers polyamine, functionalized with a diepoxy polyethylene glycol forming the polymer network of the matrix.

In some embodiments, the membranes with embedded nanoparticles as described herein can comprise a polymeric matrix made from poly(tetrafluoroethylene) (PTFE) with polymeric nanoparticles made from cross-linked poly(methacrylic acid) (PMAA)., functionalized with an acylcloride forming the polymer network of the matrix.

In some embodiments, the membranes with embedded nanoparticles as described herein can comprise a polymeric matrix made from polyether sulfone (PES) with polymeric nanoparticles made from cross-linked linear polymers functionalized with diepoxypolyethylene glycol and/or an acylchloride.

In some embodiments, the membranes with embedded nanoparticles as described herein can comprise a polymeric matrix made from polyether sulfone (PES) with polymeric nanoparticles made from cross-linked poly(methacrylic acid) (PMAA), functionalized with diepoxypolyethylene glycol and/or an acylchloride.

In some embodiments, the membranes with embedded nanoparticles as described herein can comprise a polymeric matrix made from poly(acrylonitrile) (PAN) with polymeric nanoparticles made from cross-linked linear polymers functionalized with diepoxypolyethylene glycol and/or an acylchloride.

In some embodiments, the membranes with embedded nanoparticles as described herein can comprise a polymeric matrix made from poly(acrylonitrile) (PAN) with polymeric nanoparticles made from cross-linked poly(methacrylic acid) (PMAA) functionalized with diepoxypolyethylene glycol and/or an acylchloride.

In some embodiments, the membranes with embedded nanoparticles as described herein can comprise a polymeric matrix made from poly(ethylene terephthalate) (PET) with polymeric nanoparticles made from cross-linked linear polymers functionalized with diepoxypolyethylene glycol and/or an acylchloride forming the polymer network.

In some embodiments, the membranes with embedded nanoparticles as described herein can comprise a polymeric matrix made from poly(ethylene terephthalate) (PET) with polymeric nanoparticles made from cross-linked poly(methacrylic acid) (PMAA) functionalized with diepoxypolyether and/or epoxy polyamide In some embodiments, the membranes with embedded nanoparticles as described herein can comprise a polymeric matrix with polymeric nanoparticles made from cross-linked highly branched dendritic macromolecule.

In some embodiments, the membranes with embedded nanoparticles as described herein can comprise a polymeric matrix made from poly(vinylidene) fluoride (PVDF) with polymeric nanoparticles made from cross-linked highly branched dendritic macromolecule functionalized with diepoxypolyethylene glycol forming the polymer network of the matrix.

In some embodiments, the membranes with embedded nanoparticles as described herein can comprise a polymeric matrix made from poly(vinylidene) fluoride (PVDF) with polymeric nanoparticles made from cross-linked poly(ethyleneimine) (PEI), functionalized with an acylchloride forming the polymer network of the matrix.

In some embodiments, the membranes with embedded nanoparticles as described herein can comprise a polymeric matrix made from poly(vinylidene) fluoride (PVDF) with polymeric nanoparticles made from cross-linked poly(bis (methylol)propionic acid) (MPA) (for example, G3, G4, or G5 MPA) functionalized with diepoxypolyethylene glycol and/or an acylchloride forming the polymer network of the matrix.

In some embodiments, the membranes with embedded nanoparticles as described herein can comprise a polymeric matrix made from poly(tetrafluoroethylene) (PTFE) with polymeric nanoparticles made from cross-linked highly branched dendritic macromolecule functionalized with diepoxypolyethylene glycol and/or an acylchloride forming the polymer network of the matrix.

In some embodiments, the membranes with embedded nanoparticles as described herein can comprise a polymeric matrix made from poly(tetrafluoroethylene) (PTFE) with polymeric nanoparticles made from cross-linked poly(ethyleneimine) (PEI) functionalized with diepoxypolyethylene glycol and/or an acylchloride forming the polymer network of the matrix.

In some embodiments, the membranes with embedded nanoparticles as described herein can comprise a polymeric matrix made from poly(tetrafluoroethylene) (PTFE) with polymeric nanoparticles made from cross-linked poly(bis (methylol)propionic acid) (MPA) (for example, G3, G4, or G5 MPA) functionalized with diepoxypolyethylene glycol and/or an acylchloride forming the polymer network of the matrix.

According to a further embodiment of the disclosure, a method of making a polymeric membrane with embedded polymeric nanoparticles is described. The method comprises contacting a polymeric component, a dendritic component, and a solvent to provide a blend, contacting the blend with a cross-linking component, for a time and under a condition to permit the in situ formation of dendritic nanoparticles to provide a dope solution; and casting the dope solution to provide a filtration membrane with embedded dendritic nanoparticles.

In particular, in some embodiments, contacting a polymeric component, a dendritic component, and a solvent to provide a blend is performed by mixing a solution of the base polymer of the polymeric component in a suitable solvent—the suitable solvent chosen based on parameters such as solubility parameters (see e.g. [1, 8]), compatibility of the dendritic component with the polymer component (e.g. hydrogen bonding between amine groups and fluoride groups or interaction of hydroxyl/carboxylic acid groups with oxygen atoms), or other chemical and thermodynamic parameters identifiable to a skilled person—for approximately 1-24 hours at 25-85° C.—or other times and temperatures capable of producing a homogeneous solution without decomposing the polymeric component as would be identifiable to a skilled person—and then adding a solution of the dendritic component and mixing to form a homogeneous blend (see, e.g., Examples 1 and 2). A functionalizing polymer presenting a functional group capable to react with a corresponding group in the dendrimer component can be added into the blend and is allowed to react for a time depending on the reactivity of the functional polymer end group (e.g. 1-10 hrs) and preferably between 1 hr or 2 hrs. In particular, in some embodiments, that the concentration of the dendritic component is between about 3.5 wt % and 7.5 wt % of the blend.

In particular, in some embodiments, the contacting of the blend with a cross linking component can be performed by mixing a crosslinking catalyst and cross-linking component—the cross-linking catalyst and cross linking component chosen based on the functional groups on the dendritic component as would be identifiable to a skilled person (e.g., if the dendritic component has amine groups, the cross linking component can be an epoxide such as epichlorohydrin or dihaloalkane such as 1,3-dibromopropane and the catalysts can be HCl; if the dendritic component has carboxylic acid groups, the cross-linking component can be a diamine such as 1,3-diamino propane and the cross-linking catalyst can be 1-ethyl-3-(3-dimethylaminopropyl)carbodiimide) (EDC))—for 1-24 hours at approximately 25-85° C.—or other times and temperatures capable of producing a homogeneous dope without decomposing either the polymeric or dendritic components as would be identifiable to a skilled person—to provide a dope solution with dendritic nanoparticles formed in situ (see, e.g., Examples 1 and 2). A functionalizing polymer which also present at least one epoxyde group can then be added into the blend and is allowed to react to form a polymer network for a time and under condition that depend on the reactivity of 1 hr or 2 hr (Examples 2 and 3) In particular, in some embodiments, the dendritic component is at a concentration of about 1.5 times the concentration of the cross-linking component In particular, in membranes cast with in situ generated nanoparticles, presenting or not presenting a polymer network, aggregates and clusters of nanoparticles that form for example through fractal growth are not detectable contrary to membranes cast with nanoparticles that are preformed (compare, e.g., FIGS. 6A-F of the instant application and FIG. 6 of related application U.S. Ser. No. 13/754,883 published as US20130213881 with FIG. 53 and FIG. 58B of related application U.S. Ser. No. 13/754,883 published as US20130213881) resulting in discrete nanoparticles being distributed in membranes with nanoparticles formed in situ. In particular, in some embodiments, the nanoparticles can be present in the membrane at a concentration of greater than about 20 wt %, and more particularly at a concentration of greater than about 35% and from 50% to 60%.

In particular, in some embodiments, the dope solution with in situ formed dendritic nanoparticles can be cast to provide a polymeric membrane with embedded with dendritic nanoparticles. In particular, in some embodiments, the membrane can be cast by phase inversion casting (see, e.g. [6]). In particular, in some embodiments, the casting can be performed by pouring the hot dope solution onto a glass surface and allowing it to air dry at room temperature and then immersing it into water for a time to form a nascent membrane as would be identifiable to a skilled person. The nascent membrane can then be immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with in situ formed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

According to further embodiments, a method of making a polymeric membrane with a polymeric network with embedded preformed polymeric nanoparticles is described. The method comprises contacting a polymeric component, preformed polymeric nanoparticles, and a solvent for a time and under a condition to provide a dope solution; and casting the dope solution to provide a polymeric membrane with pores, the pores embedded with the preformed polymeric nanoparticles. In some embodiments, the polymeric component is within a dope wherein a base polymer is comprised together with polymeric particle precursors functionalized with a functionalizing polymer forming a polymeric network of the matrix.

In particular, in some embodiments, the preformed polymeric nanoparticles can be performed by cross-linking a polymer (e.g. PEI or poly(methacrylic acid)) to form polymeric nanoparticles for example by inverse micelle cross-linking (see, e.g., Example 14 of related application U.S. Ser. No. 13/754,883 published as US20130213881)

In particular, in some embodiments, contacting a polymeric component, preformed polymeric nanoparticles, and a solvent for a time and under a condition to provide a dope solution is performed by mixing a solution of the polymeric component in the solvent for 1-24 hours at approximately 25-85° C.—or other times and temperatures capable of producing a homogeneous solution without decomposing the polymeric component as would be identifiable to a skilled person—and then adding a solution of the preformed polymeric nanoparticles and mixing the solution for 1-24 hours at approximately 25-85° C.—or other times and temperatures capable of producing a homogeneous blend without decomposing either the polymeric or dendritic components as would be identifiable to a skilled person to provide a dope solution with preformed polymeric nanoparticles. A functionalizing polymer can then be added into the blend and is allowed to react to form the polymer network (Examples 2 and 3)

In particular, in some embodiments, the dope solution with preformed dendritic nanoparticles can be cast to provide a polymeric membrane with embedded with dendritic nanoparticles. In particular, in some embodiments, the membrane can be cast by phase inversion casting (see, e.g. [6]). In particular, in some embodiments, the casting can be performed by pouring the hot dope solution onto a glass surface and allowing it to air dry at room and then immersing it into water for a time to form a nascent membrane as would be identifiable to a skilled person. The nascent membrane is then immersed in fresh water and then immersed in ethanol to remove impurities as would be identifiable to a skilled person. The membranes can then be removed from the glass and dried to provide a polymeric membrane with pores, the pores embedded with dendritic nanoparticles. In other embodiments, the dope solution with preformed dendritic nanoparticles can be cast onto a polymer support (e.g. a poly(ethylene terephthalate) non-woven fabric) in place of glass to provide a polymeric membrane with pores, the pores embedded with dendritic nanoparticles wherein the polymeric membrane is layered on top of the polymer support.

In particular, membranes cast with preformed nanoparticles can possess aggregates and clusters of nanoparticles that form through fractal growth unlike the discrete particles embedded in membranes when the particles are formed in situ (compare, e.g., FIG. 53 and FIG. 58B of related application U.S. Ser. No. 13/754,883 published as US20130213881 with FIGS. 6A-F of the instant application and FIG. 6 of related application U.S. Ser. No. 13/754,883 published as US20130213881).

In some embodiments, the membranes with embedded nanoparticles as described herein can comprise a polymeric matrix comprising a polymer network with polymeric nanoparticles made from cross-linked linear polymers made by using preformed nanoparticles.

In some embodiments, the preformed particles can be added to a membrane also including microparticles and/or nanoparticles formed in situ.

In some embodiments, the membranes with embedded nanoparticles as described herein can comprise a polymeric matrix made from poly(vinylidene) fluoride (PVDF) as a base polymer, and epoxy polyethylene glycol as a functionalizing polymer with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14 related application U.S. Ser. No. 13/754,883 published as US20130213881).

In some embodiments, the membranes with embedded nanoparticles as described herein can comprise a polymeric matrix made from poly(tetrafluoroethylene) (PTFE) with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14 related application U.S. Ser. No. 13/754,883 published as US20130213881).

In some embodiments, the membranes with embedded nanoparticles as described herein can comprise a polymeric matrix made from polyether sulfone (PES) with polymeric nanoparticles made from cross-linked poly(methacrylic acid) (PMAA). In particular, when the particles are premade, the PMMA can be cross-linked with either EGDMA or PEGDMA with an AIBN initiator (see, e.g., Example 14 related application U.S. Ser. No. 13/754,883 published as US20130213881).

In some embodiments, the membranes with embedded nanoparticles as described herein can comprise a polymeric matrix made from poly(acrylonitrile) (PAN) with polymeric nanoparticles made from cross-linked poly(methacrylic acid) (PMAA). In particular, when the particles are premade, the PMAA can be cross-linked with either EGDMA or PEGDMA with an AIBN initiator (see, e.g., Example 14 related application U.S. Ser. No. 13/754,883 published as US20130213881).

In some embodiments, the membranes with embedded nanoparticles as described herein can comprise a polymeric matrix made from poly(ethylene terephthalate) (PET) with polymeric nanoparticles made from cross-linked poly(methacrylic acid) (PMAA). In particular, when the particles are premade, the PMAA can be cross-linked with either EGDMA or PEGDMA with an AIBN initiator (see, e.g., Example 14 related application U.S. Ser. No. 13/754,883 published as US20130213881).

In some embodiments, the membranes with embedded nanoparticles as described herein can comprise a polymeric matrix with a polymer network component and polymeric nanoparticles made from cross-linked highly branched dendritic macromolecules made by either in situ particle formation or by using preformed nanoparticles.

In some embodiments, the membranes with embedded nanoparticles as described herein can comprise a polymeric matrix made from poly(vinylidene) fluoride (PVDF) with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI. Functionalizing polymers such as epoxypolyethylene glycol or an acyl chloride can then be added under conditions allowing to link with cross-linked PEI particles.

In some embodiments, the membranes with embedded nanoparticles as described herein can comprise a polymeric matrix made from poly(vinylidene) fluoride (PVDF) with polymeric nanoparticles made from cross-linked poly(bis(methylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA. Functionalizing polymers such as epoxypolyethylene glycol or an acyl chloride can then be added under conditions allowing to link with cross-linked PEI particles.

In some embodiments, the membranes with embedded nanoparticles as described herein can comprise a polymeric matrix made from poly(tetrafluoroethylene) (PTFE) and epoxy polyethylene glycol as a functionalizing polymer with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI.

In some embodiments, the membranes with embedded nanoparticles as described herein can comprise a polymeric matrix made from poly(tetrafluoroethylene) (PTFE) and epoxy polyethylene glycol as a functionalizing polymer with polymeric nanoparticles made from cross-linked poly(bis(methylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA.

In some embodiments, the membranes with embedded nanoparticles as described herein can comprise a polymeric matrix made from poly(methacrylic acid) (PMAA) and epoxy polyacrylate as a functionalizing polymer with polymeric nanoparticles made from cross-linked poly(ethyleneimine) (PEI). In particular, when the particles are made in situ, the PEI can be cross-linked with either epichlorohydrin or 1,3-dibromopropane with an a catalytic amount of HCl at 80° C. for 1 hour to form a dope with nanoparticles of cross-linked PEI.

In some embodiments, the membranes with embedded nanoparticles as described herein can comprise a polymeric matrix made from poly(methacrylic acid) (PMAA) and epoxy polyethylene glypolyacrylate as a functionalizing polymer with polymeric nanoparticles made from cross-linked poly(bis(methylol)propionic acid) (MPA) (for example, G3, G4, or G5 MPA). In particular, when the particles are made in situ, the MPA can be cross-linked with 1,3-diaminopropane and 1-ethyl-3-(3-dimethylaminopropyl)carbodiimide) (EDC) to form a dope with nanoparticles of cross-linked MPA.

In some embodiments a dope comprising a polymer forming the polymer matrix herein described including a polymer network component in which polymeric nanomaterial is embedded can be used to provide nanofibers and/or microfibers.

The term "fiber" as used herein indicate a material that is a continuous filament or is in a discrete elongated piece, similar to a length of thread. In particular, "nanofiber" as used herein refer to fibers with a diameter less than approximately 1000 nm and the term "microfiber" as used herein refer to fibers with a diameter between approximately 1 μm to approximately 10 μm in size.

In particular, in some embodiments the dope solution comprising a polymer embedding microparticles and/or nanoparticles herein described can be used in a method of making a nano and/or micro fibers with embedded polymer nanoparticles, and in particular with embedded dendritic nanoparticles, herein described.

In some embodiments, the method comprises contacting a polymeric component, a dendritic component, a cross-linking component, and a solvent for a time and under a condition to permit the in situ formation of dendritic nanoparticles to provide a dope solution; and spinning the dope solution to provide a nanofiber or microfiber herein described. In particular, in some embodiments, the polymeric component and dendritic component are contacted to form a blend and the cross-linking agent is added to the blend to allow in situ formation of dendritic nanoparticles and obtain the dope before the spinning. In some embodiments, the nanoparticle are preformed and then added to the polymer for an ex situ formation according to methods and systems herein described to provide a dope solution that is then spun to provide a nano-fiber and/or microfiber herein described.

In some embodiments, the nanofibers with embedded polymeric nanoparticles can be electrospun onto a support layer (e.g. a PET non-woven fabric; see e.g. Example 2). Then a nanofibrous composite membrane can be fabricated as described in U.S. patent application Ser. No. 13/570,221 entitled "Filtration Membranes, and Related Nano and/or Micro fibers, Composites, Methods and Systems" filed on Aug. 8, 2012 incorporated by reference in its entirety.

A "support layer" in the sense of the present disclosure is an aggregate material comprising a polymer component configured to strengthen the membrane structure. Suitable polymers to be included in support layers comprise, for example, poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET) which can be aggregated by inverse casting the polymer or by electrospinning. In some embodiments the support layer includes pores. In some embodiments, the support layer can be functionalized with a dendrimer component. In other embodiments, after a nanofibers and/or microfibers with embedded dendritic nanoparticles are electrospun onto a support layer, a further support layer can be electrospun to provide a top support layer for providing additional strength or for creating a bipolar membrane. In some embodiments, the support layer can comprise or be formed by a polymer matrix with embedded polymer nanoparticles, and in particular dendritic nanoparticles, in accordance with the present disclosure.

Accordingly, in some embodiments a filtration membrane can comprise a plurality of nano and/or micro fibers, wherein at least one of the nano and/or micro fibers comprises polymeric nanoparticles embedded in a polymeric component. The plurality of nano and/or micro fibers can be attached to a support layer and/or a polymer matrix comprising embedded polymer nanoparticles and in particular dendritic nanoparticles herein described. Additional layers such as a separation layer or a further support layer can also be comprised as will be understood by a skilled person.

In some embodiments a filtration membrane can comprise a polymer matrix comprising embedded polymeric microparticles and/or nanoparticles herein described attaching a nano- and/or microfiber. Additional layers such as a separation layer or a further support layer can also be comprised as will be understood by a skilled person.

In some embodiments, the nanofiber and/or microfiber can comprise a polymeric nanoparticle embedded in a polymeric component as described herein. In some embodiments other kind of nanofibers and/or microfibers can be comprised in filtration membranes herein described in the alternative or in addition to a nano fiber and/or microfiber with embedded nanoparticles. In particular in some of those embodiments, another kind of nano-fiber and/or microfiber that can be comprised in a filtration membrane herein described can comprise a scaffold component providing a supporting framework for one or more additional components attached to the scaffold providing functionalities to the scaffold and in particular to a dendrimer component as described in U.S. patent application Ser. No. 13/570,221, published as US20130112618 incorporated by reference in its entirety. The scaffold component and the additional components define features of the nanofiber and microfiber such as a diameter (or radius), a mechanical strength, chemical stability, functionalization and chemical properties which are detectable using techniques and process identifiable by a skilled person. Additional details concerning the nano-fiber and/or microfiber comprising a scaffold component and a dendrimer component are described in U.S. patent application Ser. No. 13/570,221 published as US 21013 0112618 incorporated by reference in its entirety.

In some embodiments the polymeric nanoparticles embedded in the polymeric component of the nanofiber or microfiber and/or presented on the scaffold component of the nano-micro-fiber can comprise reactive sites, and the reactive sites can be positively and/or negatively charged.

In some embodiments, in the filtration membrane, the plurality of nanofibers and/or microfibers can be arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers and/or microfibers are hollow.

In particular, in some embodiments microfiber and/or nanofiber herein described can be comprised as a composite material layer having a mesh structure comprised in the filtration membrane alone or in combination with one or more additional layers.

The term "composite material" as used herein refers to a heterogeneous material made from two or more different materials, the materials having different chemical and/or physical properties and remaining as separate and distinct materials within the composite material. For example, according to embodiments herein described, a composite material can comprise a polymer component and a dendritic nanoparticle which is structurally different from the polymer component and is embedded in the polymer component. The composite material according to some embodiments can comprise a semi-permeable barrier made of overlapping strands of nanofibers.

In particular, the composite material comprising a plurality of nanofibers and/or microfibers can comprise a plurality of a same type of fiber or of two or more different types of fibers. In some embodiments, fibers can be covalently cross-linked to one another. In some embodiments, nanofibers and/or microfibers comprised in the composite material can comprise hollow fibers herein described.

In embodiments herein described, wherein a membrane comprise a mesh, the features of the mesh such as dimension of the pores of the mesh structure, the strength and resistance of the mesh and chemical compatibility of the mesh can be controlled by selection of the diameter of the nanofiber or microfiber, number and configuration of the nanofiber and/or microfiber forming the mesh and the specific polymer component and dendrimer component of each fiber as will be understood by a skilled person upon reading of the present disclosure.

Also described herein is a bicomposite membrane, which comprises a plurality of nanofibers and/or microfibers herein described attached to a polymer matrix formed by a porous polymeric aggregate comprising polymeric nanoparticles. In particular, in some embodiments, the polymeric nanoparticles are embedded in the porous polymer aggregate (e.g., by in situ particle formation as herein described).

In particular, in some embodiments, the nanofibers and/or microfibers in the bicomposite membrane can comprise dendritic nanoparticles embedded (e.g. through in situ particle formation as herein described) in a polymer matrix as described herein. In some embodiments, the nanofibers and microfibers comprising embedded nanoparticles can be hollow. In some embodiments the polymeric nanoparticles embedded in the polymeric component of the nanofiber or microfiber comprises reactive sites, and the reactive sites can be positively and/or negatively charged.

In particular, in some embodiments, the nanofibers and/or microfibers in the bicomposite membrane comprise a scaffold component providing a supporting framework for one or more additional components attached to the scaffold providing functionalities to the scaffold. The scaffold component and the additional components define features of the nanofiber and microfiber such as a diameter (or radius), a mechanical strength, chemical stability, functionalization and chemical properties which are detectable using techniques and process identifiable by a skilled person. The features of nanofibers and microfibers in the sense of the present disclosure which can also be controlled by modifying the chemical composition and structure of the fiber during manufacturing of the fiber according to techniques identifiable by a skilled person upon reading of the present disclosure. In particular, in some embodiments, the scaffold component comprises a polymeric component providing a fiber scaffold and the additional component comprises a dendritic component attached to the polymeric component to present reactive sites on the fiber scaffold (see, e.g., FIG. 63 of related application U.S. Ser. No. 13/754,883 published as US20130213881).

In some embodiments, in the bicomposite membrane, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers and/or microfibers are hollow.

In particular, in some embodiments, the plurality of nanofibers and/or microfibers is directly attached to polymer matrix formed by a porous polymeric aggregate comprising polymeric nanoparticles (e.g. by forming a polymer aggregate comprising polymeric nanoparticles by in situ particle formation as herein described and electrospinning the nanofibers and/or microfibers directly only the polymer aggregate comprising polymeric nanoparticles). In other embodiments, the plurality of nanofibers and/or microfibers is attached to a support layer (e.g. a PET non-woven fabric) and the support layer is further attached to porous polymeric aggregate comprising polymeric nanoparticles (e.g. by casting a membrane comprising porous polymeric aggregate with embedded polymeric nanoparticles on a support layer and then electrospinning the nanofibers and/or microfibers onto the side of support layer opposite to the membrane comprising porous polymeric aggregate with embedded polymeric nanoparticles; see e.g. Examples 1 and 2 and for the casting procedure in in situ methods Examples 2, 20 and FIGS. 59 and 60 of related application U.S. Ser. No. 13/754,883 published as US20130213881)

In some embodiments a filtration membrane comprises a layer of the composite material according to the disclosure in combination with one or more additional layers. The additional layers can include, for example, a support layer and/or a separation layer (see e.g. Examples 22-24 and FIGS. 62 and 63 of related application U.S. Ser. No. 13/754,883 published as US20130213881). In embodiments wherein filtration membrane herein described comprise one or more composite material layers and one or more additional layers, the one or more composite material layers and the additional layers can be comprised in the filtration membrane in various configurations as will be understood by a skilled person upon reading of the present disclosure. For example in some embodiments one or more composite layers can be comprised between two functionalized or unfunctionalized supporting layers. In some embodiments, one or more composite layers can be comprised between a supporting layer and a coating layer. In some of these embodiments a functionalized supporting layer can be further attached to the coating layer. In some embodiments a coating layer can be comprised between one or more composite layers a functionalized supporting layer. Additional configurations can be identified by a skilled person. In particular, selection of a configuration of the membrane can be performed by a skilled person in view of the polymer component and dendrimer component forming the composite material and/or the support layer and/or coating layer and in view of a desired selection of one or more chemicals to be filtered. (see e.g. U.S. patent application Ser. No. 13/570,221 published as US 2013 0112318)

In some embodiments, where the filtration membrane comprises a composites material layer with one or more additional layers, the polymer component and the dendritic component of the one or more composite material layers and/or of the one or more additional layer can be either the same or different. In some of these embodiments, the polymer component can be polysulfone (PS), polyether sulfone (PES), poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), and/or poly(vinyl methyl ketone). In some of these embodiments the dendrimer component can be a highly branched dendritic macromolecule selected from the group consisting of generation-3 poly(amidoamine) (PAMAM) dendrimer, generation-4 poly(amidoamine) (PAMAM) dendrimer, generation-5 poly(amidoamine) (PAMAM) dendrimer, generation-3 poly(propyleneimine) (PPI) dendrimer, generation-4 poly(propyleneimine) (PPI) dendrimer, generation-5 poly(propyleneimine) (PPI) dendrimer, generation-3 poly(bis(methylol)propionic acid) (MPA) dendrimer, generation-4 poly(bis(methylol)propionic acid) (MPA) dendrimer, generation-5 poly(bis(methylol)propionic acid) (MPA) dendrimer, generation-3 poly(ethyleneimine) dendrimer, generation-4 poly(ethyleneimine) dendrimer, generation-5 poly(ethyleneimine) dendrimer, and hyperbranched poly(ethyleneimine), or aggregate nanostructures and/or microstructure thereof.

According to a further embodiment of the disclosure, a filtration system is described. The filtration system comprises a plurality of modules, each module comprising one or more of the filtration membranes for pretreatment of water according to embodiments herein described, charged particle rejection of water, and charged particle absorption of water is described.

The term "module" as used herein refers to a compartment comprising a filtration membrane according to the disclosure, adapted to be used in connection with other modules to perform parallel and/or sequential filtrations.

In particular, in some embodiments, a module herein described can comprise one of the filtration membranes herein described through which water can pass. For example, if the membrane in a module is charged particle rejecting, it can remove charged particles from the water passing through the membrane in the module such that the charged particles are reduced and/or substantially eliminated from water exiting the membrane. As another example, if the membrane in a module is charged particle absorbing, it can absorb charged particles from the water passing through the membrane in the module such that the charged particles are reduced or eliminated from water exiting the membrane.

In particular, in some embodiments, the filtration within the modules can operate by size exclusion and/or Donnan exclusion. The Donnan exclusion can be in operation can when sizes of charged species are much smaller than the pore size of a membrane [32]. For example, a more porous membrane than a general NF membrane can be provided which simultaneously shows rejection for the charged species by enhancing the Donnan exclusion effect.

The Donnan equilibrium, also known as the Gibbs-Donnan effect, Donnan effect, or Gibbs-Donnan equilibrium, refers the behavior or distribution of charged particles through the both sides of a semi-permeable membrane when they are not distributed evenly across the membrane due to the presence of a charged substances at one side of the membrane. These charged substances are unable to pass through the membrane and thus generate an electrical potential. For membranes with fixed positive or negative charges, the Donnan Effect refers to the repulsion of co-ions, (anions or cations that have the same charges as the fixed charges of the membranes).

At an initial stage, the numbers of ions in both sides can be represented as (see e.g. FIG. 40 of related application U.S. Ser. No. 13/754,883 published as US20130213881): left side: $[Na^+]=6$, $[Cl^-]=6$ and right side: $[Na^+]=6$ Since, the electrochemical potentials of both sides are different, $Cl^-$ at the left side can start to move through the right side. Due to the movement of anions, electrical potential is generated between each side separated by the membrane. The left side will be positively charged and the right side will be negatively charged. And the cation will also move through the membrane due to the electrical potential until this system will reach at electrochemical equilibrium.

At equilibrium, the numbers of ions in both sides can be represented as (FIG. 41 of related application U.S. Ser. No. 13/754,883 published as US20130213881), left side: $[Na^+]=4$, $[Cl^-]=4$ and right side: $[Na^+]=8$, $[Cl^-]=2$ In summary, net ion transport across the membrane is 2 pairs of NaCl among 6 pairs.

In this example, chloride anions are selectively rejected

Initial condition (e.g. FIG. 42 of related application U.S. Ser. No. 13/754,883 published as US20130213881) Left side: $[Na^+]_2=c_2$, $[Cl^-]_2=c_2$Right side: $[Na^+]_1=c_1$, $[P^-]=c_1$ ($P^-$: Big anions which cannot penetrate the membrane)

At equilibrium (e.g. FIG. 43 of related application U.S. Ser. No. 13/754,883 published as US20130213881) Left side: $[Na^+]_2=c_2-x$, $[Cl^-]_2=c_2$—xRight side: $[Na^+]_1=c_1+x$, $[P^-]=c_1$, $[Cl^-]=x$ At equilibrium; $\Delta G=\Delta G_{Na^+}\Delta G_{Cl^-}=0$ where $$\Delta G_{Na^+} = RT\ln\frac{[Na^+]_2}{[Na^+]_1},\ \Delta G_{Cl^-} = RT\ln\frac{[Cl^-]_2}{[Cl^-]} \text{ and}$$

$$\Delta G = RT\ln\frac{[Na^+]_2}{[Na^+]_1} + RT\ln\frac{[Cl^-]_2}{[Cl^-]} = 0$$

$$RT\ln\frac{[Na^+]_2[Cl^-]_2}{[Na^+]_1[Cl^-]} = 0$$

$$\frac{[Na^+]_2[Cl^-]_2}{[Na^+]_1[Cl^-]} = 1$$

with constants and variables, $$\frac{(c_2 - x)^2}{(c_1 + x)x} = 1$$

and solving this equation for x, $$x = \frac{c_2^2}{c_1 + 2c_2}$$

is obtained.

Therefore by increasing $c_1$, in embodiments herein described, the amount of x (anions which penetrate the membrane) can be decreased.

In embodiments, when a charged membrane is used to separate ionic species in solution, Donnan effects can dominate or contribute to the separation mechanism of ions. This effect indicates a distribution of ionic species between the solution and the charged membrane. For example, if a negatively charged membrane is used, the co-ions (anions) can be affected by repelling electro-static force. Consequently, a distribution of ionic species in membrane and solution can be changed.

For example, assuming that a negatively charged membrane is in contact with a sodium chloride solution, at equilibrium, the chemical potentials of ions at the interface (solution/membrane) can be considered to be the same.

$$\mu_i=\mu_i^m$$

The electrochemical potential (Ψ) of an ion in solution can be described by:

$$\Psi_i=\mu_i^0+RT\ln a_i+z_iFE$$

wherein $\mu_i^0$ represents reference state, R represents the gas constant, T represents temperature, $a_i$ represents activity of ion I, z represents valence of the ion, F represents the faraday constant, and E represents the measured potential.

The electrochemical potential of an ion in the membrane can be described by:

$$\Psi_i^m = \mu_i^{m,0} + RT\ln a_j^m + zFE^m.$$

Since the concentration of the ions in solution and membrane can be different, there can be an electrical potential at the interface which is called Donnan potential ($E_{don}$) which can be described by:

$$E_{don} = E^m - E = \frac{RT}{z_1 F}\ln\frac{a_1}{a_1^m}.$$

Assuming that the chemical potential of the reference state is same in both phases:

$$\mu_i^0 = \mu_i^{m,0}$$

and assuming that the solution is a diluted solution ($a_i \cong c_i$) then the following can be obtained:

$$c_{Na^+} \times c_{Cl^-} = c_{Na^+}{}^m \times c_{Cl^-}{}^m$$

For electro-neutrality conditions, $$\Sigma z_i c_i = 0$$

Electro-neutrality equation for both solution and membrane phase are, $$c_{Na^+} = c_{Cl^-}$$

and $$c_{Na^+}{}^m = c_{Cl^-}{}^m + c_{X^-}{}^m$$

It can thus be obtained that $$c_{Cl^-}{}^m \times c_{X^-}{}^m + (c_{Cl^-}{}^m)^2 = (c_{Cl^-})^2$$

or $$\frac{c_{Cl^-}}{c_{Cl^-}^m} = \sqrt{\frac{c_{X^-}^m}{c_{Cl^-}^m} + 1}$$

where X represents membrane charge.

The above equation can be rewritten As:

$$\text{*1-1 salt: } \frac{c_{Cl^-}^m}{c_{Cl^-}} = \frac{c_{Cl^-}}{(c_{Cl^-}^m + c_{X^-}^m)}.$$

A similar equation can be derived for a 2-1 salt and a 1-2 salt using the same method to give $$\text{*2-1 salt: } \frac{c_{Cl^-}^m}{c_{Cl^-}} = \left(\frac{2c_{Cl^-}}{(2c_{Cl^-}^m + c_{X^-}^m)}\right)^2 \text{ -> } MgCl_2 \text{ and}$$

$$\text{*1-2 salt: } \frac{c_{SO_4^{2-}}^m}{c_{SO_4^{2-}}} = \sqrt{\frac{c_{SO_4^{2-}}}{c_{SO_4^{2-}}^m + c_{X^-}^m}} \text{ -> } Na_2SO_4,$$

respectively.

In some embodiments, the filtration within a module can operate by ultrafiltration (UF) and microfiltration (MF). UF and MF membranes can have large pore size (e.g., 5-100 nm) allowing them to operate pressures between approximately 0.3-5.0 bar). UF and MF can be suitable in embodiments where it desired to generate less membrane concentrates, for example compared to an RO filtration. UF and MF are particularly suitable for a pretreatment process to remove particles from saline water in the desalination of brackish water and seawater.

In some embodiments, the filtration system can be configured to have three units: a first unit comprising a module, the module comprising a nanofiltration membrane to remove, for example, particles and dissolved organic matter; a second unit comprising a series of alternating positive and negative charged particle rejecting modules, for example, to remove a majority of the charged particles; and a third unit comprising a parallel series of modules capable of absorbing charged particles of interest.

Also provided herein, a filtration method comprising, passing water to be filtered through one or more modules comprising conventional nanofiltration membranes to remove particles and dissolved organic matter, passing the water through a series of alternating positive and negative charged particle rejecting modules comprising the membranes herein described to remove a majority of the charged particles, and passing the water through a parallel series of modules capable of absorbing charged particles of interest is described.

In some embodiments, the membrane filtration system for the desalination of brackish water and seawater comprises: an ion-rejection filtration stage, wherein saline water passes through a series of alternating cation/anion selective tight UF membranes designed to reject 70-90% of dissolved ions; and an ion-absorption filtration stage, wherein the product water from the ion-rejection filtration system is split into two streams that pass through a series of ion-absorbing MF membranes designed to selectively bind target anions/cations of interest.

In some embodiments, filtration membranes can be used for microalgae filtration and recovery, and in particular in microalgae Recovery by Ultrafiltration. For example. preliminary filtration experiments show that a mixed matrix PVDF membrane containing 47 wt % of PEGylated PEI particles has an algae retention of 100% with an average permeate flux of 87 $L/m_2$/hr using a suspension of *Chlorella* sp. KR-1 microalgae with 1.2-1.4 g/L of dry biomass. The microalgae permeate flux of this mixed matrix PVDF membrane can be larger by approximately 30% than that of a commercial and surface-coated hydrophilic PVDF membrane with a molecular weight cut-off of 30 kDa. Exemplary mixed matrix PVDF membrane also exhibits a flux recovery rate of 98% following microalgae filtration and a simulated membrane wash with deionized water (see Examples section).

In some embodiments a mixed matrix PVDF ultrafiltration (UF) membrane can be provided with (i) average pore diameters of 16-24 nm, (ii) high loadings of PEGylated PEI particles [35-57 wt %] and (iii) uniform distributions of particles with average diameters ranging from 600 nm to 3.6 m, which can serve as fouling resistant UF membranes for microalgae recovery from culture media of relevance to biofuel production.

In some embodiments, in particular when one or more functionalizing polymer are hydrophilic membranes according to the disclosure can be fouling resistant and high flux membranes with respect to known conventional membrane. Mixed matrix membranes (MMMs) with embedded functional nanomaterials/particles can carry out multiple functions (e.g. retention, sorption, catalysis and charge transport) with improved properties and performance including higher permselectivity and flux, greater mechanical strength and lower fouling propensity in water filtration applications and in particular in application where harvesting of microalgae and possibly subsequent downstream processing into a useful product (e.g. biofuel) is desired.

In some embodiments, the filtration membranes and related compositions methods and systems herein described can be provided without the addition of the functionalizing polymers to provide a polymer matrix formed by a porous polymeric aggregate of the base polymer in which polymeric microparticles and/or nanoparticles are embedded. In particular in embodiments where the polymeric network formed by the functionalizing polymers are absent can include microparticles and/or nanoparticles formed in situ and/or ex situ as described in U.S. patent application Ser. No. 13/570,221 published as US 2013 0112318 incorporated herein by reference in its entirety.

Further advantages and characteristics of the present disclosure will become more apparent hereinafter from the following detailed disclosure by way or illustration only with reference to an experimental section.

EXAMPLES

The polymeric membranes with embedded polymeric micro/nanoparticles and polymeric network and related methods and systems herein described are further illustrated in the following examples, which are provided by way of illustration and are not intended to be limiting.

In particular, the following examples illustrate exemplary polymeric membranes with embedded polymeric micro/nanoparticles and related methods and systems. A person skilled in the art will appreciate the applicability and the necessary modifications to adapt the features described in detail in the present section, to additional polymeric membranes with embedded polymeric micro/nanoparticles and related methods and systems according to embodiments of the present disclosure.

Example 1: General Method for Formation and Optimization of Filtration Membranes with Embedded Micro/Nanoparticles Formed In Situ Described below is a general method for formation and optimization of filtration membranes with embedded micro/nanoparticles formed in situ. In particular, the method comprises membrane preparation, membrane characterization, and membrane performance evaluation.

In the membrane preparation, a desired polymer to form the polymer matrix and a desired polymer to form the polymeric micro/nanoparticles (in particular a hyperbranched polymer) are selected based on compatibility of the two polymers. In particular, the compatibility can be determined from parameters known in the art such as, for example, similar solubility parameters [6] [8] [1] or ability to form hydrogen bonds (e.g., between the amine groups of a dendritic polymer such as PEI and the fluoride atoms of a linear polymer such as PVDF or between the carboxylic acid groups of a dendritic polymer such as MPA and the oxygen atoms of a linear polymer such as PES). The desired polymer to form the polymer matrix and a desired polymer to form the polymeric micro/nanoparticles can be dissolved in a suitable solvent or mixture of solvents (e.g. dimethylformamide (DMF), dimethylacetamide (DMA), triethylphosphate (TEP), and/or N-methylpyrrolidinone (NMP)) based on similar parameters known to a skilled person [6] [8] [1] (e.g. similar solubility parameters). The blending of desired polymer to form the polymer matrix and a desired polymer to form the polymeric micro/nanoparticles can be performed for a time and at a temperature to permit a homogenous blend. The time and temperature can be determined by measuring the cloudiness or viscosity of the blend and increasing or decreasing the time and temperature to provide a blend with suitable properties as would be known to a skilled person. Once a suitable blend is obtained, a desired cross-linker can be added to the blend to provide a dope with in situ generated micro/nanoparticles. The cross-linker can be selected based on the functional groups on the polymer to form the polymeric micro/nanoparticles (in particular a hyperbranched polymer) as would be apparent to a skilled person. For example, if the dendritic polymer has amine groups, the cross-linker can be an epoxide such as epichlorohydrin or a dihaloalkane such as 1,3-dibromopropane.

In related application U.S. Ser. No. 13/754,883 published as US20130213881, the membranes were embedded with engineered PEI particles cross-linked with ECH at a fixed degree of cross-linking 39.7%.

The initial amount of desired polymer to form the polymer matrix can be between 10 and 25 wt % of the blend and the initial combined amount of polymer to form the polymeric micro/nanoparticles (in particular a hyperbranched polymer) and amount of cross-linker can be between 5 and 60 wt %. The initial amounts and can be adjusted upon evaluation of the properties of the dope solution produced with the in situ generated particles as would be apparent to a skilled person. For example if the dope solution is too viscous to cast a membrane, the amount of cross linker can be decreased. Additionally, the sizes and distribution of the particles in the blend can be evaluated through techniques such as light scattering. The initial amounts can also be altered after performing the membrane characterization and membrane performance evaluation described herein until a membrane with suitable properties is produced. In particular, several membranes with different amounts of desired polymer to form the polymer matrix, desired polymer to form the polymeric micro/nanoparticles, and cross linker can be produced for evaluation and comparison. In addition to membranes with embedded nanoparticles being produced, control membranes comprising only desired polymer to form the polymer matrix and desired polymer to form the polymeric micro/nanoparticles (without cross-linker) can be produced to be compared with membranes produced with embedded micro/nanoparticles.

After blends with embedded micro/nanoparticles having properties suitable for casting of membranes as would be identifiable to a skilled person, the micro/nanoparticles can be functionalized either before or after the casting of the membrane to provide micro/nanoparticles with desired functionality (see, e.g., Examples 15 and 16 of related application U.S. Ser. No. 13/754,883 published as US20130213881).

In membrane characterization, the morphological and chemical properties of the membranes and embedded micro/nanoparticles are measured. In particular, the membranes can be analyzed by SEM to confirm the formation and homogeneous distribution of discrete particles (see e.g. Example section). The amounts of desired polymer to form the polymer matrix, desired polymer to form the polymeric micro/nanoparticles, and cross linker initially chosen can be adjusted by increasing or decreasing their amounts until desired morphological properties are obtained. In addition, the sizes of the micro/nanoparticles can be determined by AFM and the amounts of desired polymer to form the polymer matrix, desired polymer to form the polymeric micro/nanoparticles, and cross linker initially chosen can be adjusted by increasing or decreasing their amounts until micro/nanoparticles of desired sizes as would be recognized by a skilled person are obtained.

In addition, spectroscopic characterization (e.g. infrared spectroscopy or x-ray photoelectron spectroscopy) can be performed to evaluate the presence of desired functional groups on the embedded micro/nanoparticles and x-ray and neutron scattering experiments can be performed to evaluate the size and distribution of the micro/nanoparticles. In addition, contact angle measurements can be performed to assess the hydrophilicity and wettability of the membrane and the amounts of desired polymer to form the polymer matrix, desired polymer to form the polymeric micro/nanoparticles, and cross linker adjusted to provide desired levels of hydrophilicity and wettability as would be identifiable to a skilled person.

In membrane performance evaluation, the desired properties of the membranes, as determined by the functional groups on the dendritic micro/nanoparticles, as well as general properties (e.g. flux) are measured. For example, if the micro/nanoparticles are chosen to reject proteins (e.g. BSA), a test membrane can be used to reject BSA in a solution and its flux measured during the BSA rejection and after a cleaning (see, e.g., Example 2 and FIG. 17 of related application U.S. Ser. No. 13/754,883 published as US20130213881) and the amounts of desired polymer to form the polymer matrix, desired polymer to form the polymeric micro/nanoparticles, and cross linker adjusted until membranes with desirable flux and rejection properties, as identifiable to a skilled person, are obtained.

In particular, several membranes with different amounts of polymer that will form the polymeric micro/nanoparticles can be made as described herein. Exemplary concentrations and related proportions are summarized in the following Table 5

TABLE 5

| Component | Weight (g) | Weight, % |
|---|---|---|
| I. PVDF dope solution recipe | | |
| PVDF | 5.25 | 12.42 |
| TEP | 29.75 | 70.36 |
| Total | 35.0 | |
| II. In situ cross-linking recipe | | |
| PEI | 2.28 | 5.39 |
| ECH | 1.50 | 3.55 |
| TEP | 3.5 | 8.28 |
| Total | 42.28 | 100 |

HC1: 0.1 g (4.2% w/w on PEI) is excluded from the recipe

In related application U.S. Ser. No. 13/754,883 published as US 2013 0213881, the membranes were embedded with engineered PEI particles cross-linked with ECH at a fixed degree of cross-linking 39.7%.

Accordingly, engineered polymer particle embedded composite membranes can be synthesized by in situ in presence of a membrane dope solution. By this methodology, composite PVDF membranes with high concentrations of positively charged PEI particles can be made.

For example, exemplary the membranes NSM-1, NSM-2 and NSM-3 of related application U.S. Ser. No. 13/754,883 published as US20130213881 have been produced with amounts compositions and reagents shown in Table 6.

TABLE 6

| Composition | NSM-1 | NSM-2 | NSM-3 | PVDF-1 (B lend) | PVDF-2 (Neat) |
|---|---|---|---|---|---|
| On total dope solution (w/w), % | | | | | |
| PVDF | 13.45 | 12.42 | 11.43 | 12.42 | 15 |
| HPEI + ECH | 5.79 | 8.94 | 12.35 | 8.94 | — |
| TEP | 80.76 | 78.64 | 76.22 | 78.64 | 85 |
| Final membrane composition (w/w), % | | | | | |
| PVDF | 69.9 | 58.14 | 48.1 | 58.14 | 100 |
| PEI | 30.1 | 41.86 | 51.9 | 41.86 | — |

Further, these membranes were prepared with and without support layer by simple and commercial feasible phase inversion casting method. The membranes with support layer can be used for membrane distillation experiments to test their multi functionality.

The membranes so obtained can be characterized and evaluated (e.g. morphology, chemistry, particle size, particle concentration, ion-rejecting ability and other characteristics described herein and apparent to a skilled person). Then membranes with amounts of polymer that will form the polymeric micro/nanoparticles different than the initial amounts can be made to produce membranes with optimized features (e.g. particle concentration, pore size, ion-rejecting ability and others described herein and apparent to a skilled person).

The particle concentration can be achieved as high as about 50% on the basis of final membrane composition as described for example in related application U.S. Ser. No. 13/754,883 published as US20130213881.

The other challenges associated with particles dispersion in membrane matrix can also be addressed by this methodology. These membrane morphologies as seen in the SEM images were found to be unique and confirm the dispersion of PEI particles throughout the membrane matrix as for example described in related application U.S. Ser. No. 13/754,883 published as US20130213881. It is worth noting the improved hydrophilicity of composite PVDF membranes endowed by in situ generated PEI particles with respect to the related PVDF control as described related application U.S. Ser. No. 13/754,883 published as US20130213881. Therefore, particles generation by in situ can provide a way to prepare polymeric composite membranes, while the surface enrichment of hydrophilicity can be controlled by micro-phase separation of particles. Membrane characteristics like permeability, selectivity and fouling resistance can be optimized according to methods described in the present disclosure and in related application U.S. Ser. No. 13/754,883 published as US20130213881 to ascertain their applications in water treatment, catalysis and separations. Moreover, optimization of particle concentration and expanding this methodology to acrylic based negative charge particles can also be accomplished by using the methods described herein.

Example 2: Method for Forming a Mixed Matrix Membrane with Polymeric Particle Network In Situ An exemplary procedure for providing a mixed matrix membrane with polymeric particle network in situ comprises the following steps.

1) Preparation of a base polymer solution by dissolving the target amount of polymer in a suitable and good/compatible solvent. A variety of linear polymers can be used as building blocks for the matrices of membranes with in-situ generated polymeric particles and networks including (i) polyvinylidene fluoride (PVDF), (ii) polyethersulfone (PES), (iii) polysulfone (PSf), (iv) polyacrylonitrile (PAN) and polyamides (PAM). Potential good solvents for these polymers include (i) n-methyl-2-pyrrolidone (NMP), (ii) dimethyl formamide (DMF), (iii) dimethyl acetamide (DMAc), (iv) triethyl phosphate (TEP) and (v) dimethyl sulfoxide (DMSO). The smaller the difference between the solubility parameters of a polymer and a solvent, the more compatible they are.

2) Addition and dispersion of a particle precursor in the base polymer solution. Two requirements for a particle precursor are: (i) solubility in a solvent (or mixture of solvents) compatible with that used to dissolve the base polymer and (ii) ability to form dispersed/segregated domains (e.g. micelles) in the base polymer solution. Potential membrane particle precursors include: (i) functional monomers/polymers, (ii) branched polymers/dendrimers and (iii) block copolymers. Preferred particle precursors include (i) aliphatic amines, (ii) aromatic amines, (iii) anhydrides, (iv) polyamines (linear, branched and dendritic) and (v) epoxides and other compounds hydroxyl groups. It is worth mentioning that the sizes of the segregated domains of precursor particles often control the sizes of the in-situ synthesized particles. They can range from 10-100 nm to 2-4 μm and depend on several factors including the (i) chemistry and molecular weight of the particle precursor, (ii) intensity and duration of mixing (e.g. sonication versus slow stirring) and (ii) the addition of a dispersion stabilizer (e.g. surfactant). For example, a mixture of (i) base polymer+solvent, (ii) monomer/oligomer [molecular weight ($M_n$) of 100-1000] and (iii) surfactant (e.g. sodium dodecyl sulfate) might need to be sonicated to prepare a membrane casting solution containing segregated domains of particle precursors of 10-100 nm in sizes. In contrast, only the slow stirring of a mixture of base polymer+solvent and (ii) monomer/polymer [Molecular weight ($M_n$) of 300-100000] might be required to prepare a membrane dope containing segregated domains of particle precursors of sizes ranging from 0.5 to 4 m.

3) Addition of a crosslinker/monomer and initiator to synthesize the polymeric particles in the membrane casting solutions (i.e. base polymer+solvent+precursor particle+crosslinker/initiator). Potential crosslinkers include diacrylates, dimethacrylates, diepoxides, dihalides, diisocyanates, diacyl chlorides, dianhydrides. Preferred crosslinkers include diepoxides, dihalides, diacyl chlorides and dianhydrides with small molecular weights (Mn of 90-300). Prefer monomers include epoxides, acrylics, amines, acid chlorides and others that can be used to prepare polymeric particles in the dope solutions 4) Addition of a polymer network precursor into the dispersion of base polymer+solvent+in-situ synthesized particles. Potential polymer network precursors include acrylates, epoxides, isocyanates, acyl chlorides and anhydrides. Preferred polymer network include diepoxides, diacrylates and diacyl chlorides and others that be can be polymerized in the membrane dope solutions to prepare polymer networks that are linked to the larger molecular weights (e.g. $M_n$ of 1000-1000,000+).

5) Membrane preparation by phase inversion casting by mixing the dispersion prepared in step 4 with a non-solvent. Note that the membrane can be casted onto a glass plate and peeled off to form a self-supporting membrane. Alternatively, the membrane can be casted onto a microporous [e.g. polyethylene terephthalate (PET)] support.

Example 3: Method for Forming a Mixed Matrix Membrane with Polymeric Particle Network In Situ A mixed matrix membrane according to the disclosure was provided in situ using the following materials and methods in accordance with the reaction scheme and graphical process protocol depicted in FIGS. 3A-C.

Materials. Polyvinylidene fluoride (PVDF) (Kynar 761, Arkema Inc.) was provided by Arkema (King of Prussia, Pa., USA), Branched polyethyleneimine (PEI) (Epomin SP-003 of molar mass ($M_n$) of 300 Da $M_n$: 300) was purchased from Nippon Shokubai, Epichlorohydrin (ECH, was purchased from Aldrich), Triethyl phosphate (TEP, was purchased from Daejung Chemicals, Korea), Poly(ethylene glycol) diglycidyl ether (PEGDE) ($M_n$ 2000 Da; was purchased from Aldrich), and Hydrochloric acid (HCl, 35 wt %, was purchased from Daejung Chemicals, Korea) All chemicals and materials were utilized as received. All aqueous solutions were prepared using Milli-Q deionized water (DIW) with a resistivity of 18.2MΩcm and total organic content<5 ppb.

Membrane Preparation:

The membrane preparation procedures were adapted from Kotte et al. [33].

Casting Solutions—PVDF Solution in TEP.

Figure 3A:
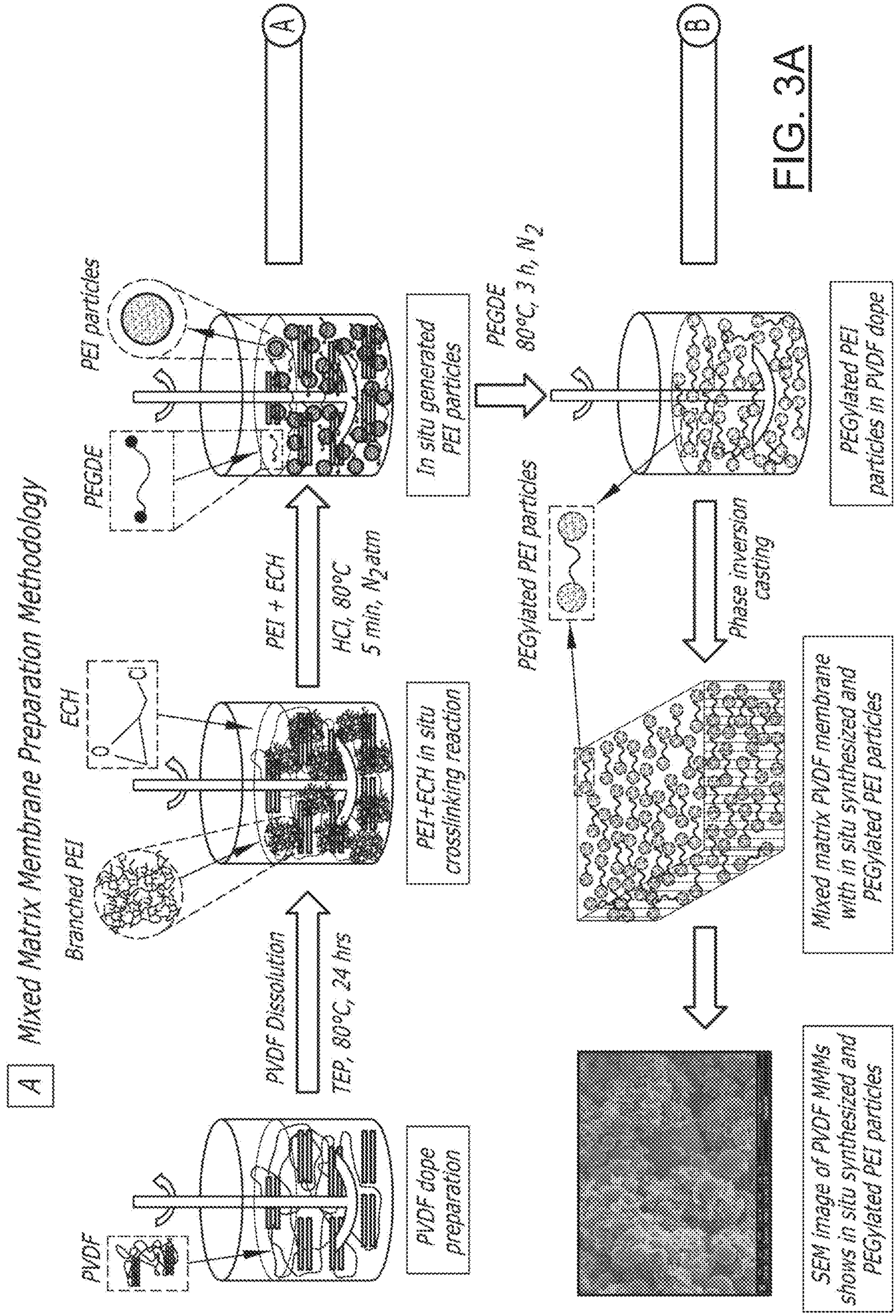
FIGS. 3A-C show a schematic illustration of the preparation of a mixed matrix membrane by in situ functionalization with PEGDE polymeric network according to embodiments herein described.

A typical membrane casting solution was prepared by mixing 15 g of PVDF with 85 g of TEP in a three neck round-bottom flask equipped with a condenser and an overhead stirrer. A homogeneous PVDF dope solution was obtained after mixing for 24 hours at 80° C. (FIG. 3A "PVDF Dope Preparation" illustration). The concentration of PVDF in TEP varies between 8 and 25% w/w.

In Situ Synthesis of PEI Particles.

In a typical experiment, the required amount of PEI dissolved in TEP was added to a PVDF casting solution at 80° C. After mixing for 10 minutes, a catalytic amount of HCl (35 mg) was added to the casting solution of PEI+PVDF+TEP. Following 15 minutes of mixing, the required quantity of ECH was added to the casting solution to initiate crosslinking reaction with PEI (FIG. 3A "PEI ECH in situ crosslinking reactions" illustration). The concentration of PEI with respect to PVDF varies between 15 and 40% w/w In Situ PEGylation of PEI Particles.

After 5 minutes of crosslinking reaction, the required amount of PEGDE was added to each casting solution to initiate the PEGylation of the crosslinked PEI particles. The PEGylation and curing reactions were continued for 3 h at 80° C. under a nitrogen ($N_2$) atmosphere (FIG. 3A "In situ generated PEI particles" and "PEGylated PEI particles in PVDF Dope" illustration and FIGS. 3B-C schematic illustrations of reaction schemes for in situ generated PEGylated PEI particles in PVDF dope solution). The possible variation in addition sequence is that addition of PEI followed by PEGDE and finally ECH to get intra crosslinked PEG loops with PEI particles.

Membrane Casting.

The membranes were prepared with and without a polyethylene terephthalate (PET) microporous support. To prepare a membrane without support, a hot casting solution with in situ synthesized and PEGylated PEI particles was poured onto a clean glass plate. A casting knife (BYK Chemie) [with 300 μm air gap] was used to uniformly coat the casting solution onto the glass plate. The nascent membrane was kept for 30 seconds at ambient temperature (25±1° C., RH: 55%) followed by immersion into a DIW bath with a temperature of 23±1° C. After 1 hr, the nascent membrane was transferred to a fresh DIW bath and immersed for 24 h. Following this, the membrane was soaked in ethanol for 10 h. Finally, the membrane was air dried and stored in a desiccator. (FIG. 3A "Mixed Matrix PVDF Membrane Embedded with In situ generated PEGylated PEI Particles" and "SEM image of PVDF MMMs shows in situ generated PEGylated PEI particles" illustration).

A similar procedure was used to prepare a membrane with PET support by pouring the casting solution onto the support instead of the glass plate. For all characterizations only the membranes without support layer were utilized. The membranes with support layer were utilized for membrane filtration experiments. In particular, in the case of hollow fibers membrane configuration the membranes can be utilized without PET support with no difference in casting process and dope preparation. In a. flat sheet membrane PET support is used for membrane filtration applications.

The amount of amine (PEI), crosslinker (ECH) and PEGylating reagent (PEGDE) in the PVDF membrane casting solutions before the in situ synthesis of PEGylated PEI particles is reported in Table 7

TABLE 7

| Membrane | PPNM-1 | PPNM-2 | PPNM-3 |
|---|---|---|---|
| [a]A. Amine (mmol) | | | |
| Total | 28.56 | 47.88 | 71.82 |
| Primary | 12.85 | 21.55 | 32.32 |
| Secondary | 10.00 | 16.76 | 25.14 |
| Tertiary | 5.71 | 9.57 | 14.36 |
| B. Crosslinker (mmol) | | | |
| [b]ECH | 9.70 | 16.21 | 24.32 |
| C. PEGylating reagent (mmol) | | | |
| [c]PEGDE | 0.45 | 0.75 | 1.12 |

[a]The total amine content of the PEI base polymer [Epomin SP-003 with molar mass (Mn) of 300 Da] is equal to 21.00 mmol/g of solid. The primary, secondary and tertiary amine contents of Epomin SP-003 are, respectively, equal to 45%, 35% and 20%. Available online at the website farbeundlack.de/img/navigator/lack/NipponShokubai MM DOC Epomin.pdf
[b]ECH: Epichlorohydrin
PEGDE: Poly (ethylene glycol) diglycidyl ether (PEGDE) [$M_n$ of 2000 Da]

Example 4: Mixed Matrix Membrane with Polymeric Particle Network In Situ

The three different mixed matrix membrane with polymeric particle network in situ were obtained with the method of Example 3 was analyzed.

In particular, the exemplary composition for composite membranes PPNM-1, PPNM-2, and PPNM-3 is shown in Table 8 which reports compositions of the casting solutions, control (neat) PVDF membrane and mixed matrix PVDF membranes with in situ synthesized and PEGylated PEI particles

TABLE 8

| Membrane | PPNM-1 M (g) | PPNM-1 wt (%) | PPNM-2 M (g) | PPNM-2 wt (%) | PPNM-3 M (g) | PPNM-3 wt (%) | PVDF (Neat) M (g) | PVDF (Neat) wt (%) |
|---|---|---|---|---|---|---|---|---|
| A. Compositions of Membrane Casting Solutions | | | | | | | | |
| PVDF[a)] | 5.25 | 13.07 | 5.25 | 11.99 | 5.25 | 10.90 | 5.25 | 15.0 |
| PEI[b)] + ECH[c)] + PEGDE[d)] | 3.16 | 7.87 | 5.28 | 12.07 | 7.92 | 16.44 | — | — |
| TEP[e)] | 31.75 | 79.06 | 33.25 | 75.94 | 35 | 72.66 | 29.75 | 85.0 |
| B. Estimated Membrane Compositions (Dry mass wt %) | | | | | | | | |
| PVDF | 5.25 | 65.14 | 5.25 | 52.78 | 5.25 | 42.70 | 5.25 | 100 |
| PEGylated PEI particles | 2.81 | 34.86 | 4.696 | 47.22 | 7.044 | 57.30 | — | — |
| C. Estimated degree of crosslinking of PEI particles based on ECH concentration (Dry mass wt %) | | | | | | | | |
| ECH | 0.9 | 39.8 | 1.5 | 39.7 | 2.25 | 39.7 | — | — |
| PEI | 1.36 | 60.2 | 2.28 | 60.3 | 3.42 | 60.3 | — | — |

HCl: 35 mg is also added to each membrane casting solution as a catalyst
[a)]PVDF: Polyvinylidene fluoride;
[b)]PEI: Branched polyethyleneimine;
[c)]ECH: Epichlorohydrin;
[d)]PEGDE: Poly(ethylene glycol) diglycidyl ether;
[e)]TEP: Triethyl phosphate In the membranes of Table 8, all ECH crosslinker molecules were incorporated into the PEI particles by reaction of their epoxy and chloro groups with the primary/secondary amino groups of the segregated PEI molecules in the dope solutions (FIGS. 3B-C).

Figure 3B:
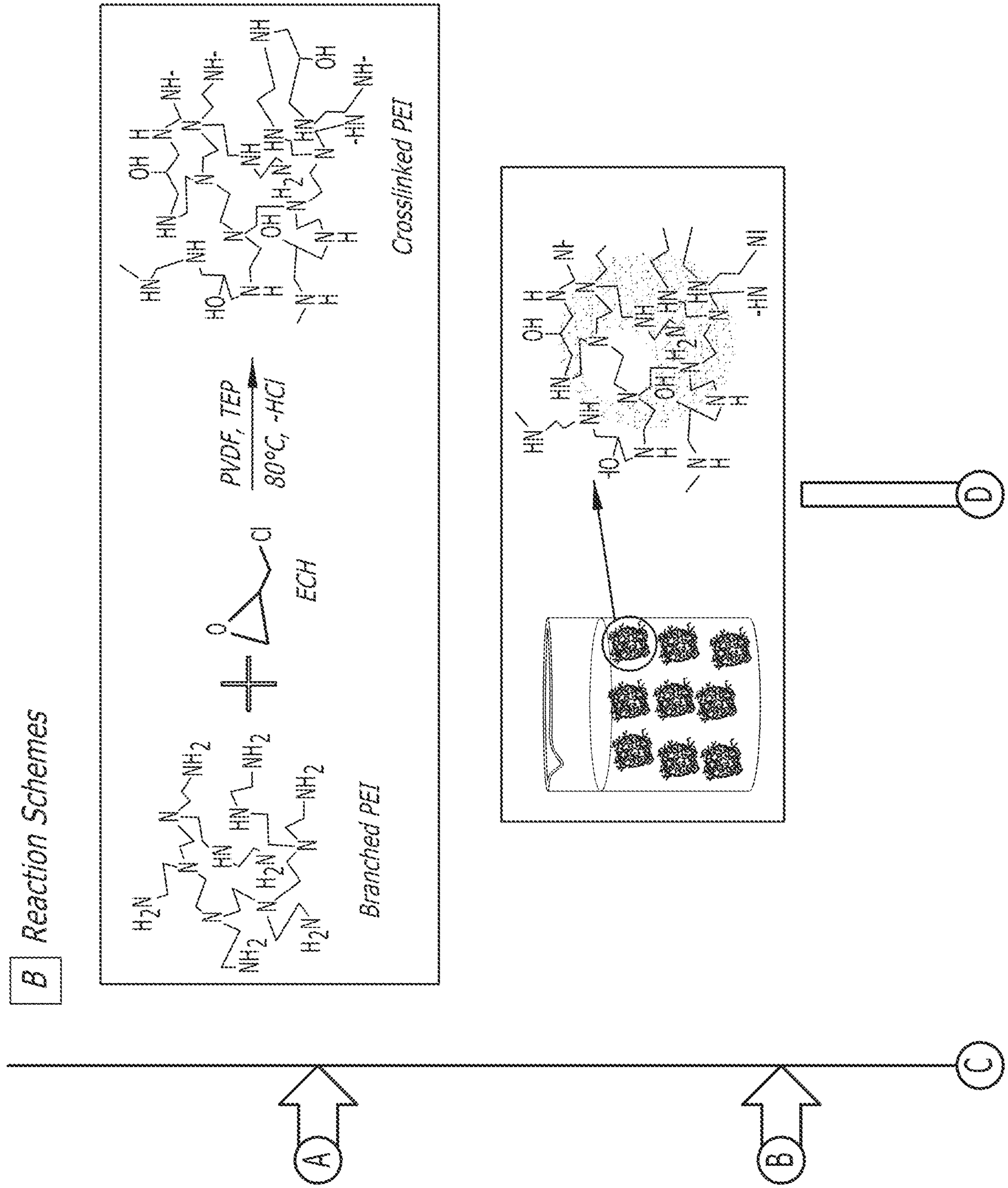
Figure 3C:
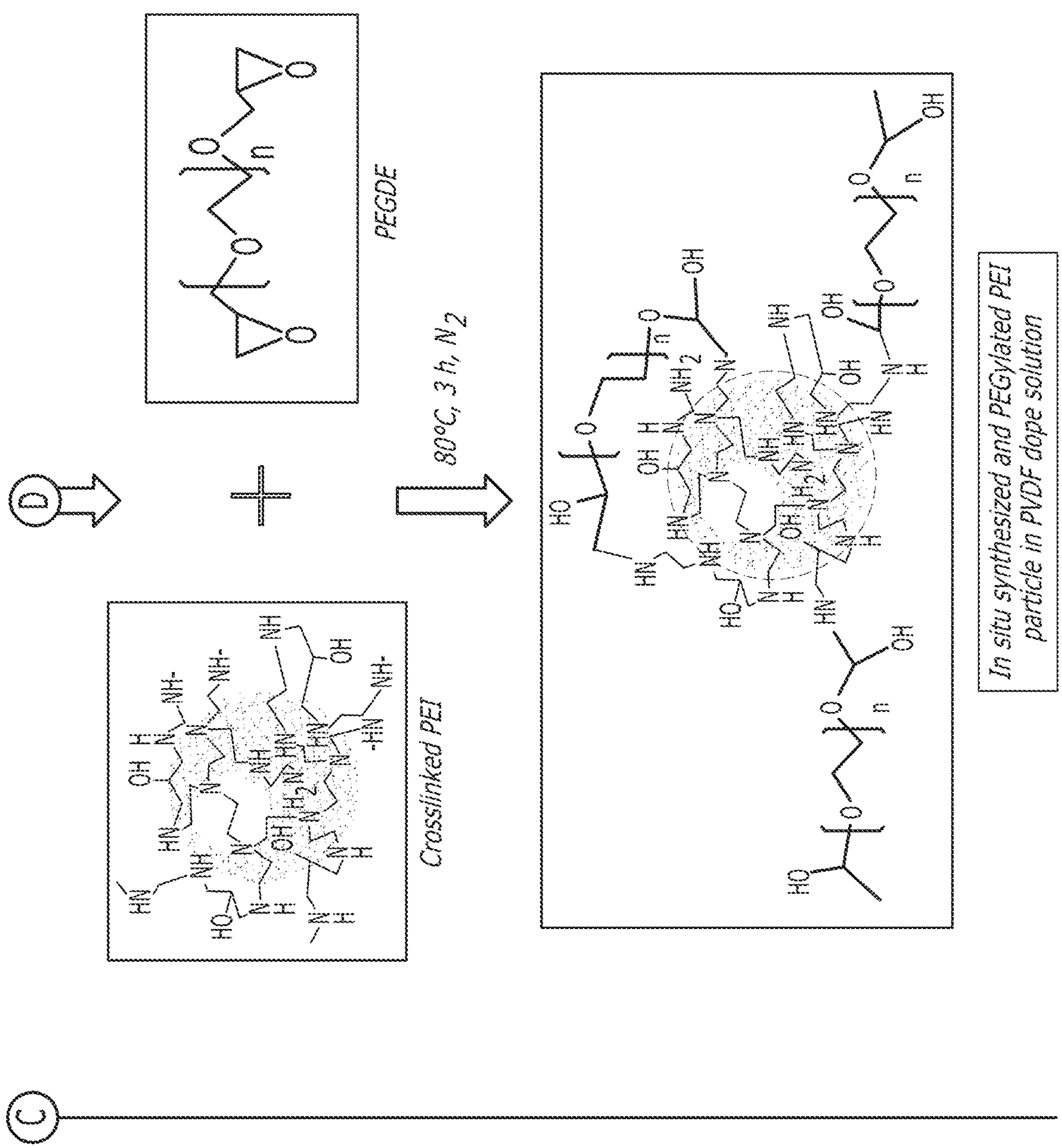
Figure 4A:
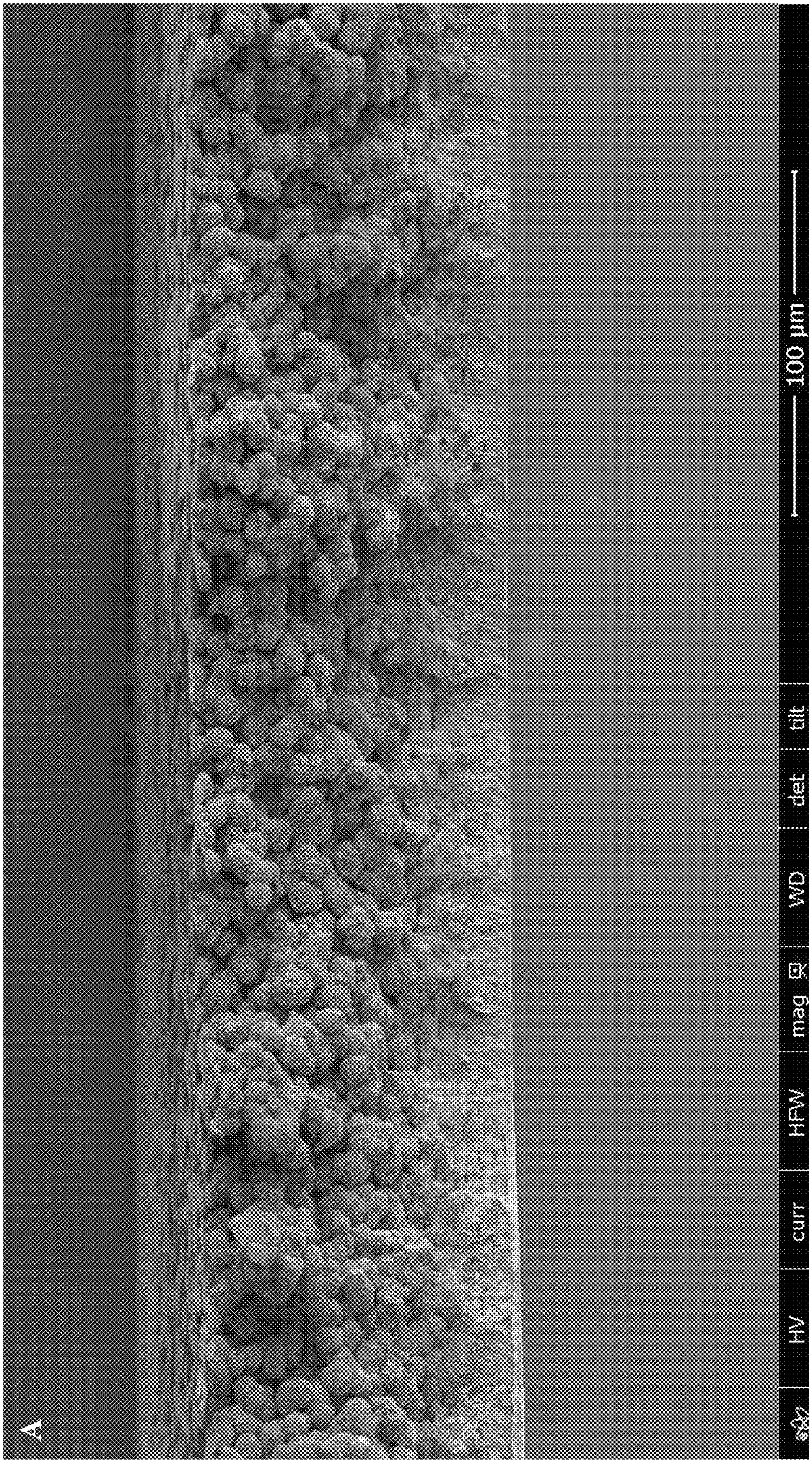
FIGS. 4A-H show representative FESEM images showing cross section morphology of control PVDF membrane and mixed matrix PVDF membranes with in situ synthesized and PEGylated PEI particles.
Figure 4B:
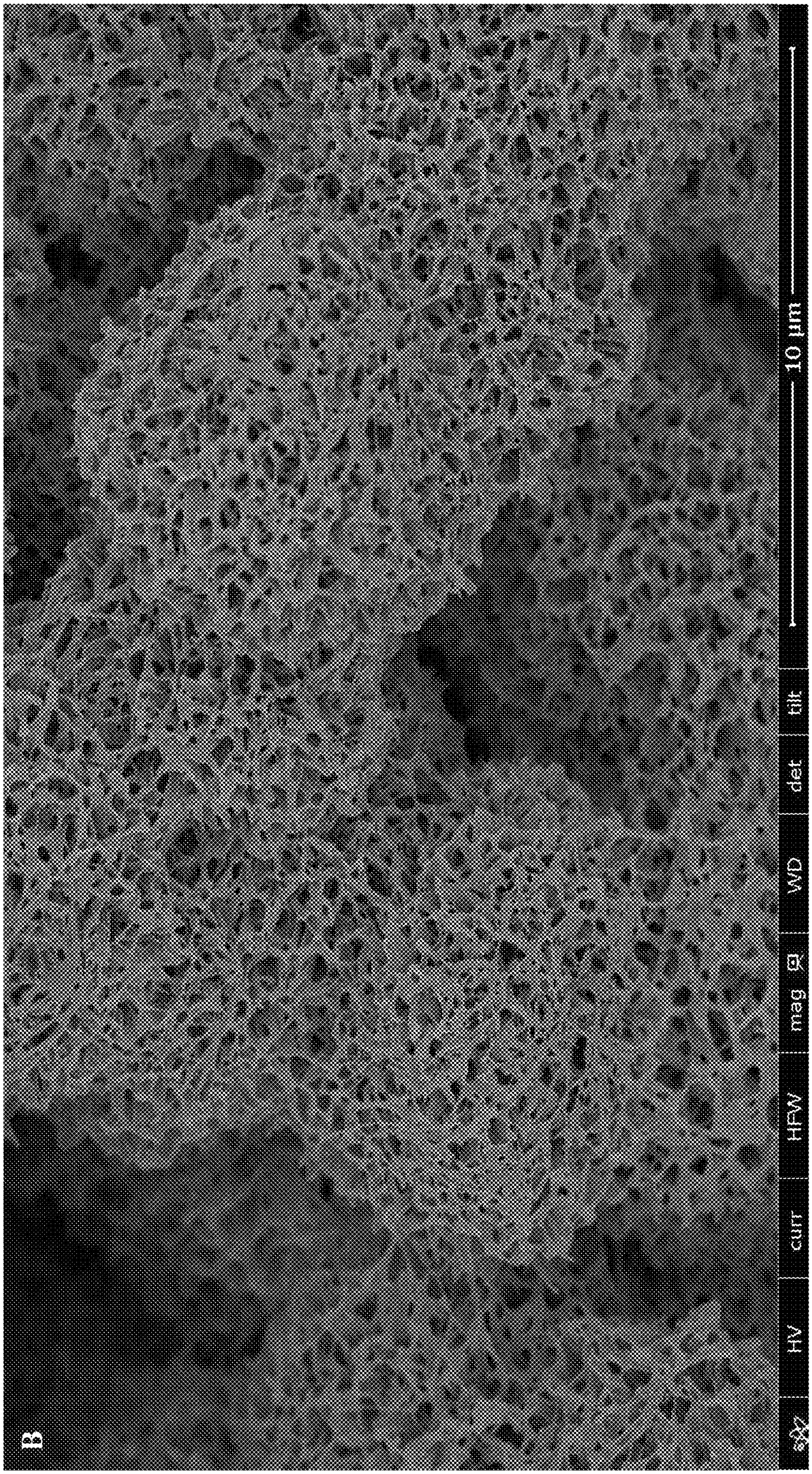
Figure 4C:
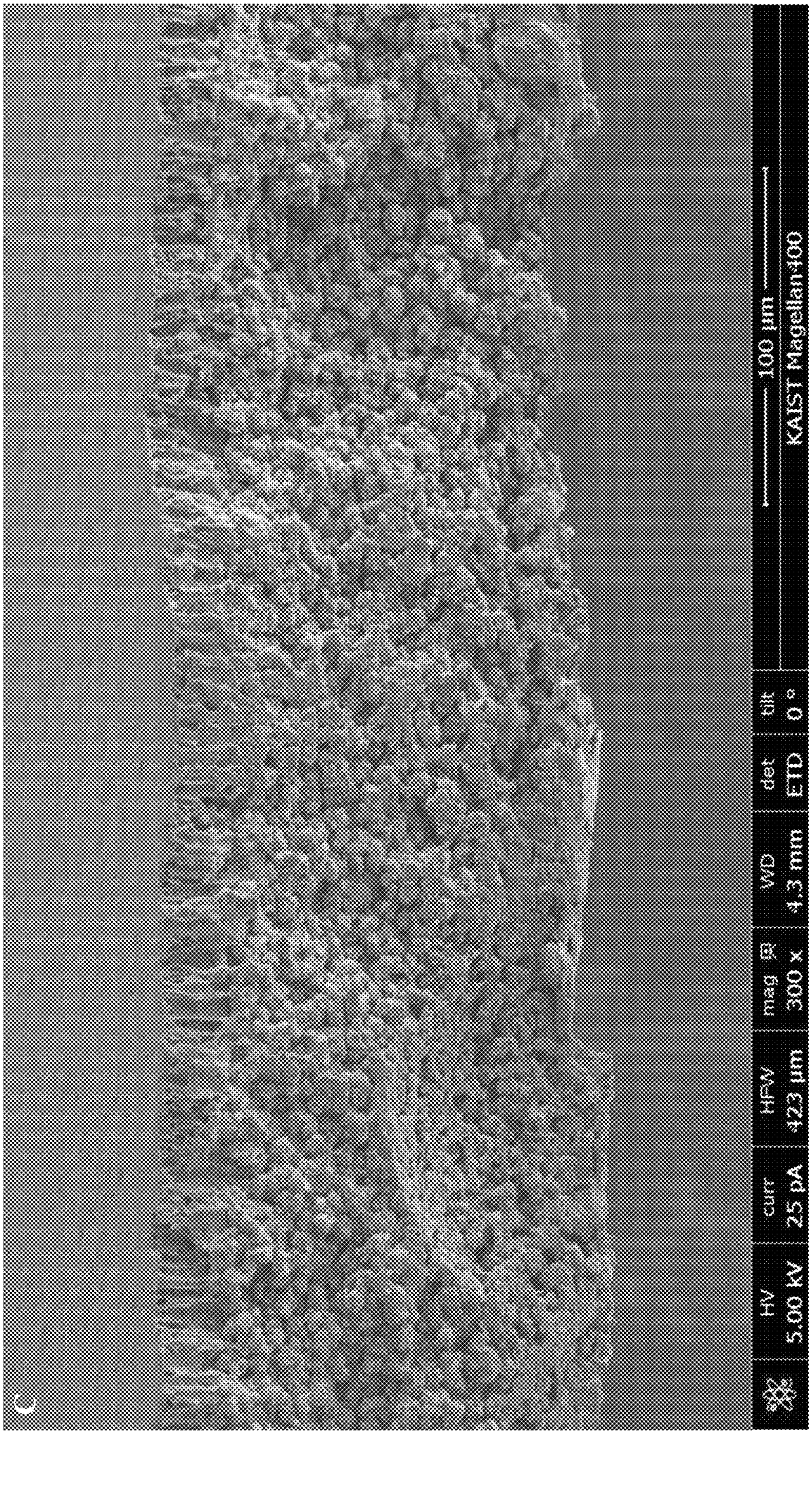
Figure 4D:
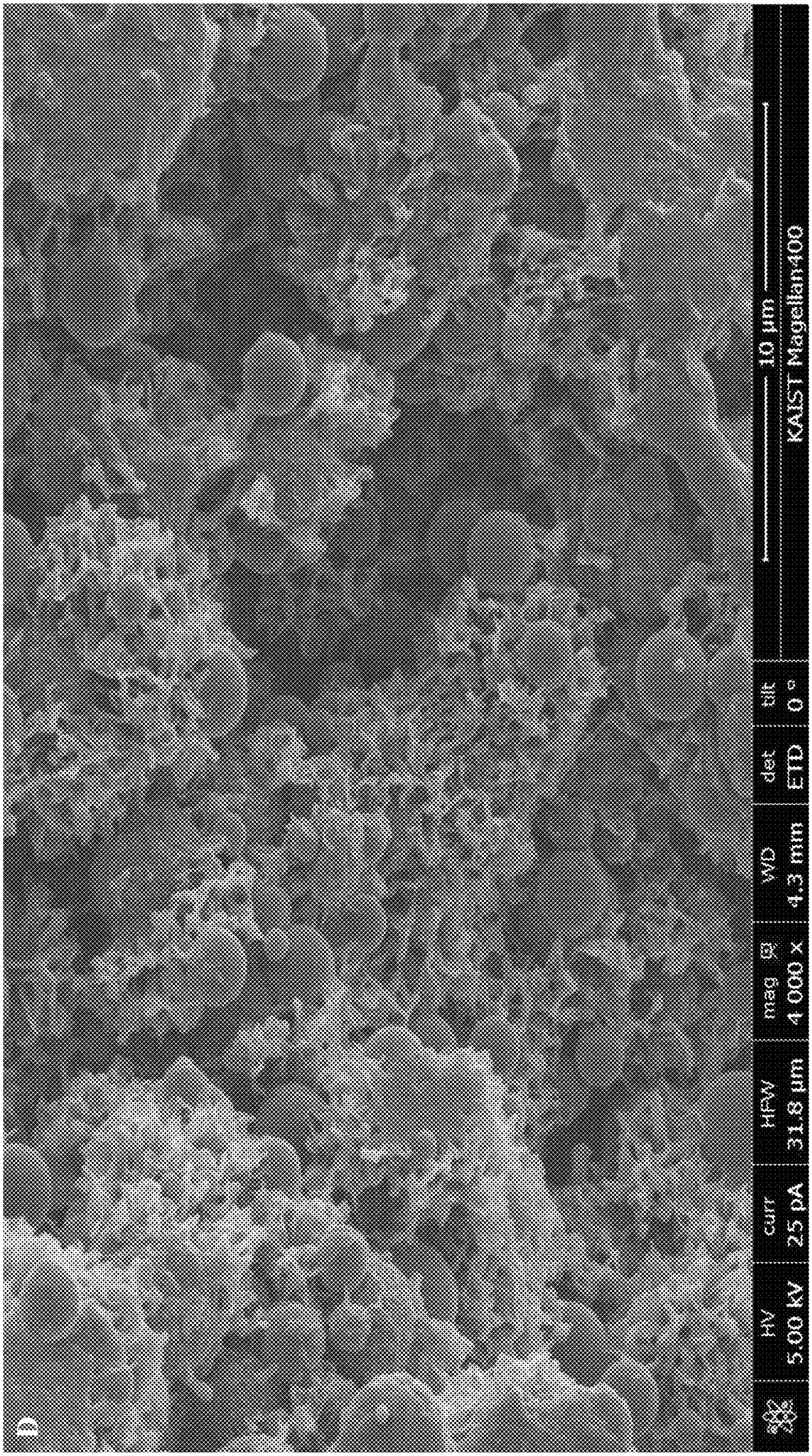
Figure 4E:
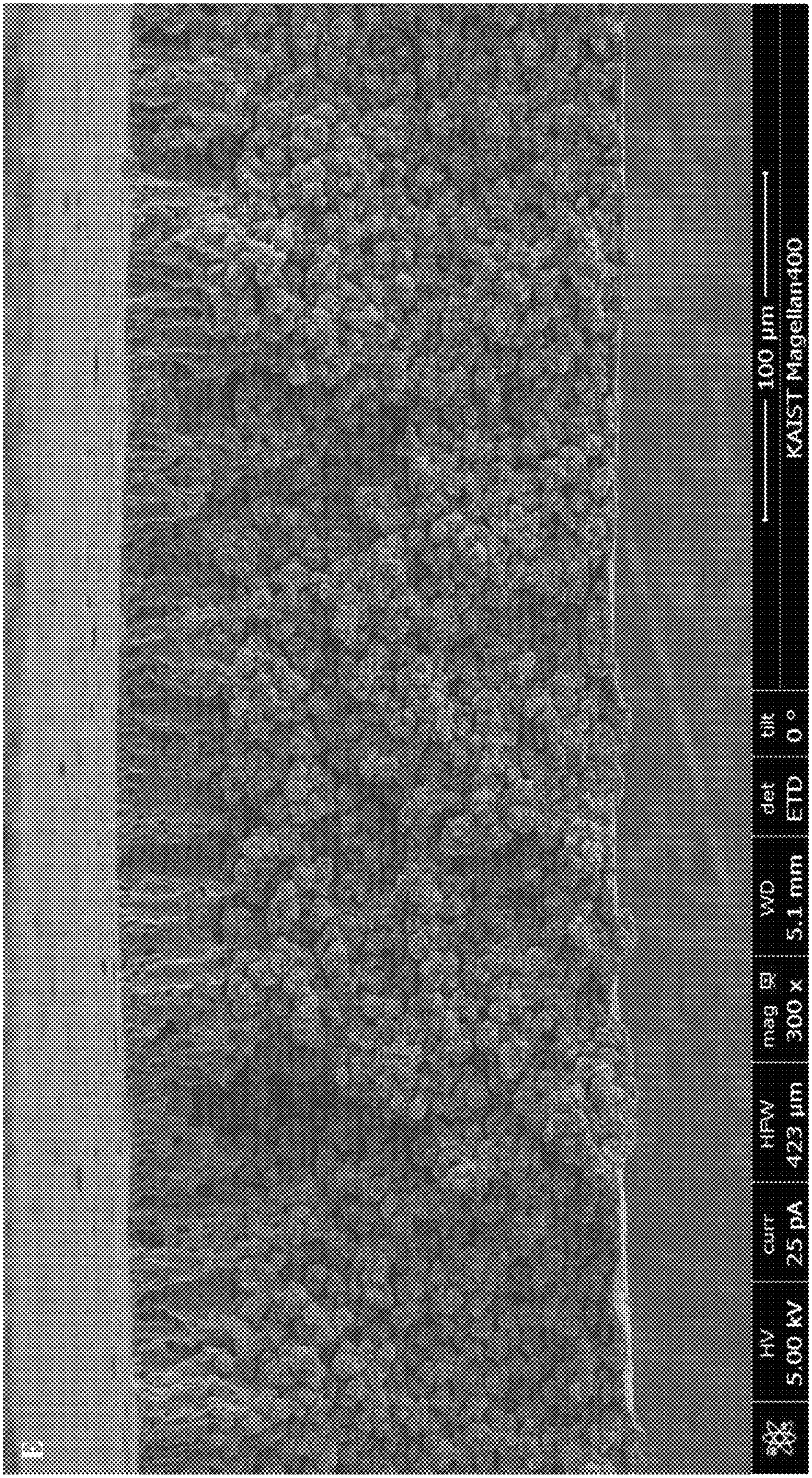
Figure 4F:
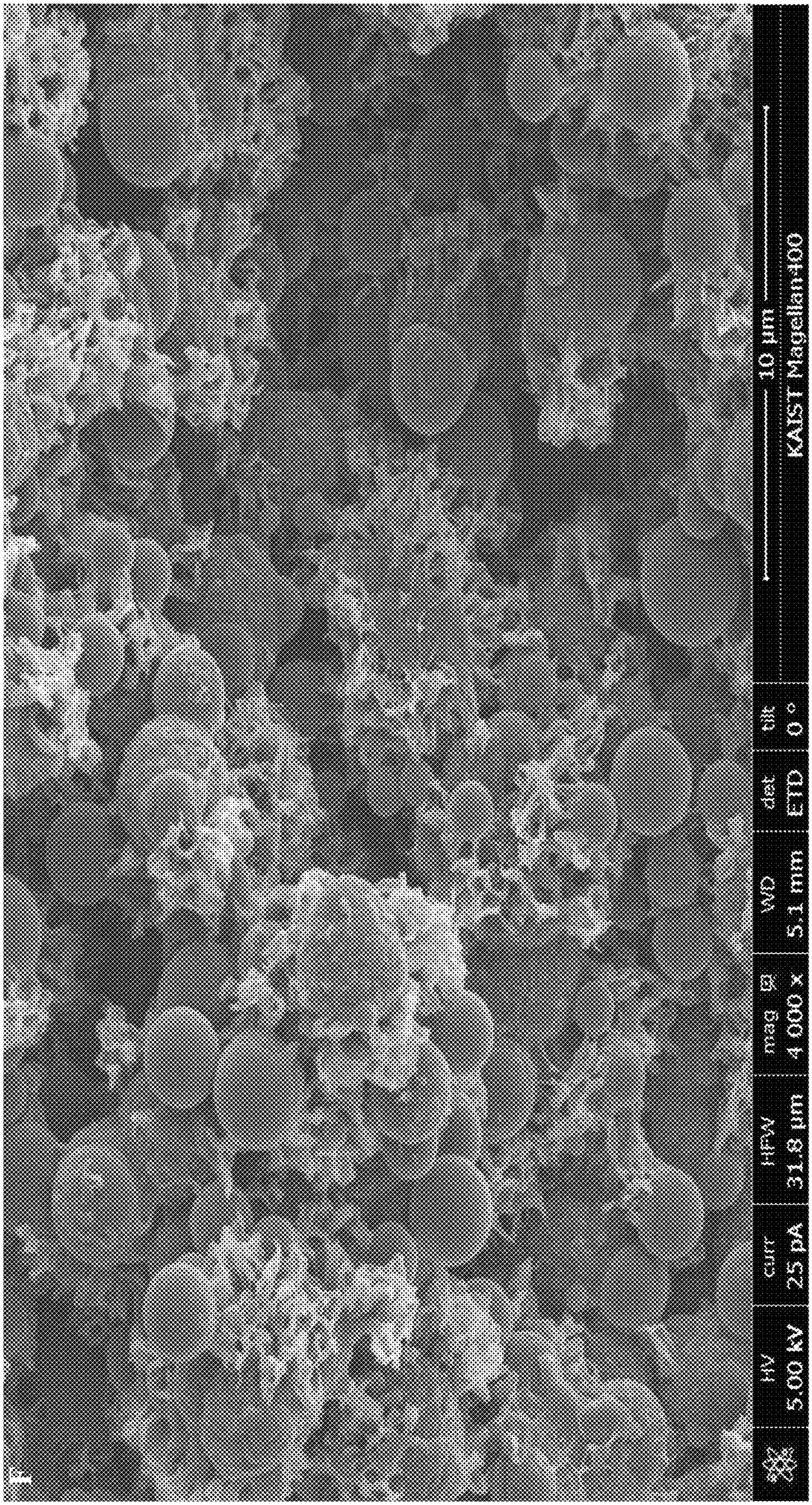
Figure 4G:
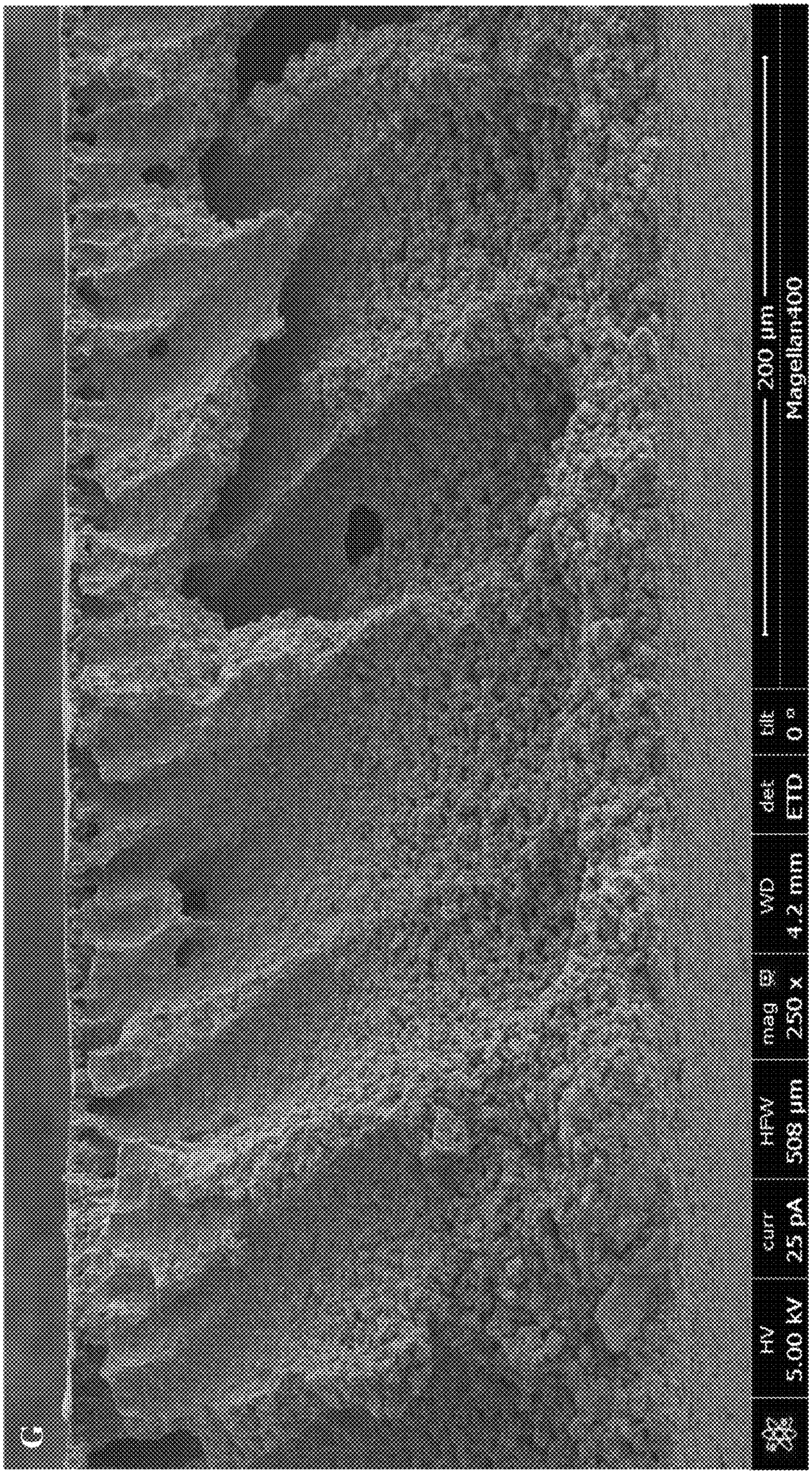
Figure 4H:
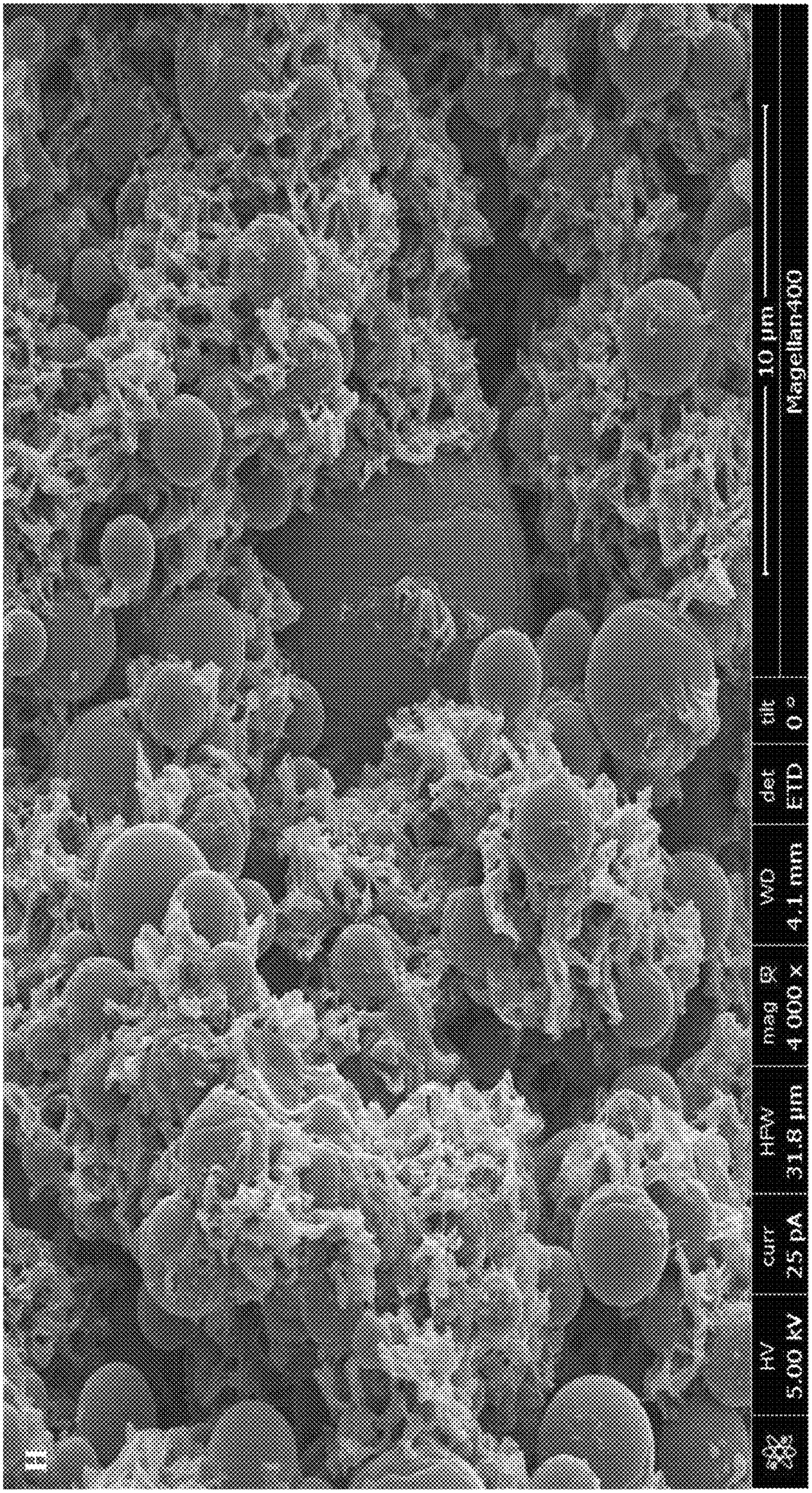

In the membranes of Table 8, each ECH molecule produces one molecule of hydrogen chloride (HCl) following the crosslinking reaction (FIGS. 3B-3C).

In the membranes of Table 8, all PEGDE molecules were incorporated into the PEI particles by reaction of their epoxy groups with the primary/secondary amino groups of the ECH crosslinked PEI particles (FIGS. 3B-3C).

In the membranes of Table 8, all unreacted PEI molecules were removed in the coagulation bath and subsequent membrane washes with methanol and DIW.

Example 5 Morphology of a Mixed Matrix Membrane with Polymeric Network

The morphology of the mixed matrix membranes PPNM-1, PPNM-2 and PPNM-3 of Example 4 was analyzed by FESEM The cross section and top/bottom layers of each membrane were imaged with a field emission scanning electron microscope (FESEM, Magellan Series 400, FEI Corporation) at an acceleration voltage of 2.0 kV as described by Kotte et al. [33]

Representative microphotographs of control membrane of PVDF taken by FESEM are shown in FIGS. 4A-H and FIGS. 5A-H. The cross section morphology of the neat PVDF control membrane (FIG. 4A and FIG. 4B) and the mixed matrix PVDF PPNM-1 (FIG. 4C and FIG. 4D) and mixed matrix PVDF PPNM-2 (FIG. 4E and FIG. 4F) membranes are asymmetric with dense skins and matrices with sponge-like microstructures consisting predominantly of PVDF spherulites with fibrous textures. [33]

In contrast, the mixed matrix PVDF PPNM-3 membrane (FIG. 4G and FIG. 4H) has a thinner skin and a matrix with a finger-like microstructure. PPNM-3 membrane has the highest loading (57.30 wt %) of PEGylated PEI particles (Table 8). Consequently, the finger-like microstructure of the PPNM-3 membrane matrix is attributed to a faster rate of solid-liquid demixing during membrane formation due to more favorable interactions between the PVDF polymer solution and the non-solvent (DIW) as more PEGylated PEI particles become incorporated into the membrane casting solution. Top surfaces (FIGS. 5A-H) of the mixed matrix PVDF membranes appear to be more porous than that of the neat PVDF membrane.

FIGS. 4A-H show that the PEGylated PEI particles are uniformly dispersed and distributed throughout the cross-section of MMMs. Size distributions of the embedded PEI particles for each mixed matrix PVDF membrane are estimated by SEM analysis Image J software[40], indicating that diameters of the PEGylated PEI particles of the MMMs range from a low value of 600 nm (PPNM-1) to a high value of 3.6 μm (PPNM-3).

In comparison FIGS. 6A-F depict the representative SEM images of cross section morphology of composite membranes NSM-1, NSM-2, and NSM-3 of Example 1 which do not include a functionalizing polymer. As can be seen in FIGS. 6A-F, modification by in situ cross-linking does not cause a significant alteration of cross section morphology of nanocomposite membranes. However, the significant difference was occurred to the membrane structure by unusual formation of PEI particles. To understand the particle formation, the nanocomposite membranes NSM-2 and NSM-3 were synthesized with higher concentrations of PEI. The highest particle density and lowest particle size down to few hundred nanometers is observed in SEM image of NSM-3. This is the manifestation from in situ cross-linking reaction between PEI and ECH in presence of the PVDF solution. The particle size measurements from Image J software concludes that, the NSM-3 membrane has a particle size as low as 400 nm whereas, the membranes NSM-2 and NSM-1 are ranging from 1-3 μm. Further, the cross section morphology of nanocomposite membranes reveals that the dense skin layer is decreasing with increasing PEI concentration render to symmetric structure within an asymmetric membrane system. The distribution of PEI particles observed throughout the matrix however, it is more at the bottom side. This can be because of rapid exchange of solvent from bottom to top surface, as a result phase separation originated at bottom side and hence relatively less time to migrate particles to top surface (FIGS. 7A-F).

The morphology of top surface of nanocomposite membranes NSM-1, NSM-2 and NSM-3 was found to be distinct from their control membranes PVDF-1 and PVDF-2 illustrated in FIG. 5 of related application U.S. Ser. No. 13/754,883 published as US20130213881 incorporated herein by reference in its entirety.

The cross sectional morphology of PPNM series membranes differ from their counterpart NSM series membranes because of the PEGylated PEI particles present in PPNM series. The skin thickness of PPNM series membranes was increased with increase in PEGylated PEI particle concentration where as in the case of NSM series the skin thickness by and large was remains same with increase in concentration of crosslinked PEI particles. In fact in the case of NSM-3 membrane the skin thickness was relatively less when compare with NSM-1 and NSM-2. Among all membranes the PPNM-3 membrane reported highest skin thickness where the PEGylated PEI particles concentration was highest. As a result in cross sectional morphology differences the PPNM series membranes was observed superior DI water permeation flux than NSM series membranes. However, there was no significant difference in top surface morphology between PPNM and NSM series membranes.

Example 6: Size of Embedded Particles in a Mixed Matrix Membrane with Polymeric Network and Further Analysis of the Membrane Measurement of particle size of embedded particles can be measured from scanning electron microscope (SEM) images by Image J software.

Field emission scanning electron microscopy (FE-SEM) was conducted on Magellan Series 400 (FEI Corporation) at an acceleration voltage of 2.0 kV. The sample for cross section analysis was made by breaking the samples in liquid nitrogen. In order to get better image quality the sputtering method was optimized. All samples were first coated with osmium for 30 s followed by gold for 30 s and ensured that minimum charge effect and maximum image quality.

The average pore diameter of each membrane top/skin layer was determined by $N_2$ adsorption permporometry [6] at 77 K using a Micromeritics ASAP 2020 accelerated surface area and porosimetry analyzer. The Barrett-Joyner-Halenda (BJH) methodology [34] was utilized to extract membrane pore diameters from the $N_2$ adsorption/desorption data.

Membranes and particles can also be analyzed by atomic force microscopy. AF images of can be seen in FIG. 9 to FIG. 13 of related application U.S. Ser. No. 13/754,883 published as US20130213881

Example 7: Infrared Spectroscopy Analysis of a Mixed Matrix Membrane with Polymeric Network The mixed matrix membranes PPNM-1, PPNM-2 and PPNM-3 of Example 4 were also analyzed by infrared spectroscopy.

The surface chemical composition of each membrane was characterized by Fourier transform infrared (FT-IR) spectroscopy. The mid IR spectra (500 $cm^{-1}$ to 4000 $cm^{-1}$) of the membranes were measured by attenuated total reflectance (ATR). The spectra were acquired by averaging 32 scans at a resolution of 2 $cm^{-1}$ using a JASCO 4100 FT-IR spectrometer (Japan) and a zinc selenide ATR crystal plate with an aperture angle of 45° as described by Kotte et al. [33]

In contrast, the near IR spectrum of each membrane (4000 $cm^{-1}$ to 10000 $cm^{-1}$) was measured by reflection using a Bruker MPA FT-NIR spectrometer equipped with a quartz beam splitter and an external RT-PbS detector. The NIR spectra were acquired by averaging 32 scans at a resolution of 8 $cm^{-1}$.

Figure 8A:
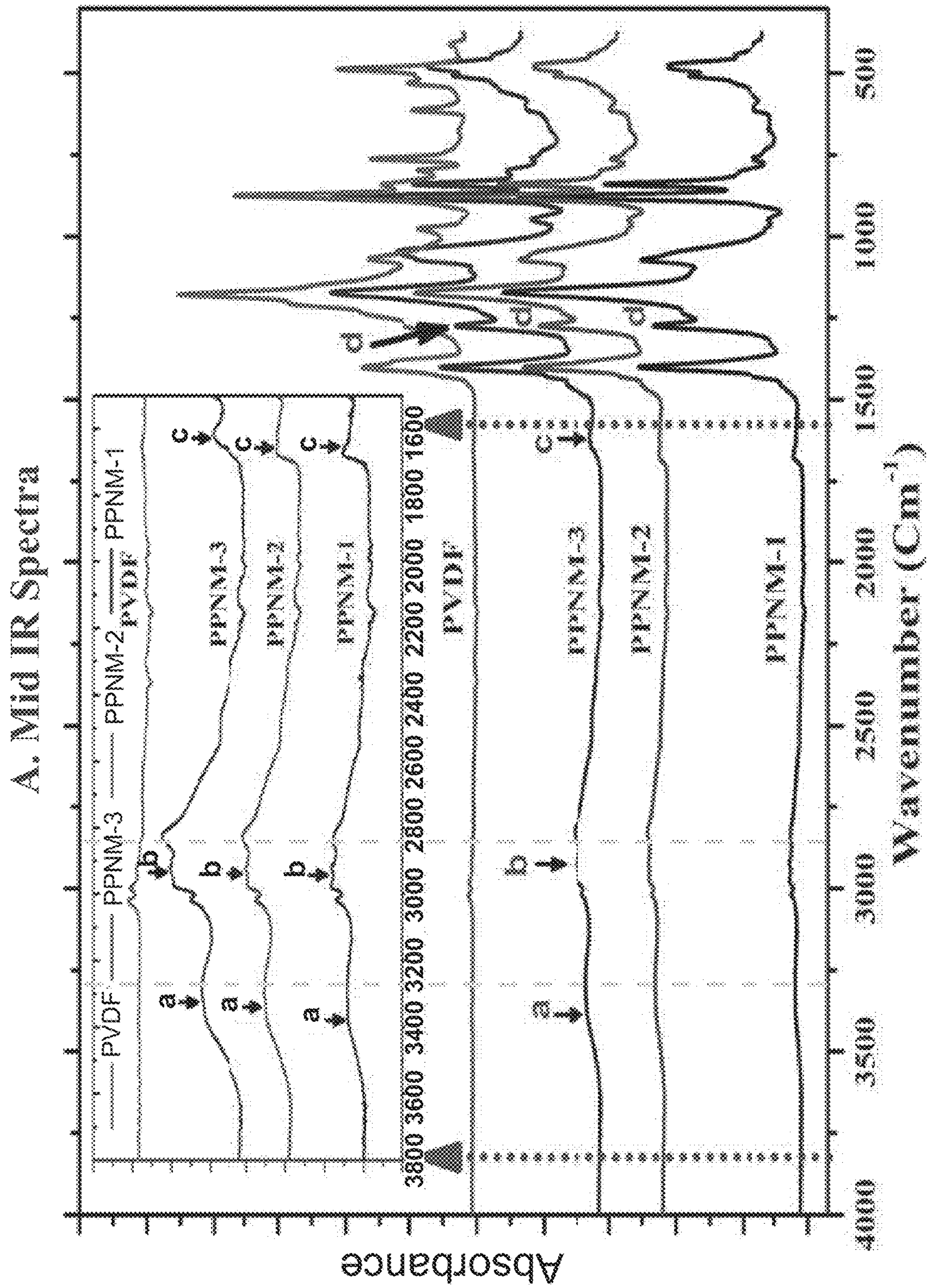
FIGS. 8A-B show FTIR spectrum scans of control PVDF membrane and mixed matrix PVDF membranes with in situ synthesized and PEGylated PEI particles.
Figure 8B:
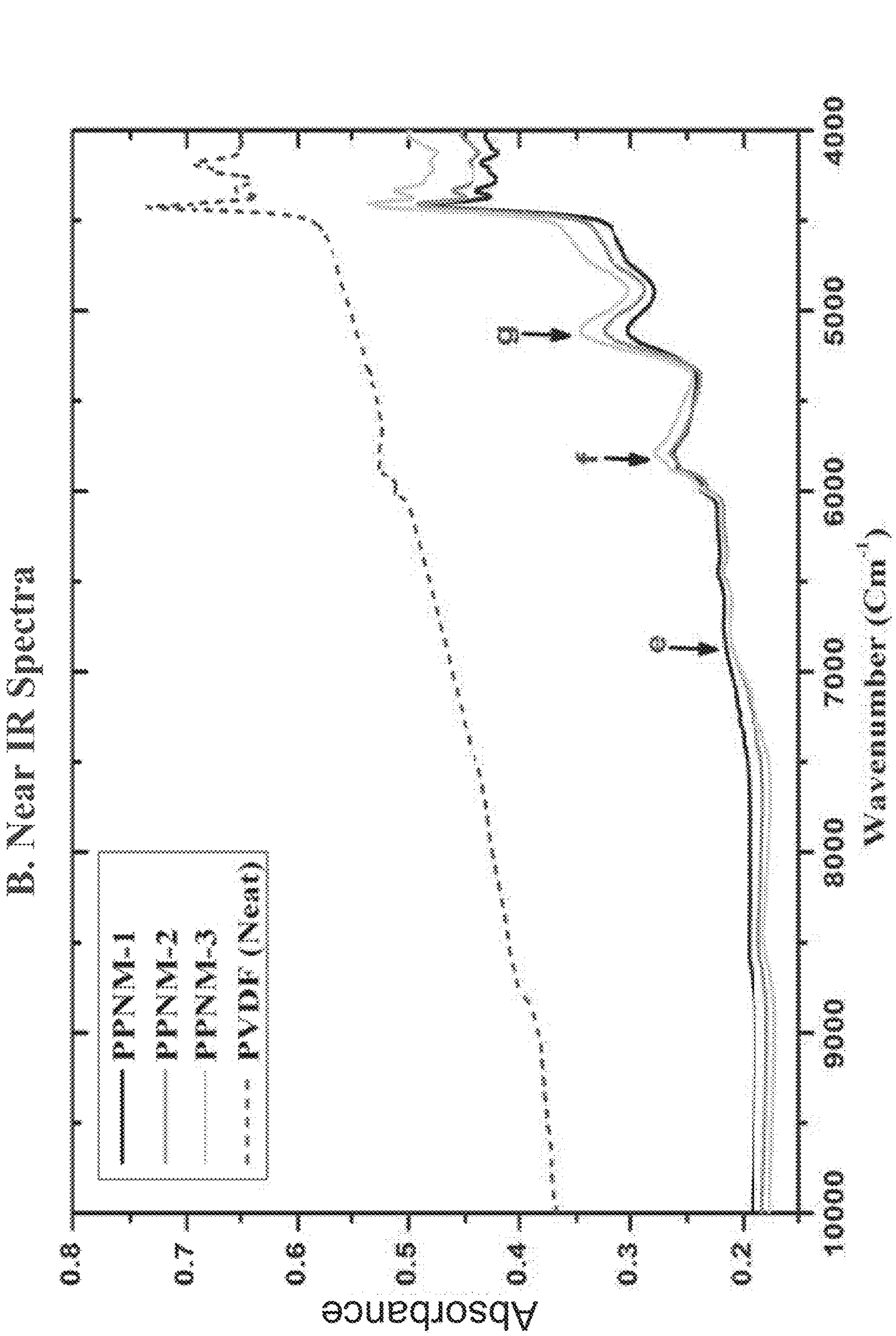

The mid and near IR spectra of the control PVDF membrane and PPNM-1, PPNM-2 and PPNM-3 membranes are shown in FIGS. 8A-B. The mid IR spectra (FIG. 8A) of the membranes with in situ synthesized and PEGylated PEI particles exhibit three new peaks including (i) —$NH_2$ bending (1635 $cm^{-1}$) from primary amines, (ii) —NH stretching (3255 $cm^{-1}$) from primary/secondary amines and (iii) —OH stretching (3410 $cm^{-1}$) [33]. These peaks are consistent with the presence of PEI particles with —OH groups at the surfaces of the mixed matrix PVDF membranes Kotte [33]. The near IR spectra (FIG. 8B) provide additional supporting evidence for the presence of particles with —OH groups at the surface of these membranes including: (i) first overtone of —OH stretching vibrations (6914 $cm^{-1}$), (ii) first overtones of —CH and —$CH_2$ stretching vibrations and (iii) combination of —$NH_2$ stretching and bending vibrations (5115 cm 1).

Figure 9:
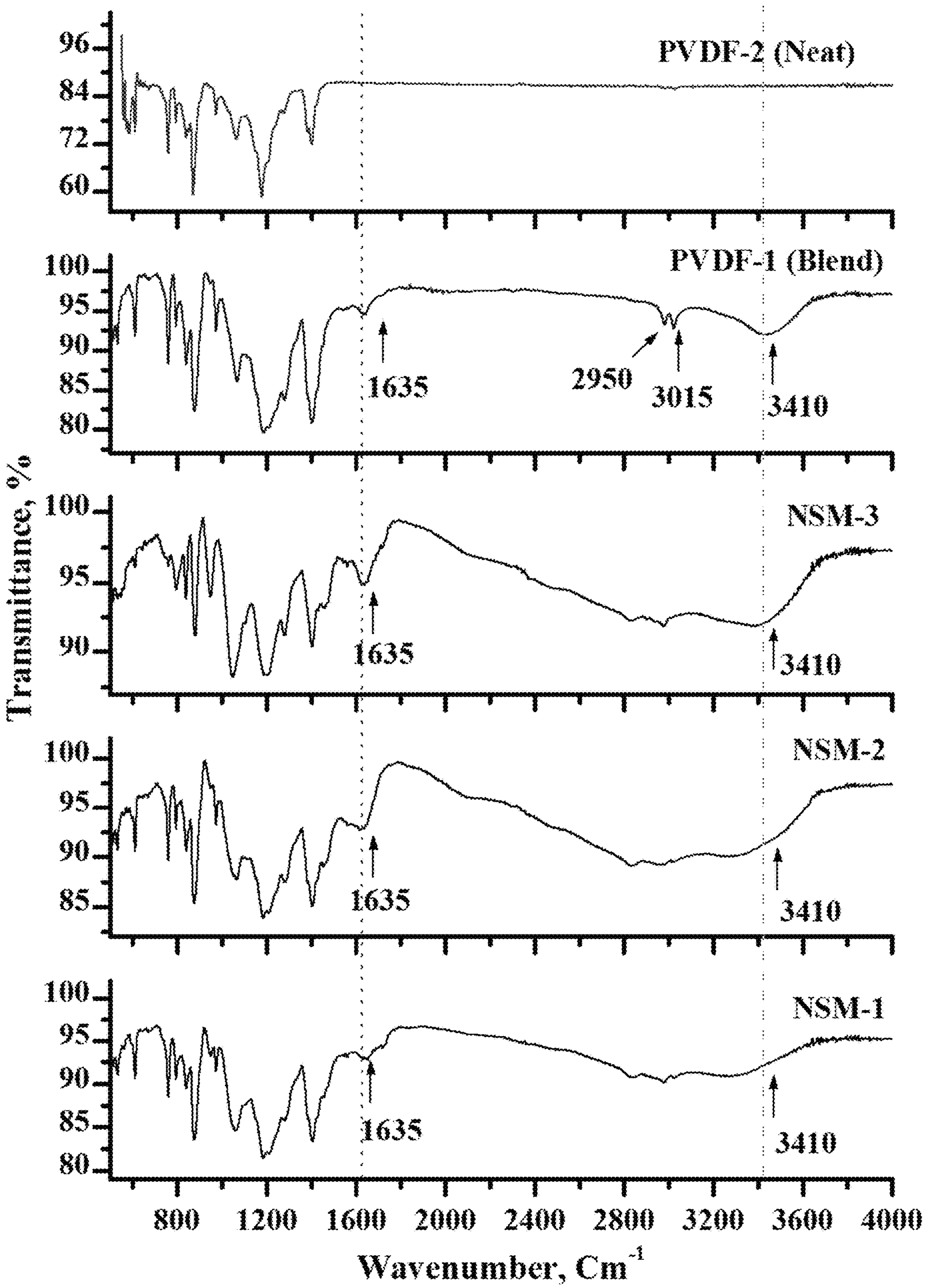
FIG. 9 shows FTIR spectrum scans of control and nanocomposite membranes NSM-1, NSM-2 and NSM-3 described in related application U.S. Ser. No. 13/754,883 published as US20130213881.
Figure 10:
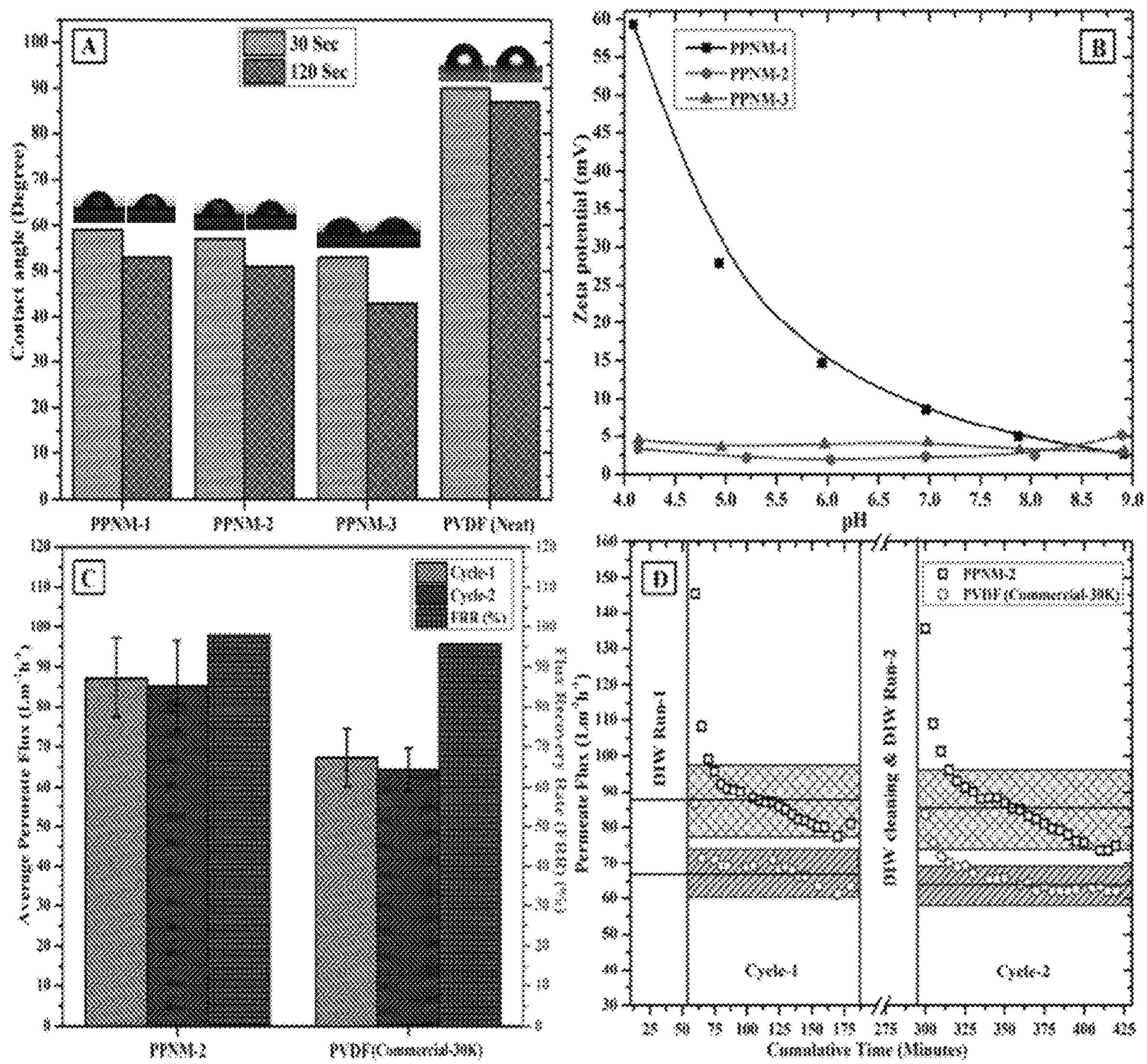
FIG. 10 shows selected physicochemical properties and performance parameter of mixed matrix PVDF membranes with in situ synthesized and PEGylated PEI particles. Panel A shows contact angle measurements. Panel B shows zeta potential measurements. Panel C shows average permeate flux for suspensions of *Chlorella* sp. KR-1 microalga. Panel D shows permeate flux for suspensions of microalgae as a function of cumulative filtration time.

In comparison the FTIR spectrums of neat PVDF, PVDF-PEI blend and nanocomposite membranes NSM-1, NSM-2 and NSM-3 can be seen in FIG. 9. The characteristic peaks are assigned to neat PVDF membrane including $CF_2$ bending (615 and 766 $cm^{-1}$), $CH_2$ rocking (840 $cm^{-1}$), CH stretching (976 $cm^{-1}$), and CF stretching (1234 and 1279 $cm^{-1}$) [35]. In contrast to neat PVDF membrane (PVDF-2), the PVDF-PEI blend (PVDF-1) and nanocomposite membranes (NSM-1, NSM,-2, and NSM-3) exhibits two new peaks including $NH_2$ bending (1635 $cm^{-1}$) from primary amines and —NH stretching (3255 $cm^{-1}$) from primary/secondary amines. These peaks are assigned to HPEI macromolecule particles which are embedded in PVDF membranes. In contrast, the FTIR spectrum of nanocomposite membranes exhibits a broad peak of —OH stretching at 3410 cm indicating that hydroxyl groups were produced when the HPEI macromolecules reacted with ECH cross-linker. The characteristic peak intensity at 1635 cm ($NH_2$ bending) is increasing from NSM-1 to NSM-3 which confirms that the increasing concentration of HPEI-NPs in membrane matrix. Furthermore, the bands of 2950-3015 cm appear which are stretching vibration bands of C—H bond of —$CH_2$ groups coexist. The control membrane PVDF-1 however, shows all characteristic peaks and prominent peak of —CH stretching which further confirms the absence of cross-linking reaction.

Example 8: Determination of Wettability and Hydrophilicity of Membranes

The wettability and hydrophilicity of mixed matrix membranes PPNM-1, PPNM-2 and PPNM-3 of Example 4 were also analyzed.

Wettability and hydrophilicity of the membrane material can play a crucial role in controlling fouling resistance and release of adsorbed foulants since these parameters are directly related to the material surface tension [36] [37] [38]. Recent study has shown to improve membrane hydrophilicity by functionalized surface-tailored inorganic nanoparticles coated with polyelectrolytes [39]. The enrichment of PEI moieties in a membrane surface has shown promising improvement of hydrophilicity of nanofiltration membranes [40].

In particular, hydrophilicity of each membrane was determined from contact angle measurements using a Phoenix 300 contact angle analyzer (SEO Corporation, Korea).

The contact angle measurements (FIG. 10A) provide further supporting evidence for the presence of PEI particles with high density of —OH groups at the surfaces of the mixed matrix PVDF membranes. FIG. 10A indicates that the MMMs are hydrophilic and have contact angles (120 seconds) ranging from a high value of 53° for the PPNM-1 membrane to a low value of 43° for the PPNM-3 membrane. FIG. 10A shows the contact angle of the MMMs decrease with contact time, which can be attributed to membrane surface roughness. Table 9 compares the contact angles of our MMMs with those of various commercial PVDF membranes. In all cases, our PVDF MMMs have lower contact angles and are thus are more hydrophilic than the commercial and surface coated PVDF membranes (Table 9).

TABLE 9

| Membrane | Contact angle (Degree) | Zeta potential (mV) pH 7.0 |
|---|---|---|
| PPNM-1 | 53 | 8.60 |
| PPNM-2 | 51 | 2.30 |
| PPNM-3 | 43 | 4.20 |

TABLE 9-continued

| Membrane | Contact angle (Degree) | Zeta potential (mV) pH 7.0 |
|---|---|---|
| PVDF (Commercial-30K) | 61 | −9.5 |
| PVDF (Commercial -120K) | 81 | −70.0 |
| PVDF (PVA Coated) | 68 | −64.0 |

In comparison, the hydrophilicity of each membrane NSM-1, NSM2 and NSM-3 was determined from contact angle measurements using a Phoenix 300 contact angle analyzer (SEO Corporation, Korea). A microsyringe was utilized to place a water droplet on the surface of each membrane. After 30 s and 120 s, the image was captured and analyzed using the instrument's image processing software. Each reported contact angle is the average of 5 different measurements at randomly selected points over the membrane surface.

Figure 12:
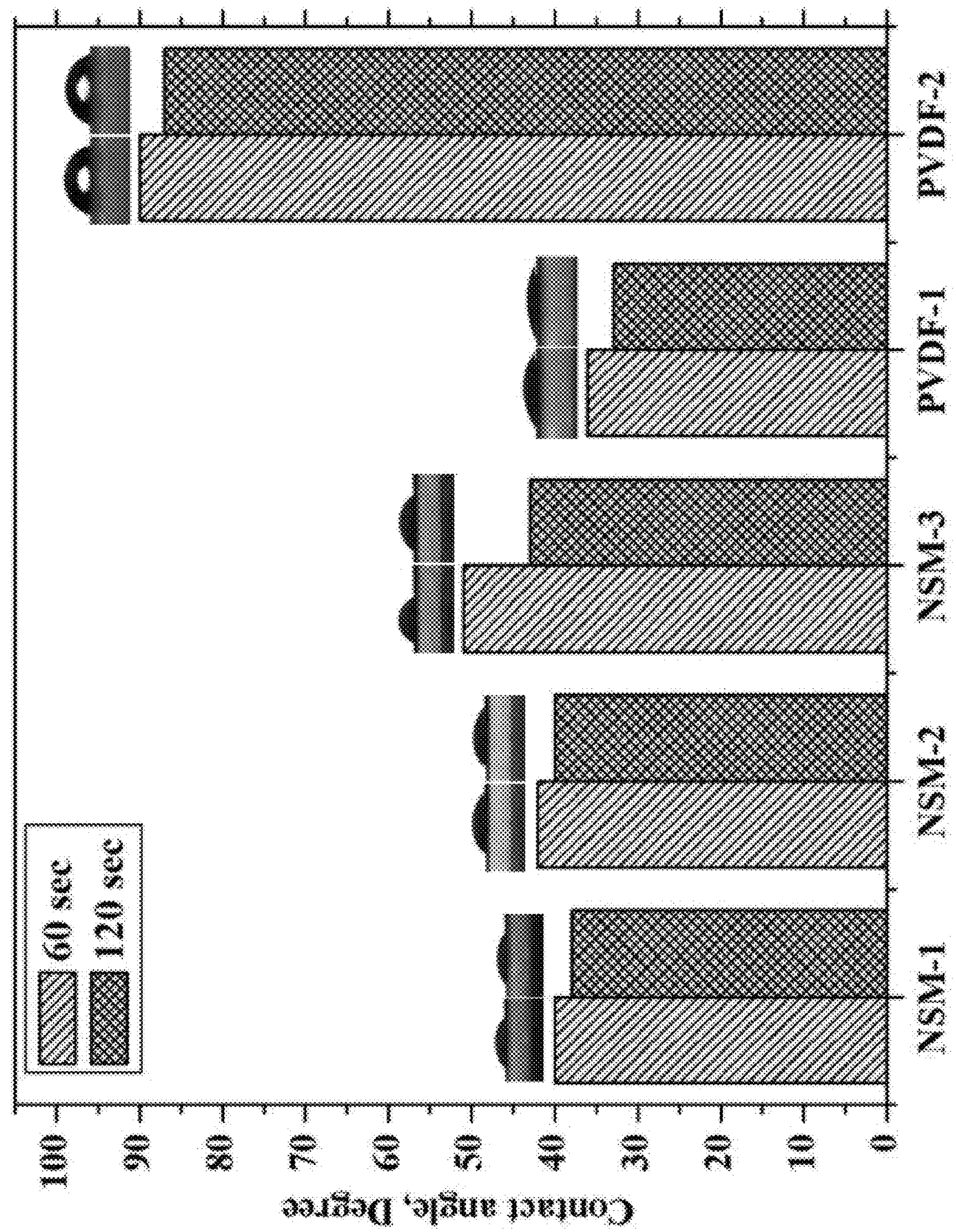
FIG. 12 shows contact angle measurements and images of control and membranes NSM-1, NSM-2 and NSM-3 described in related application U.S. Ser. No. 13/754,883 published as US20130213881 at a drop ageing of 30 and 120 seconds.
Figure 13A:
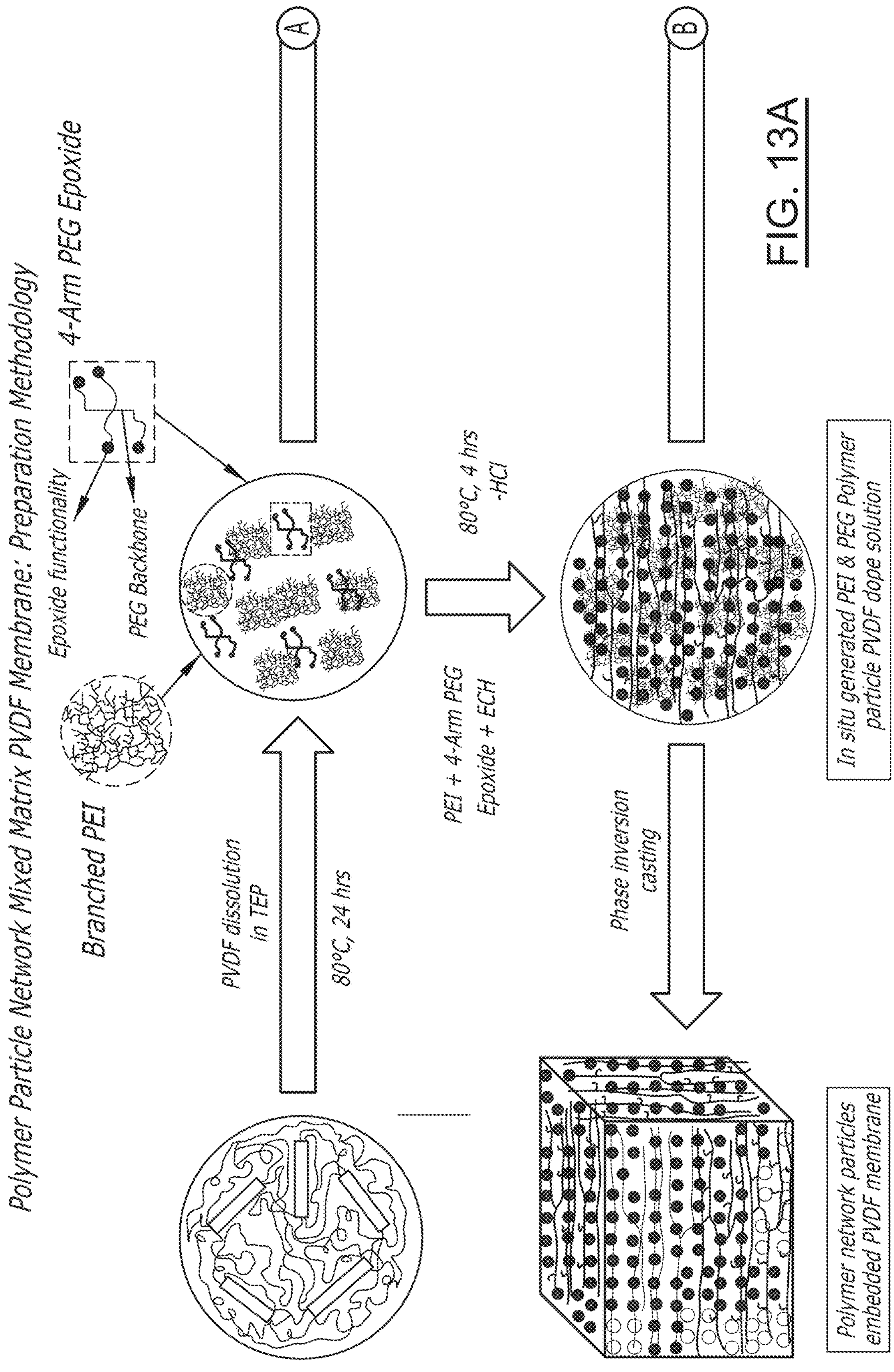
FIGS. 13A-B show a schematic illustration of the preparation of a polymer particle network mixed matrix PVDF membrane prepared by in situ cross-linking and PEGylation with 4-Arm PEG epoxide PEI particle networks according to embodiments herein described.
Figure 13B:
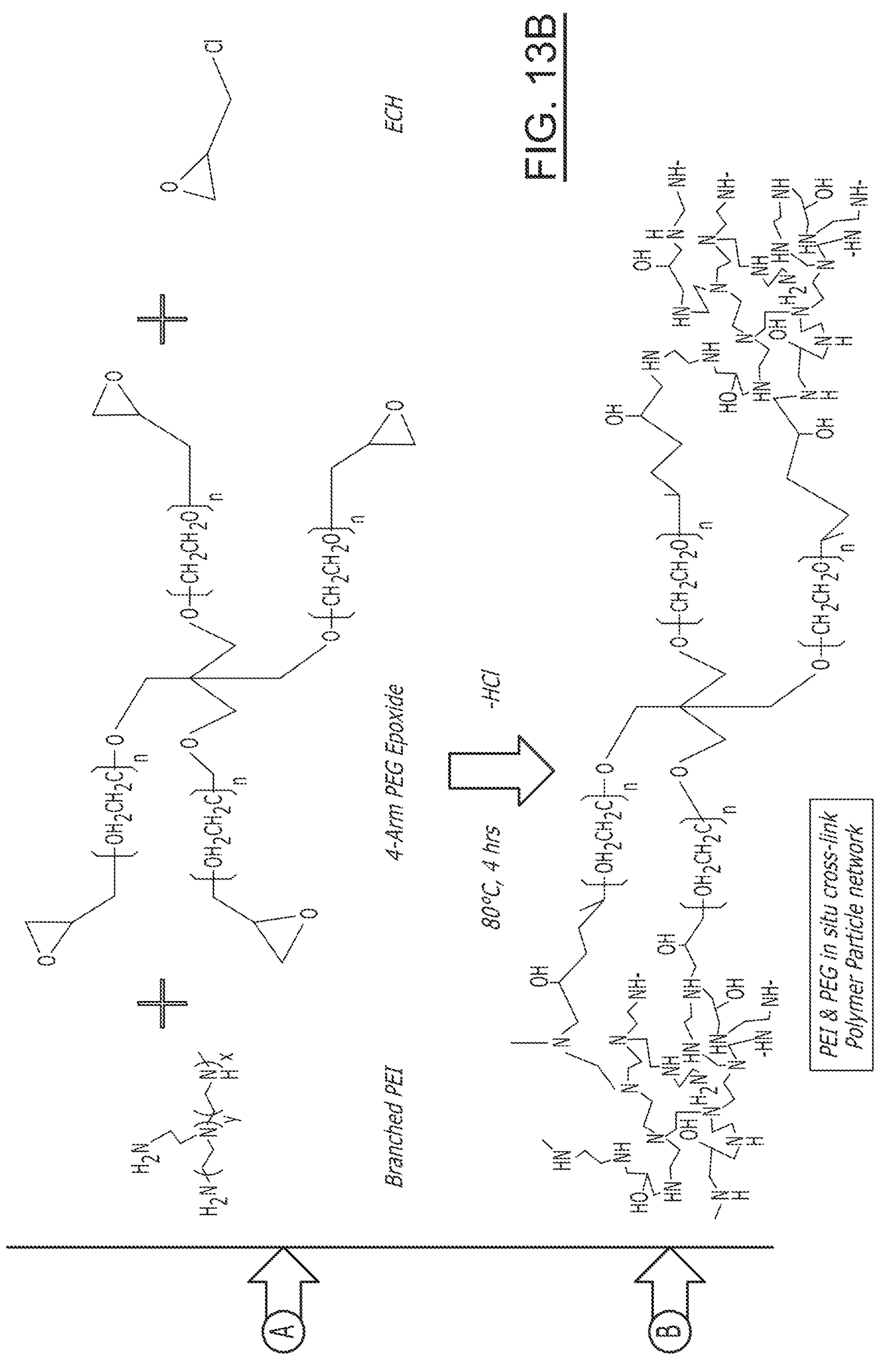
Figure 14A:
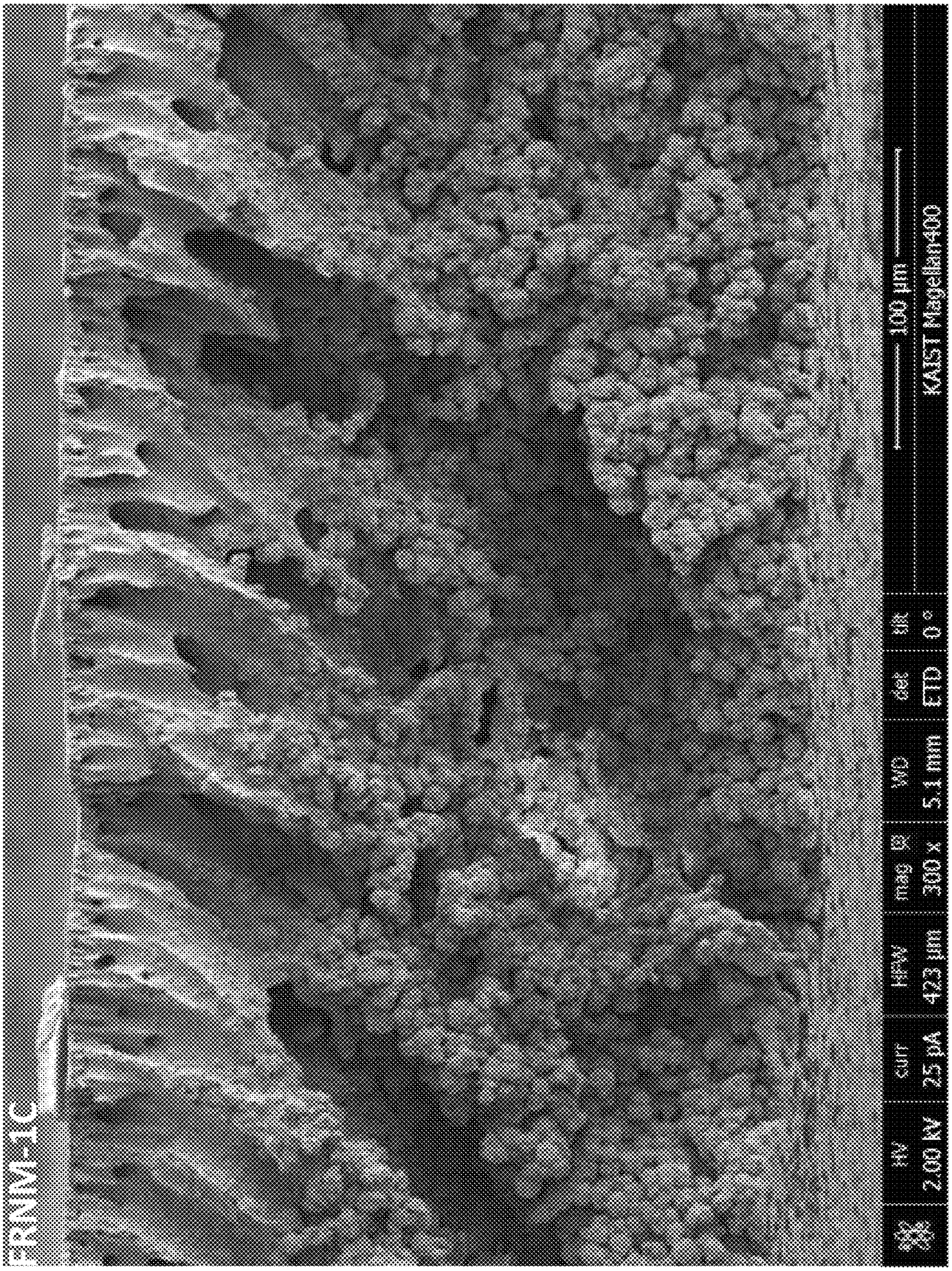
FIGS. 14A-I show representative FESEM images showing cross section and top morphology of mixed matrix PVDF membranes prepared by in situ cross-linking and PEGylation with 4-Arm PEG epoxide PEI particle networks.
Figure 14B:
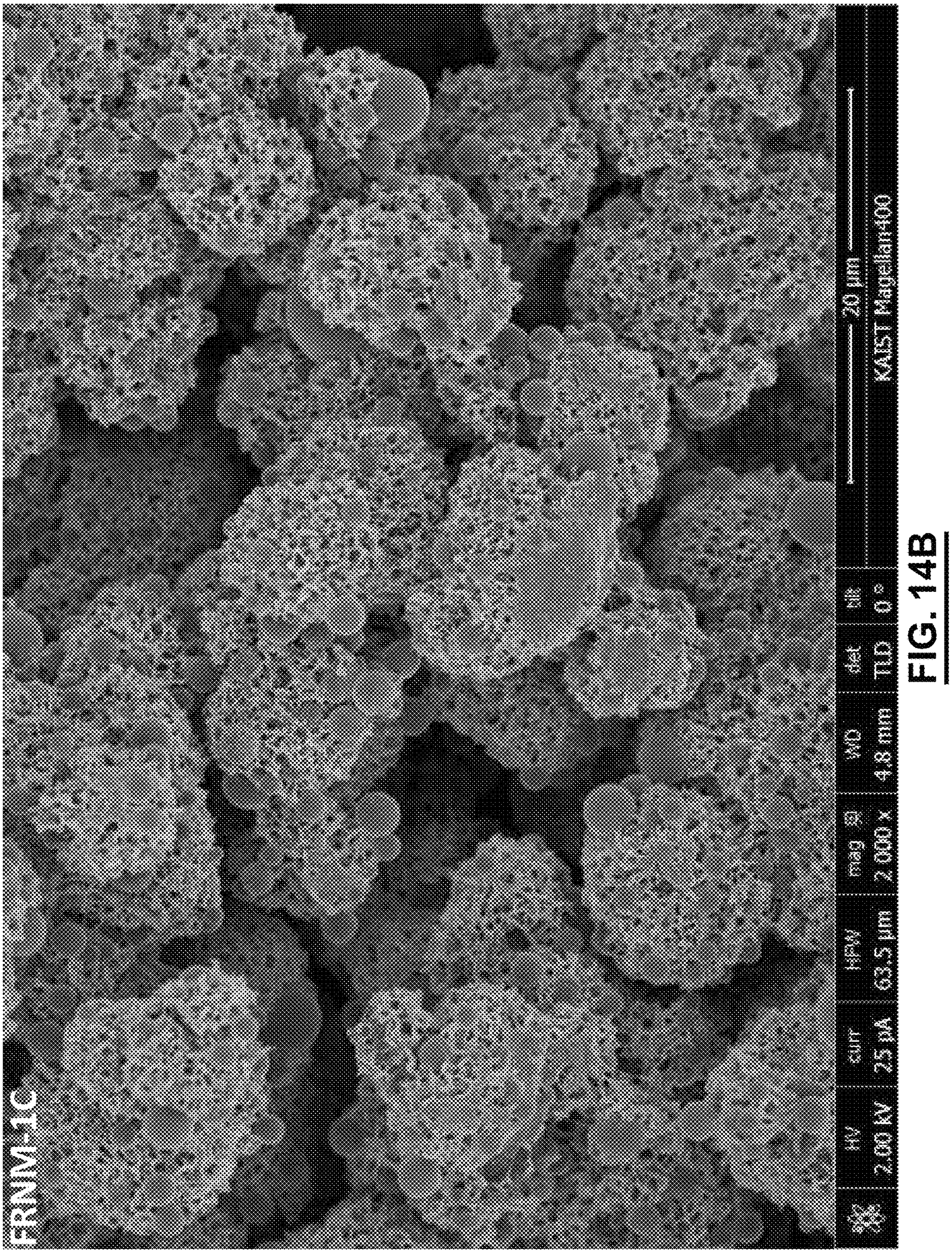
Figure 14C:
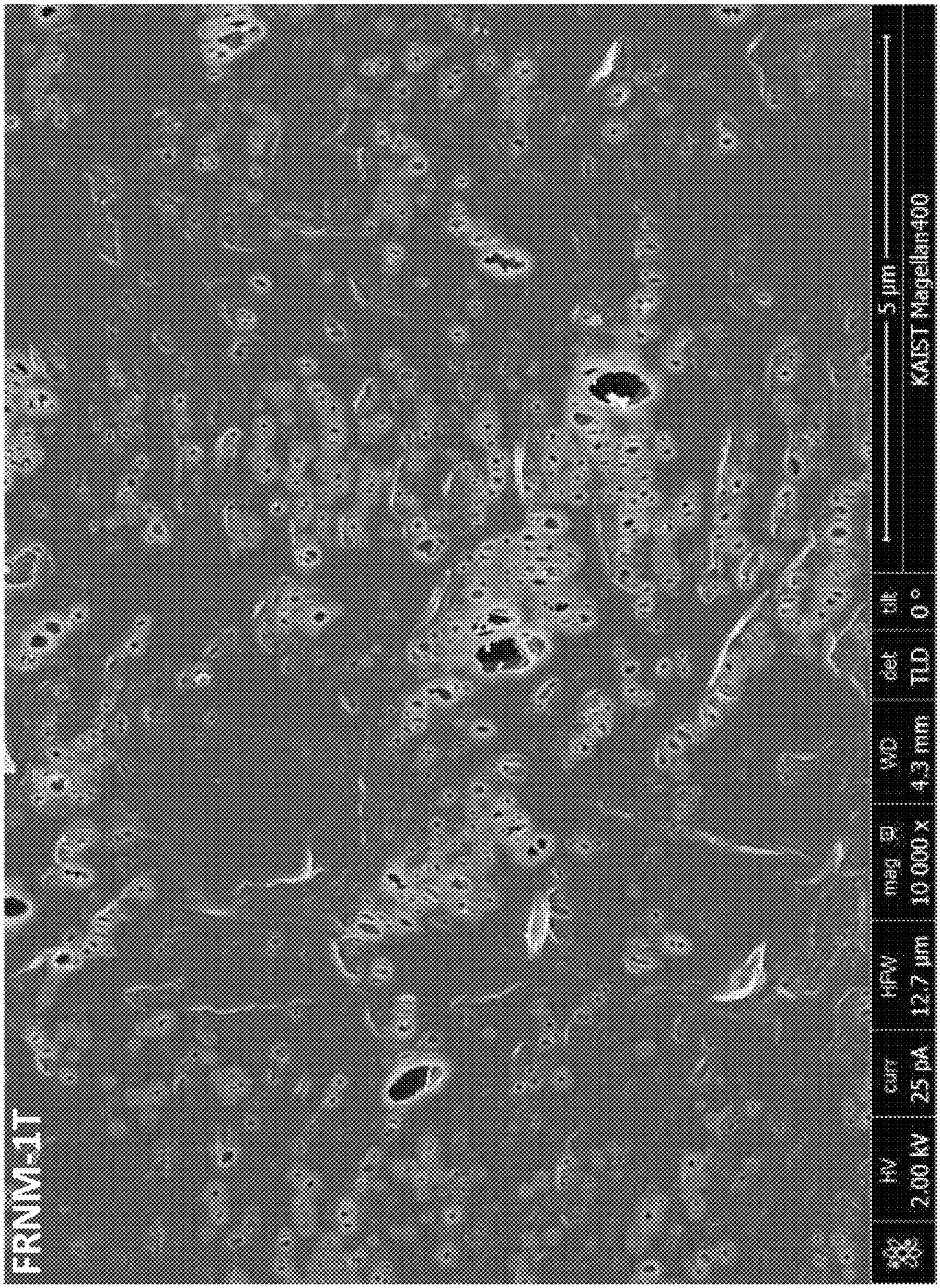
Figure 14D:
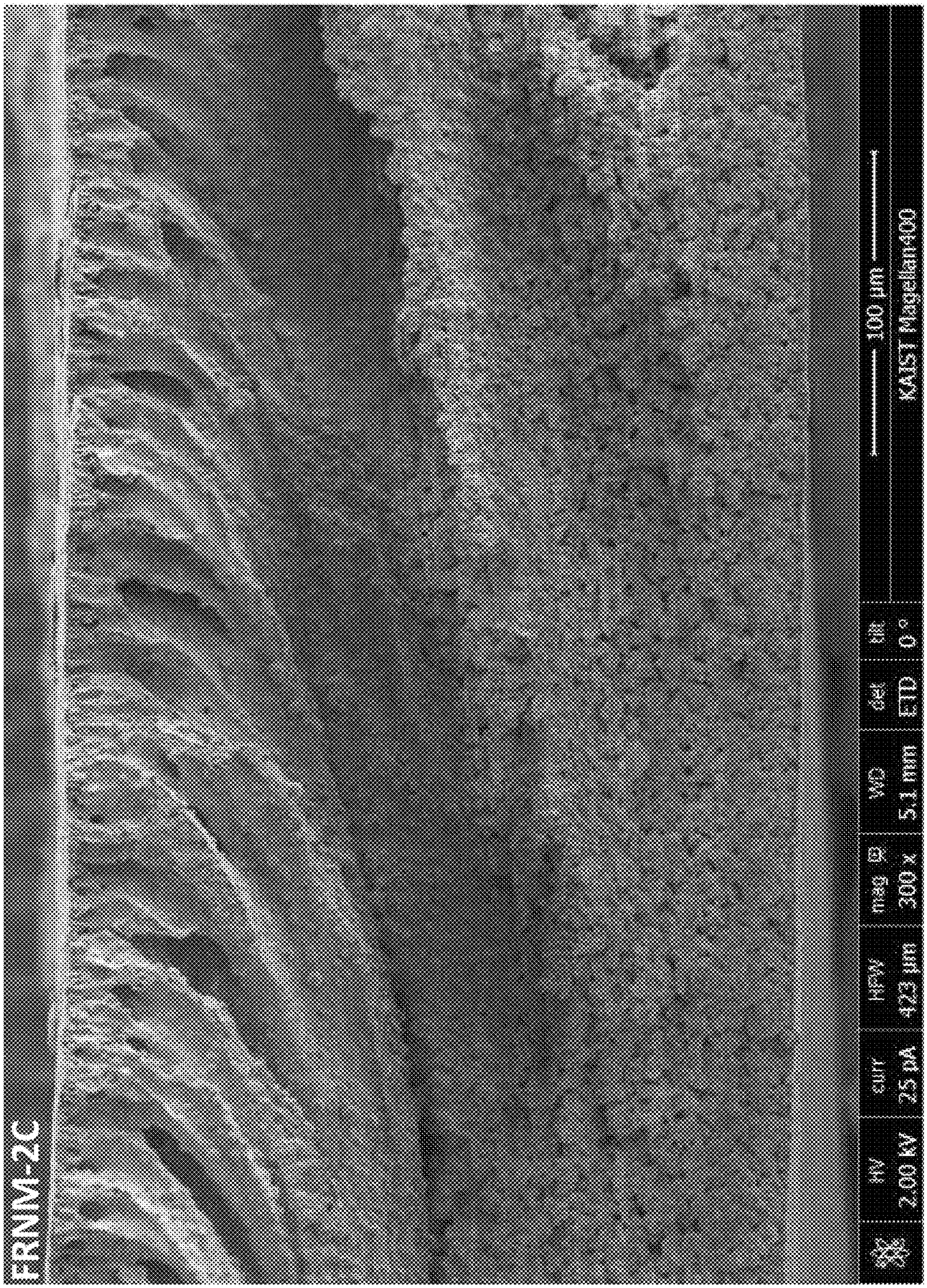
Figure 14E:
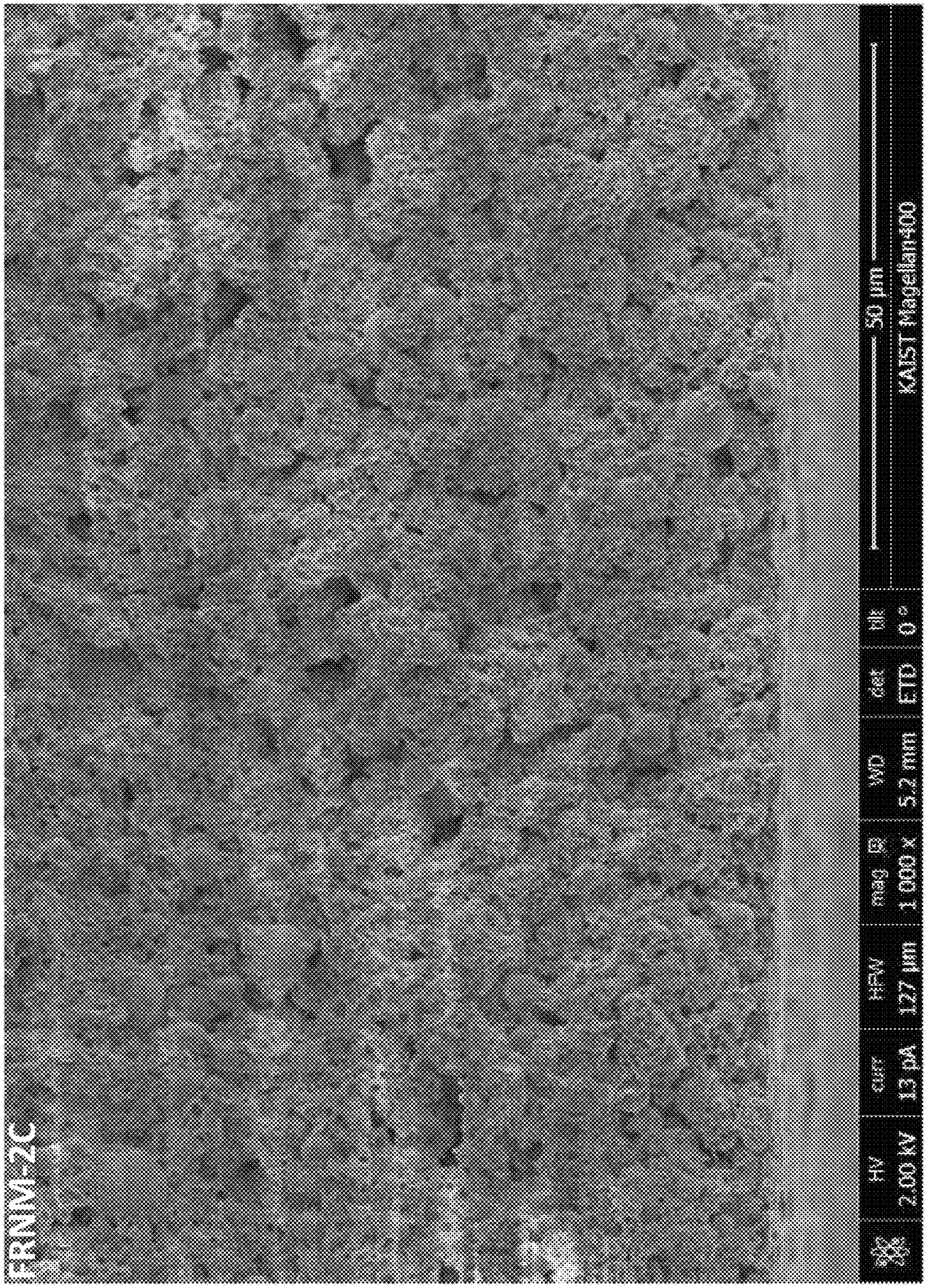
Figure 14F:
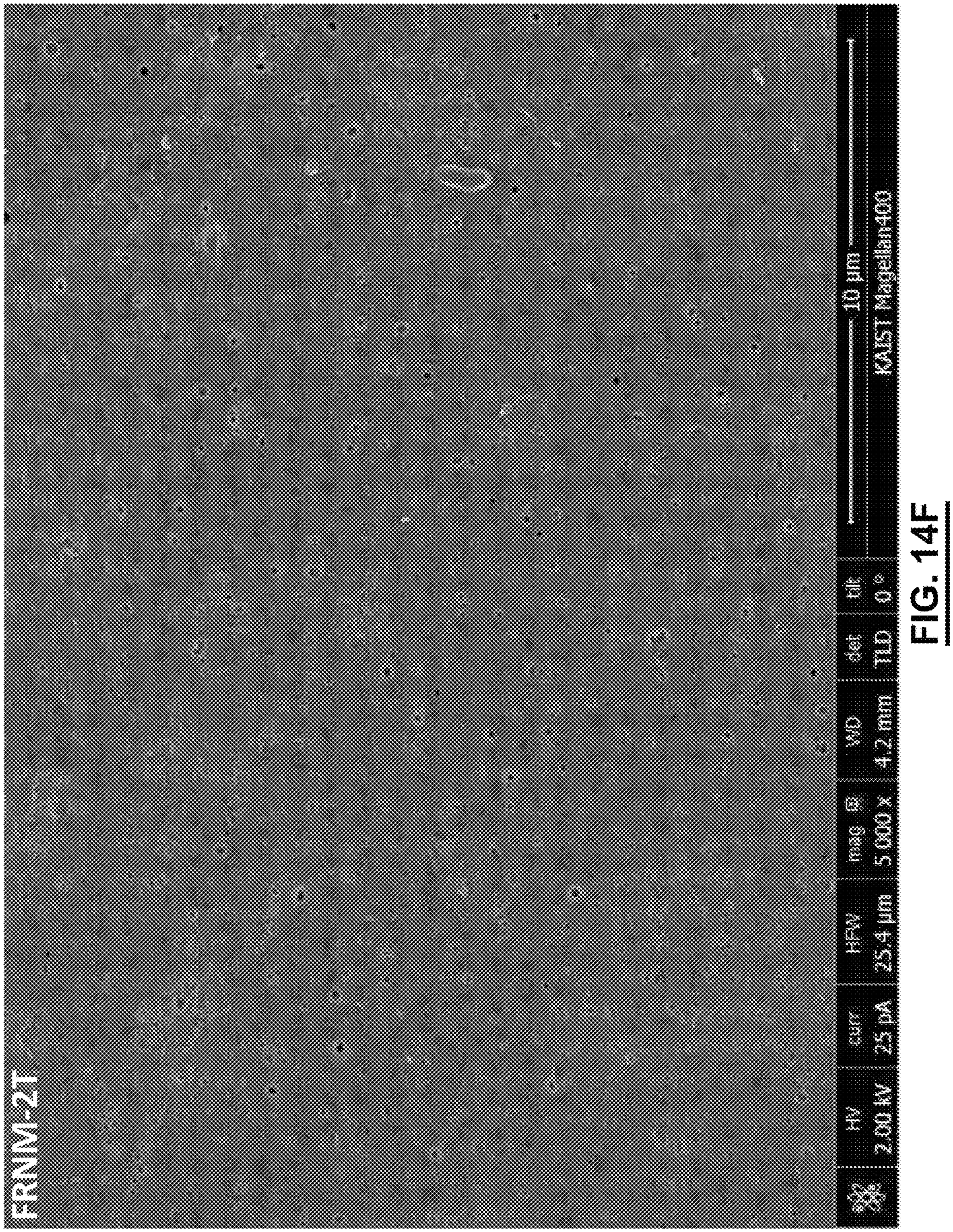
Figure 14G:
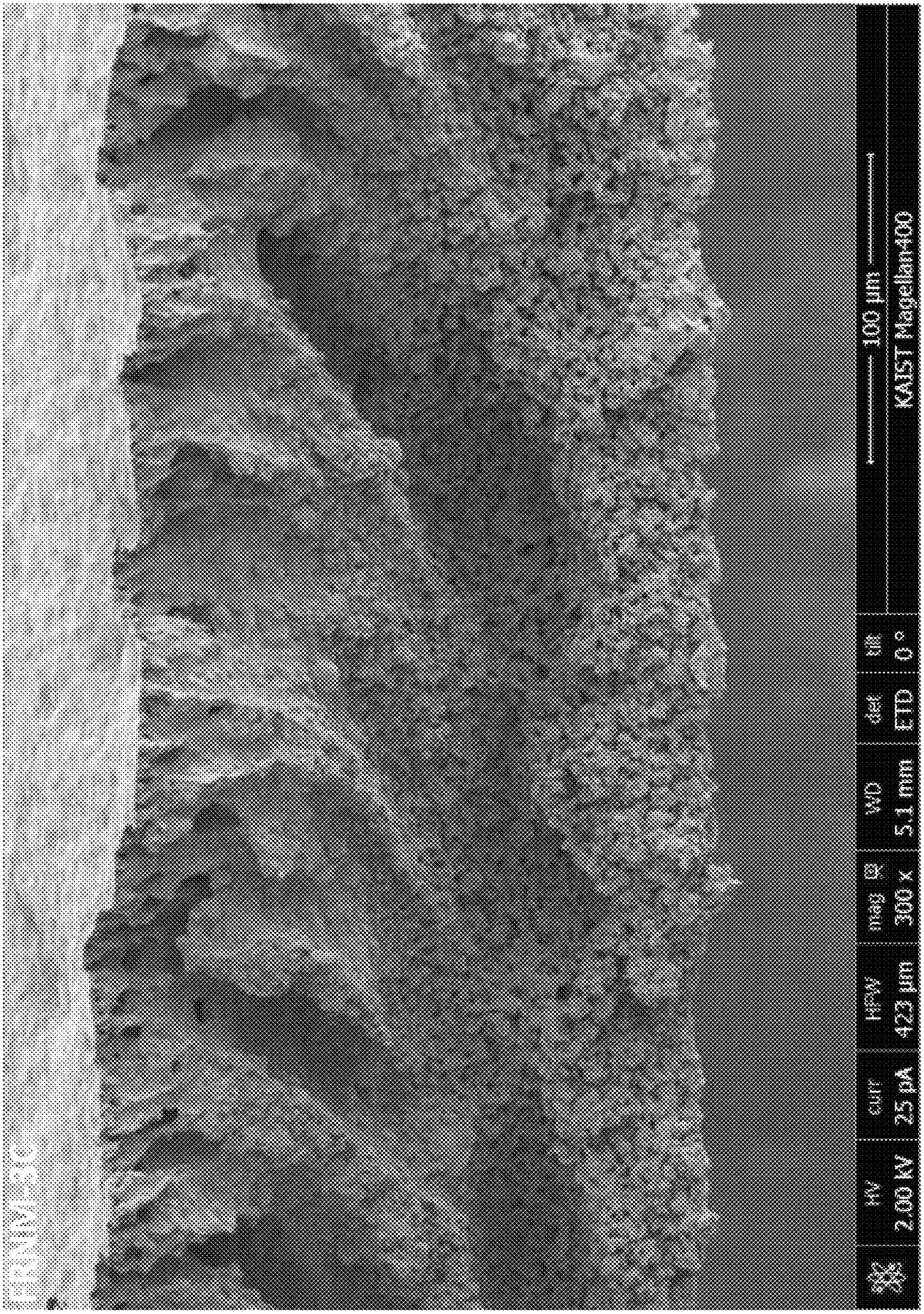
Figure 14H:
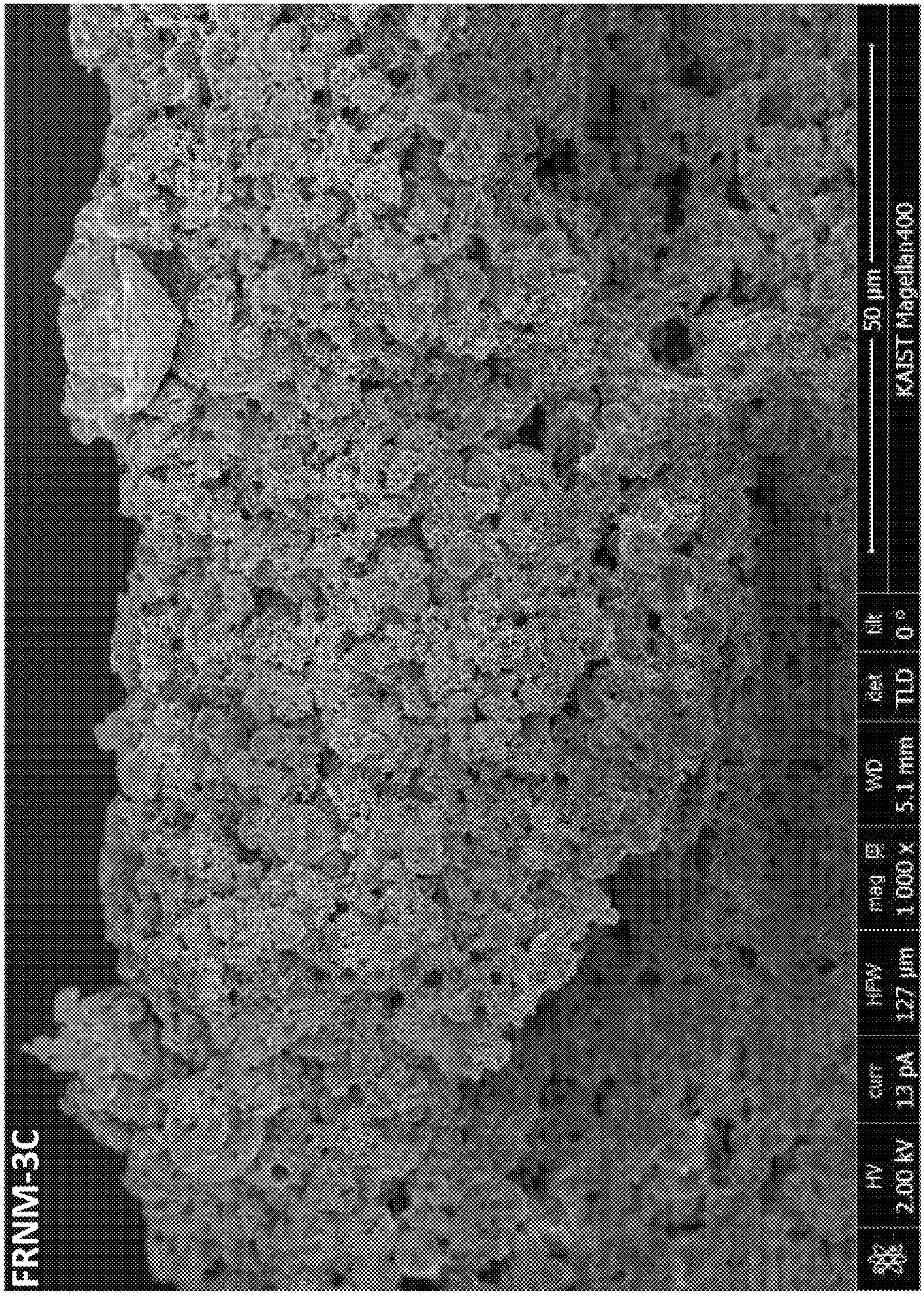
Figure 14I:
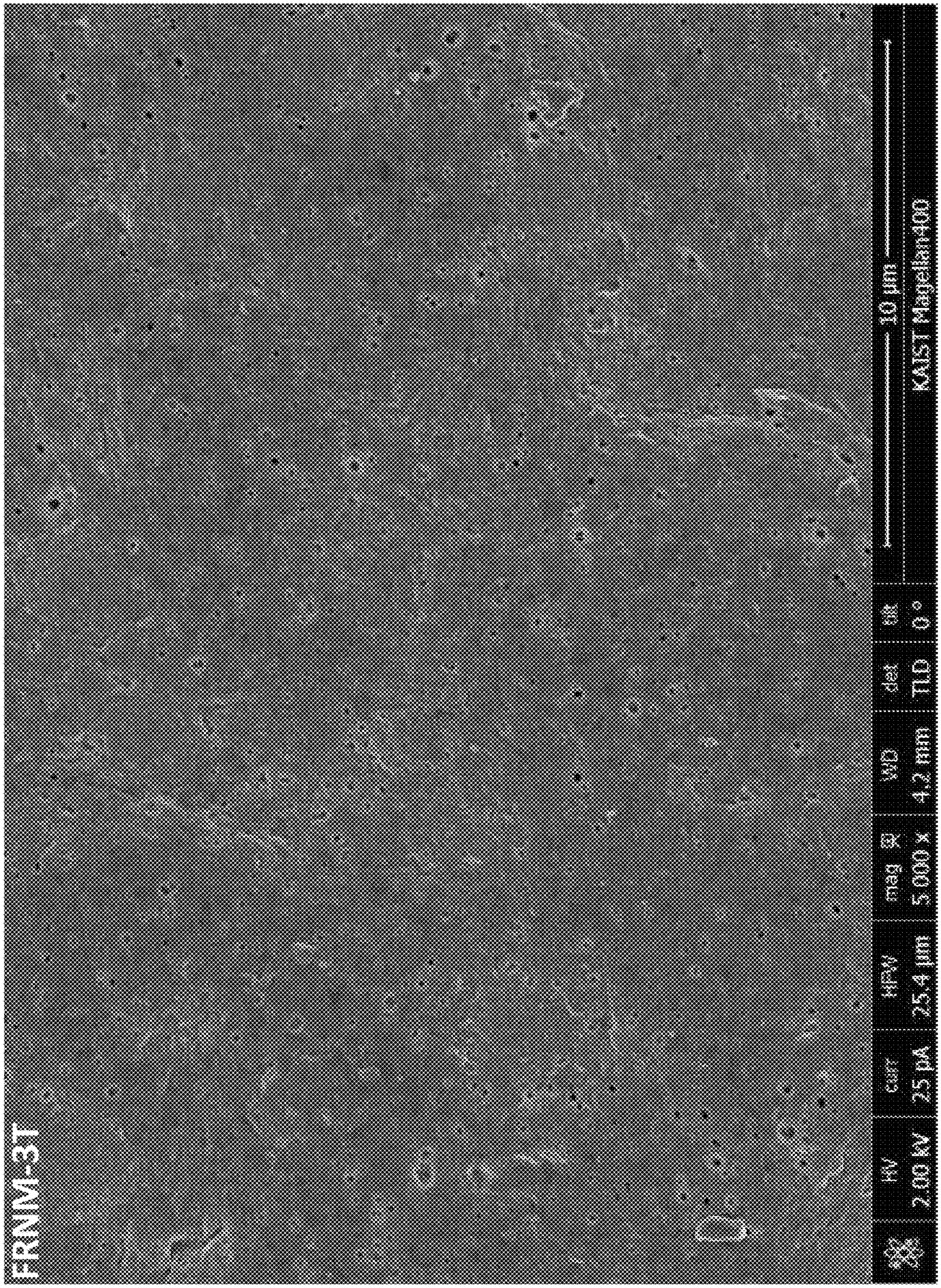
Figure 15A:
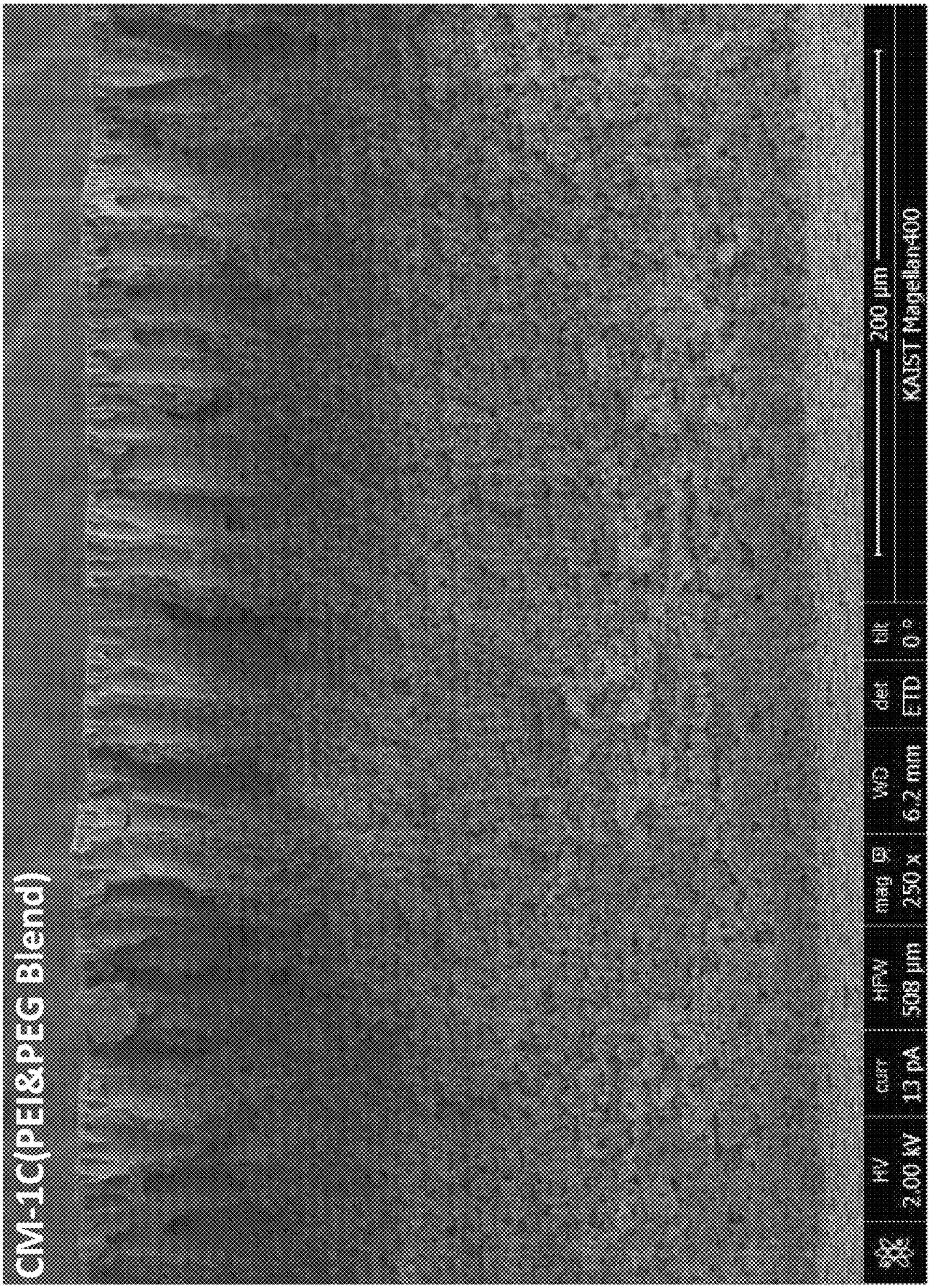
FIGS. 15A-I show representative FESEM images showing cross section and top morphology of control PVDF membranes with PEI&PEG blend, PEG blend and PEI blend.
Figure 15B:
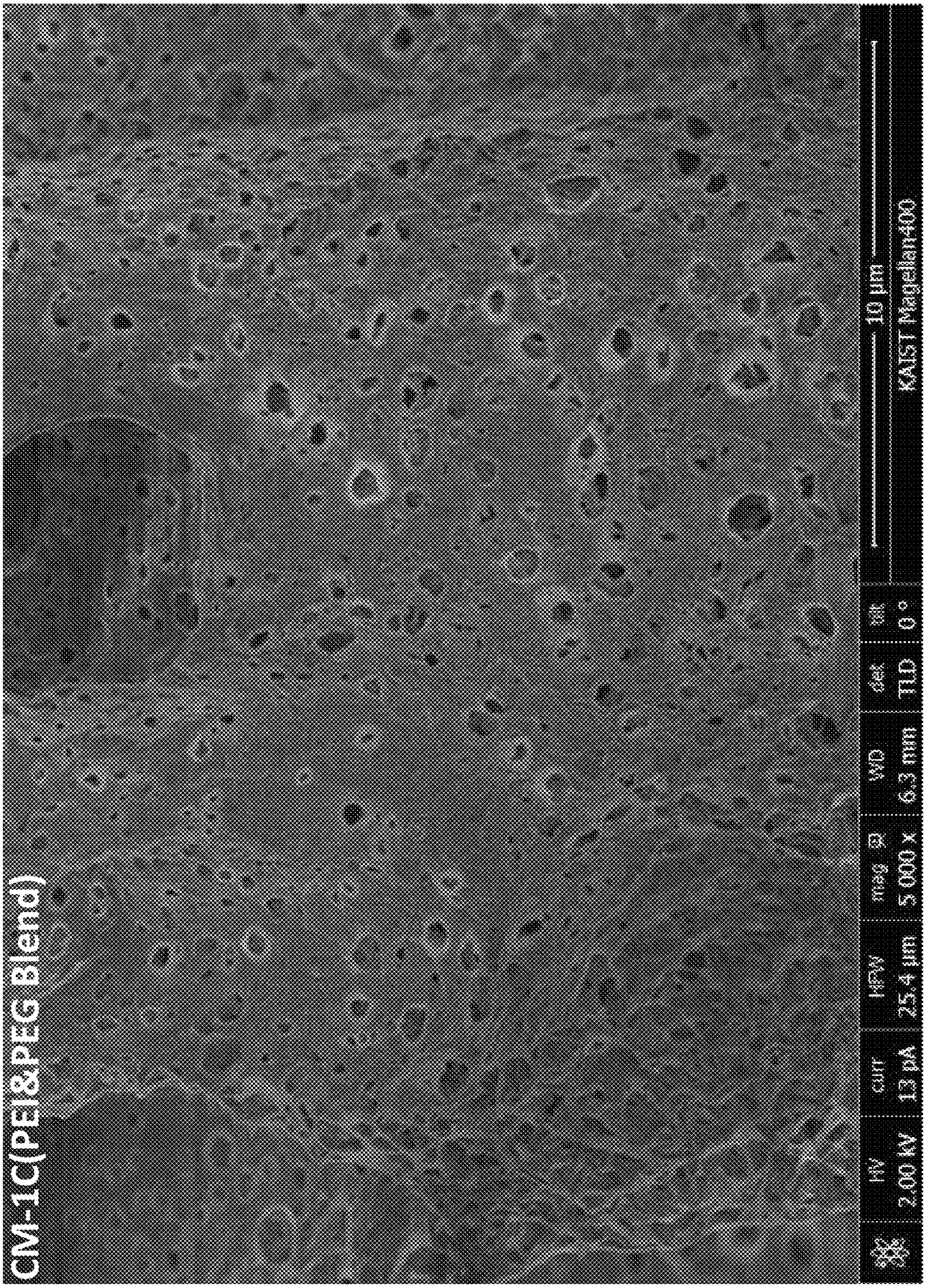
Figure 15C:
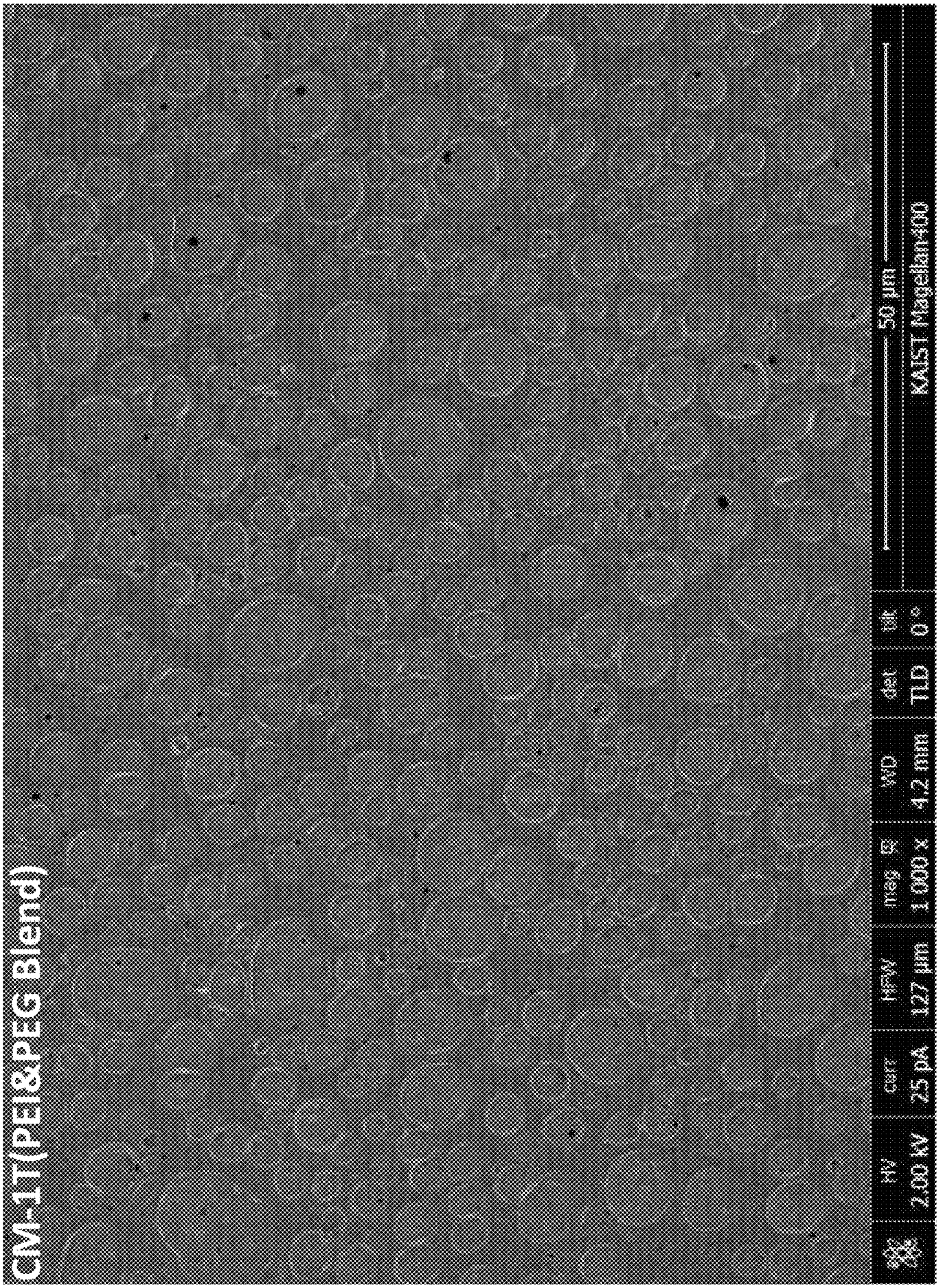
Figure 15D:
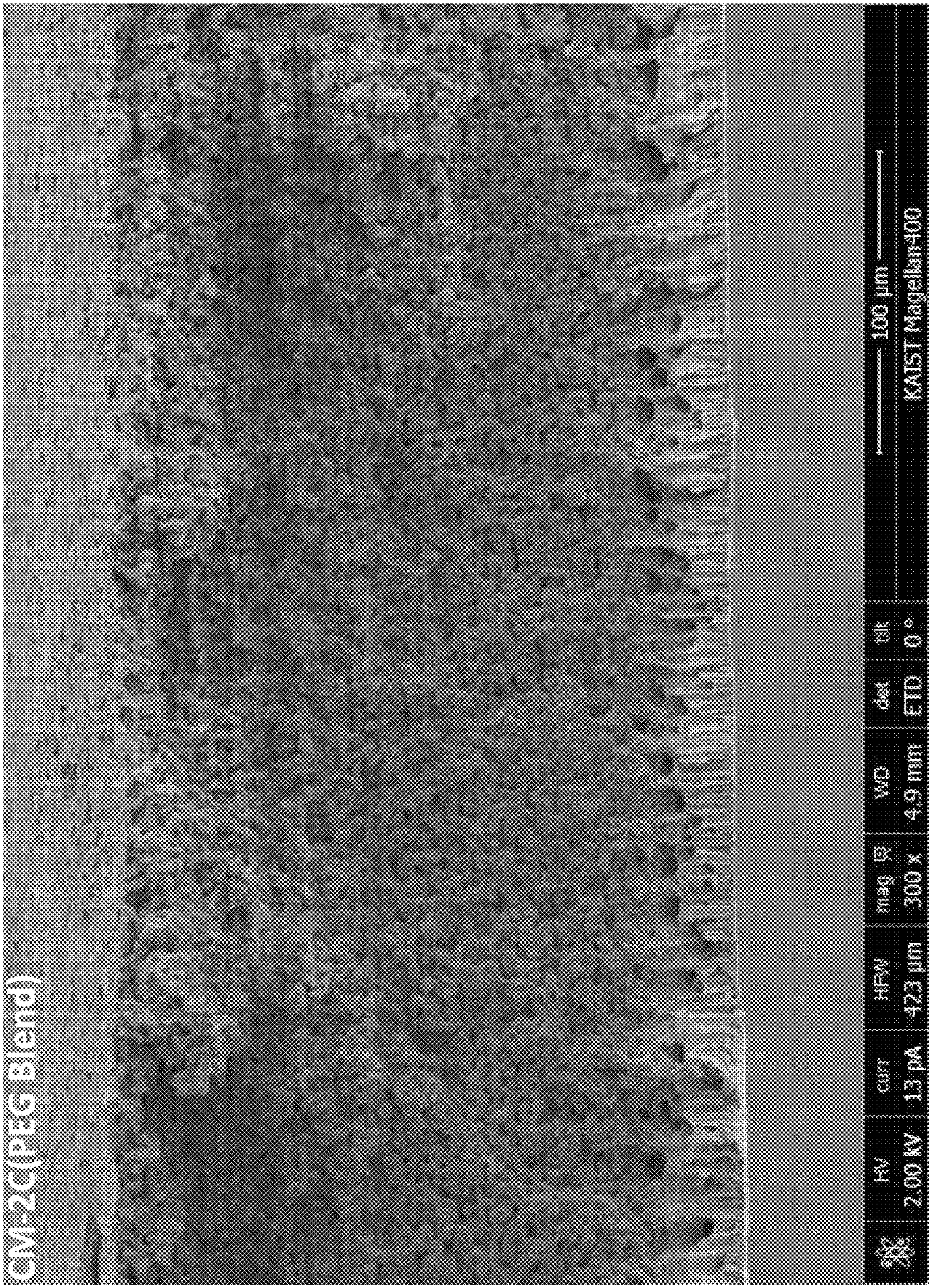
Figure 15E:
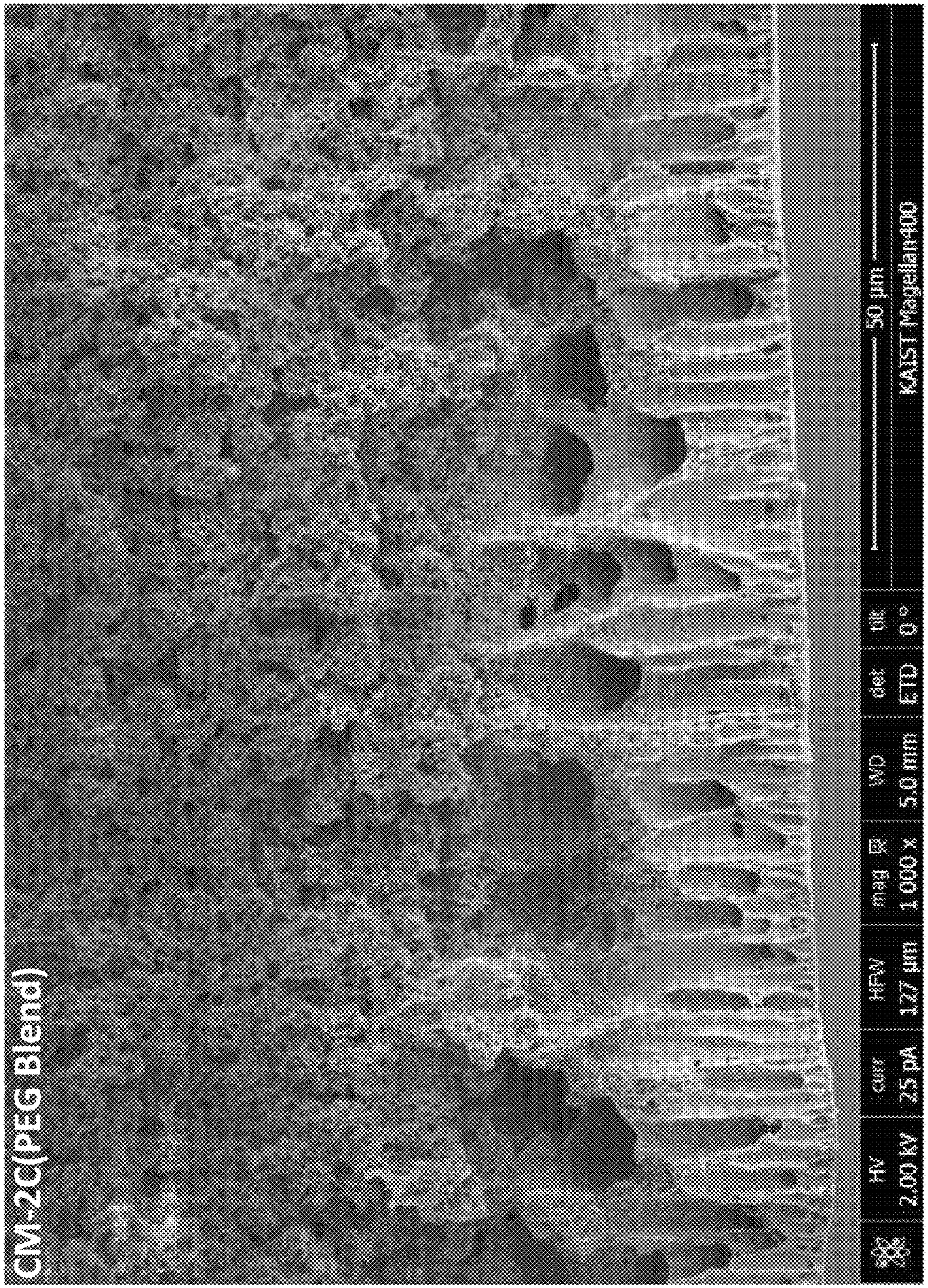
Figure 15F:
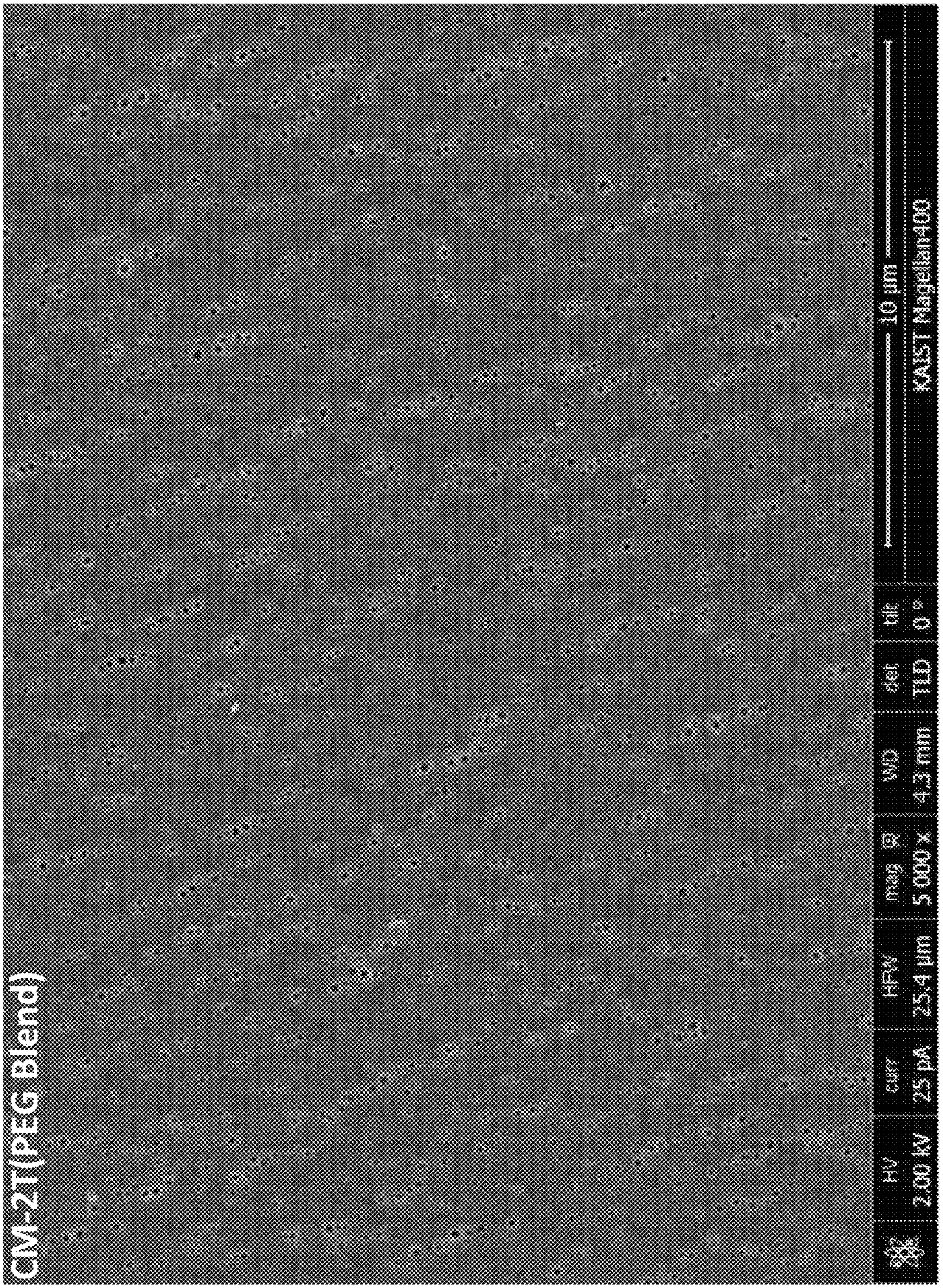
Figure 15G:
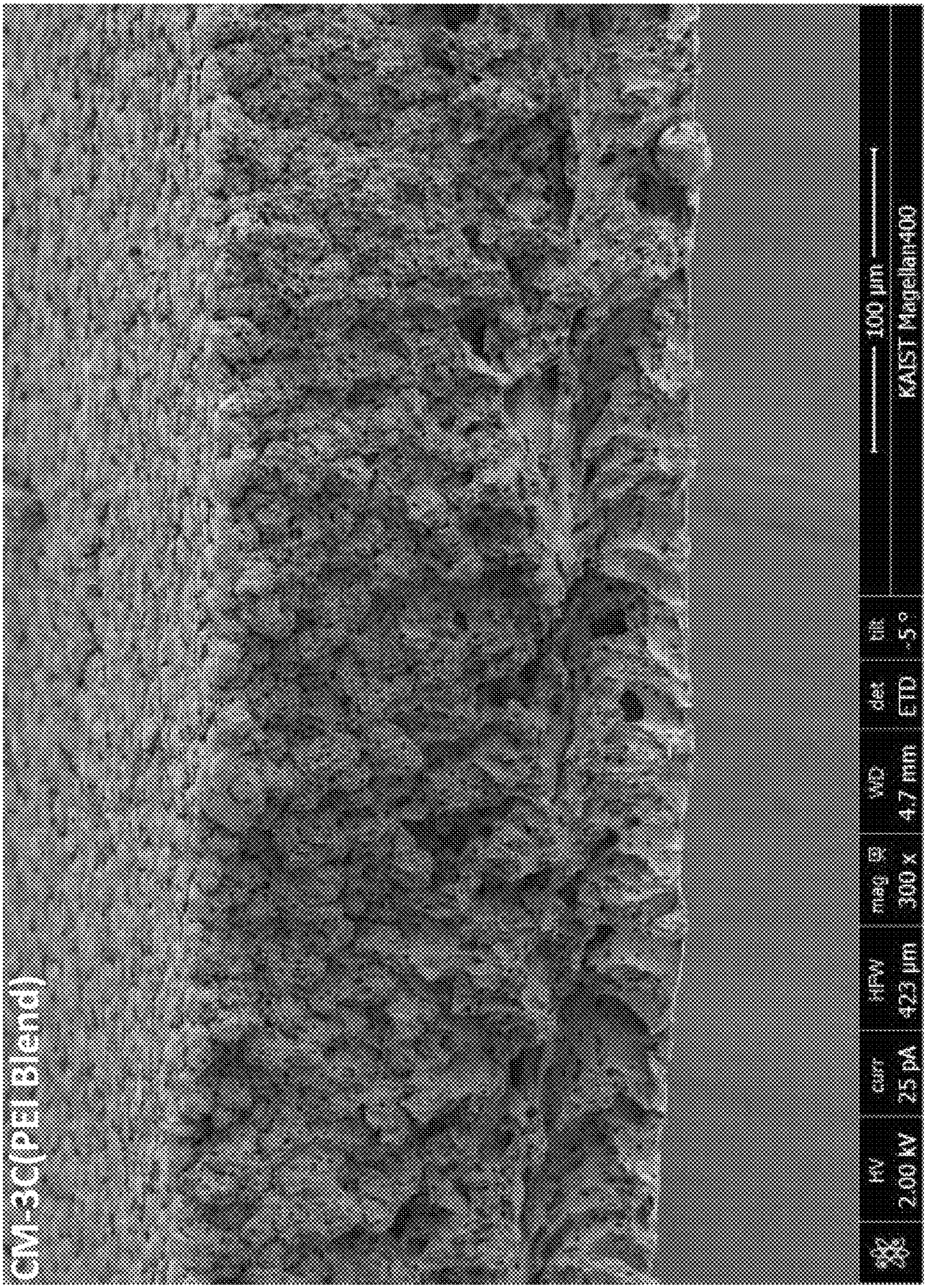
Figure 15H:
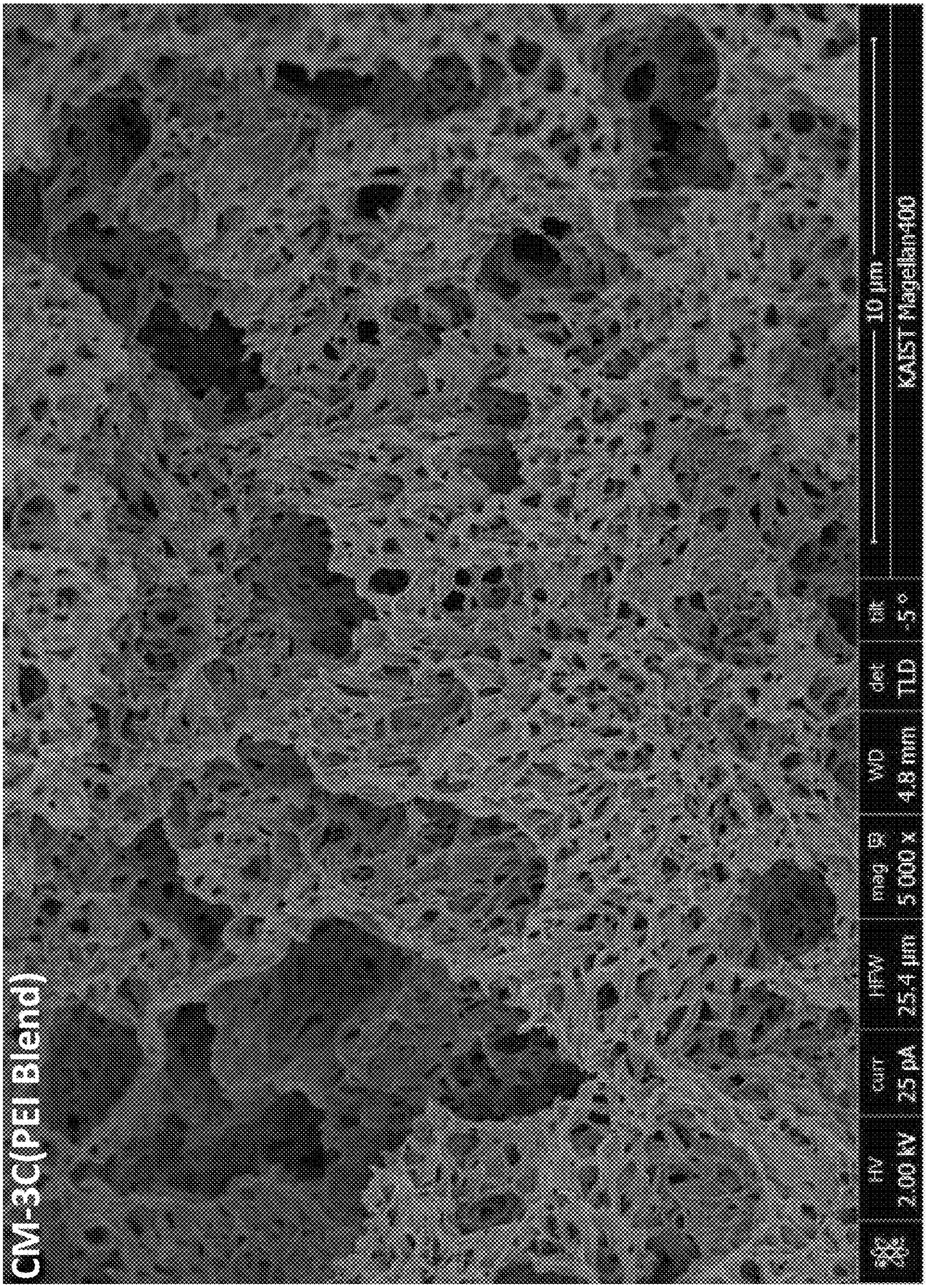
Figure 15I:
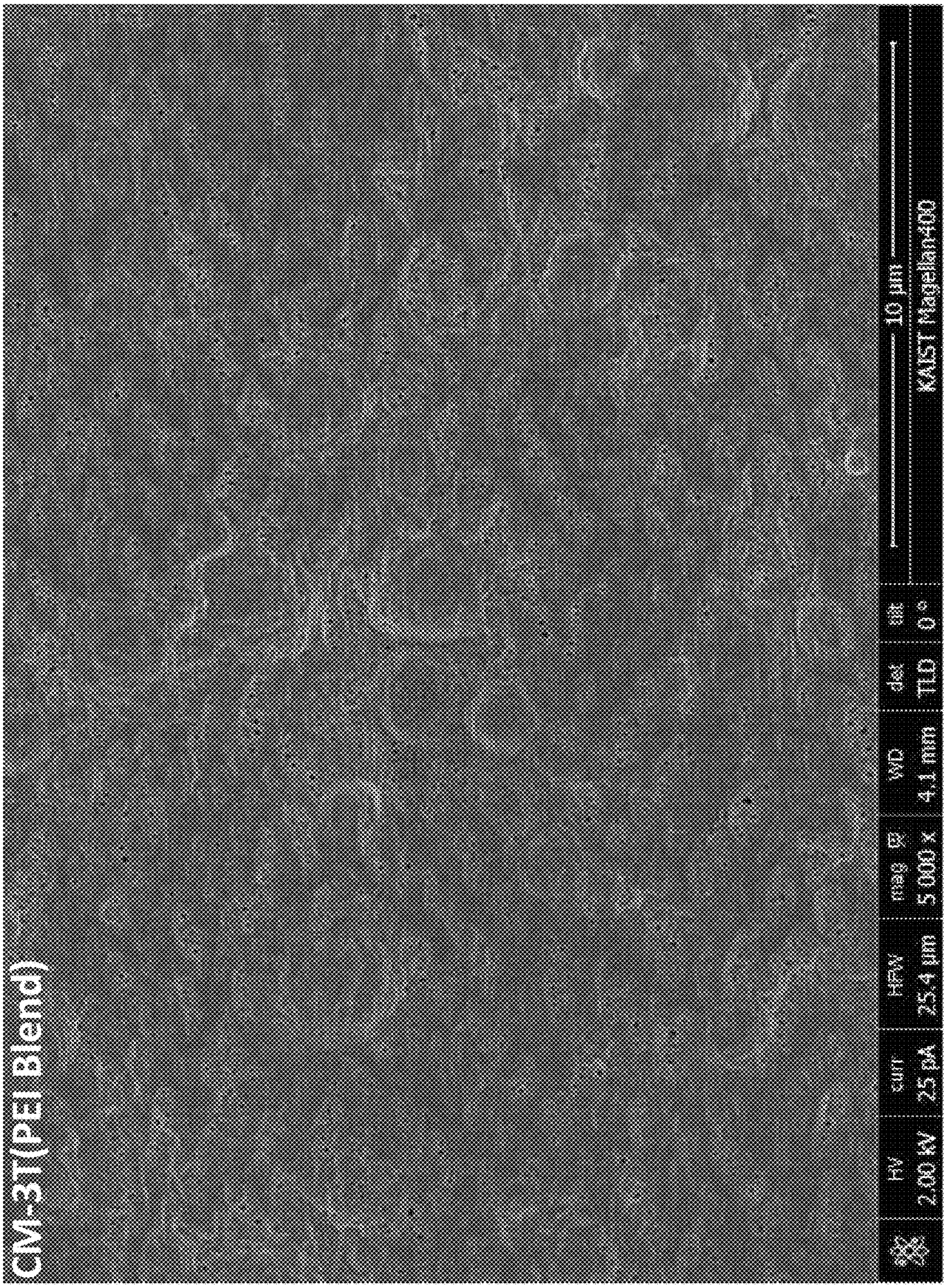
Figure 16A:
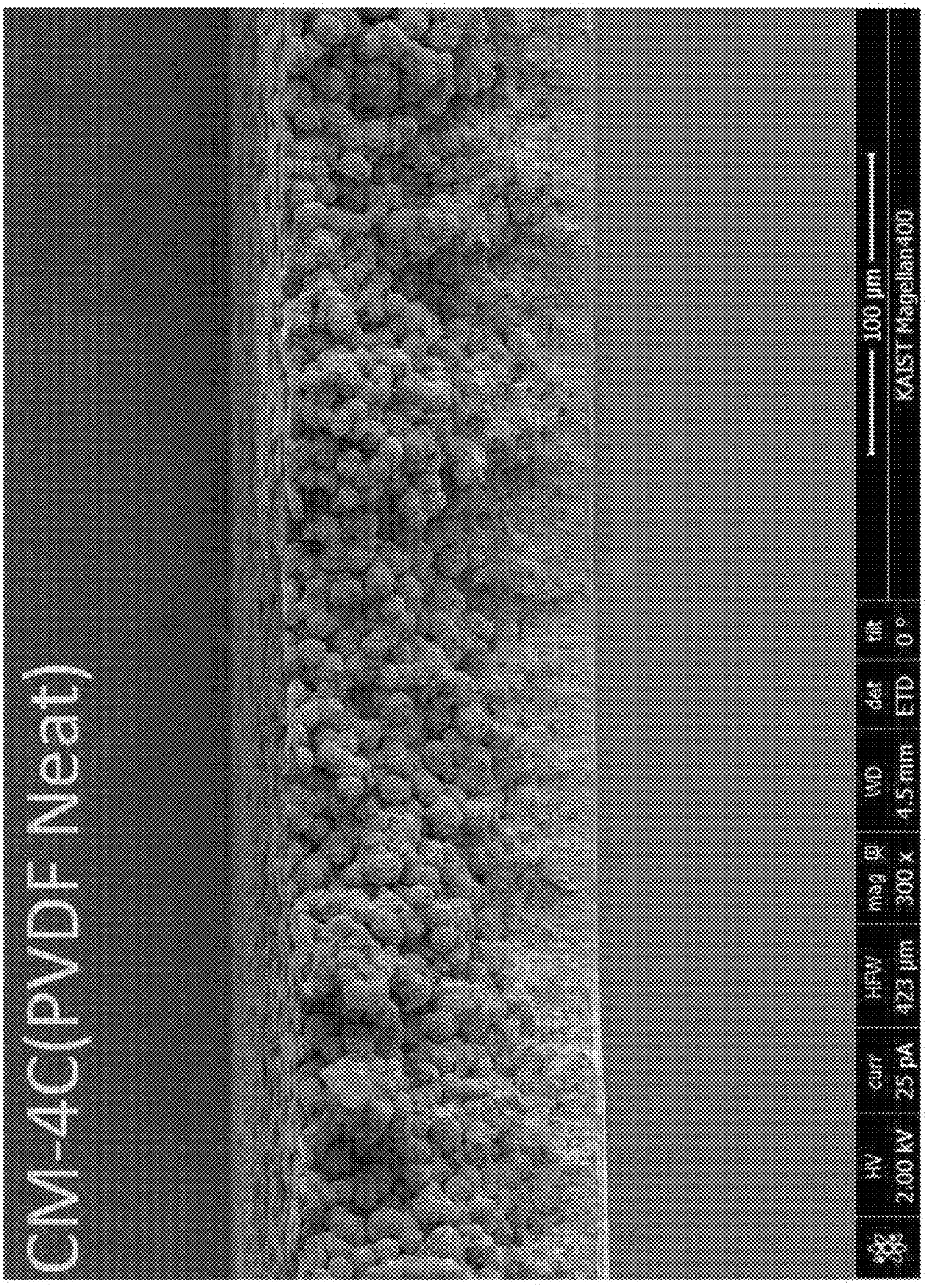
FIGS. 16A-D show representative FESEM images showing cross section and top morphology of control neat PVDF membrane.
Figure 16B:
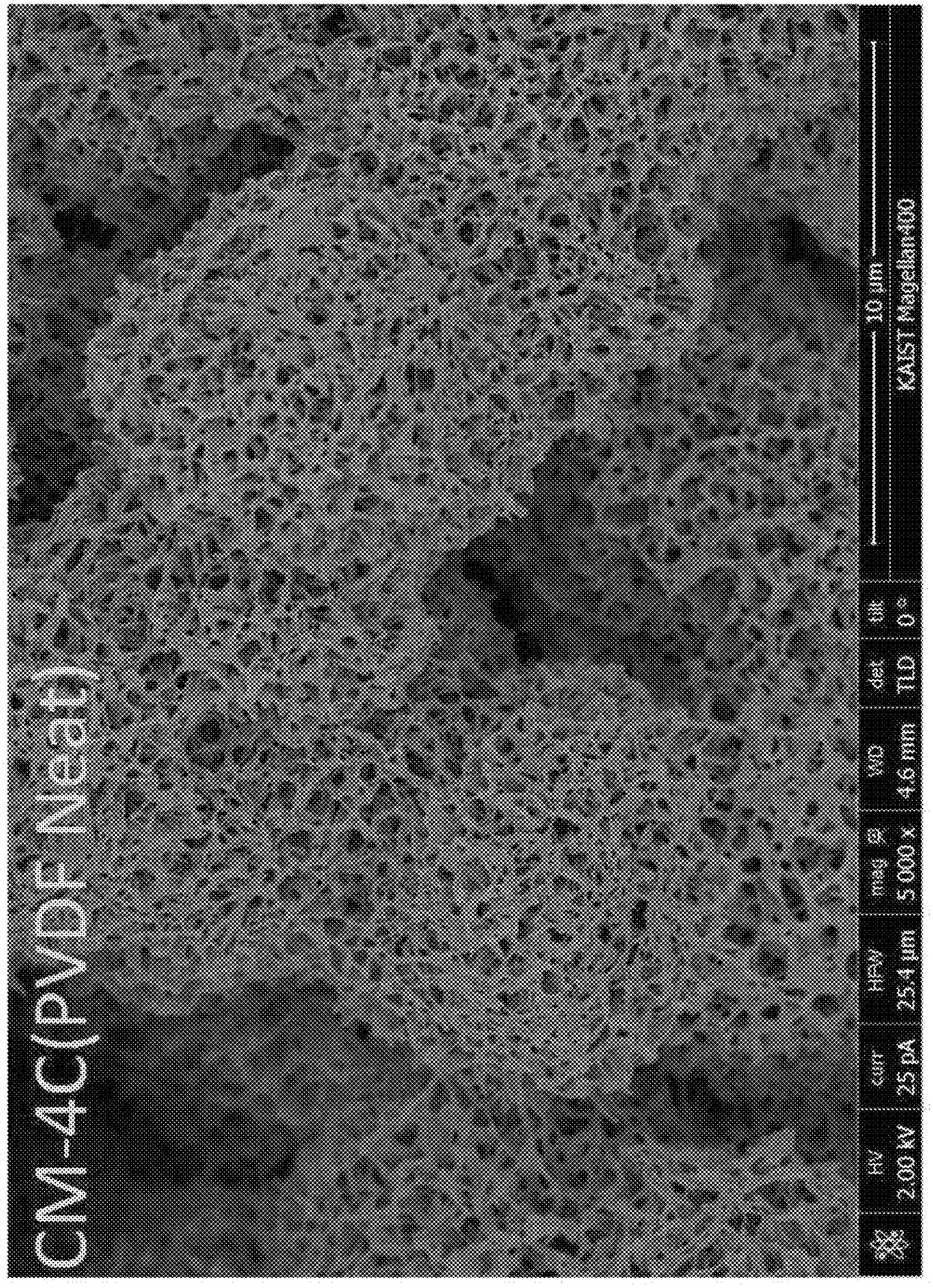
Figure 16C:
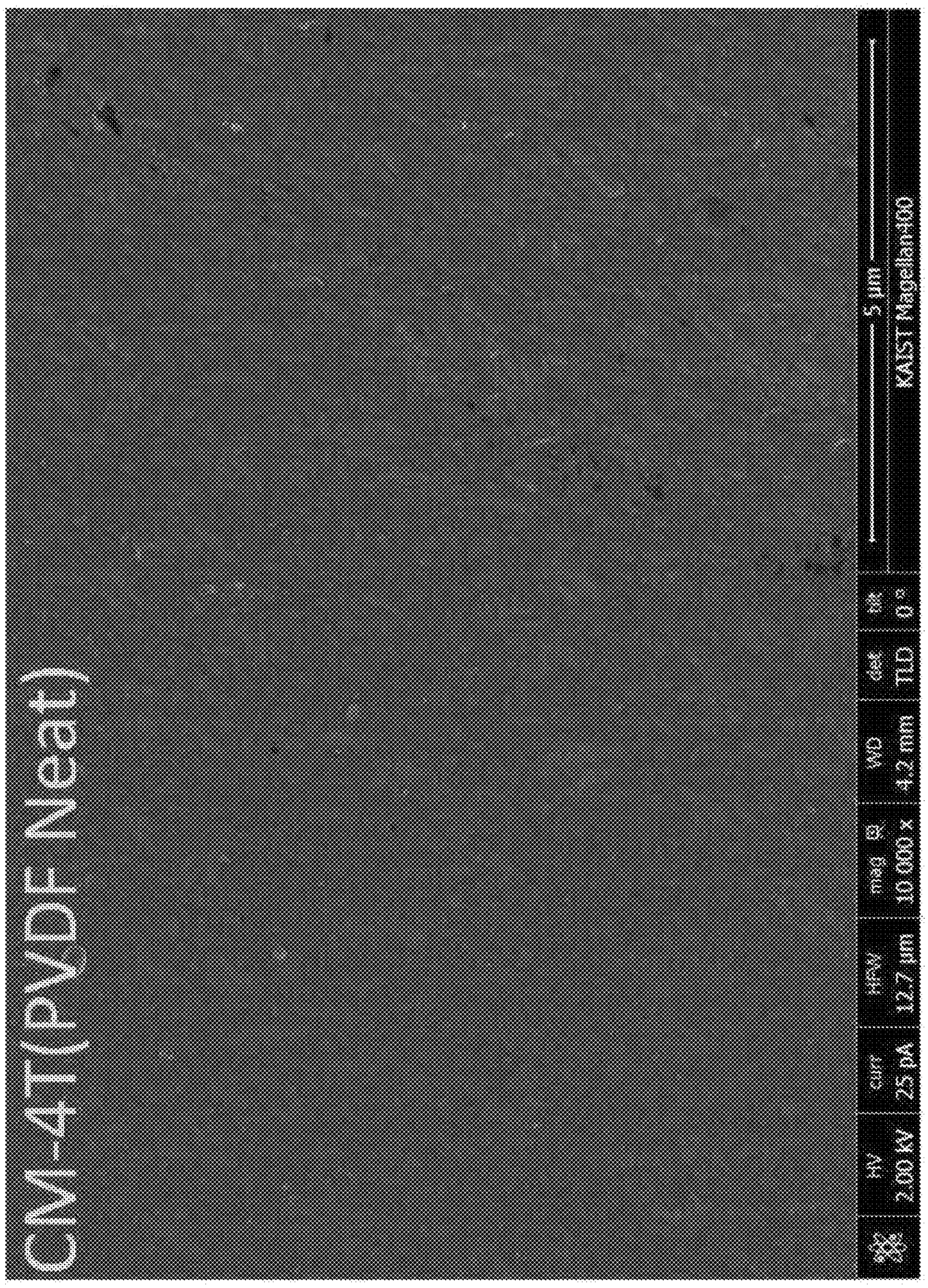
Figure 16D:
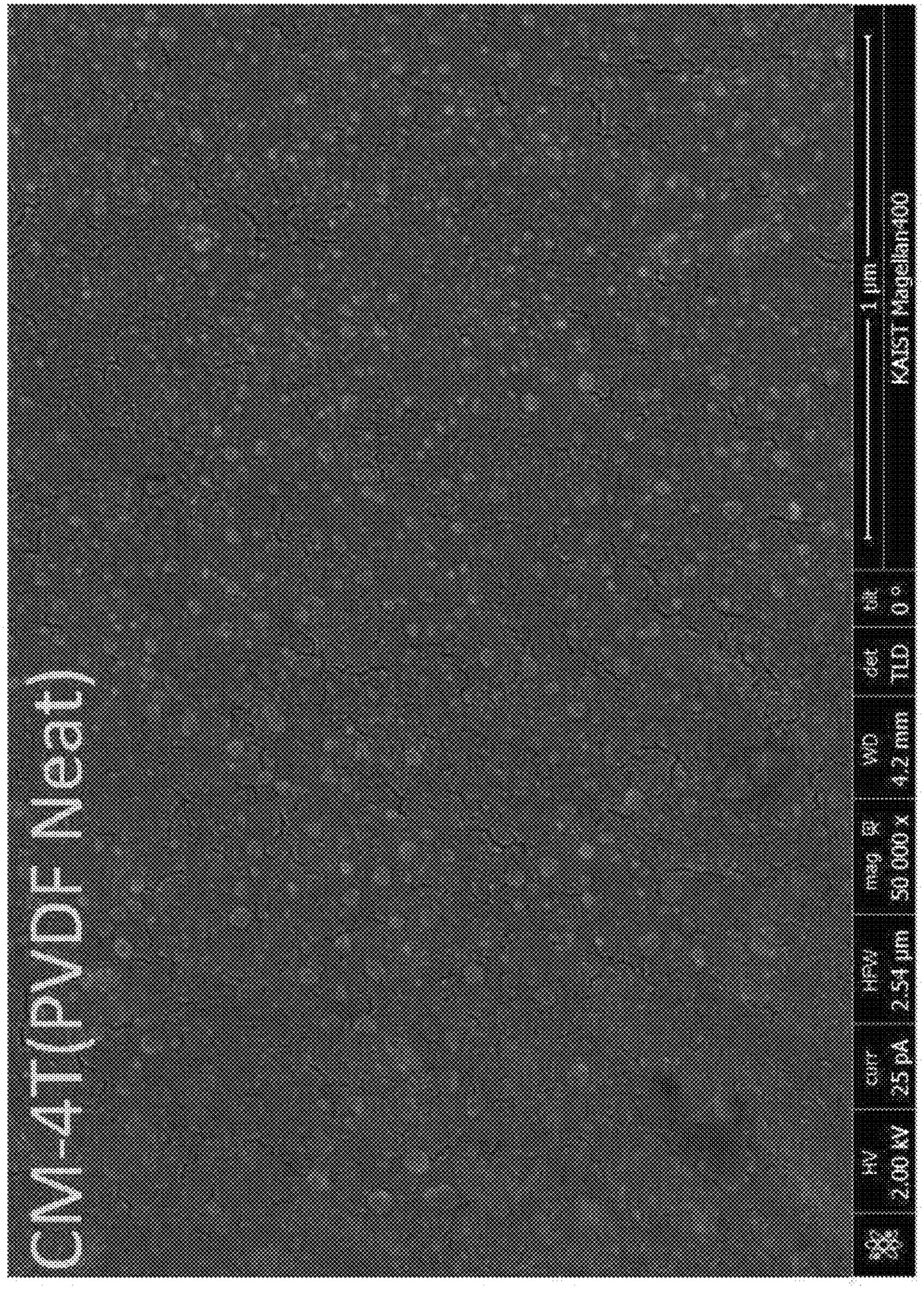

In case, of membranes NSM-1, NSM2 and NSM-3 the wettability of nanocomposite membranes was obtained by contact angle measurements in comparison with their related control PVDF-1 and PVDF-2 as described in related application U.S. Ser. No. 13/754,883 published as US20130213881 and illustrated in FIG. 12. The lowest contact angle of 36°±1.8° was observed at initial time of 30 s for a control membrane PVDF-1 and the highest value 90°±2.1° for a control membrane PVDF-2. The high hydrophilicity of PVDF-1 membrane was due to the porosity rather than the chemical modification of PVDF (FIG. 8 of related application U.S. Ser. No. 13/754,883 published as US20130213881). In the case of PVDF-2, there is no significant change in contact angle with drop ageing (120 s) suggests that the surface is completely hydrophobic in nature. The nanocomposite membranes embedded with PEI particles shows substantial lower contact angle yet not much change in porous structure (FIG. 7 of related application U.S. Ser. No. 13/754,883 published as US20130213881). FIG. 12 further shows a gradual increase in contact angle with increase in concentration of PEI particles in the membrane matrix. This suggests that the membranes are tightly packed with particles and free from voids and defects. Meanwhile, the membrane with highest PEI particle concentration (NSM-3) shows initial contact angle of 51°±1.5° and decreased significantly with drop ageing (120 s) to 43°±1.2°. In this work, there are two major factors determining the decrease in contact angle, including the hydrophilicity and porosity of the membrane surface. Despite the more porous top surface which could accelerate the penetration of water droplets due to capillary effects [41], control membranes PVDF-1 and PVDF-2 exhibits a stable contact angle. Therefore, the significant decrease in contact angle for NSM-3 was mainly caused by its hydrophilicity endowed by in situ generated PEI micro/nanoparticles.

The contact angle of PPNM series membranes from PPNM-1 to PPPNM-3 decreased with increase in PEGylated PEI particle concentration in contrast to the NSM series membranes where the contact angle was increased with PEI particle concentration. This endows the effect of PEGylation of PEI particles on hydrophilicity/wettability of the functionalized mixed matrix membranes. Thus in case of PPNM series membranes the PEGylation of mixed matrix membranes further shows the improvement in DI water permeation flux.

Example 9: Determination of Surface Charge of Membranes

The surface charge of the mixed matrix membranes PPNM-1, PPNM-2 and PPNM-3 of Example 4 was also analyzed by measurement of Zeta potential.

In particular, the zeta potential (surface charge) of each membrane was determined by streaming potential measurements using a SurPASS electrokinetic analyzer (Anton Parr GmbH, Austria) as described by Kotte et al. [33]

The zeta potential (ZP) of each mixed matrix PVDF membrane is shown as a function of pH in FIG. 10B. At pH 7.0, the ZP of the PPNM-2 membrane is almost neutral (~2 mV). In contrast, the commercial and surface coated PVDF membranes exhibit negative surface charges with ZP values at neutral pH ranging from −9.5 mV to −70.0 mV (Table 8). Again, we attribute this trend to the presence of PEGylated PEI particles with high density of —OH groups at the surface of our MMMs.

Figure 11:
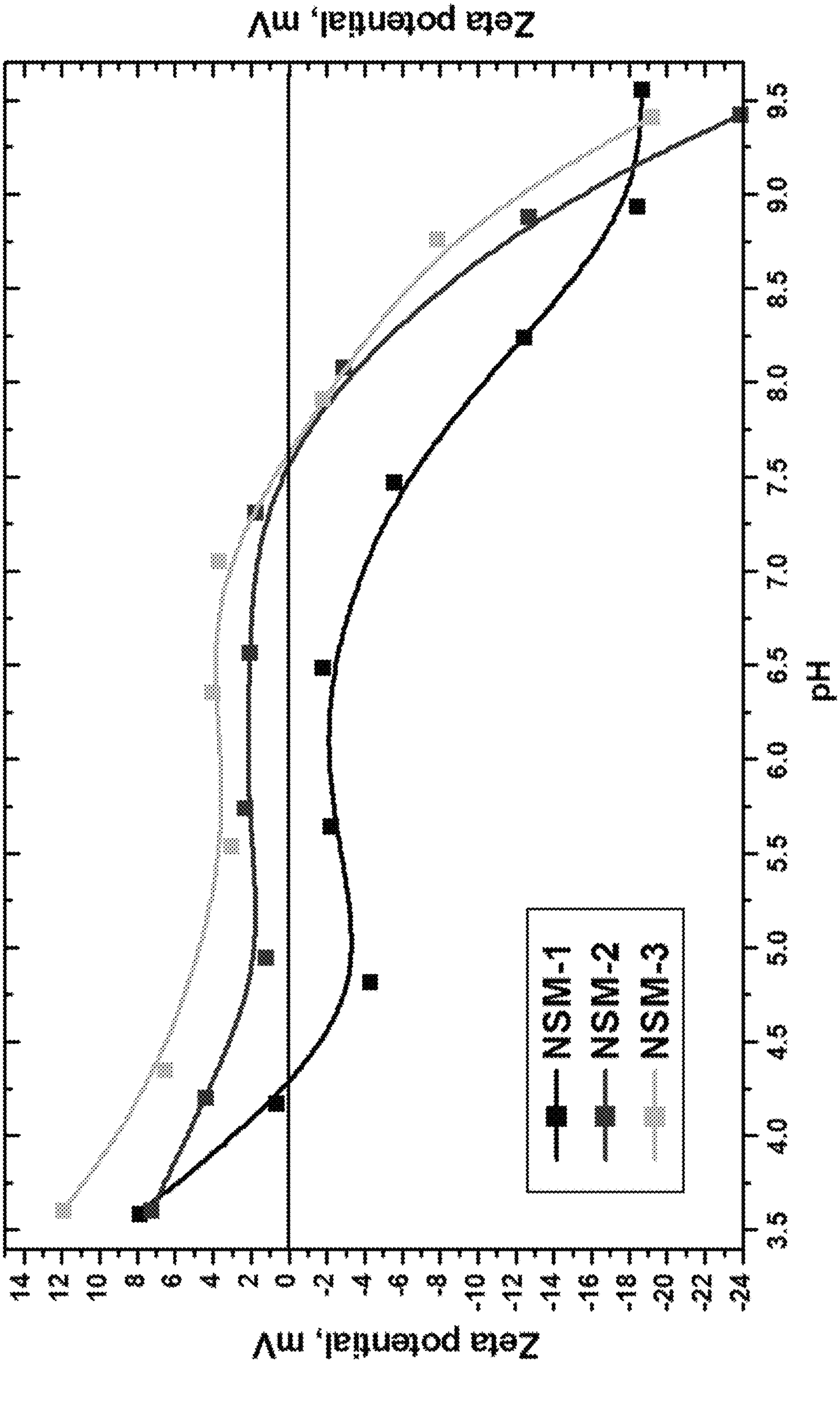
FIG. 11 shows Zeta potential measurements of membranes NSM-1, NSM-2 and NSM-3 described in related application U.S. Ser. No. 13/754,883 published as US20130213881 at pH ranging from 3.5 to 9.5 by electrophoresis method.

In comparison, the Zeta potential of membranes NSM-1, NSM2 and NSM-3 of Example 2 was determined using the electrophoresis method [42] as described in related application U.S. Ser. No. 13/754,883 published as US20130213881. The results for the membranes NSM-1, NSM-2 and NSM-3 are illustrated in FIG. 11.

The surface charge of the membranes is especially useful for separation of charged bio molecules like bovine serum albumin (BSA) and human serum albumin (HSA). At the same time the surface charge plays a major role in designing fouling resistant membranes, in the present description herein we show PPNM and FRNM series membranes are superior fouling resistant membranes because of their neutral surface charge due to the PEGylated PEI particles. Whereas, the NSM series membranes shows weak base membrane absorbers because of their positive surface charge which are useful for the separation of biomolecules Example 10: Water and Microalgae Filtration Experiments Water and microalgae filtration experiments were carried out on a custom-made cross-flow filtration system with an effective membrane area of 14 $cm^2$ of the membranes of Example 4 and real-time permeate flux measurement capability. [18]

In particular a suspension of *Chlorella* sp. KR-1 (1.2-1.4 g of dry biomass per liter) was used as model microalgae culture medium [43]. The algae suspension was cultivated at the Korea Institute of Energy Research (KIER) using the procedures described by Lee et al. [43]. It was collected during the stationary growth phase after 7 days of cultivation [43]. The microalgae were imaged using an optical microscope (Axio Imager A2, Carl Zeiss, Germany) with a magnification of 1000×. The particle size distribution (PSD) and zeta potential of the *Chlorella* sp. KR-1 suspension were measured using an ELS-Z2 electrophoretic light scattering spectrophotometer (Otsuka Electronics, Japan) [44]. All chemicals and materials were utilized as received. All aqueous solutions were prepared using Milli-Q deionized water (DIW) with a resistivity of 18.2 MΩcm and total organic content<5 ppb.

With reference to the microalgae filtration experiments, during each filtration run, one liter (1.0 L) of algal suspension (1.2-1.4 g/L in dry biomass) was circulated at a constant flow rate of 4.5 L/min with a cross-flow velocity of 1 m/s. Each microalgae filtration experiment was carried out in six steps as listed in Table 10. Each membrane was first compacted for 1 hour at a pressure of 3 bar using DIW. Following this, the flux of DIW through each membrane was recorded at 2 bar for 1 hour. This was followed by two hours of microalgae filtration at a pressure of 2 bar. After the completion of the first microalgae filtration cycle, each membrane was soaked in a vial containing 500 mL of DIW and stirred at 300 rpm for 1 hour. Following cleaning, each membrane was subjected to a second DIW filtration cycle (1 hour and 2 bar) followed by a second microalgae filtration for 2 hours at 2 bar.

During each filtration run, the mass of permeate was measured continuously and used to determine the corresponding permeate flux for each membrane. During each microalgae filtration experiment, the optical density (OD) of aliquots (10 mL) of permeate were also measured every 30 minutes using a UV-VIS spectrophotometer (Hach, DR-5000) at a wavelength of at 660 nm. 18 Microalgae retention ($R_{algae}$) was estimated as given below:

$$R_{algae} = 1 - \frac{OD_{permeate}^{660\,nm}}{OD_{feed}^{660\,nm}} \times 100$$

where $OD_{feed}^{660nm}$ is the optical density of the microalgae feed suspension.

TABLE 10

| Cycle-1 | Cycle-2 |
|---|---|
| Ran 1: DIW Filtration (Compaction)<br>Feed: DI water;<br>pH: 6.0<br>Pressure: 3 Bar<br>Compaction time: 60 min | Run 4: Membrane Cleaning<br>Each membrane was soaked in a vial containing 500 mL of DIW and stirred at 300 rpm.<br>Cleaning time: 60 min. |
| Run 2: DIW Filtration<br>Feed: DI water; pH: 6.0<br>Pressure: 2 Bar<br>Run time: 60 min | Run 5: DIW Filtration<br>Feed: DI water: pH: 6.0<br>Pressure: 2 Bar<br>Run time: 60 min |
| Run 3: Microalgae Filtration<br>Concentration: 1.2-1.4 g/L<br>pH: 6.50<br>Run time: 120 min<br>Pressure: 2 Bar | Run 6: Micro algae Filtration<br>Concentration: 1.2-1.4 g/L<br>pH: 6.50<br>Run time: 120 min<br>Pressure: 2 .Bar |

Figure 5A:
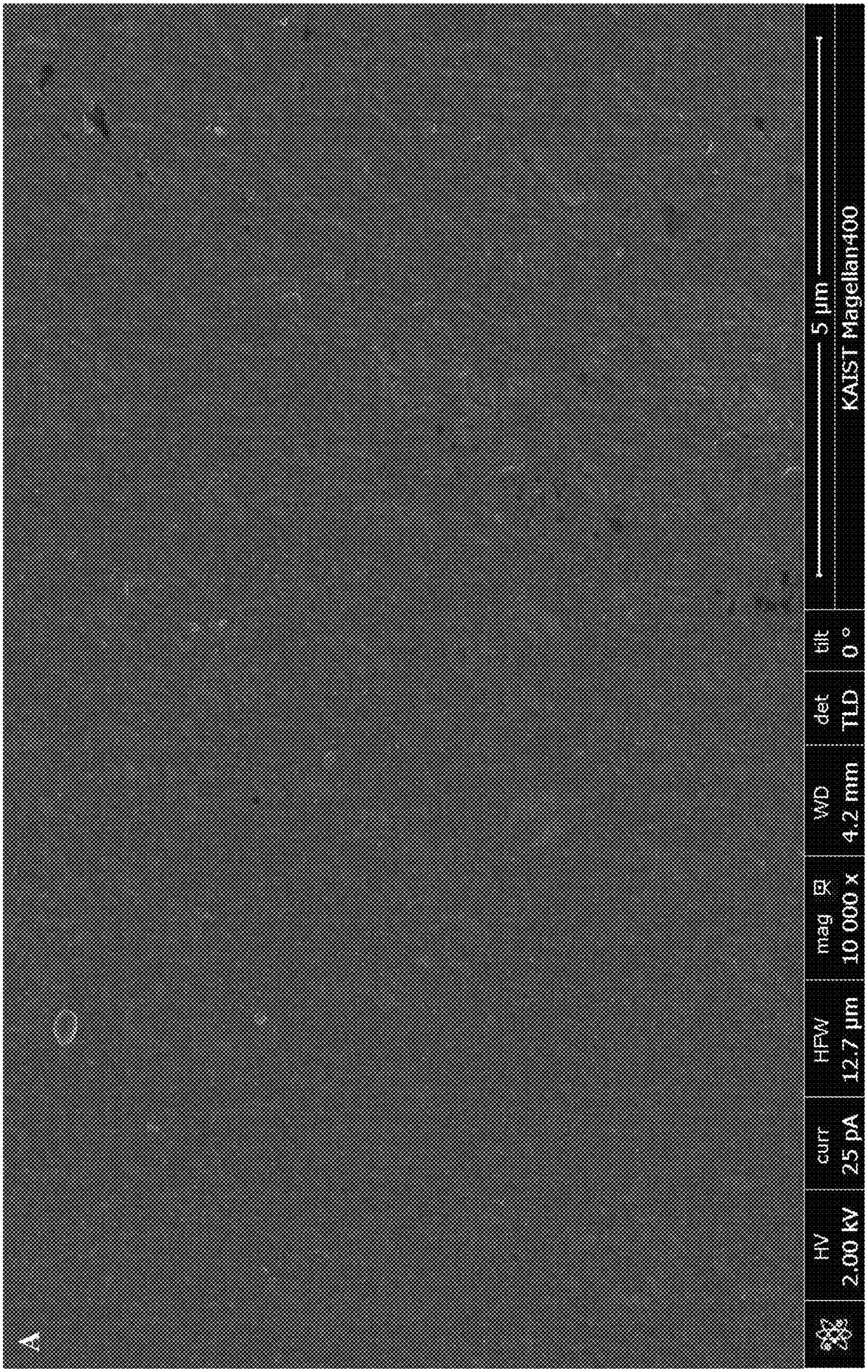
FIGS. 5A-H show representative FESEM images showing top morphology of control PVDF membrane and mixed matrix PVDF membranes with in situ synthesized and PEGylated PEI particles.
Figure 5B:
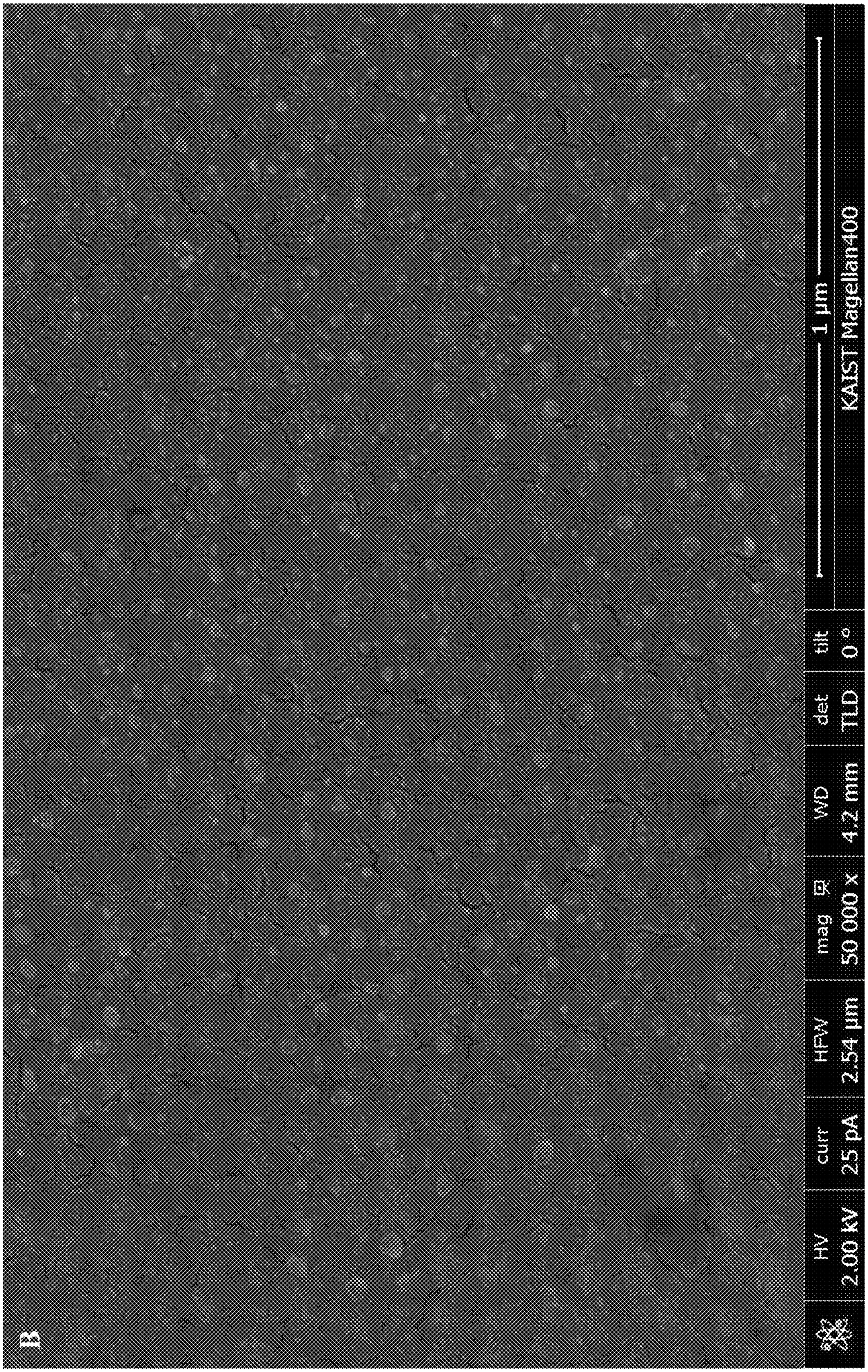
Figure 5C:
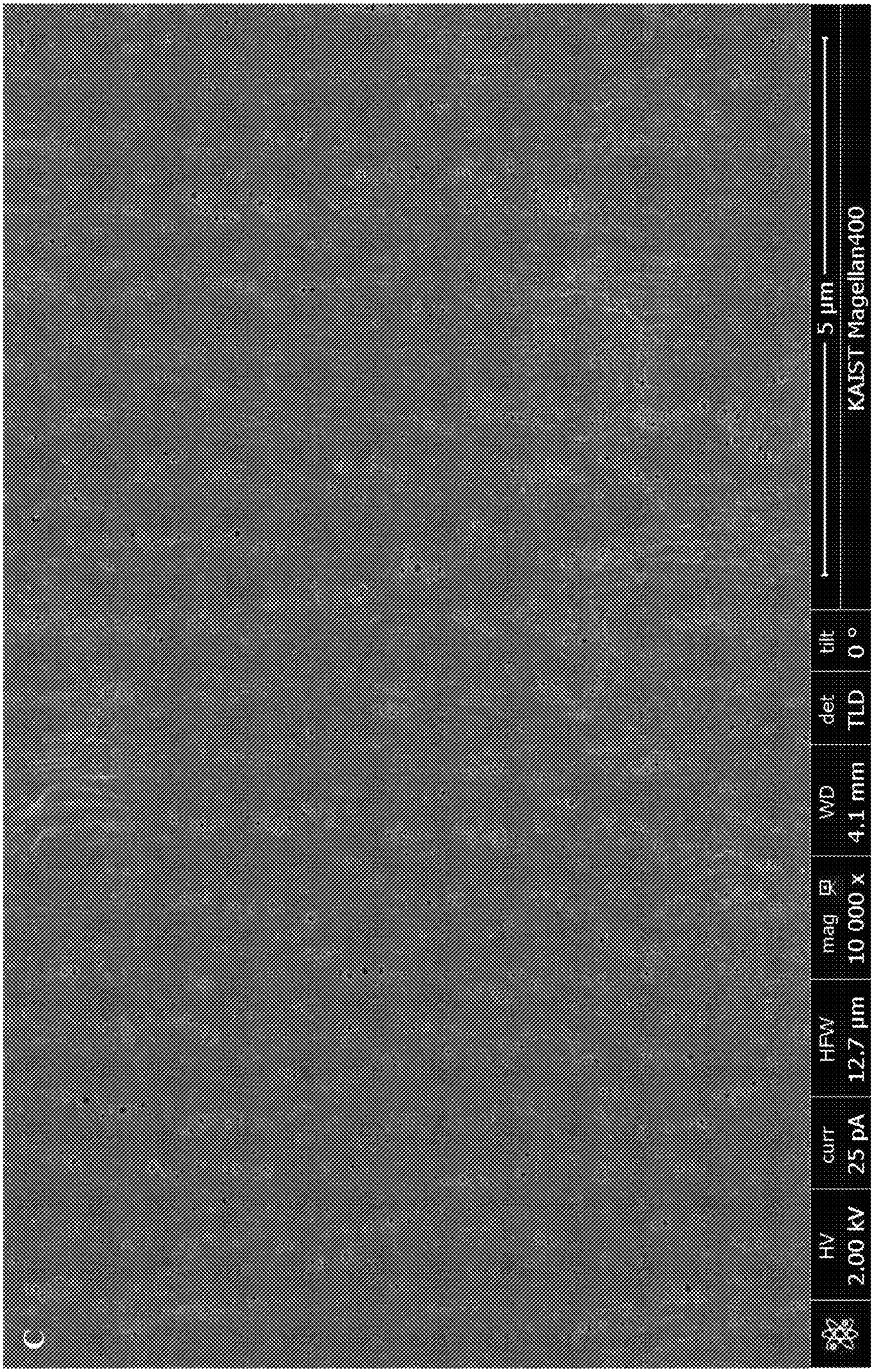
Figure 5D:
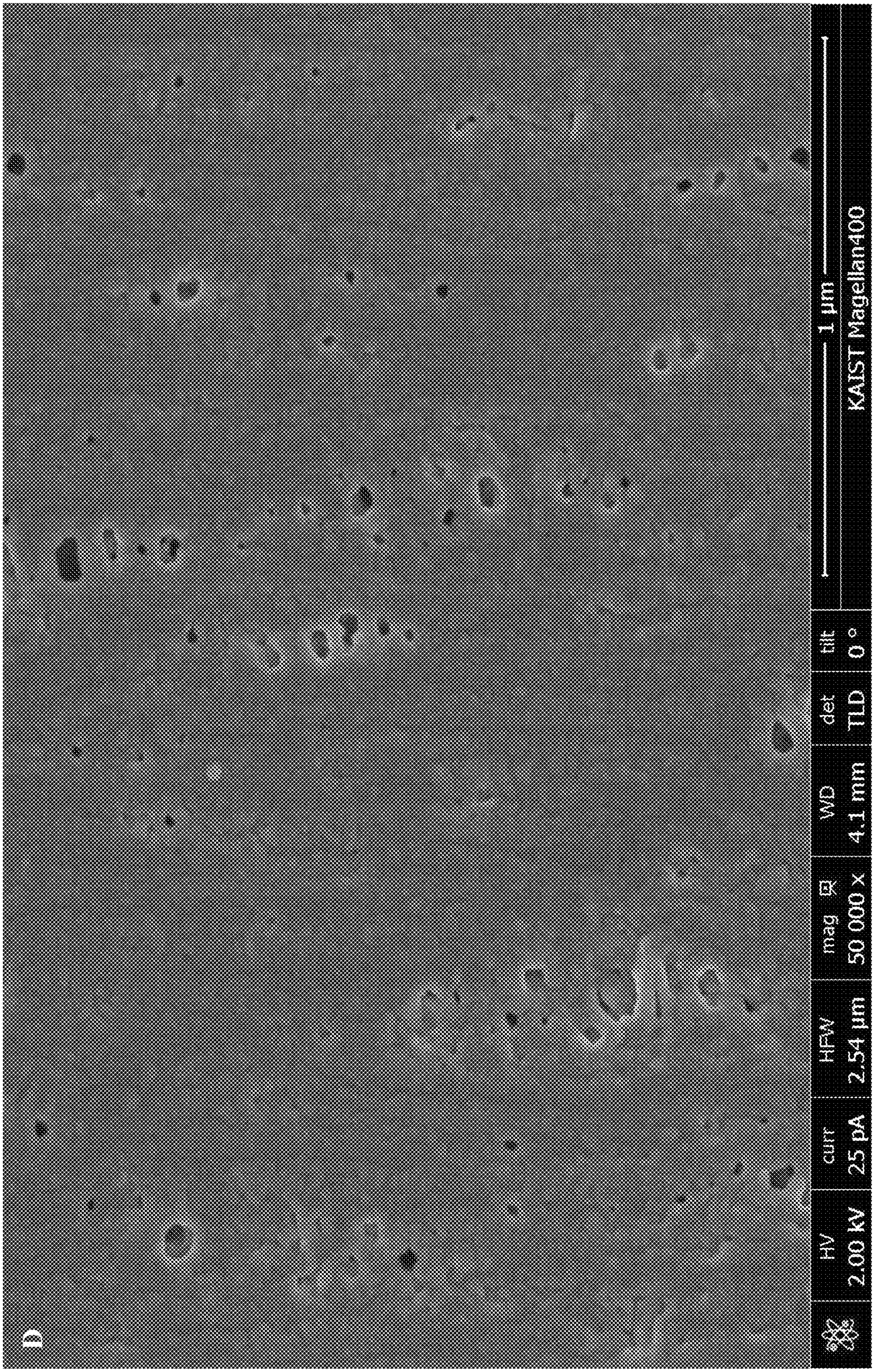
Figure 5E:
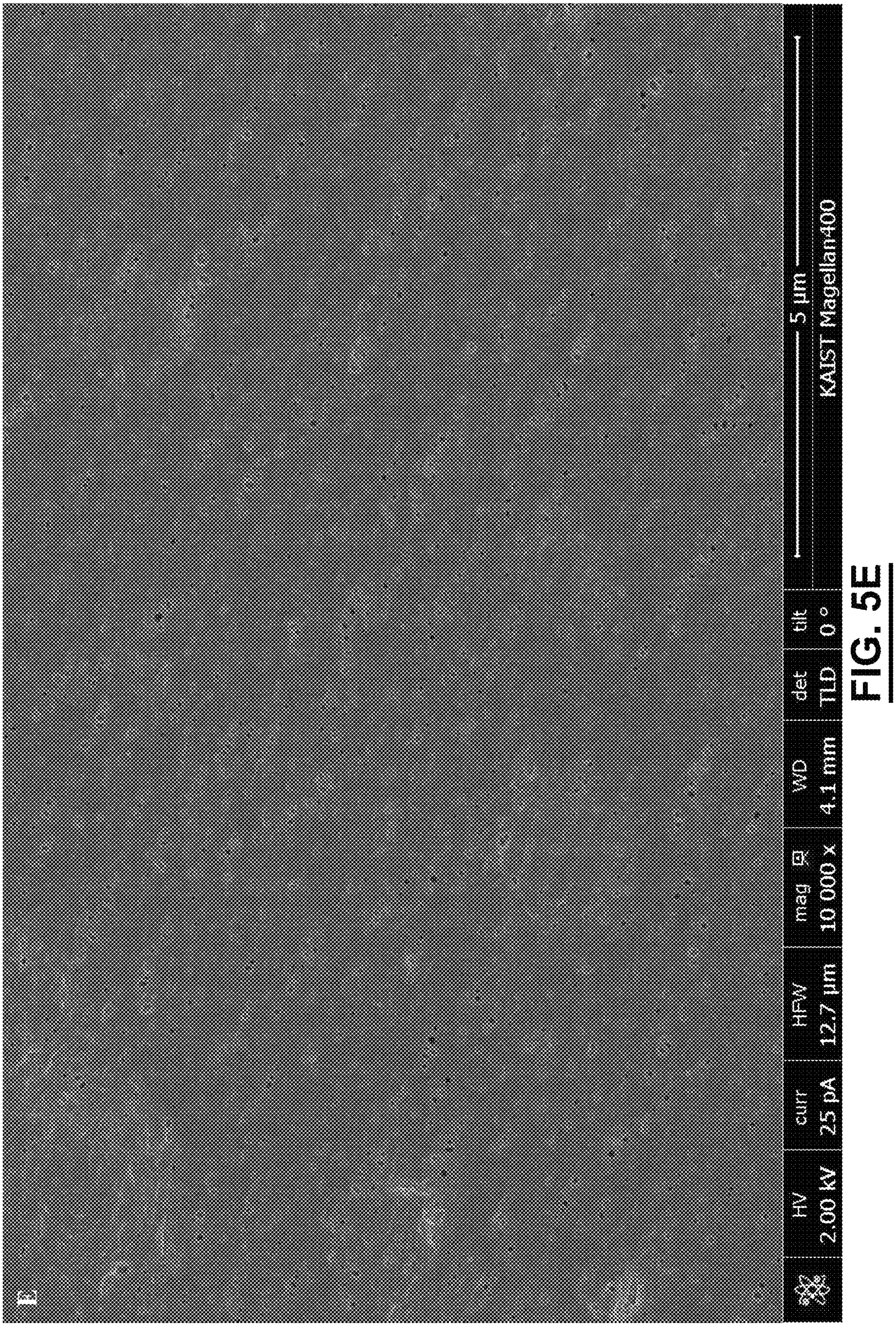
Figure 5F:
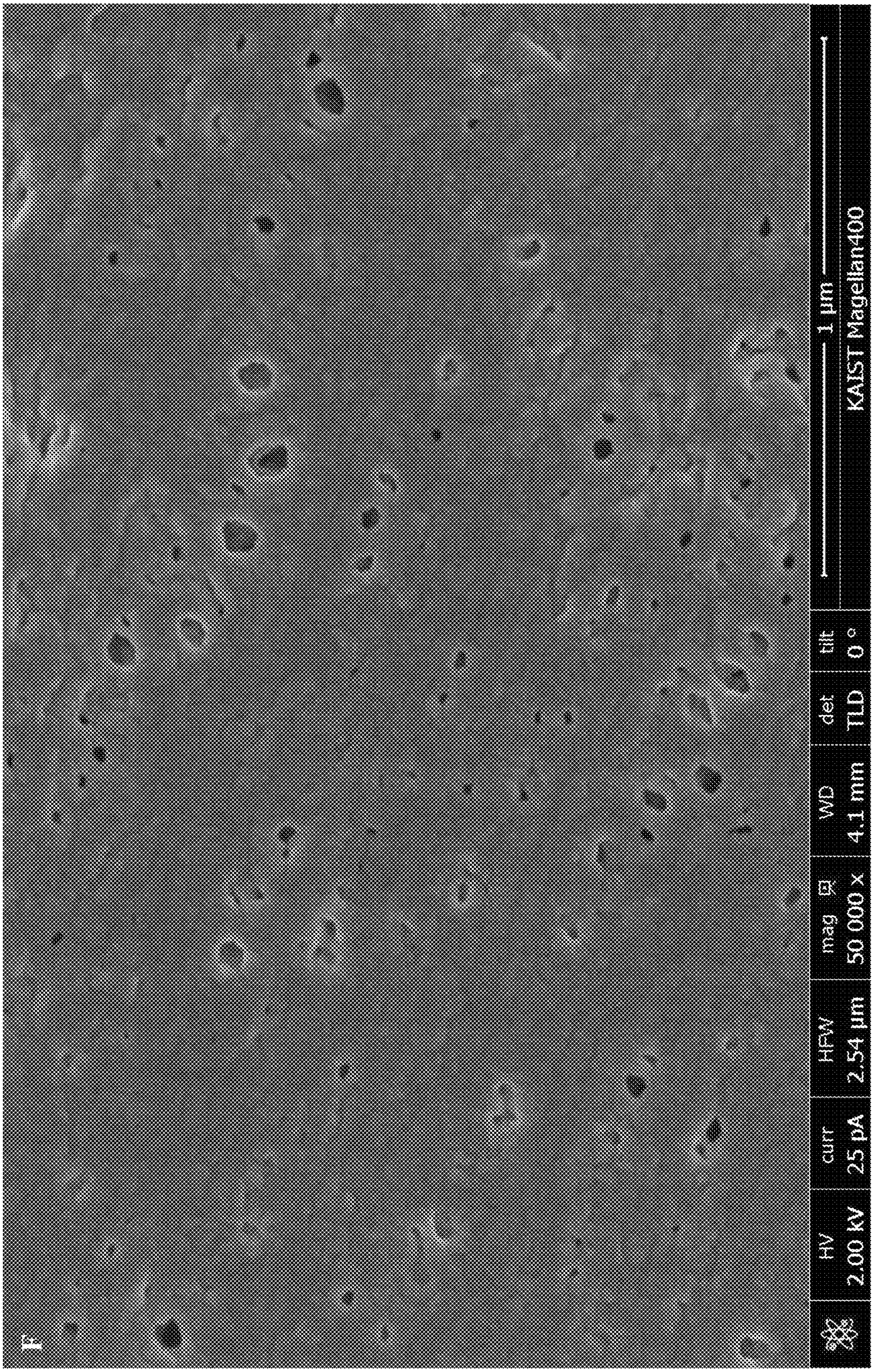
Figure 5G:
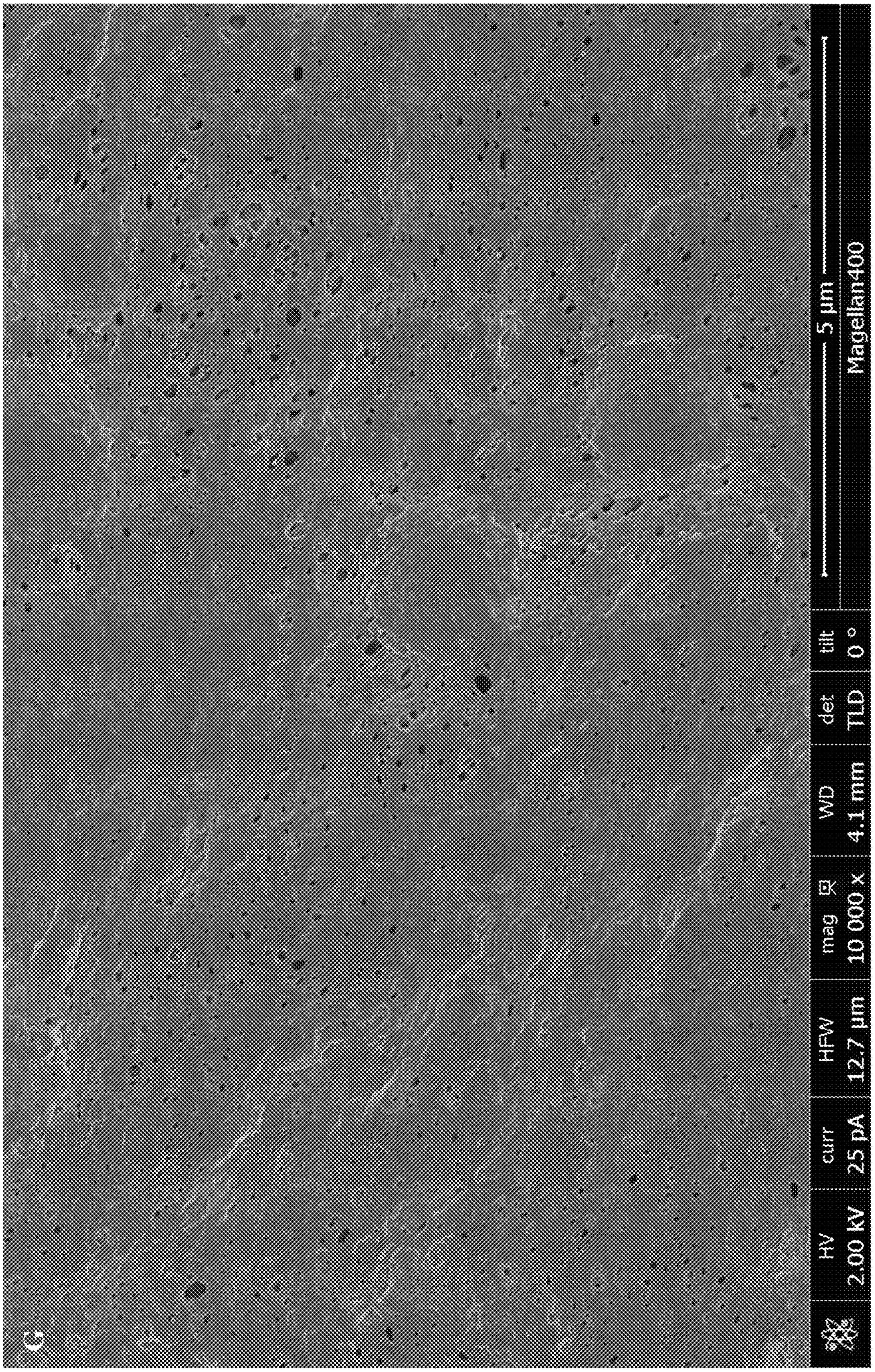
Figure 5H:
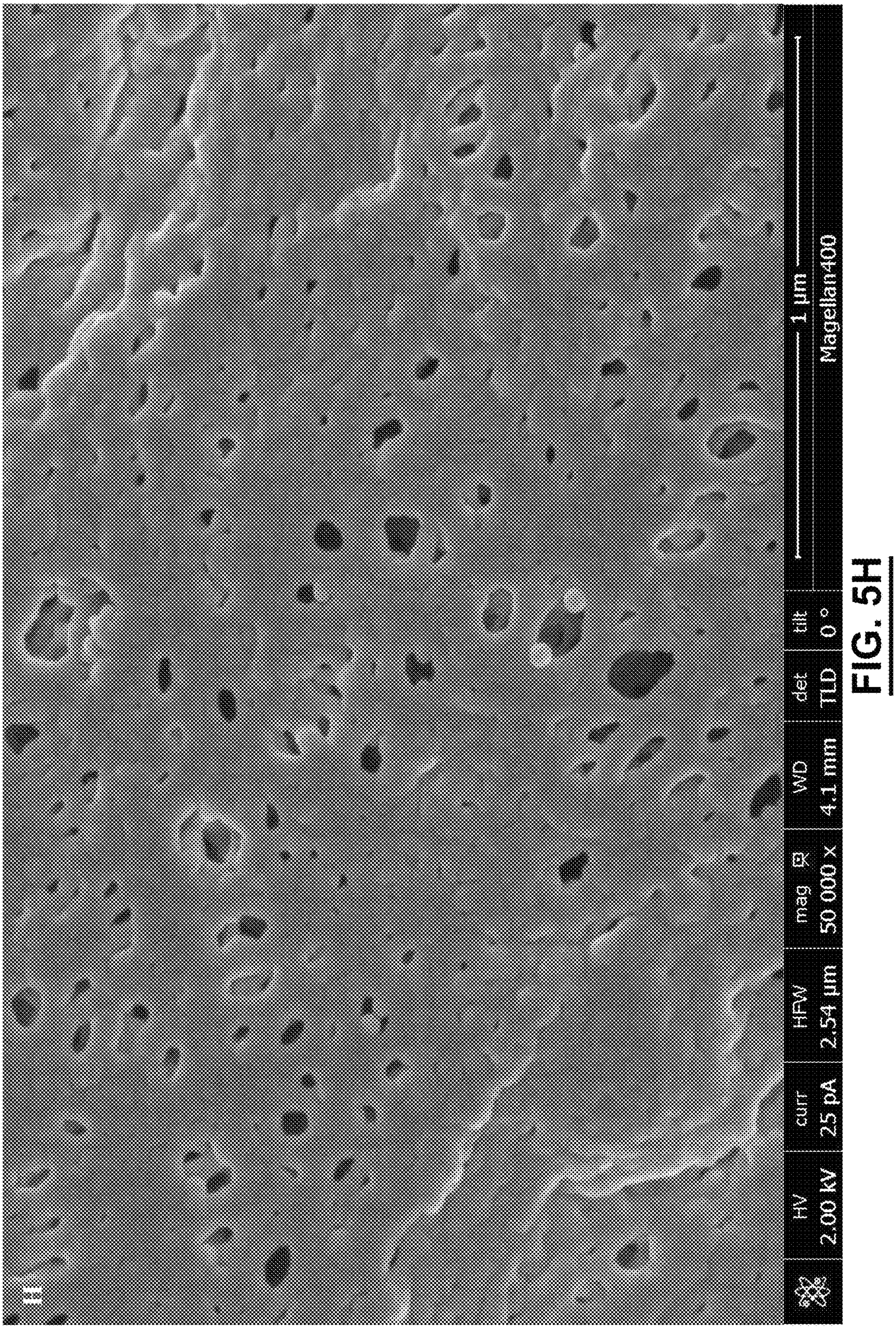
Figure 6A:
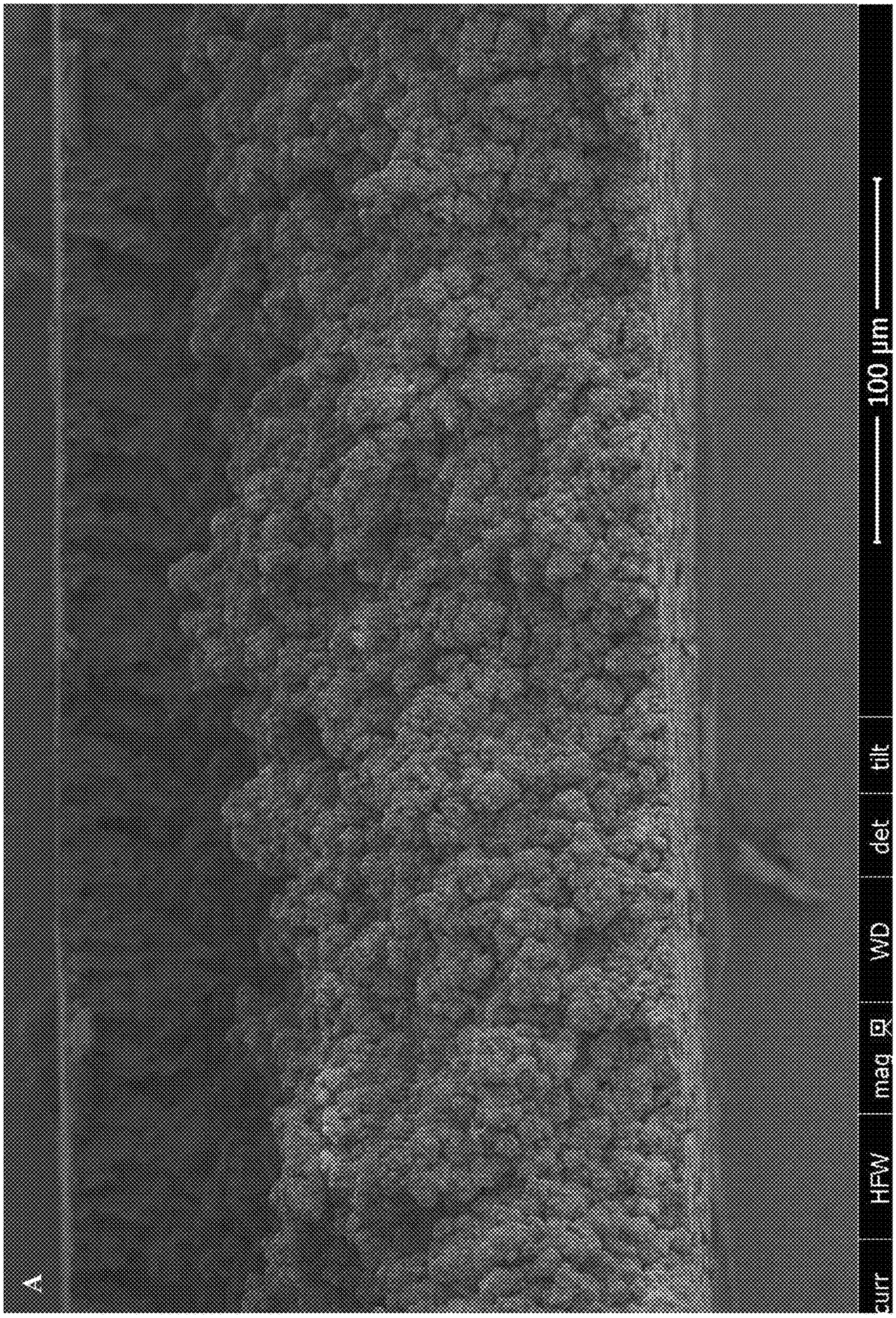
FIGS. 6A-6F show representative SEM images showing cross section morphology of nanocomposite membranes modified with HPEI-ECH to obtain NSM-1, NSM-2 and NSM-3 described in related application U.S. Ser. No. 13/754,883 published as US20130213881.
Figure 6B:
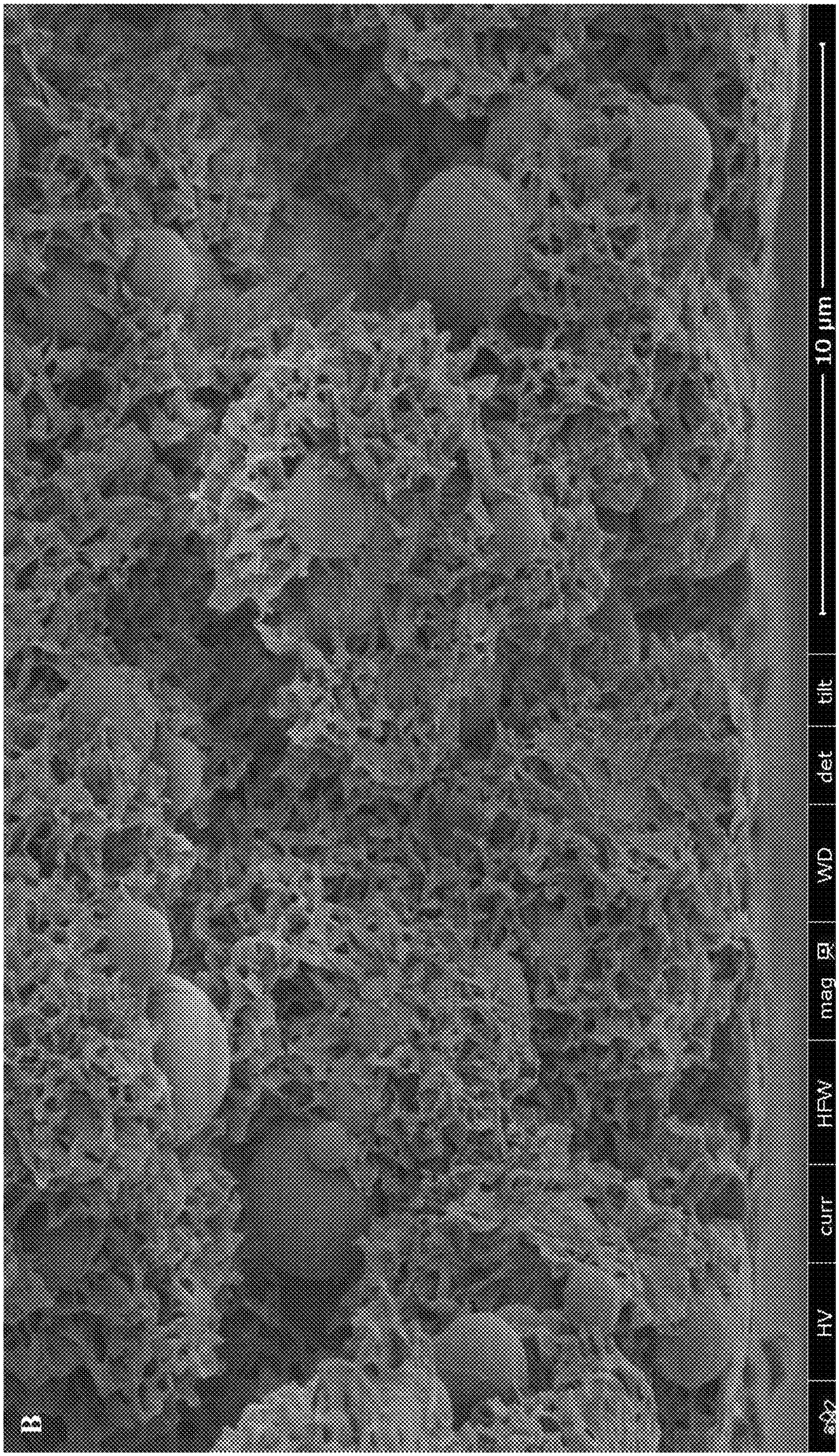
Figure 6C:
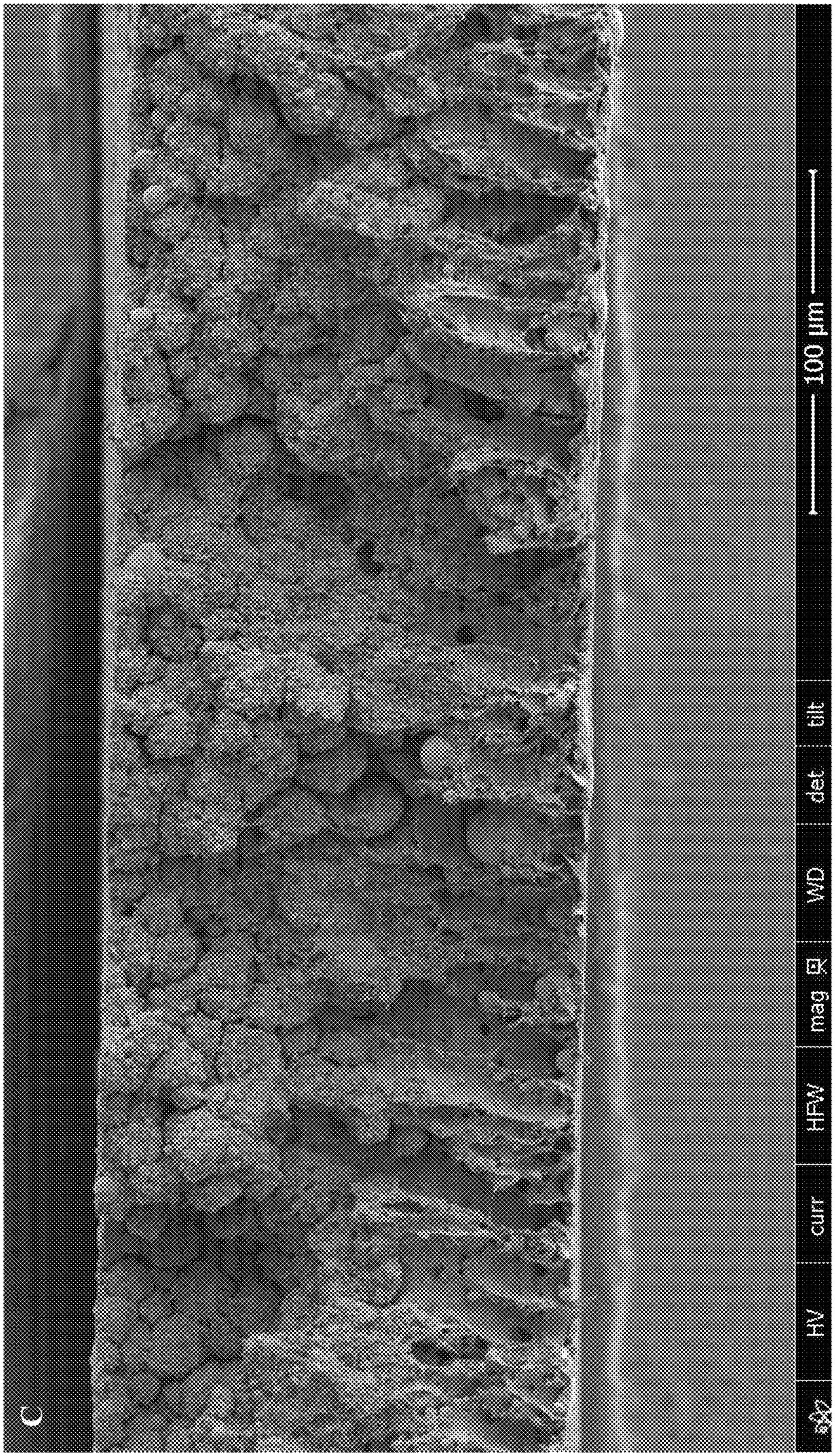
Figure 6D:
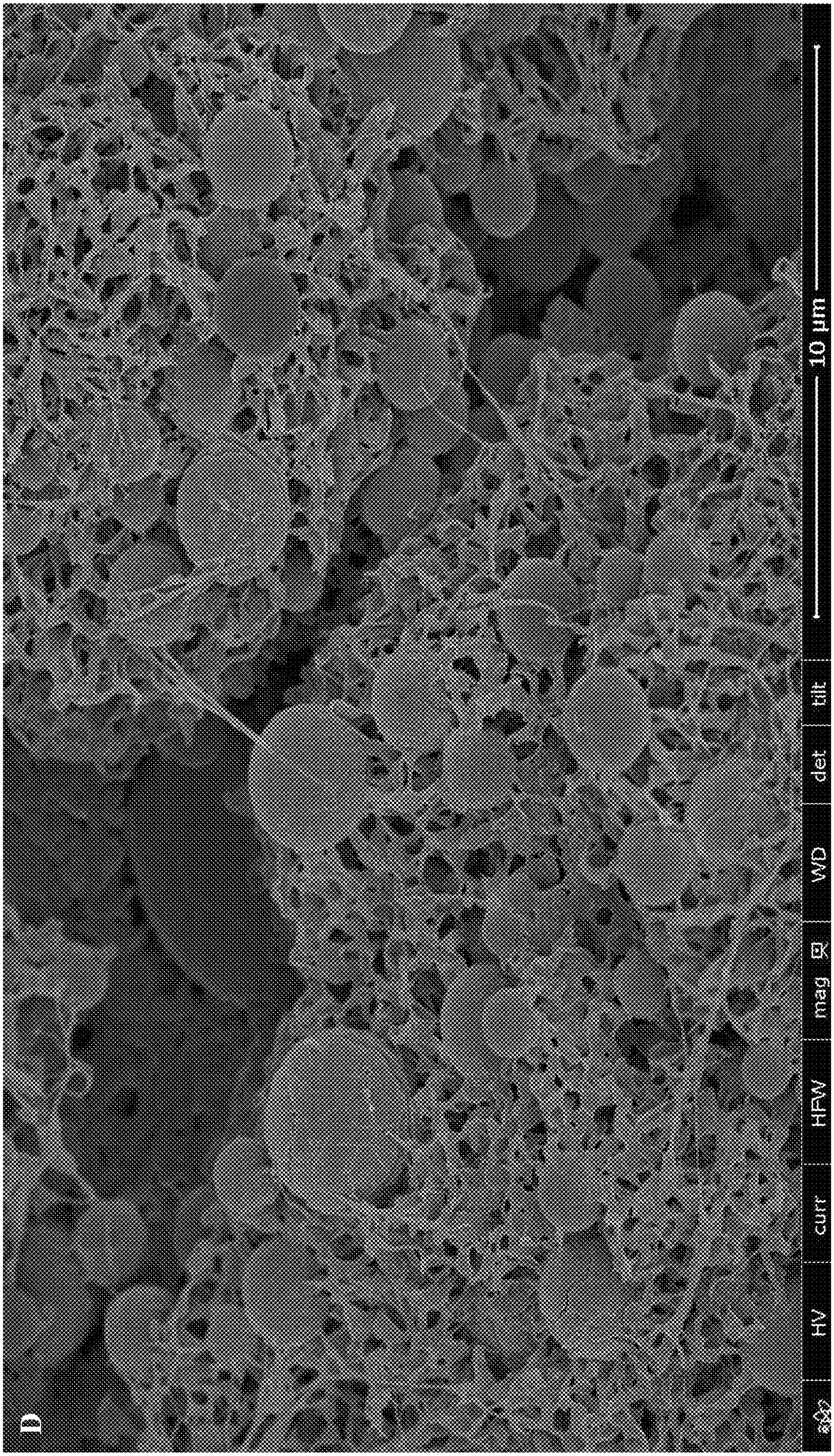
Figure 6E:
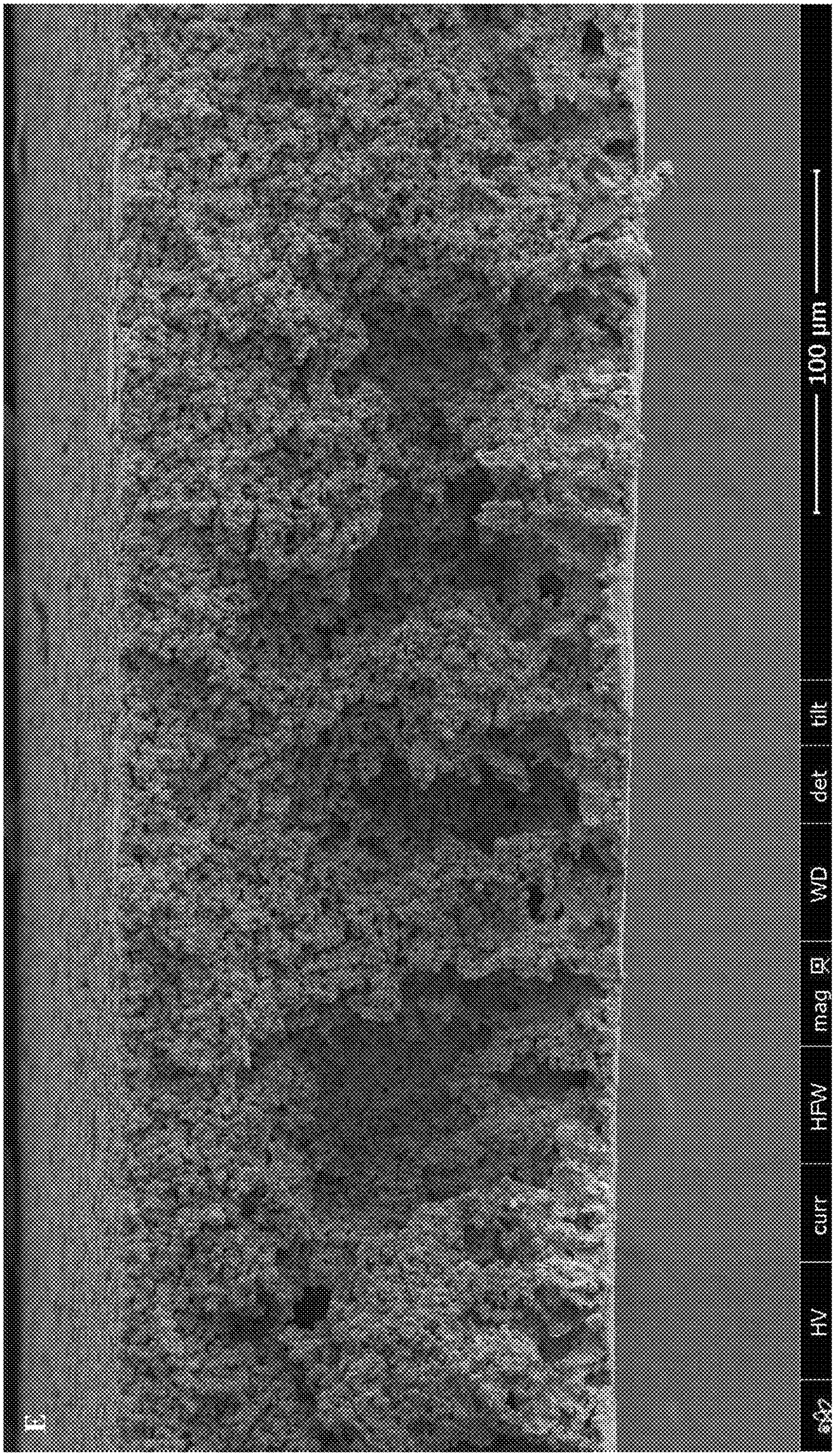
Figure 6F:
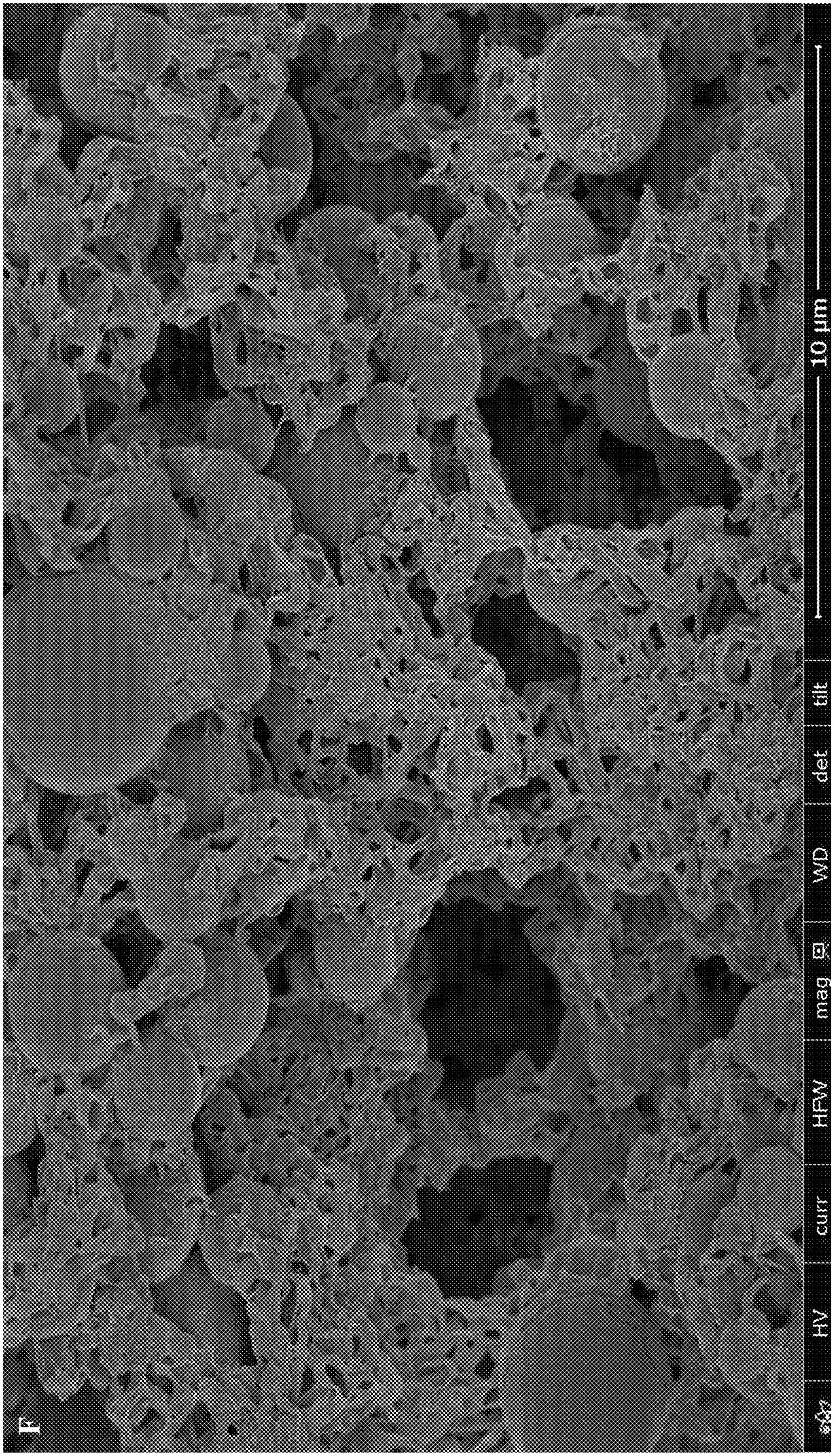
Figure 7A:
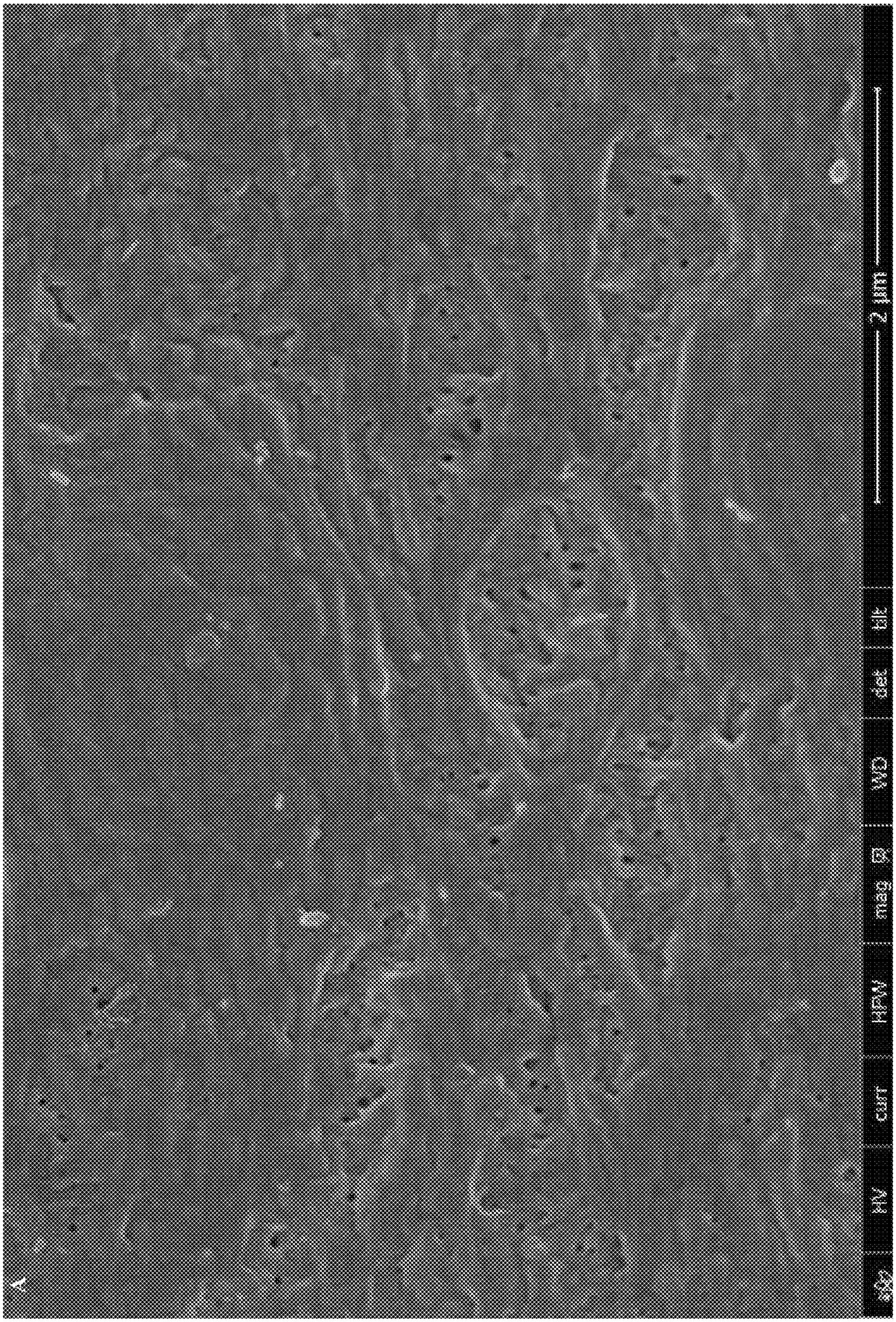
FIGS. 7A-F show representative SEM images showing top and bottom morphology of composite membranes NSM-1, NSM-2 and NSM-3 described in related application U.S. Ser. No. 13/754,883 published as US20130213881. Top surface images are taken at 20,000× and bottom surface images are taken at 1,000× magnification in all cases.
Figure 7B:
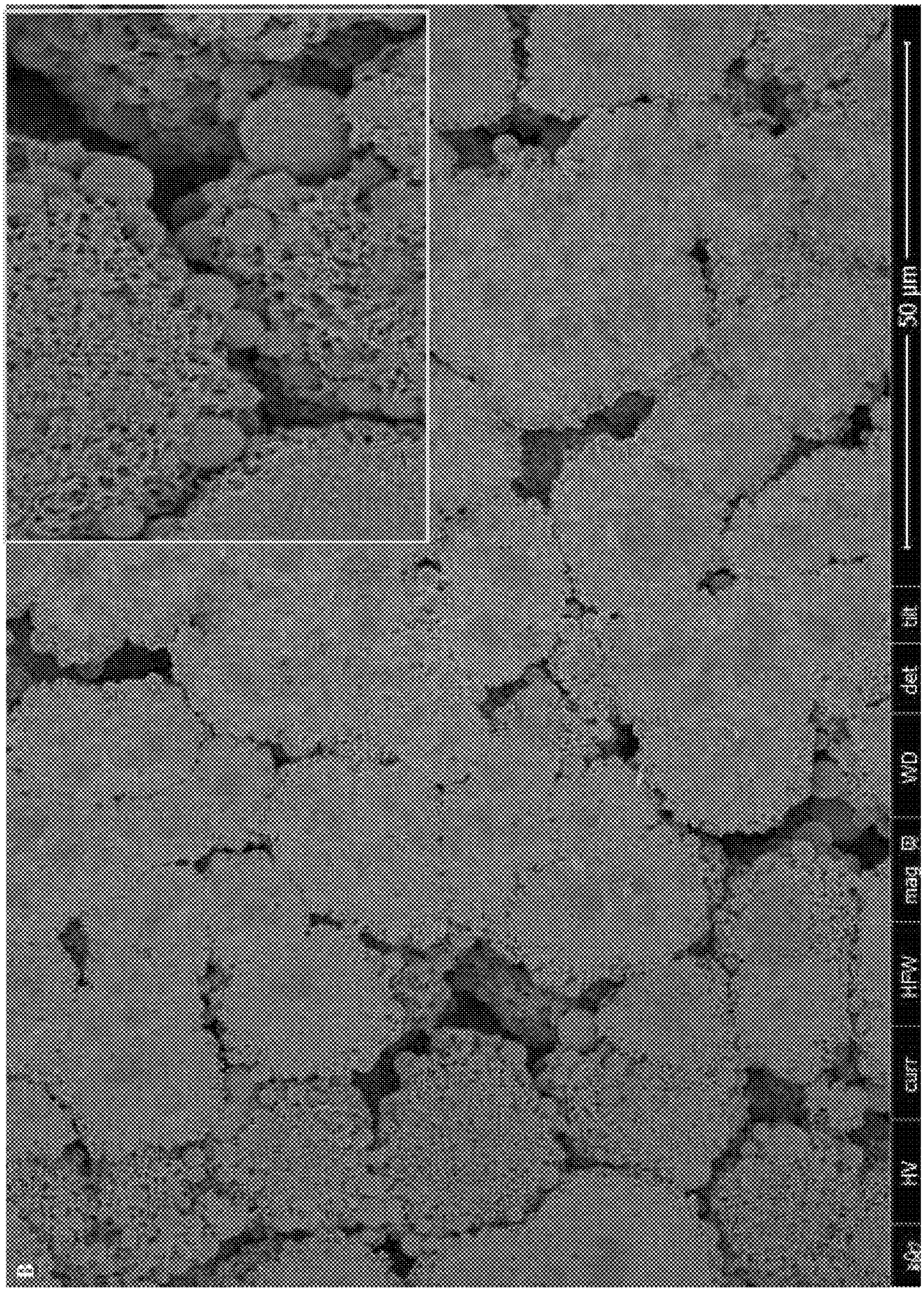
Figure 7C:
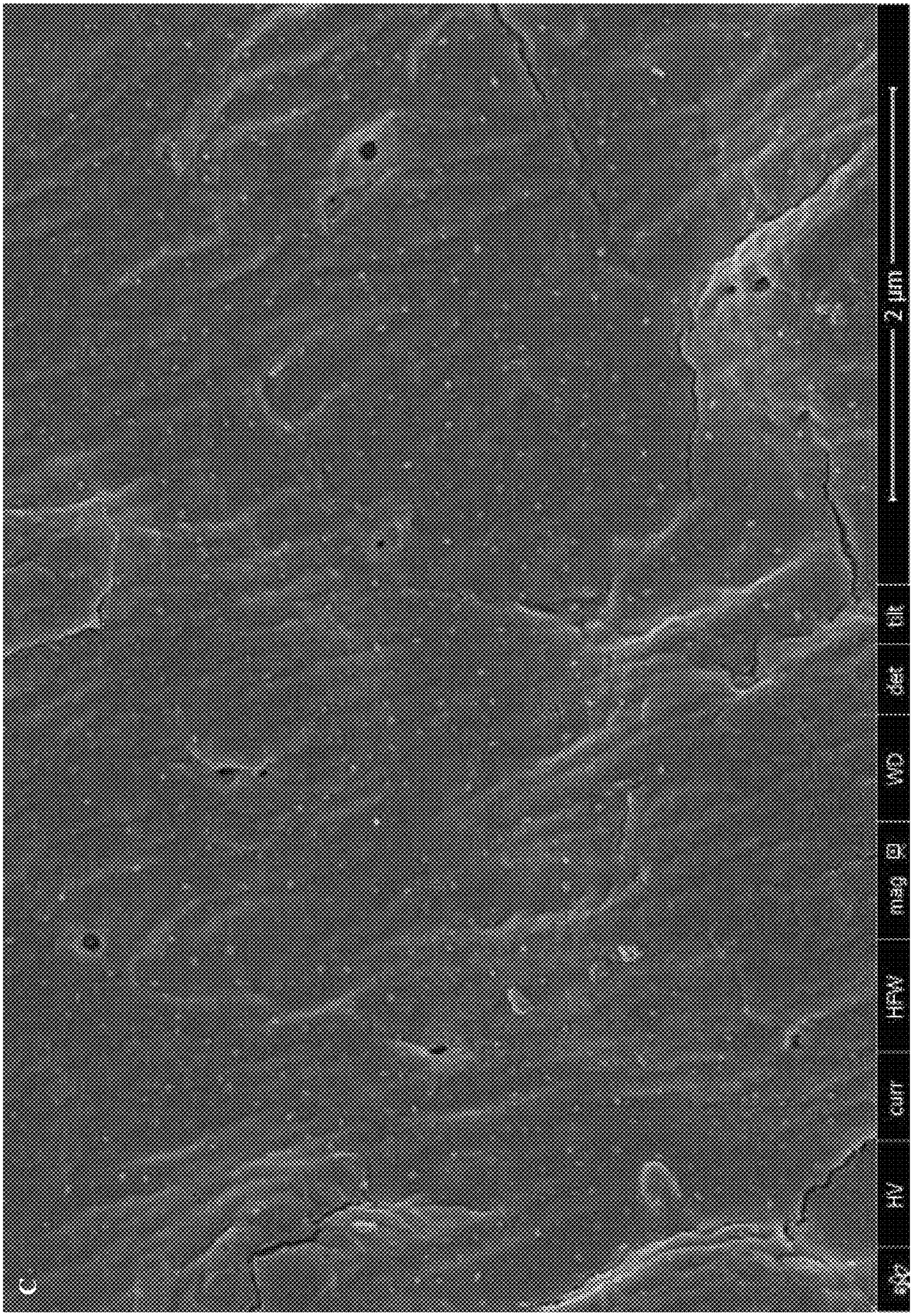
Figure 7D:
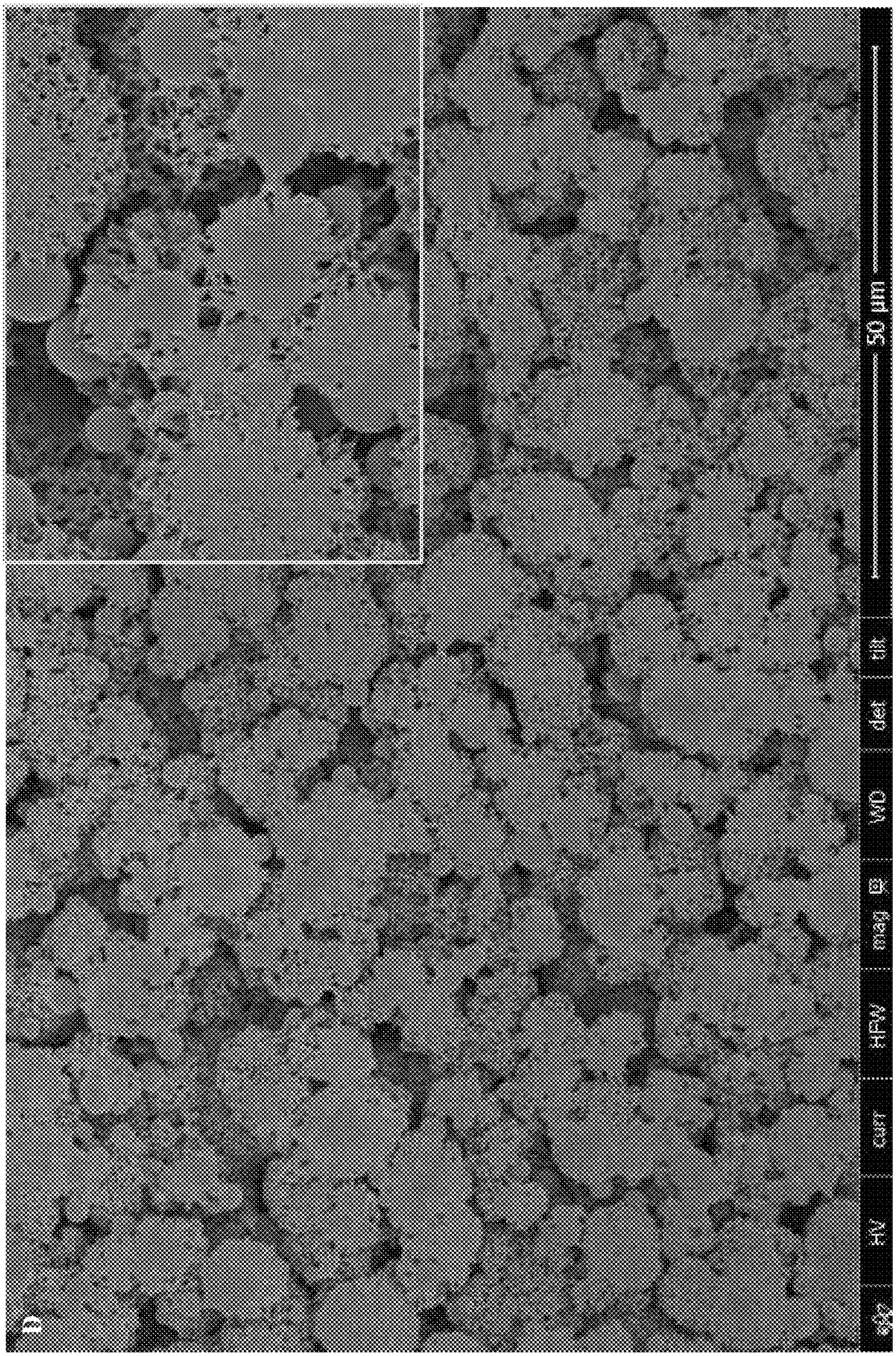
Figure 7E:
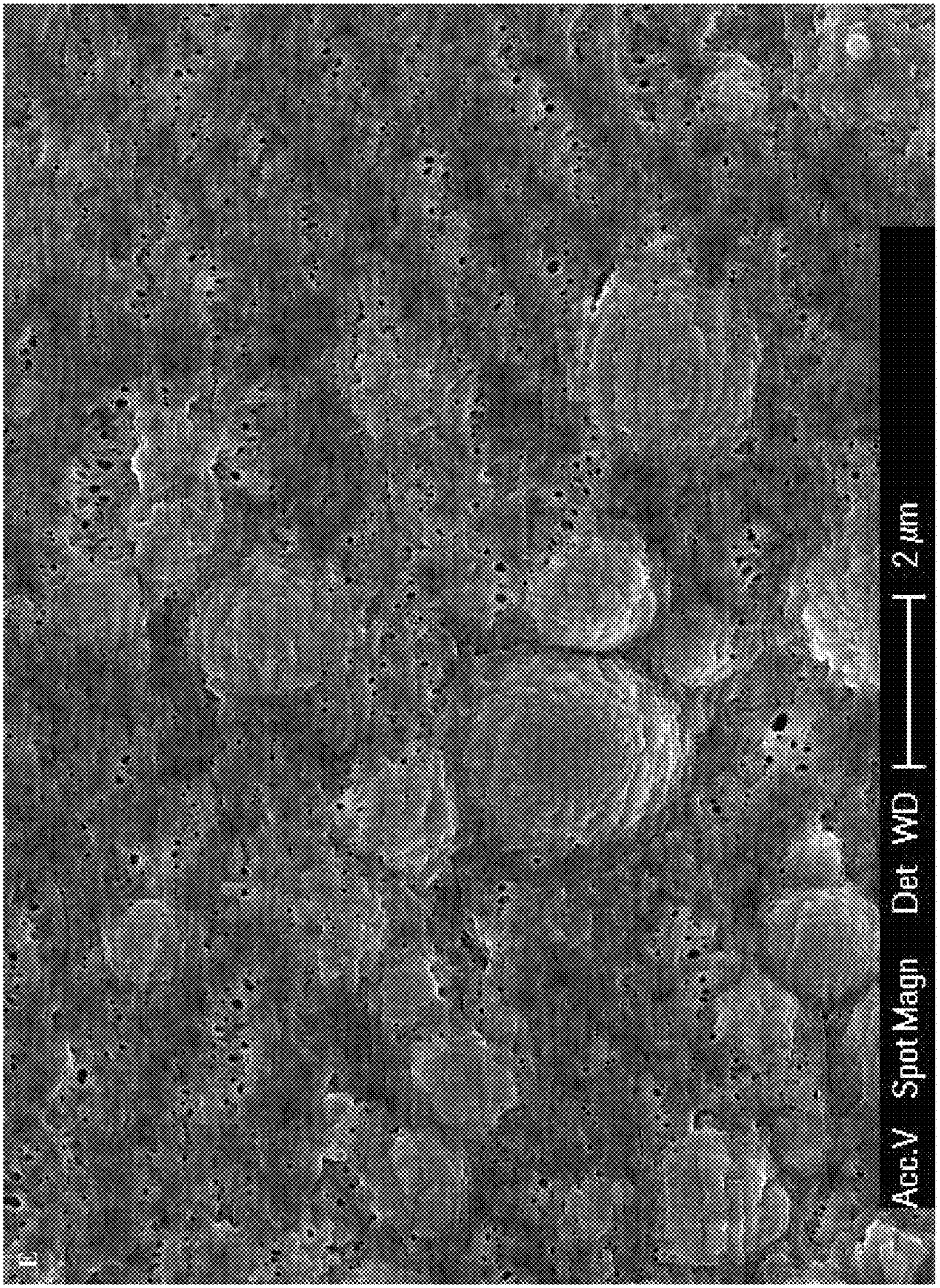
Figure 7F:
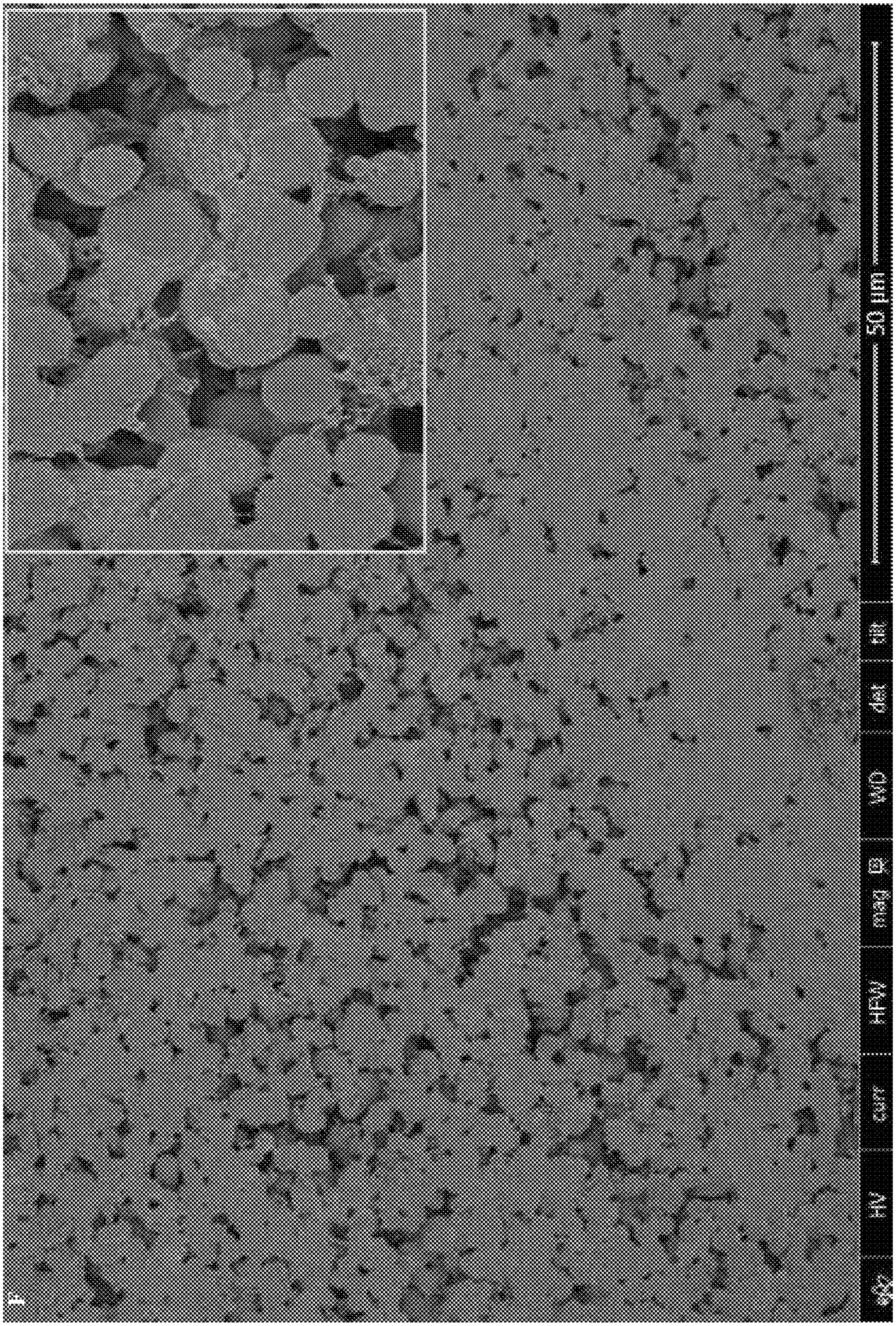

Water and microalgae filtration experiments were carried out to evaluate the potential of the PPNM-2 membrane as high flux and fouling resistant membrane for microalgae recovery from aqueous solutions and culture media. A key objective of the filtration experiments was to benchmark the performance of the mixed matrix PVDF membrane herein described against that the best commercially available and surface-coated hydrophilic UF membrane with high water flux that we could find (Table 11). Table 11 provides a compilation of selected surface properties of *Chlorella* microalgae species. Table 11 also indicate that the *Chlorella* sp. KR-1 microalgae species have an average particle of 3 μm with chemically heterogeneous surfaces (i.e. consisting of acidic/basic sites and hydrophobic domains) and overall negative surface charge (i.e. zeta potential) of −14 mV. Table 10 lists the sequence and duration of the DIW and microalgae filtration experiments. FIG. 10C and FIG. 10D show the results of the microalgae and water filtration experiments. Table 12 summarizes the results of the flux measurements. The average water flux through the PPNM-2 and commercial PVDF membranes are, respectively, equal to 253 and 167 LMH at 2 bar (Table 12). The water permeability of a UF membrane typically varies from 50 to 800 LMH/bar. PPNM-2 and commercial PVDF membranes behave, respectively, as a medium-flux and a low-flux UF membrane. FIG. 10D shows that the permeate fluxes of the microalgae suspension through both membranes drop sharply during the first 2 minutes and then stabilize with an average value of 87.0±10.0 LMH for the PPNM-2 membrane compared to 67.0±7.0 LMH for the commercial PVDF membrane (Table 12). In both case, we attribute the sharp drop in the permeate flux to concentration polarization due to the formation and buildup of a microalgae cake layer at the surface of each membrane This explanation is consistent with the results of the simulated membrane cleaning experiments following the first cycle of microalgae filtration. FIG. 10C and Table 12 show that a simple DIW wash was able to restore the permeate flux of the PPNM-2 membrane to an average value of 85.0±11.3 LMH compared to 64.0±5.4 for the commercial PVDF membrane during the second cycle of microalgae filtration. The corresponding flux recovery rates (FRR) are equal, respectively, to 98% for the PPNM-2 membrane and 95% for the commercial PVDF membrane (FIG. 10C FIG. 5C). Although both membranes show excellent FRR, the permeate flux of our mixed matrix PVDF membrane (PPNM-2) with in situ synthesized and PEGylated PEI micro/nanoparticles is larger by ~30% than that of the commercial and surface coated hydrophilic PVDF UF membrane with an MWCO of 30 KDa.

TABLE 11

| Zeta Potential pH 6.5 (mV) | Adhesion to Decane (%) | $pK_1$ Carboxyl | $C_1$ Carboxyl ($10^{-3}$ mol/g) | $pK_2$ Phosphoryl | $C_2$ Phosphoryl ($10^{-3}$ mol/g) | $pK_3$ Amine Hydroxyl | $C_3$ Amine Hydroxyl ($10^{-3}$ mol/g) |
|---|---|---|---|---|---|---|---|
| −14 | 50 | 5.50 | 0.100 | 7.70 | 0.040 | 9.90 | 0.070 |

TABLE 12

| | Cycle-1: Permeate Flux ($L\ m^{-2}h^{-1}$) | | | Cycle-2: Permeate Flux ($L\ m^{-2}h^{-1}$) | | |
|---|---|---|---|---|---|---|
| | Average | SD | Equilibrium Flux | Average | SD | Equilibrium flux |
| Deionized Water (DIW) | | | | | | |
| PPNM-2 | 253.1 | 5.0 | 244.0 | 229.9 | 6.7 | 222.1 |
| PVDF (Commercial-30K) | 165.7 | 8.7 | 160.6 | 118.5 | 5.3 | 122.5 |
| Microalgae Suspension | | | | | | |
| PPNM-2 | 87.2 | 9.9 | 80.5 | 85.2 | 11.3 | 72.3 |
| PVDF (Commercial-30K) | 67.3 | 7.1 | 63.2 | 64.3 | 5.4 | 61.9 |

In comparison a time dependent water flux of composite membranes NSM-1, NSM-2 and NSM-3 and related is depicted in FIG. 24 of the instant application and FIG. 17 and Example 2 of related application U.S. Ser. No. 13/754,883 published as US20130213881. The neat PVDF membrane is highly hydrophobic in nature and having a dense top surface it shows pure water flux below 3 LMH hence this data is excluded from the graph. The initial pure water flux of these membranes shows a unique trend, though the initial water flux of NSM-1 is high when compared to NSM-2 and NSM-3, it shows high compaction. As a result stable water flux of NSM-1, NSM-2 and NSM-3 is in the order of 29.5, 36 and 5.5 LMH respectively. It can be observed that NSM-2 shows reasonably high water flux and less compaction in nature. This can be understood by high hydrophilicity of NSM-2 purely because of the chemical modification of the matrix by means of packed PEI particles.

Figure 25:
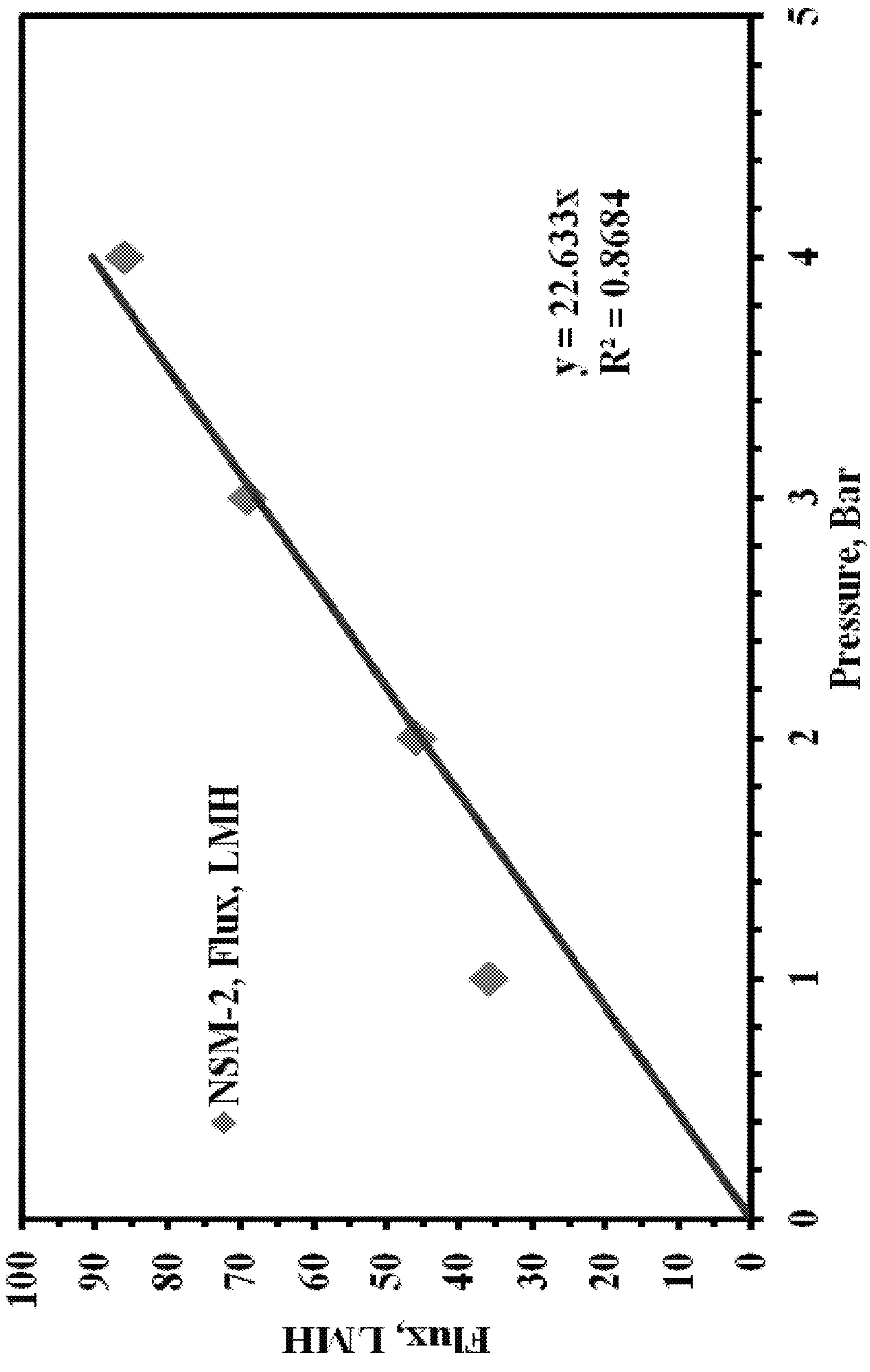
FIG. 25 shows a graph of the permeability of the NSM-2 membrane described in related application U.S. Ser. No. 13/754,883 published as US20130213881.

In case of NSM-3, the membrane shows less water flux and compaction because it is highly packed with PEI micro and nanoparticles. These particles further block the pores of membrane leading to less porous in nature. Membrane permeability of NSM-2 sample was studied by measuring water flux as a function of pressure. A plot of linear curve fitting was drawn between stable pure water flux and operation pressure is shown in FIG. 25. The slope of the curve gives permeability of the membrane, in case of NSM-2 it is found to be 22.663 LMH per bar pressure. This permeability data suggests that these membranes are in the order of nanofiltration membranes.

Example 11: Method of Preparing a Mixed Matrix Membrane with In Situ Synthesized and PEGylated Polymeric Particle Network In Situ A mixed matrix membrane according to the disclosure was provided using the following materials and methods in accordance with the reaction scheme and graphical process protocol depicted in FIGS. 13A-B.

PVDF Solution in TEP.

A typical membrane casting solution was prepared by mixing PVDF with TEP in a three neck round-bottom flask equipped with a condenser and an overhead stirrer. A homogeneous PVDF dope solution was obtained after mixing for 24 hours at 80° C. (FIG. 13A "In situ generated PEI & PEG polymer particles PVDF dope solution" illustration, depiction top left corner)

In Situ Synthesis of Cross-Link PEI & PEG Polymer Particle Network.

In a typical experiment, the required amount of PEI, the required amount of ECH, and the required amount of 4-Arm PEG Epoxide are all added to the PVDF casting solution 80° C. The cross linking reactions were continued for 4 h at 80° C. under a nitrogen ($N_2$) atmosphere. (FIG. 13A "In situ generated PEI & PEG polymer particles PVDF dope solution" illustration and FIG. 13B PEI & PEG in situ cross-link Polymer Particle Network)

The sequence of addition is as follows, first PEI addition after mixing for 15 minutes then ECH addition and mixed for 10 minutes. Finally the addition of 4-Arm PEG epoxide and the reaction was continued for 3 hours at 80° C. under a nitrogen atmosphere. All other PEG derivatives with various functionalities like epoxide, amine, thiol and additional functionalities. can also be employed.

Membrane Casting.

The membranes were prepared with and without a polyethylene terephthalate (PET) microporous support by similar process described in Example 1.

Example 12: Mixed Matrix Membrane with Polymeric Particle Network In Situ

The three different mixed matrix membrane with polymeric particle network in situ were obtained with the method of Example 11 was analyzed.

In particular composition for composite Mixed Matrix Membranes FRNM-1, FRNM-2, and FRNM-3 is shown in Table 13. Three control membranes such as PEI and PEG blend with PVDF dope solution (CM-1), PEG blend with PVDF (CM-2), and PEI blend with PVDF (CM-3) are utilized as comparison for composite membranes.

Example 13: Morphology of a Mixed Matrix Membrane with Polymeric Particle Network The morphology of a mixed matrix membrane prepared according to Example 11 was analyzed by FESEM. Polymeric micro/nanoparticles are present in all three PPNM membranes.

The results are illustrated in FIGS. 14A-I, FIGS. 15A-I and FIGS. 16A-D.

Example 14: Characterizations of a Mixed Matrix Membrane with Polymeric Network

Figure 17A:
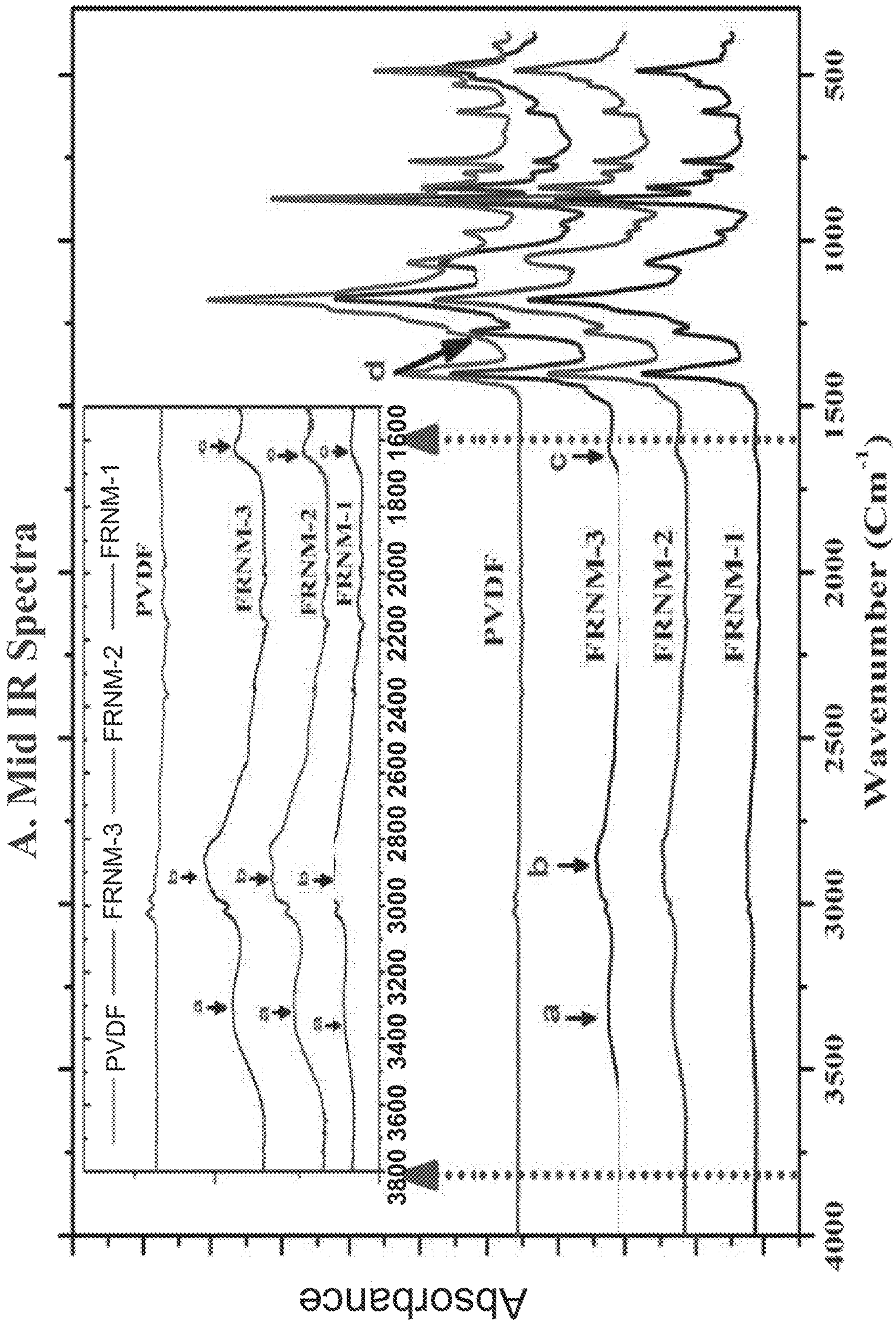
FIGS. 17A-B show FTIR spectrum scans of control PVDF membrane and mixed matrix PVDF membranes prepared by in situ cross-linking and PEGylation with 4-Arm PEG epoxide PEI particle networks.
Figure 17B:
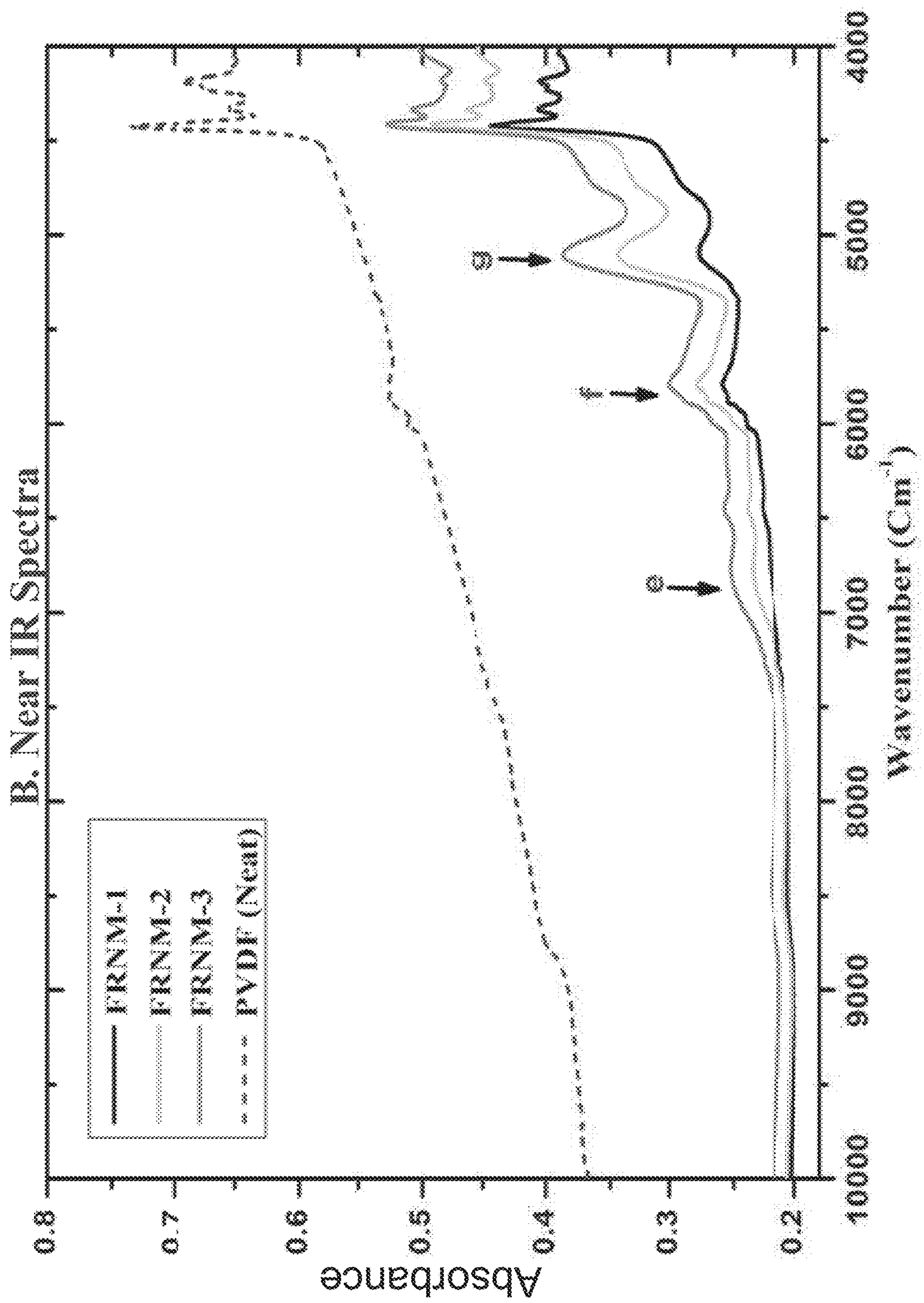

The mixed matrix membrane prepared according to Example 11 was characterized by infrared spectroscopy (FIGS. 17A-B).

In particular, the FTIR spectrums confirm the presence of PEI particles and PEG network in the mixed matrix membranes as indicated in FIGS. 14A-I.

TABLE 13

| | FRNM-1 | | FRNM-2 | | FRNM-3 | | PVDF (Neat) (CM-4) | | CM-1 | | CM-2 | | CM-3 | |
|---|---|---|---|---|---|---|---|---|---|---|---|---|---|---|
| Membrane | M (g) | wt (%) | M (g) | wt (%) | M (g) | wt (%) | M(g) | wt (%) | M (g) | wt (%) | M (g) | wt (%) | M (g) | wt (%) |
| A. Compositions of Membrane Casting Solutions | | | | | | | | | | | | | | |
| PVDF[a)] | 5.25 | 13.07 | 5.25 | 11.99 | 5.25 | 10.90 | 5.25 | 15.0 | 5.25 | 12.56 | 5.25 | 13.81 | 5.25 | 13.81 |
| PEI[b)] | 1.36 | 3.39 | 2.28 | 5.21 | 3.42 | 7.1 | — | — | 2.28 | 5.46 | — | — | 1.5 | 3.95 |
| ECH[c)] | 0.9 | 2.24 | 1.5 | 3.43 | 2.25 | 4.67 | — | — | — | — | — | — | — | — |
| 4-Arm PEG epoxide | 0.9 | 2.24 | 1.5 | 3.43 | 2.25 | 4.67 | — | — | 1.5 | 3.59 | 1.5 | 3.95 | — | — |
| TEP[d)] | 31.75 | 79.06 | 33.25 | 75.94 | 35 | 72.66 | 29.7 | 85.0 | 32.75 | 78.39 | 31.25 | 82.24 | 31.25 | 82.24 |
| B. Estimated Membrane Compositions (Dry mass wt %) | | | | | | | | | | | | | | |
| PVDF | 5.25 | 65.14 | 5.25 | 52.78 | 5.25 | 42.70 | 5.25 | 100 | 5.25 | 100 | 5.25 | 100 | 5.25 | 100 |
| [1]PEGy1ated PEI particles | 2.81 | 34.86 | 4.7 | 47.22 | 7.04 | 57.30 | — | — | — | — | — | — | — | — |
| C. Estimated degree of crosslinking of PEI particles based on ECH concentration (Dry mass wt %) | | | | | | | | | | | | | | |
| ECH | 0.9 | 39.8 | 1.5 | 39.7 | 2.25 | 39.7 | — | — | — | — | — | — | — | — |
| PEI | 1.36 | 60.2 | 2.28 | 60.3 | 3.42 | 60.3 | — | — | — | — | — | — | — | — |

HCl: 35 mg is also added to each membrane casting solution

[a)]PVDF: Polyvinylidene fluoride;

[b)]PEI: Branched polyethyleneimine;

[c)]ECH: Epichlorohydrin;

[d)]TEP: Triethyl phosphate

In the membranes of Table 13, all ECH crosslinker molecules were incorporated into the PEI particles by reaction of their epoxy and chloro groups with the primary/secondary amino groups of the segregated PEI molecules in the dope solutions (FIGS. 3B-C).

In the membranes of Table 13, each ECH molecule produces one molecule of hydrogen chloride (HCl) following the crosslinking reaction (FIGS. 3B-C).

In the membranes of Table 13, all PEGDE molecules were incorporated into the PEI particles by reaction of their epoxy groups with the primary/secondary amino groups of the ECH crosslinked PEI particles (FIGS. 3B-C).

In the membranes of Table 13, all unreacted PEI molecules were removed in the coagulation bath and subsequent membrane washes with methanol and DIW.

Example 15: Determination of Wettability and Hydrophilicity of Membranes

The wettability and hydrophilicity of the mixed matrix membranes prepared according to Example 11 were investigated by measurement of Zeta potential of the membranes and by contact angle measurements.

Figure 18:
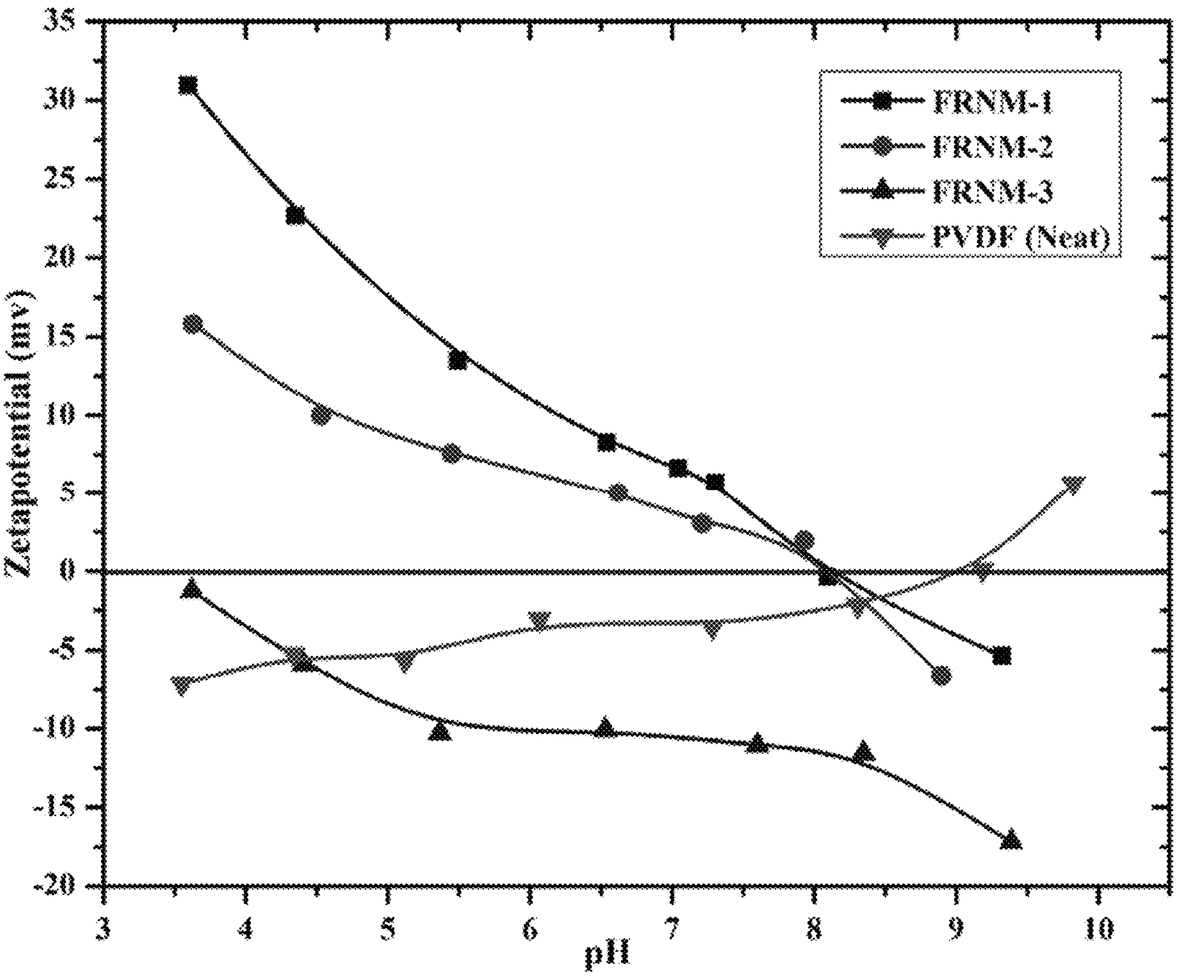
FIG. 18 shows zeta potential measurements of control PVDF membrane and mixed matrix PVDF membranes prepared by in situ cross-linking and PEGylation with 4-Arm PEG epoxide PEI particle networks as herein described at pH ranging from 3.5 to 9.5 by electrophoresis method.

The zeta potential (ZP) of each membrane was determined at different solution pH as indicated in FIG. 18. At pH 7.0, the ZP of the PPNM-1 is ~10 mV, PPNM-2 is ~5 mV, and PPNM-3 is ~-10 my. We attribute this trend to the presence of PEGylated PEI particles with high density of —OH groups at the surface of our MMMs.

Figure 19:
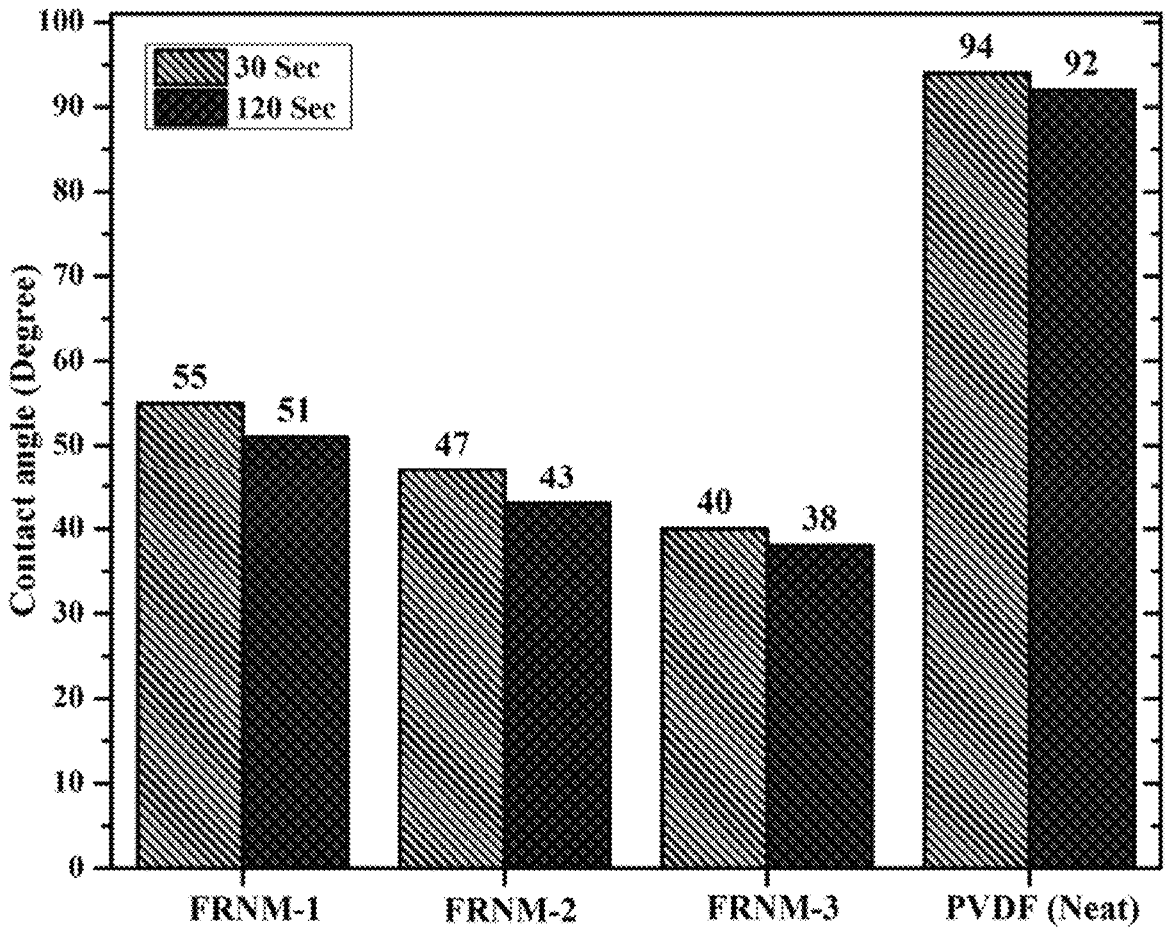
FIG. 19 shows contact angle measurements and images of control PVDF membrane and mixed matrix PVDF membranes prepared by in situ cross-linking and PEGylation with 4-Arm PEG epoxide PEI particle networks as herein described at a drop ageing of 30 and 120 seconds.
Figure 20:
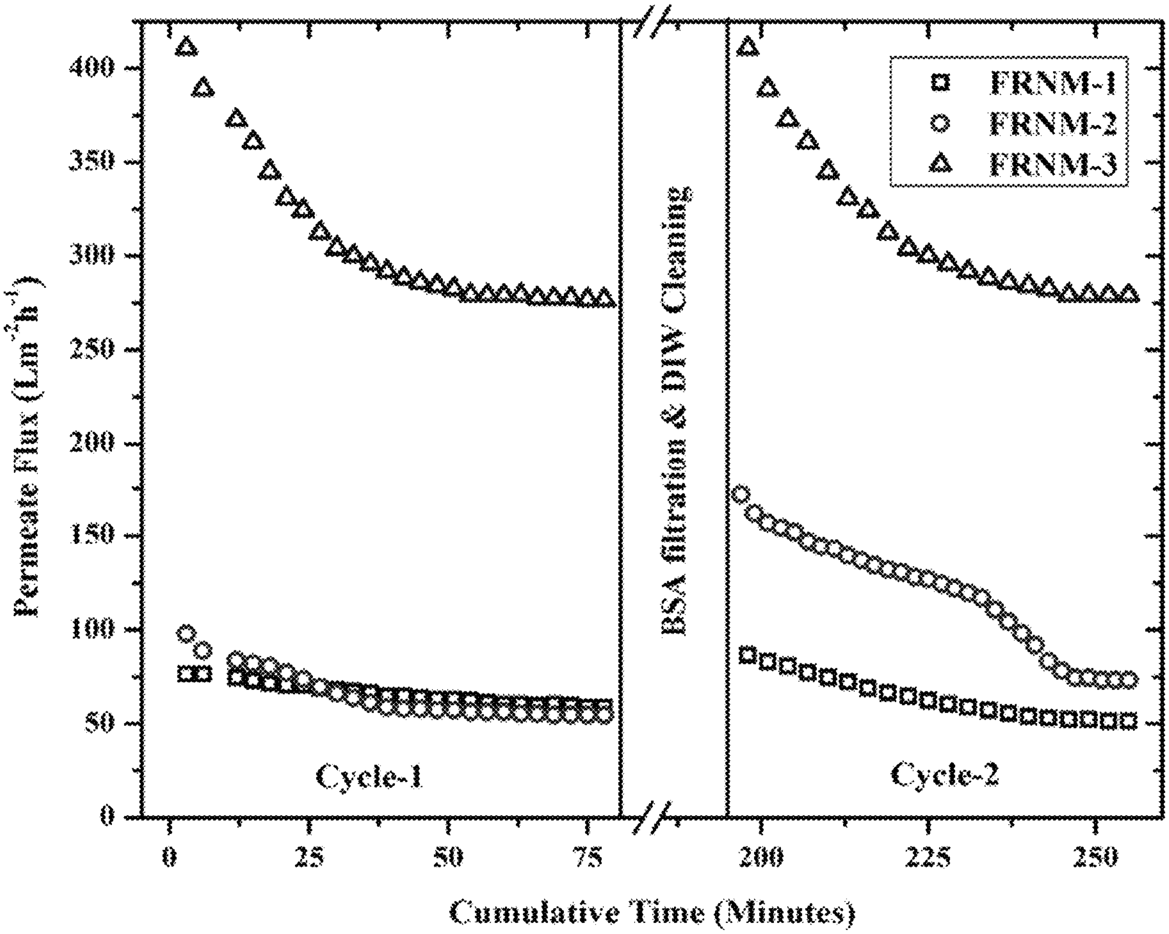
FIG. 20 shows permeate flux measurements for DI water as a function of cumulative filtration time using mixed matrix PVDF membranes prepared by in situ cross-linking and PEGylation with 4-Arm PEG epoxide PEI particle networks as herein described.

Contact angle measurements of FRNM-1, FRNM-2 and FRNM-3 show that all the membranes are hydrophilic. Contact angle measured at 30 and 60 seconds for the composite and control membranes are indicated in FIG. 19.

Example 16: Filtration Experiments with Mixed Matrix Membranes

Filtration experiments were performed with the mixed matrix membranes prepared according to Example 11.

Figure 21:
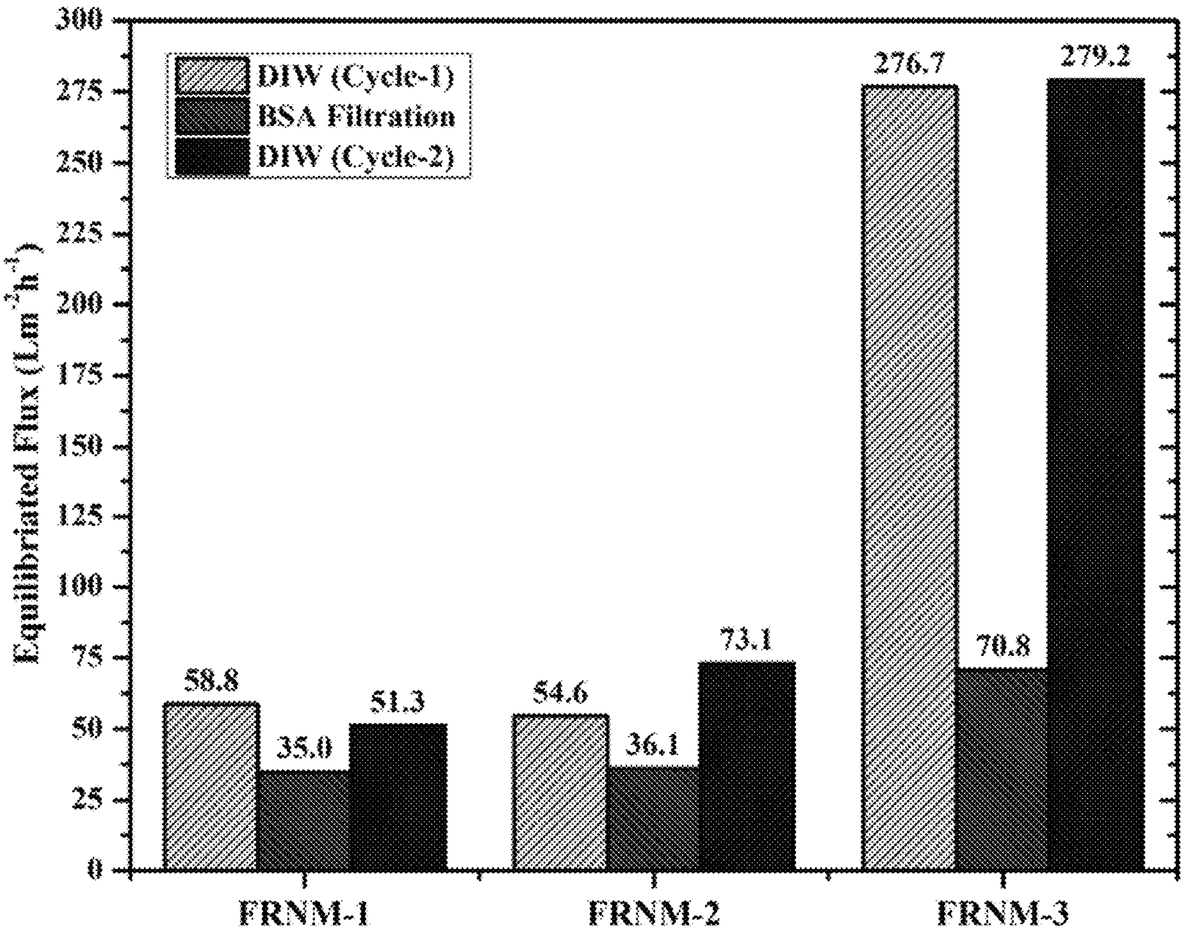
FIG. 21 shows equilibrated DI water permeation flux before and after the BSA filtration of the mixed matrix PVDF membranes prepared by in situ cross-linking and PEGylation with 4-Arm PEG epoxide PEI particle networks as herein described.
Figure 22:
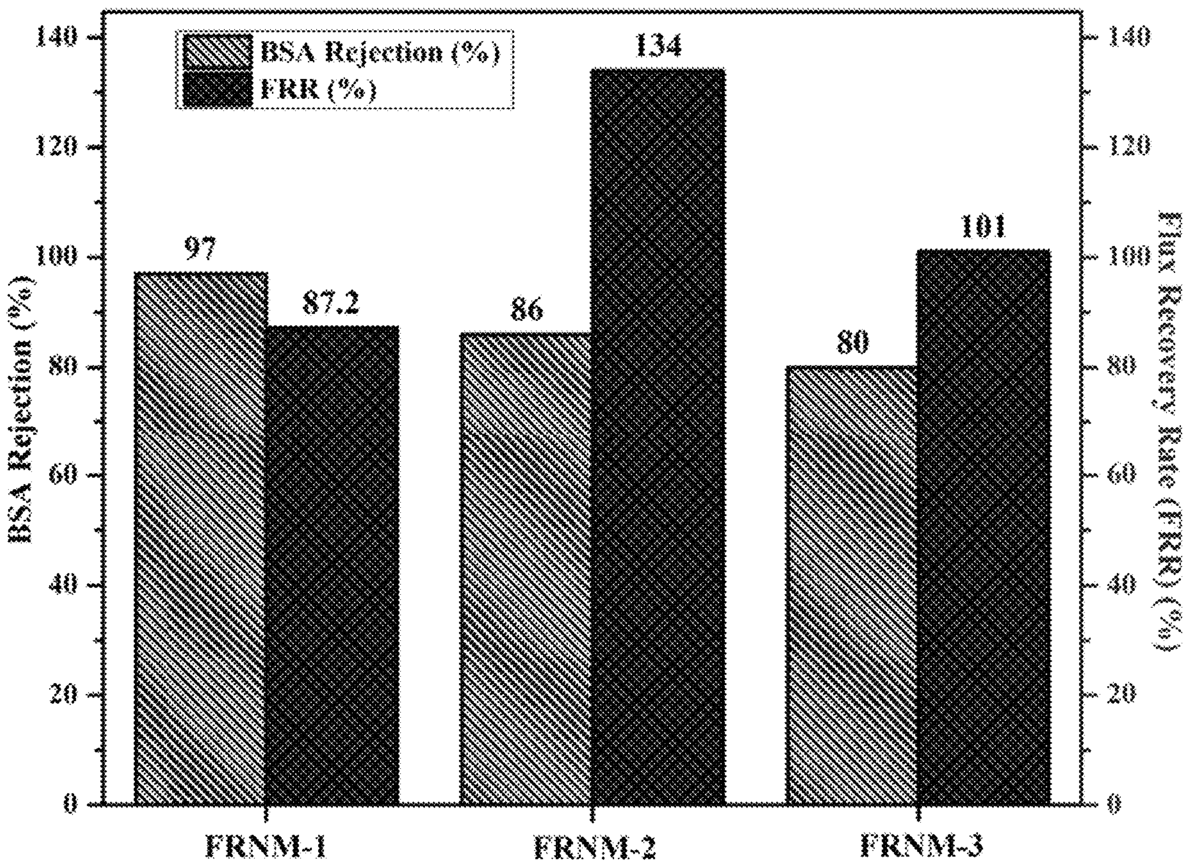
FIG. 22 shows BSA rejection and flux recovery rate (FRR) of the mixed matrix PVDF membranes prepared by in situ cross-linking and PEGylation with 4-Arm PEG epoxide PEI particle networks as herein described. Figure illustrates antifouling efficiency of mixed matrix PVDF membranes.
Figure 23:
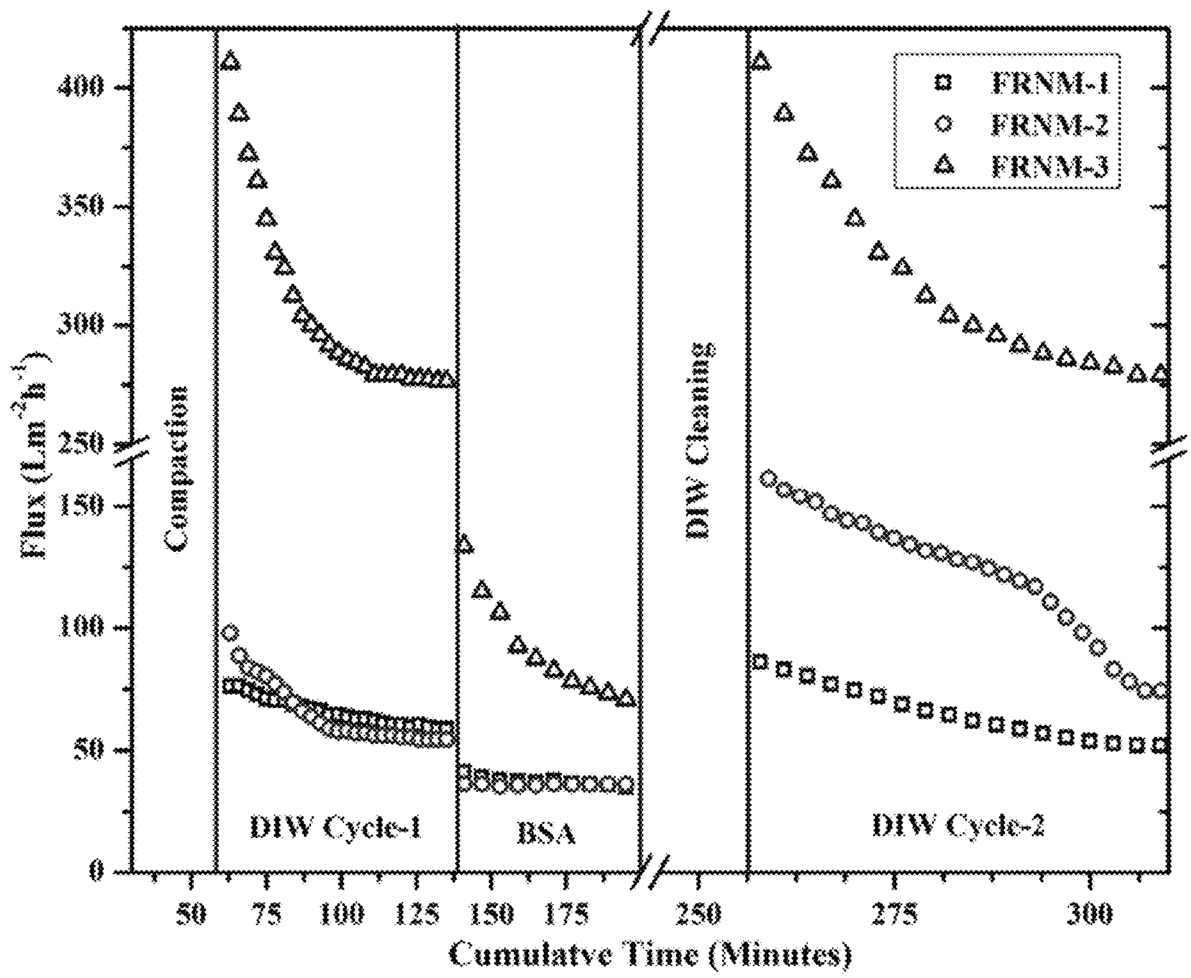
FIG. 23 shows permeate flux measurements of DI water and BSA filtration as a function of cumulative filtration time using mixed matrix PVDF membranes prepared by in situ cross-linking and PEGylation with 4-Arm PEG epoxide PEI particle networks as herein described.

In particular, The equilibrated cycle-1 water flux through the FRNM-1, FRNM-2 and FRNM-3 are, respectively, equal to 58.8, 54.6 and 276.7 LMH at 2 bar. The results of the filtration experiments are illustrated in FIG. 21

Example 17: Method for Forming a Polymer Network Embedded PVDF Membrane

Figure 26A:
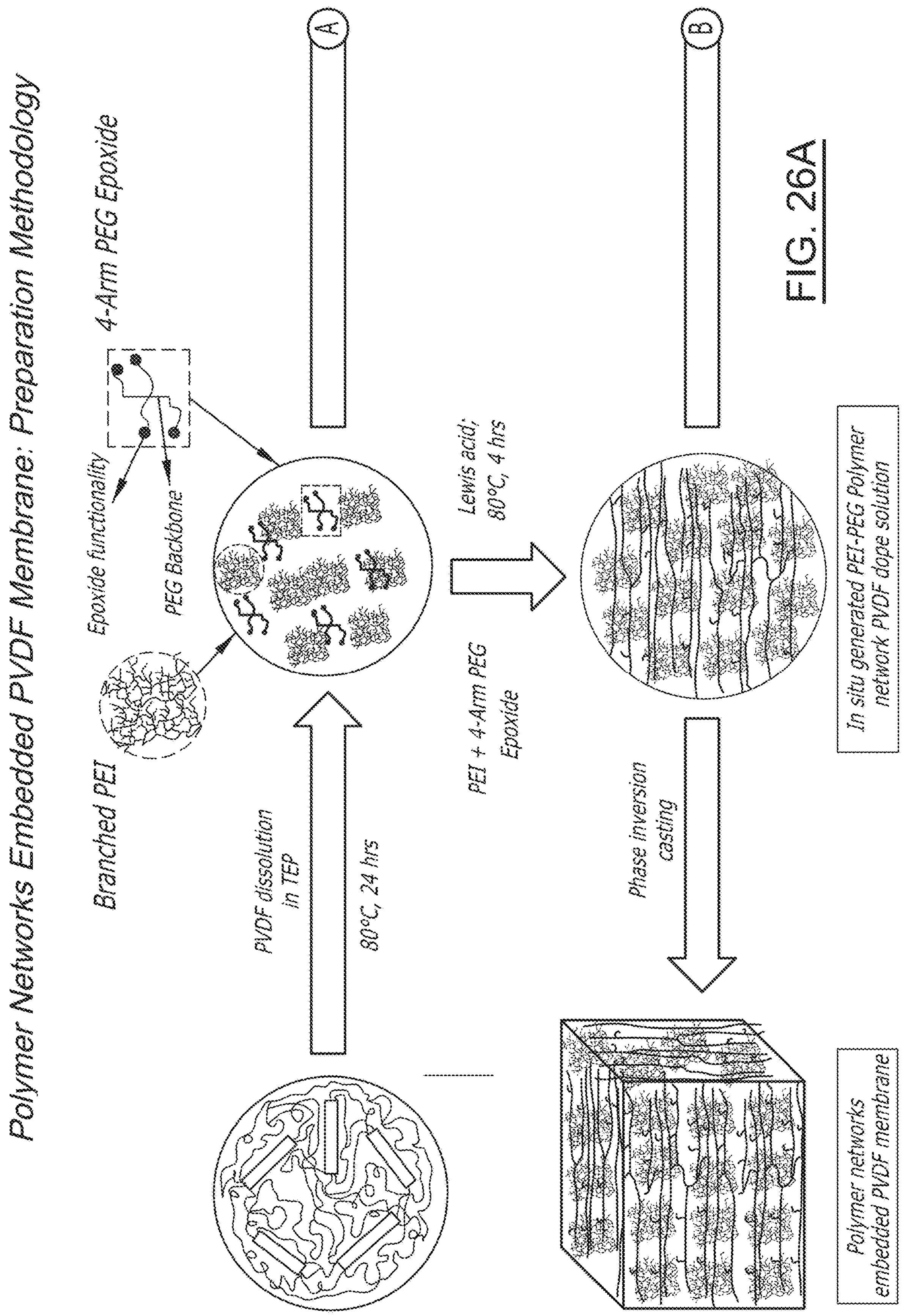
FIGS. 26A-B show a schematic illustration of the preparation of a polymer network embedded PVDF membrane according to embodiments herein described.
Figure 26B:
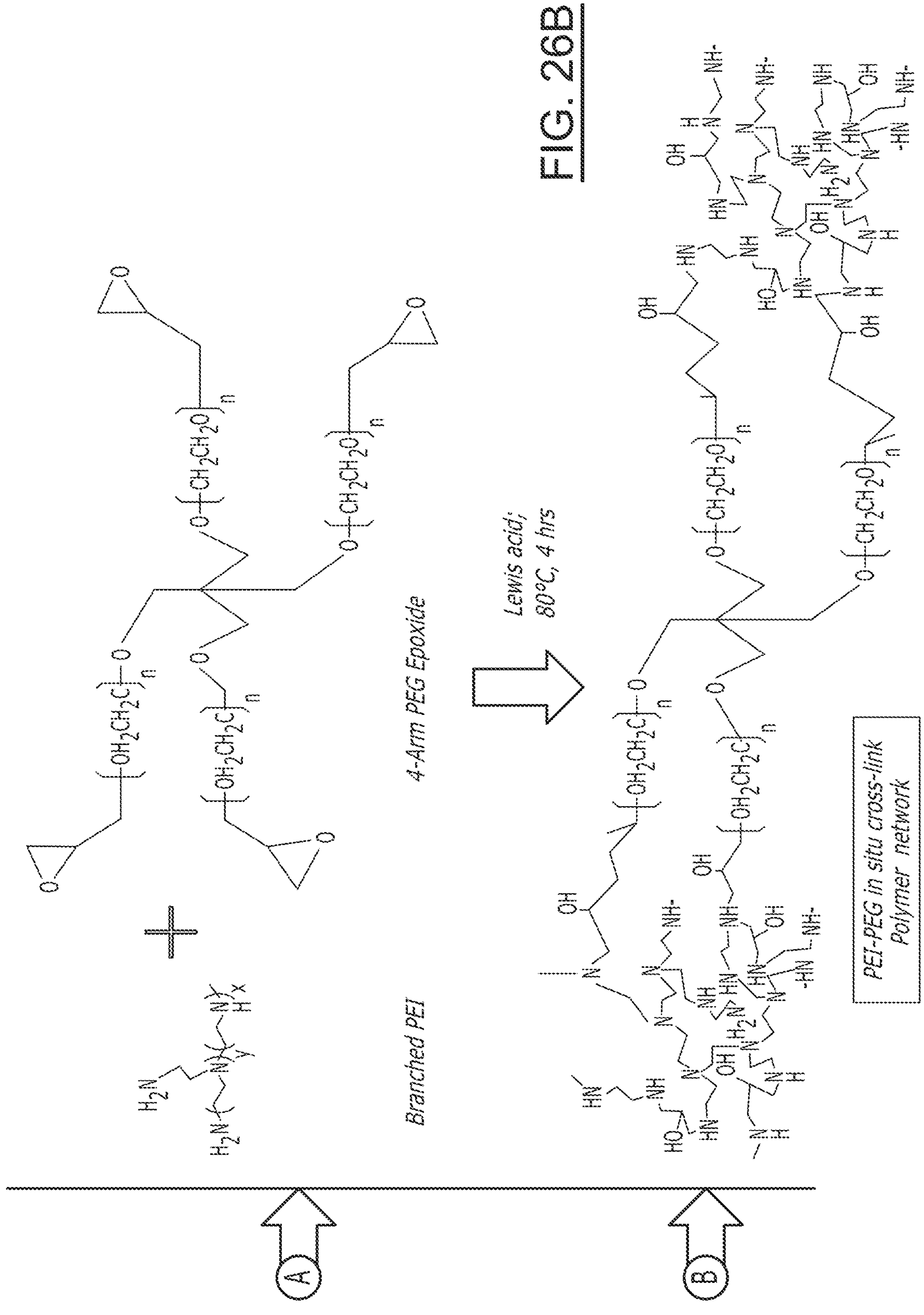
Figure 27A:
FIGS. 27A-I show representative FESEM images showing cross section and top morphology of polymer network embedded PVDF membranes PNM-1, PNM-2 and PNM-3.
Figure 27B:
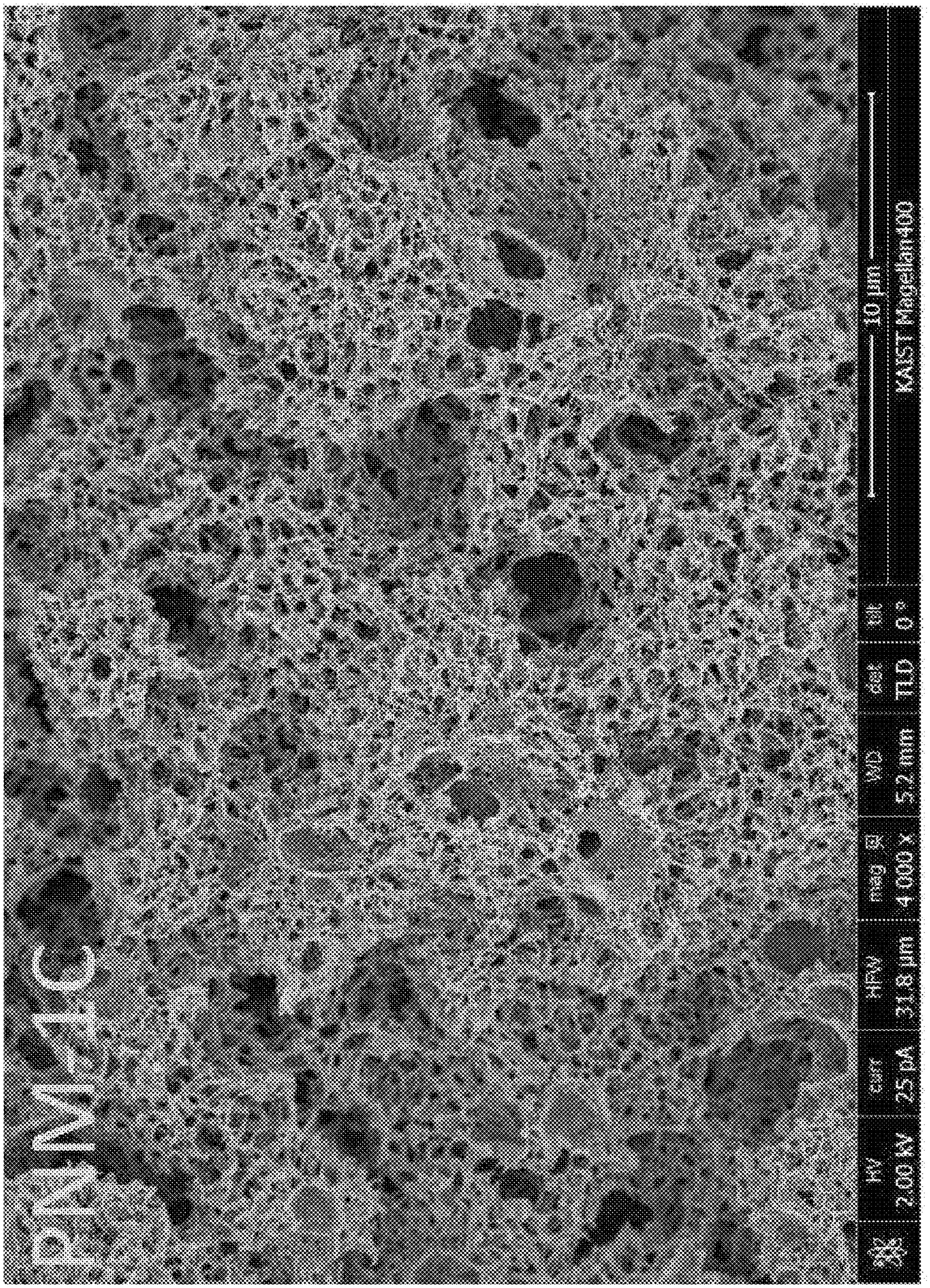
Figure 27C:
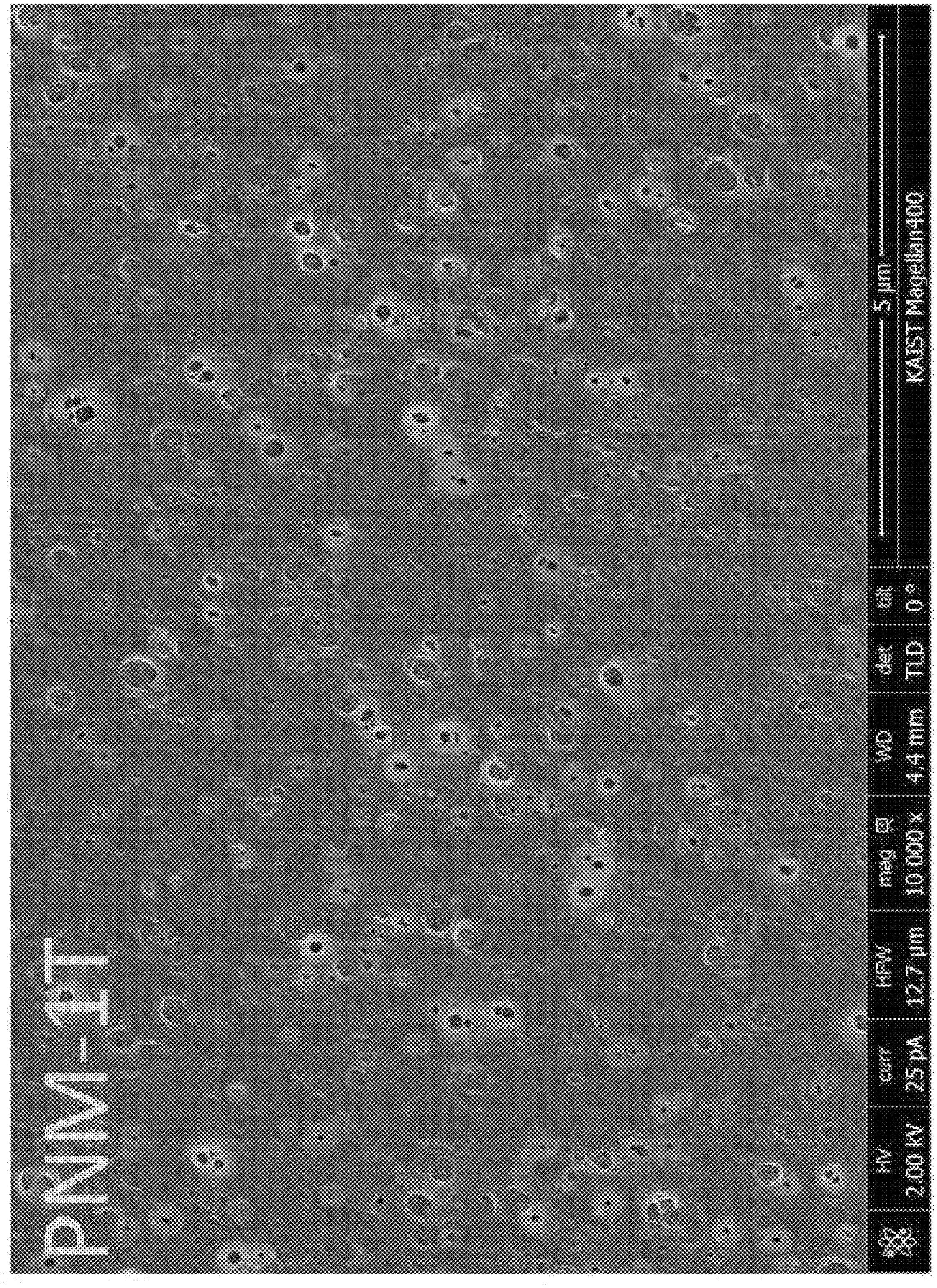
Figure 27D:
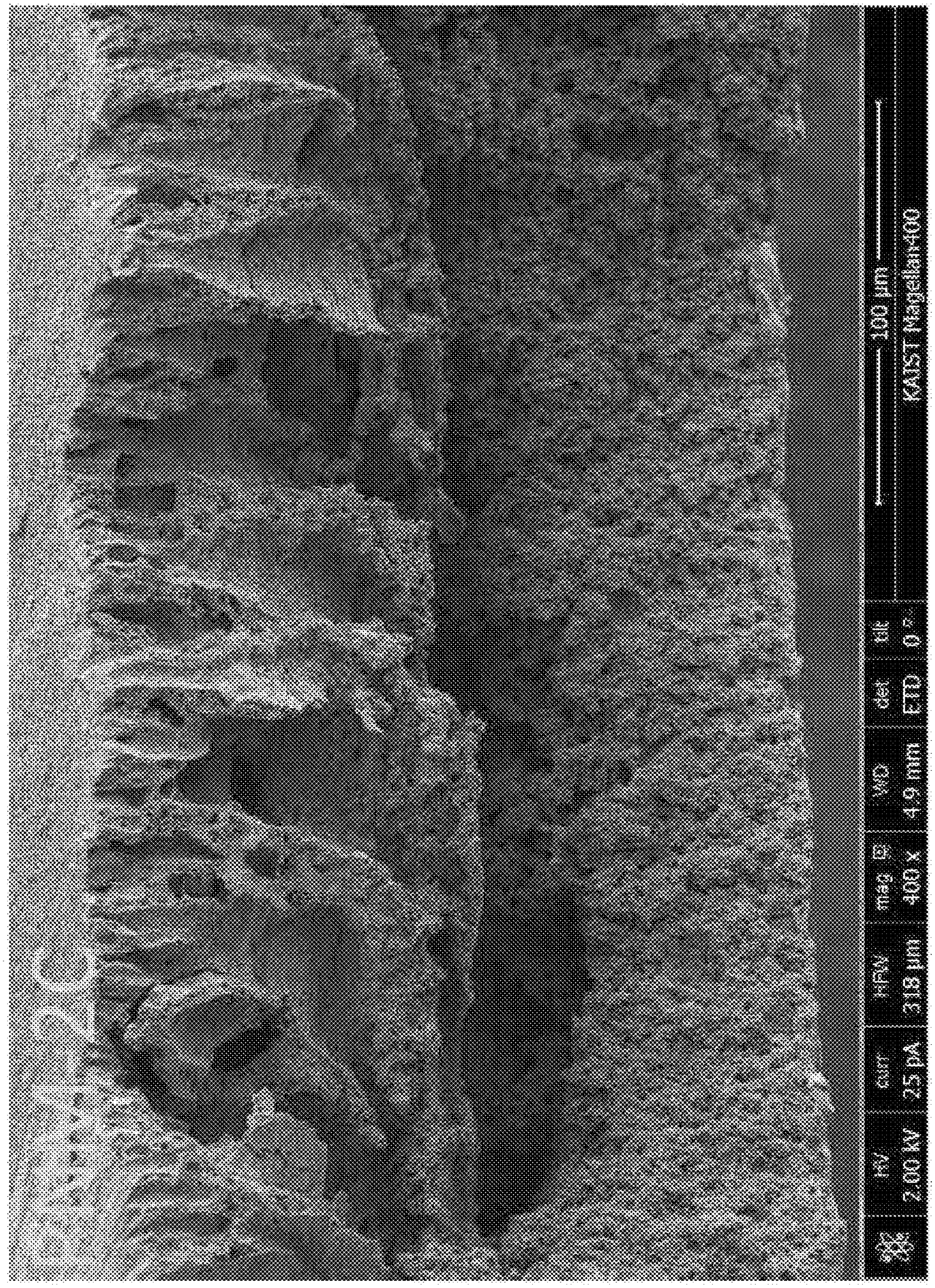
Figure 27E:
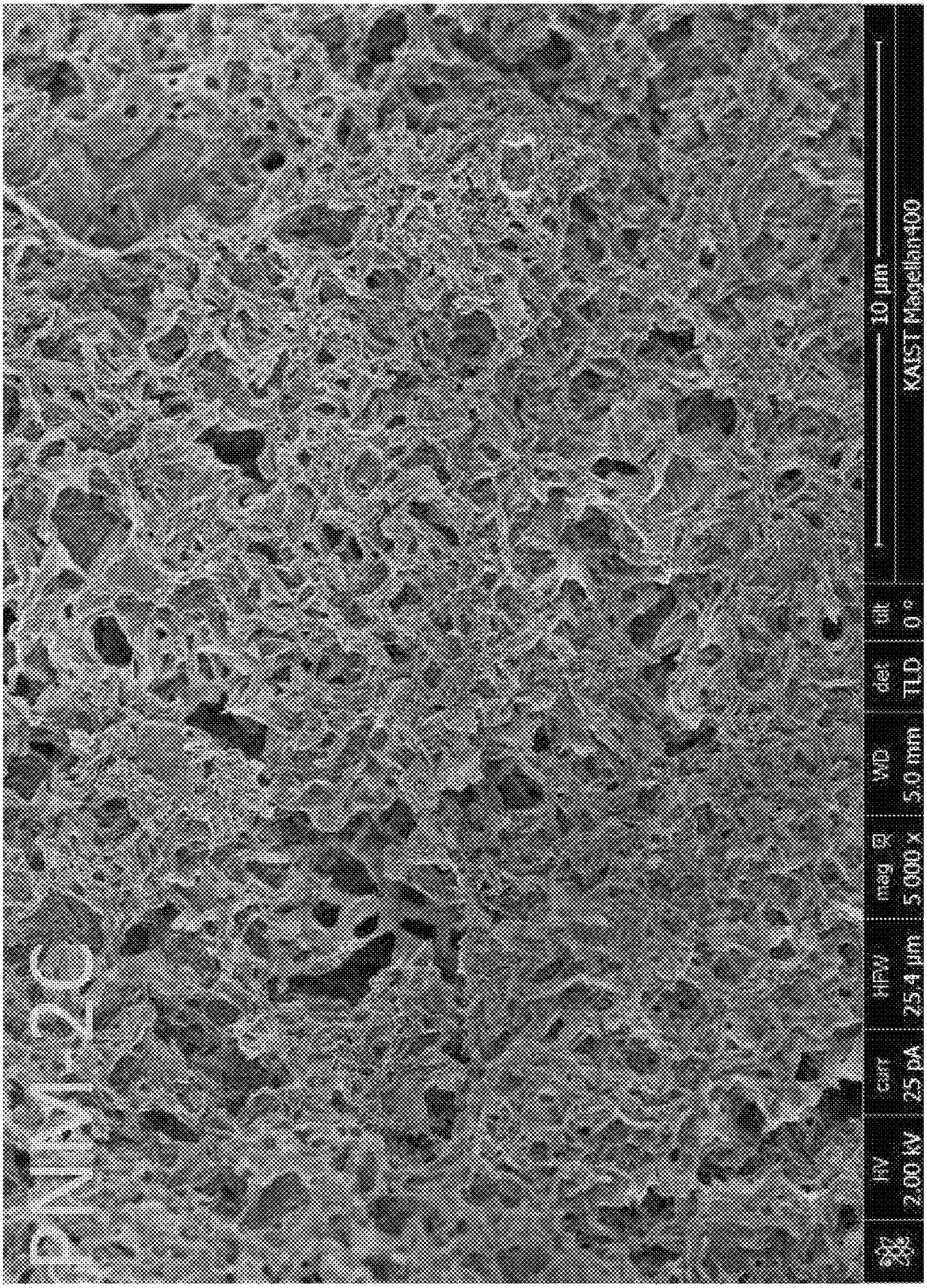
Figure 27F:
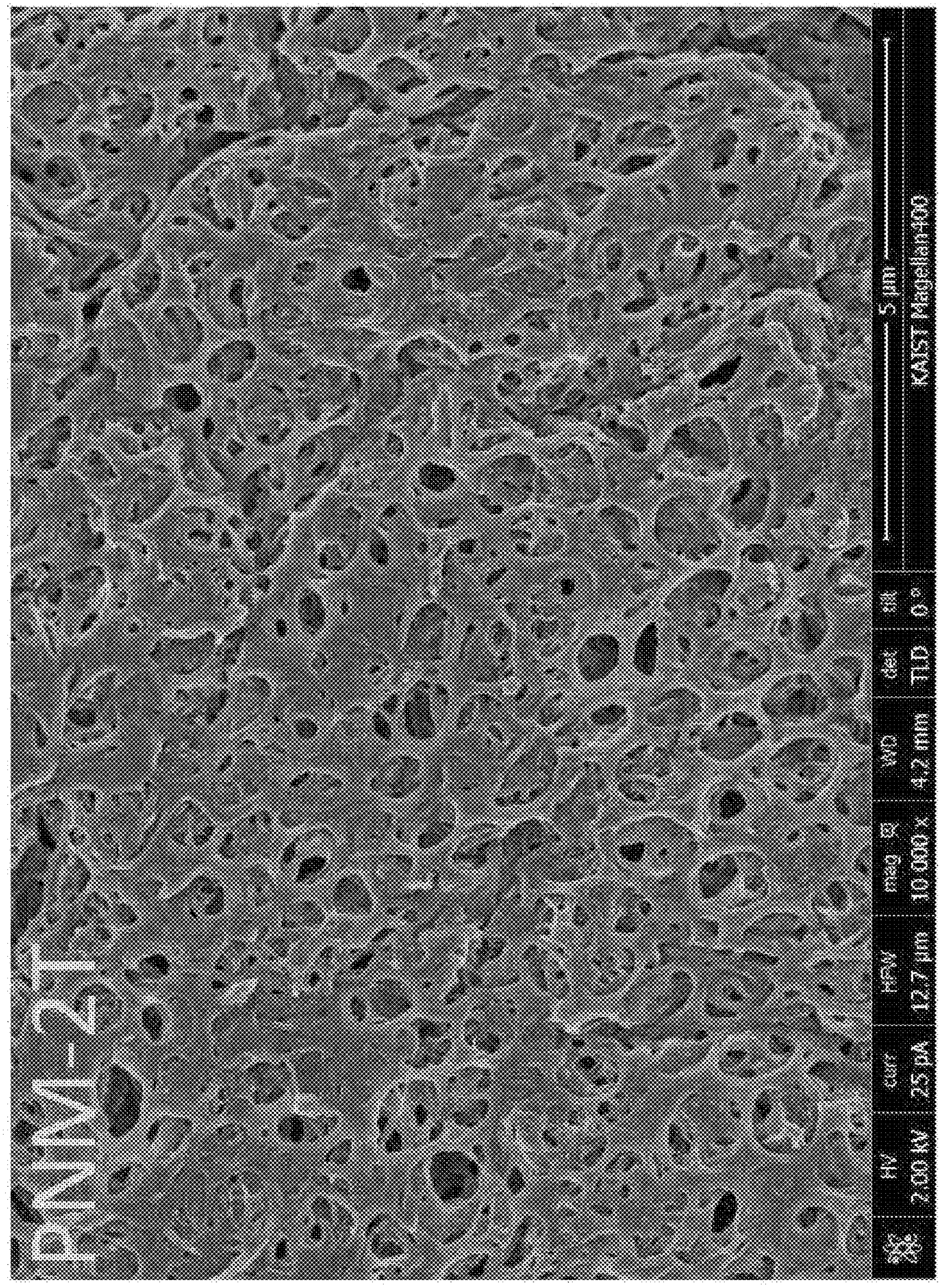
Figure 27G:
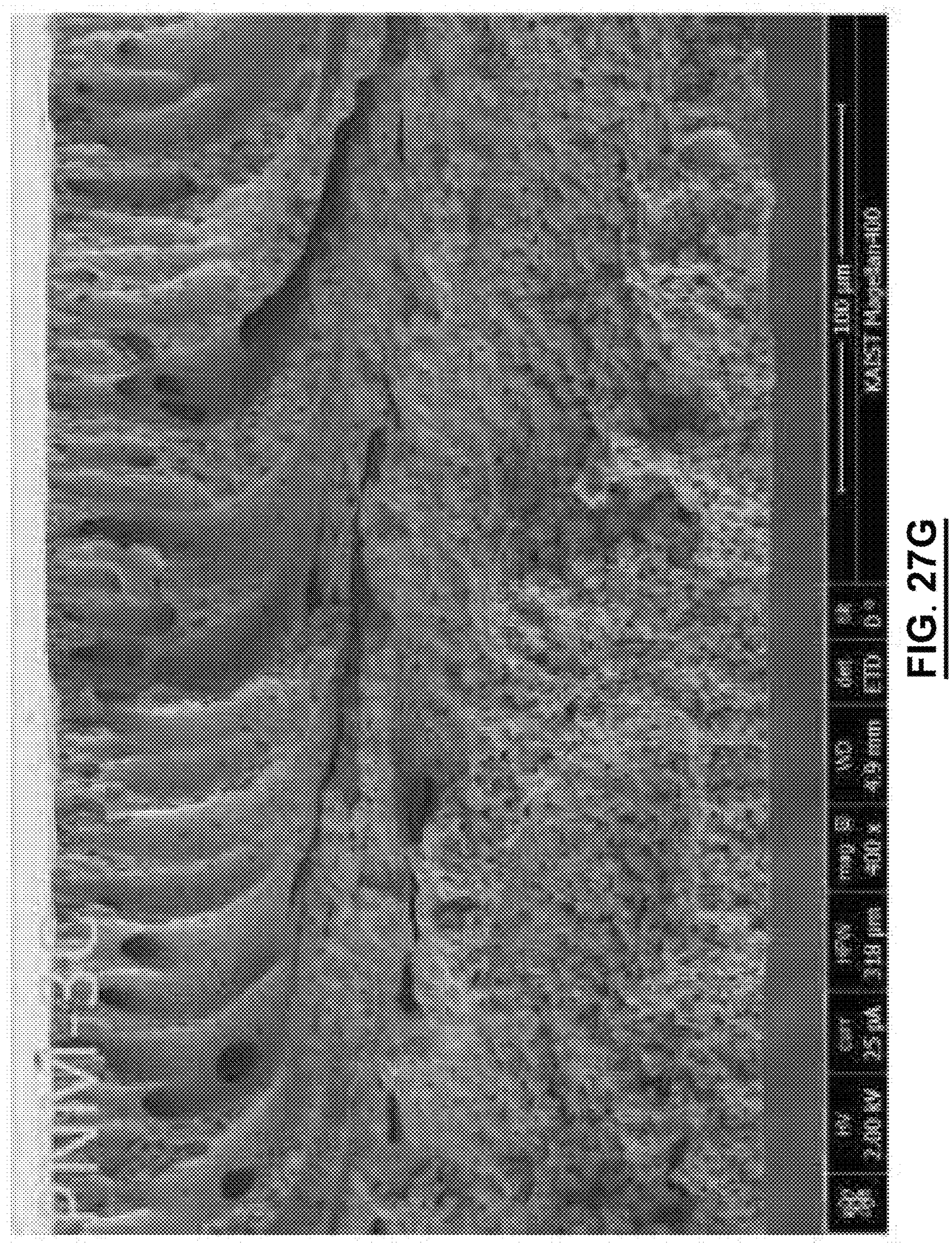
Figure 27H:
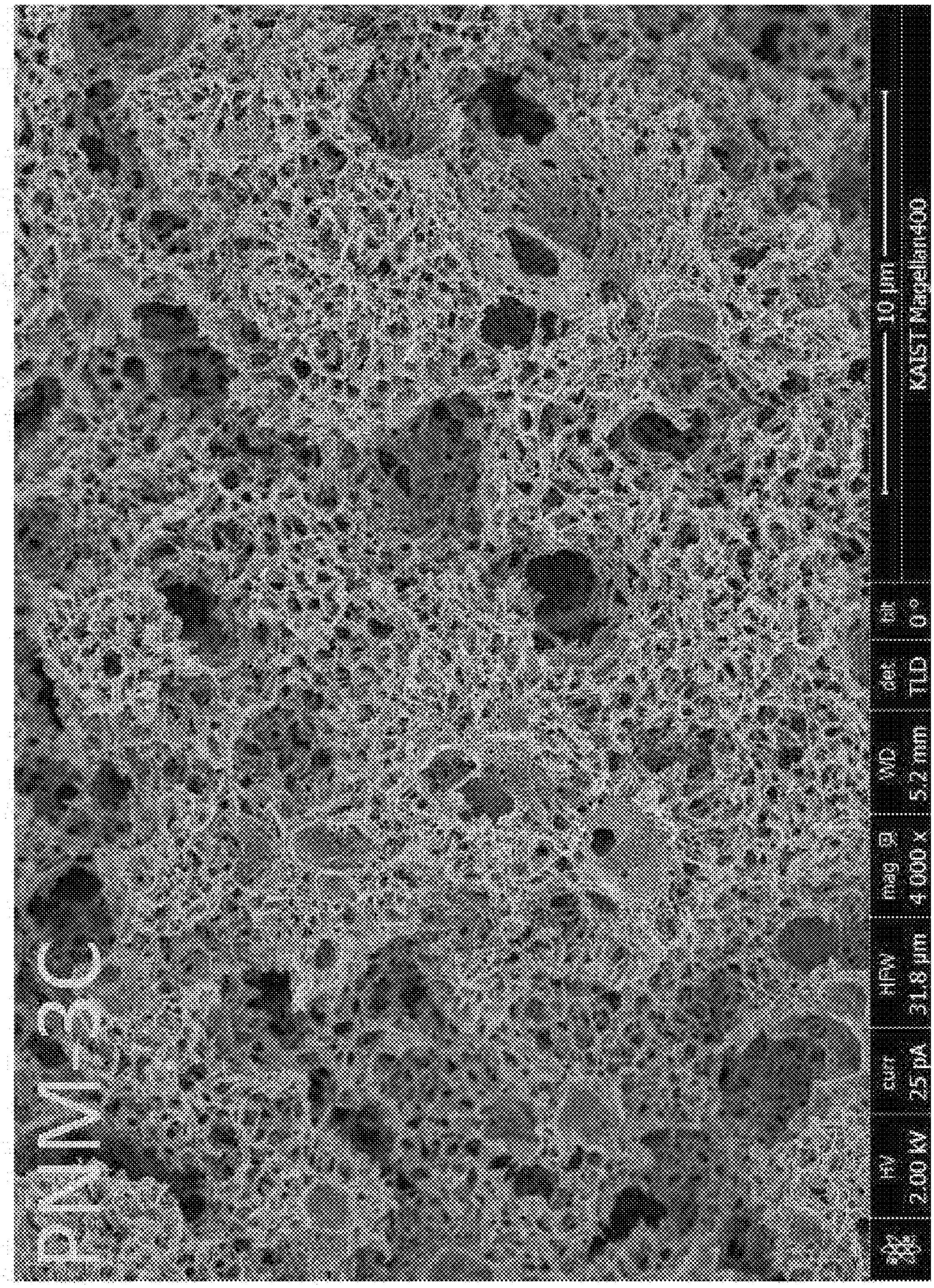
Figure 27I:
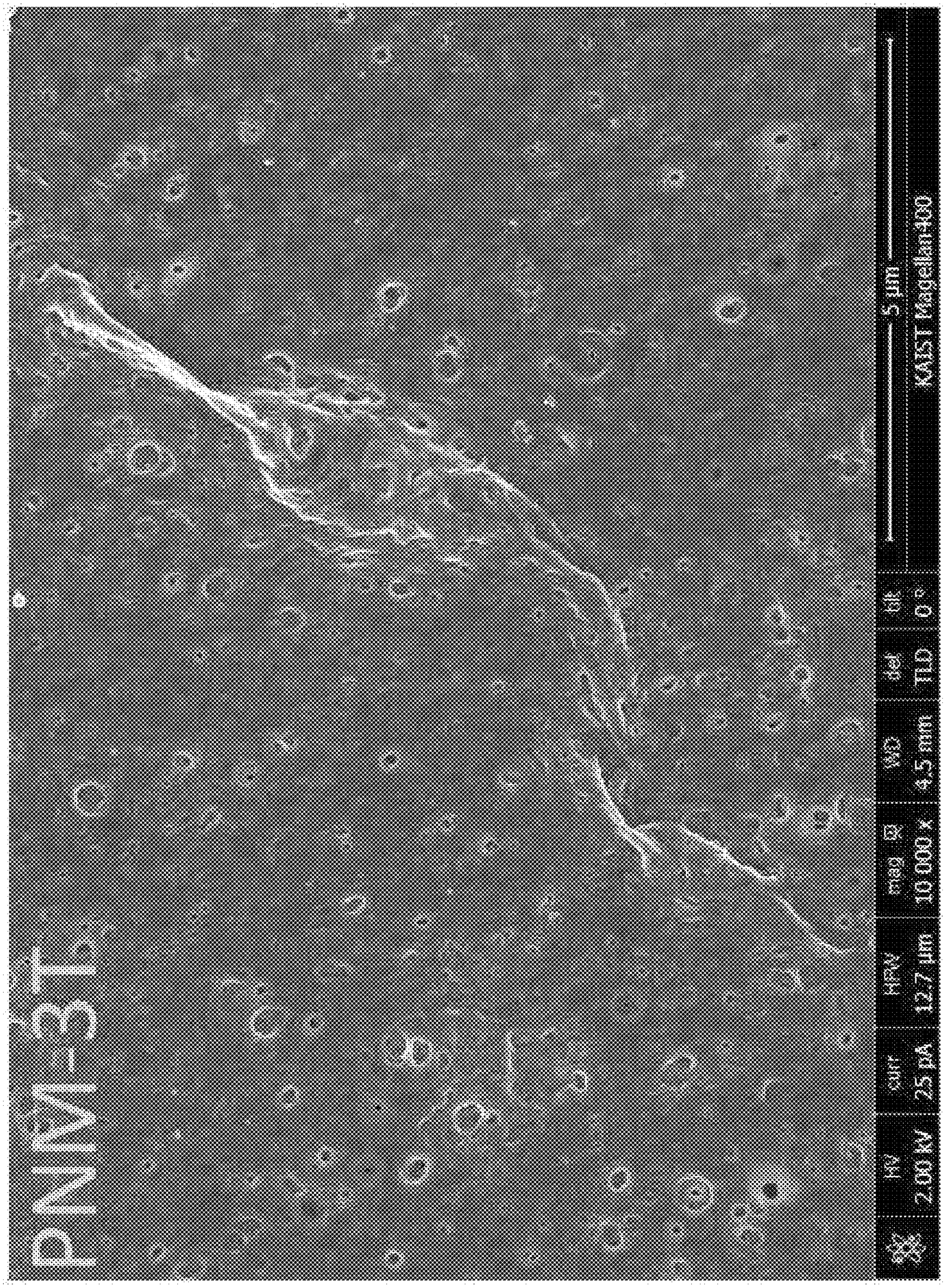

A mixed matrix membrane according to the disclosure was provided using the following materials and methods in accordance with the reaction scheme and graphical process protocol depicted in FIGS. 26A-B.

Example 18: Method for Forming a Polymer Network Embedded PVDF Membrane

Three different mixed matrix membrane with polymeric particle network in situ were obtained with the method of Example 17.

In particular, three Mixed Matrix Membranes (MMMs) PNM-1, PNM-2 and PNM-3 are prepared with different component amount listed in Table 14. Three control membranes such as PEI and PEG blend with PVDF dope solution (CM-1), PEG blend with PVDF (CM-2), and PEI blend with PVDF (CM-3) are utilized as comparison for composite membranes.

TABLE 14

[PVDF, TEP, PEI, 4-Arm PEG Epoxide

| Membrane | PNM-1 M(g) | PNM-1 wt (%) | PNM-2 M(g) | PNM-2 wt (%) | PNM-3 M(g) | PNM-3 wt (%) | PVDF (Neat) (CM-4) M(g) | PVDF (Neat) (CM-4) wt (%) | CM-1 M(g) | CM-1 wt (%) | CM-2 M(g) | CM-2 wt (%) | CM-3 M(g) | CM-3 wt (%) |
|---|---|---|---|---|---|---|---|---|---|---|---|---|---|---|
| A. Compositions of Membrane Casting Solutions | | | | | | | | | | | | | | |
| PVDF[a)] | 5.25 | 13.37 | 5.25 | 12.57 | 5.25 | 11.43 | 5.25 | 15.0 | 5.25 | 12.56 | 5.25 | 13.81 | 5.25 | 13.81 |
| PEI[b)] | 1.36 | 3.47 | 2.28 | 5.46 | 3.42 | 7.45 | — | — | 2.28 | 5.46 | — | — | 1.5 | 3.95 |
| 4-Arm PEG epoxide | 0.9 | 2.29 | 1.5 | 3.58 | 2.25 | 4.90 | — | — | 1.5 | 3.59 | 1.5 | 3.95 | — | — |
| TEP[d)] | 31.75 | 80.87 | 32.75 | 78.39 | 35.0 | 76.22 | 29.75 | 85.0 | 32.75 | 78.39 | 31.25 | 82.24 | 31.25 | 82.24 |
| B. Estimated Membrane Compositions (Dry mass wt %) | | | | | | | | | | | | | | |
| PVDF | 5.25 | 69.91 | 5.25 | 58.14 | 5.25 | 48.08 | 5.25 | 100 | 5.25 | 100 | 5.25 | 100 | 5.25 | 100 |
| [1]PEG networks | 2.26 | 30.09 | 3.78 | 41.86 | 5.67 | 51.92 | — | — | — | — | — | — | — | — |
| C. Estimated degree of crosslinking of PEI particles based on 4-Arm PEG epoxide concentration (Dry mass wt %) | | | | | | | | | | | | | | |
| 4-Arm PEG epoxide | 0.9 | 39.8 | 1.5 | 39.7 | 2.25 | 39.7 | — | — | — | — | — | — | — | — |
| PEI | 1.36 | 60.2 | 2.28 | 60.3 | 3.42 | 60.3 | — | — | — | — | — | — | — | — |

HCl: 35 mg is also added to each membrane casting solution
[a)]PVDF: Polyvinylidene fluoride;
[b)]PEI: Branched polyethyleneimine;
[c)]TEP: Triethyl phosphate PVDF Solution in TEP.

A typical membrane casting solution was prepared by mixing PVDF with TEP in a three neck round-bottom flask equipped with a condenser and an overhead stirrer. A homogeneous PVDF dope solution was obtained after mixing for 24 hours at 80° C.

In Situ Synthesis of Cross-Link PEI & PEG Polymer Network.

In a typical experiment, the required amount of PEI, and the required amount of 4-Arm PEG Epoxide are all added to the PVDF casting solution 80° C. The cross linking reactions were continued for 4 h at 80° C. under a nitrogen ($N_2$) atmosphere.

Membrane Casting.

The membranes were prepared with and without a polyethylene terephthalate (PET) microporous support by similar process described in Example 1.

In the membranes of Table 14, 4-Arm PEG epoxide crosslinker molecules were incorporated into the PEI networks by reaction of their epoxy groups with the primary/secondary amino groups of the segregated PEI molecules in the dope solutions (FIGS. 3B-C).

In the membranes of Table 14, unreacted PEI and 4-Arm PEG epoxide polymer networks were removed in the coagulation bath and subsequent membrane washes with methanol and DI water.

Example 19: Morphology of a Polymer Network Embedded PVDF Membrane

The morphology of a mixed matrix membrane prepared according to Example 17 and Example 14 was analyzed by FESEM. No polymeric nanoparticles are present in all three PNM membranes.

The results are illustrated in FIGS. 27A-I.

Example 20: Determination of Wettability and Zeta Potential of Membranes

The wettability and zeta potential of the mixed matrix membranes prepared according to Example 17 were investigated by measurement of contact angle and by Zeta potential measurements of the membrane.

In particular, contact angle measurements of PNM-1, PNM-2 and PNM-3 show that all the membranes are hydrophilic. Contact angle measured at 30 and 60 seconds for the composite and control membranes are indicated in FIG. 29.

Figure 28:
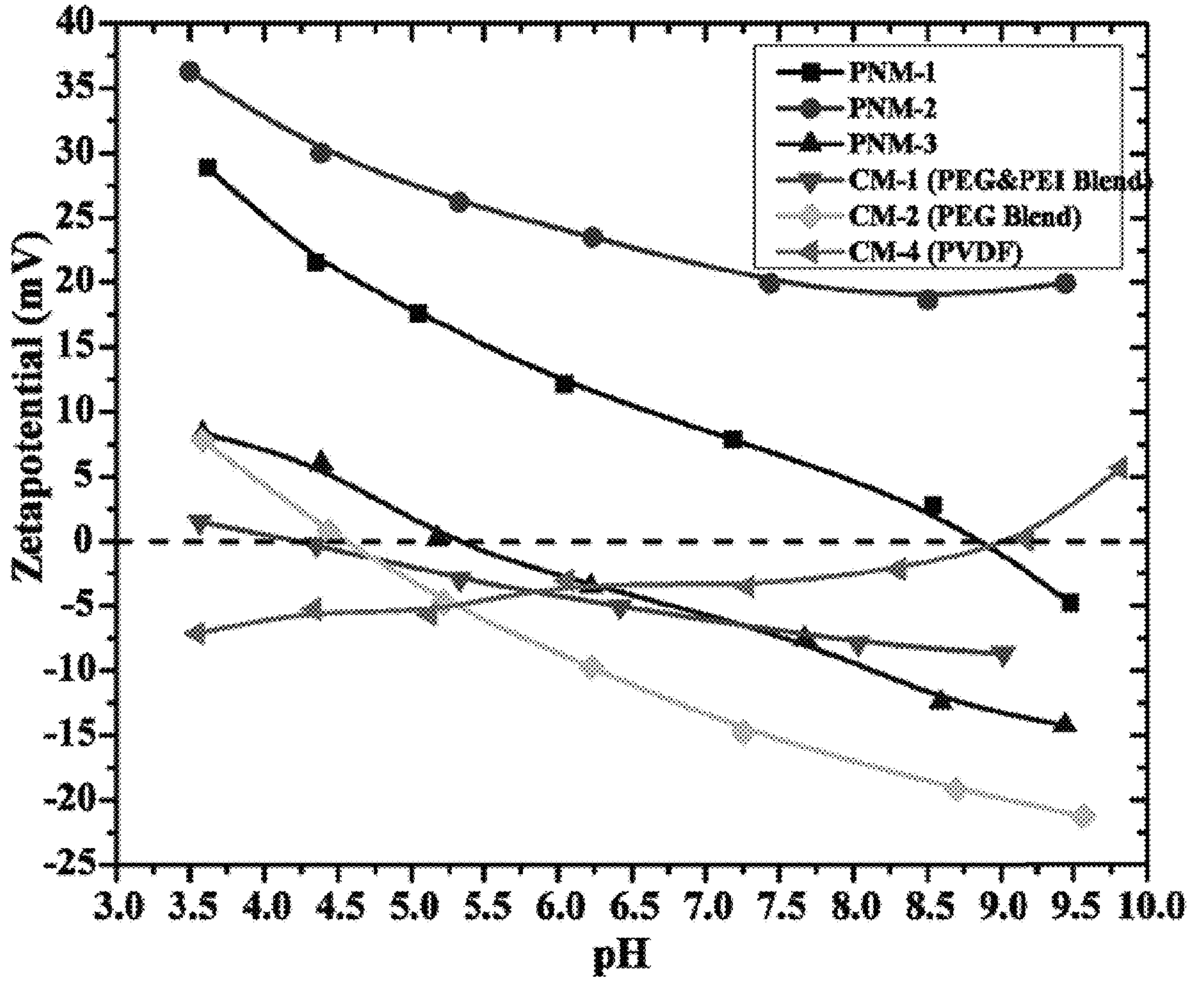
FIG. 28 shows zeta potential measurements of control PVDF membranes and polymer network embedded PVDF membranes PNM-1, PNM-2 and PNM-3 as herein described at pH ranging from 3.5 to 9.5 by electrophoresis method.

The zeta potential (ZP) of each membrane was determined at different solution pH as indicated in FIG. 28. At pH 7.0, the ZP of the PNM-1 is ~8 mV, PNM-2 is ~25 mV, and PNM-3 is ~−6 mv. We attribute this trend to the presence of PEGylated PEI particles with high density of —OH groups at the surface of our MMMs.

Example 21 Filtration Experiments

Real-time permeate flux measurement [18] were carried out on a custom-made cross-flow filtration system with an effective membrane area of 14 $cm^2$ provided with the process of Example 17.

The average water flux through the PNM-1, PNM-2 and PNM-3 are, respectively, equal to 108, 120 and 62 LMH at 2 bar, (see FIGS. 30 to 35)

Example 22: Porosimetry Determination

PVDF membranes enclosing functionalized particles were prepared with the in situ method herein described. The compositions of the casting solutions used to prepare PVDF membranes with in situ synthesized and PEGylated PEI particles are listed in Table 15. A catalytic amount of HCl (35 mg) was also added to each membrane casting solution.

TABLE 15

| Component | PPNM-1 Weight (g) | PPNM-1 Weight, % | PPNM-2 Weight (g) | PPNM-2 Weight, % | PPNM-3 Weight (g) | PPNM-3 Weight, % |
|---|---|---|---|---|---|---|
| I. Composition of membrane dope solution | | | | | | |
| [a]PVDF | 5.25 | 13.07 | 5.25 | 11.99 | 5.25 | 10.90 |
| [b]TEP | 29.75 | 74.08 | 29.75 | 67.95 | 29.75 | 61.76 |
| Total | 35.0 | | 35.0 | | 35.0 | |
| II. Composition of PEI crosslinking and PEGylation reaction mixture | | | | | | |
| [c]PEI | 1.36 | 3.39 | 2.28 | 5.21 | 3.42 | 7.10 |
| [d]ECH | 0.9 | 2.24 | 1.50 | 3.43 | 2.25 | 4.67 |
| [e]PEGDE | 0.9 | 2.24 | 1.50 | 3.43 | 2.25 | 4.67 |
| [b]TEP | 2.0 | 4.98 | 3.5 | 7.99 | 5.25 | 10.90 |
| Total | 40.16 | 100 | 43.78 | 100 | 48.17 | 100 |

[a]PVDF: Polyvinylidene fluoride
[b]TEP: Triethyl phosphate
[c]PEI: Branched polyethyleneimine [$M_n$: 300 Da]
[d]ECH: Epichlorohydrin
[e]PEGDE: Poly(ethylene glycol) diglycidyl ether [$M_n$: 2000 Da]

The pore diameters were estimated experiments using the Barrett-Joyner-Halenda (BJH) methodology. The related results are illustrated in FIGS. 36 to 39

Example 23 Particles Dimension Determination

Exemplary membranes with in situ synthesized polymeric particles. Particle diameters were estimated using the image processing/analysis software ImageJ[1].

The related results are illustrate in Tables 16 and 17

TABLE 16

| Image No | Particle Diameter (nm) PPNM-1 | PPNM-2 | PPNM-3 |
|---|---|---|---|
| 1 | 1841 | 2167 | 2449 |
| 2 | 1827 | 1209 | 2148 |
| 3 | 1300 | 751 | 2502 |
| 4 | 599 | 1179 | 1453 |
| 5 | 1728 | 1103 | 1448 |
| 6 | 1967 | 2215 | 925 |
| 7 | 1383 | 2110 | 1076 |
| 8 | 2092 | 940 | 3642 |
| 9 | 1381 | 2056 | 2483 |
| 10 | 805 | 1398 | 2017 |
| Average Diameter (nm) | 1492 | 1513 | 2014 |
| Maximum Diameter (nm) | 2092 | 2215 | 3642 |
| Minimum Diameter (nm) | 599 | 751 | 925 |

[1] Abramoff, M.D.; Magalhaes, P.J. and Ram, S.J. Image Processing with Image J Software. Biophotonics. Int. 2004. 11, 36-42.

TABLE 17

| DIW | Cycle-1: Permeate Flux ($L\ m^{-2}h^{-1}$) [a]Average | [b]SD | [c]Equilibrium flux | Cycle-2: Permeate Flux ($L\ m^{-2}h^{-1}$) Average | SD | Equilibrium flux |
|---|---|---|---|---|---|---|
| PPNM-1 | 307.4 | 4.9 | 302.5 | 177.7 | 3.2 | 177.5 |
| PPNM-2 | 253.1 | 5.0 | 244.0 | 229.9 | 6.7 | 222.1 |
| PPNM-3 | 243.0 | 7.1 | 235.0 | 293.3 | 55.1 | 243.0 |
| Microalgae Suspension | Cycle-1: Permeate Flux ($L\ m^{-2}h^{-1}$) Average | SD | Equilibrium flux | Cycle-2: Permeate Flux ($L\ m^{-2}h^{-1}$) Average | SD | Equilibrium flux |
| PPNM-1 | 88.4 | 11.8 | 80.1 | 80.7 | 9.0 | 72.7 |
| PPNM-2 | 87.2 | 9.9 | 80.5 | 85.2 | 11.3 | 72.3 |
| PPNM-3 | 79.7 | 6.2 | 77.5 | 91.5 | 10.6 | 81.4 |

[a]Average permeate flux: average of all the permeate fluxes that were recorded every 1 minute during the filtration experiments.
[b]SD: standard deviation of the average of all the permeate fluxes that were recorded every 1 minute during the filtration experiments.
[c]Equilibrium flux: estimated flux when each permeate flux leveled off and remained constant during the filtration experiment.

Example 24: Electrospinning

A dope formed with an in situ method herein described is expected to be possibly subjected to electrospinning using the parameters summarized in Table 18

TABLE 18

List of Electrospinning and Electrospraying Process Parameters

| Process Parameters | Electrospinning | Electrospraying |
|---|---|---|
| Concentration of Polymer Solution | 18.5% (w/w) PVDF and 1.25% (w/w) PEI 1.25% (w/w) PEGDE in a mixture (5:5 w/w) of DMF and NMP | Hyperbranched PEI (50% w/w) in methanol |
| Amount of Polymer Solution | 6 mL | 1 mL |
| Solution Flow Rate | 0.7 mL/hr | 0.3 mL/hr |
| Applied Voltage | 29 kV | 29 kV |
| Needle Diameter (mm) | 0.394 mm | 0.394 mm |

TABLE 18-continued

| List of Electrospinning and Electrospraying Process Parameters | | |
|---|---|---|
| Process Parameters | Electrospinning | Electrospraying |
| Needle Collector Distance | 7.5 cm | 7.5 cm |

The utilization of mixtures of electrospinning solvents provides several advantages [Ramakrishina S, Fujihara K, Teo W-E, Lim T-C, Ma Z (2005) An introduction to electrospinning and nanofibers. World Scientific Publishing Co., Singapore [45]; Yung L, Ma H, Wang X, Yoon K, Wang R, Hsiao B S, Chu B (2010) [46] Fabrication of thin-film nanofibrous composite membranes by interfacial polymerization using ionic liquids as additives. J. Membr. Sci. 365: 52-58].

First, this can eliminate the formation of beaded nanofibers (Ramakrishna et al., 2005). Beads are defects that are formed during the electrospinning of polymeric nanofibers (PNFs) when low-viscosity solvents are utilized to dissolve the base polymers (Ramakrishna et al., 2005). In NFC membranes, beaded nanofibers decrease the membrane porosity and interrupt the flow of water through the membrane nanofibrous scaffolds (Ramakrishna et al., 2005). Note that that the viscosity of NMP (1.7 cps) is larger than that of DMF (0.9 cps). For example consistent with the observations of Ramakrishna et al. (2005), use of pure DMF as spinning solvent for a membrane including PVDF and PEI has resulted in the formation of beaded PVDF nanofibers. In contrast, no beaded nanofibers were observed when mixtures of DMF and NMP (1:1 w/w) were utilized as spinning solvents. Second, the use of mixtures as spinning solvents can also increase both the adhesion/tensile strength of PNFs as well as the strength of their adhesion to nonwoven microporous supports. Yung et al. (2010) have investigated the adhesion/tensile strength of polymeric nanofibers (PNFs) and their delamination from nonwowen microporous polymeric supports. They reported that the adhesion between poly(ethersulfone) (PES) nanofibrous layers and a nonwoven poly(ethylene terephthalate) (PET) microporous support was stronger when the base PES polymer was dissolved in mixtures of DMF and NMP (6:4 w/w).

In previous experiments, for membrane comprising PVDF and PEI particles the use of mixtures of DMF and NMP increases the adhesion strength of PVDF nanofibers to PVDF microporous supports. Consistent with the observations of Yung et al. (2010), it has been found the use of pure DMF as spinning solvent resulted in the formation of PVDF nanofibrous scaffolds that are easily peeled off by hand from the PVDF microporous supports. In contrast, none of the PVDF nanofibrous scaffolds could be peeled off by hand from their supports when the fibers were electrospun using mixtures of DMF and NMP (1:1 w/w).

Example 25: Determination of Concentration of Membrane Components

The relative concentration of the various membrane components (functionalizing polymers, polymeric particles and base polymer can be calculated based on the stoichiometry of the reactions between functional groups presented on the various components.

For example in case of PEI as a particle precursor and PEGDE as polymer precursor, based on an amount of amine presented on the particle precursor, is it possible to calculate the molar ratio of functionalizing polymer precursor (PGDE) per amine (PEI) based on the stoichiometry of the related reaction. Then it is possible to calculate the amount of cross linker (if crosslinker is desired) to have formation of the particles possibly having excess reagents. In order to perform the calculation of the amounts, the stoichiometry of the reaction between the network polymer and the reacting group of the linking particle is primarily considered while the interaction of the backbone polymer of the base polymer and functionalizing polymers are typically not considered. For example in the case of a reaction between amines on PEI and epoxy groups presented on PEG, the amount can be calculated with the following equations from the "Dow Liquid Epoxy Resins Guide" available online at the website epoxy.dow.com/resources/literature.htm at the date of filing of the present application [12]

Equation (1):

$$\text{Amine H eq wt} = \frac{\text{MW of amine}}{\text{no. of active hydrogen}}$$

Example:

$$\text{Amine H eq wt D.E.H. 20} = \frac{103.2}{5} = 20.6$$

2. To calculate the stoichiometric ratio o DEH 20 to use with D.E.R. 331 epoxy resin having an epoxide equivalent weight of 189:

Equation (2):

$$\text{phr}^{\dagger}\text{ of amine} = \frac{\text{Amine } H\ eq \text{ wt} \times 100}{\text{Epoxide } eq \text{ wt of resin}}$$

Example:

phr D.E.H. 20 to be used with D.E.R. 331.

$$\text{phr} = \frac{20.6 \times 100}{189} = 10.9$$

Equation (3):

$$\text{EEW of mix} = \frac{\text{Total Wt.}}{\frac{\text{Wt } a}{EEwa} + \frac{\text{Wt } b}{EEwb} + \frac{\text{Wt } c}{EEwc}}$$

Total weight includes all materials, both reactive and nonreactive.

a, b, c, etc., are only the materials reactive with the curing agent, and are characterized by an epoxy ring.

Example:

| | |
|---|---|
| 100 parts D.E.R. 331 | Avg EEW 189 |
| 100 parts D.E.R. 337 | Avg EEW 240 |
| 30 parts BGE (diluent) | Avg EEW 130 |
| 230 parts Filler | — |
| 460 Total | |

$$\text{EEw of mix} = \frac{460}{\frac{100}{189} + \frac{100}{240} + \frac{30}{130}} = \frac{460}{1.1766} = 391$$

By equation (2):

$$\text{Amount D.E.H. 20} = \frac{20.6 \times 100}{391} = 8.27 \text{ parts per hundred parts filled formulation}$$

$^{\dagger}$Parts by wt per 100 parts resin

The same calculations can be applied to calculate the amine groups that is available not only for liking with the epoxy groups in the PEG 1 polymer, but also the amine groups which are left available as reactive sites following the formation of the PEGylated PEI particles. In summary described herein are mixed matrix filtration membranes and related, compositions, methods and systems and in particular mixed matrix filtration membranes with an embedded polymer network and/or embedded polymeric micro/nanoparticles functionalized with a functionalization polymer covalently and/or non-covalently linked to the micro/nanoparticles and related compositions, methods, and systems.

The examples set forth above are provided to give those of ordinary skill in the art a complete disclosure and description of how to make and use the embodiments polymeric membranes with embedded polymeric micro/nanoparticles and related methods and systems of the disclosure, and are not intended to limit the scope of what the Applicants regard as their disclosure. Modifications of the above-described modes for carrying out the disclosure can be used by persons of skill in the art, and are intended to be within the scope of the following claims.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

1. *Polymer Solutions: Solvents And Solubility Parameters*. Jan. 25, 2012]; Available From: Http://Www.Sigmaaldrich.Com/Etc/Medialib/Docs/Aldrich/General_Information/Polymer_Solutions.Par.0001.File.Tmp/Polymer_Solutions.Pdf.
2. Brandrup, J., Et Al., *Polymer Handbook*. Vol. 89. 1999: Wiley New York.
3. Liu, F., Et Al., *Progress In The Production And Modification Of Pvdf Membranes*. Journal Of Membrane Science, 2011. 375(1): P. 1-27.
4. Connor, E. E. A., *Pharmaceutical Compositions Comprising Crosslinked Polyamine Polymers*, 2008: Us.
5. Gokmen, M. T. And F. E. Du Prez, *Porous Polymer Particles—A Comprehensive Guide To Synthesis, Characterization, Functionalization And Applications*. Progress In Polymer Science, 2012. 37(3): P. 365-405.
6. Strathmann, H., L. Giorno, And E. Drioli, *An Introduction To Membrane Science And Technology*. 2011: Wiley.
7. Liu, Y., Et Al., *Pamam Dendrimers Undergo Ph Responsive Conformational Changes Without Swelling*. Journal Of The American Chemical Society, 2009. 131(8): P. 2798-2799.
8. Van Krevelen, D. W. And K. Te Nijenhuis, *Properties Of Polymers: Their Correlation With Chemical Structure; Their Numerical Estimation And Prediction From Additive Group Contributions*. 2009: Elsevier Science.
9. Frechet, J. M., *Functional Polymers And Dendrimers: Reactivity, Molecular Architecture, And Interfacial Energy*. Science, 1994. 263(5154): P. 1710-5.
10. Lichtenhan, J. And J. Salamone, *Polymeric Materials Encyclopedia*. Salamone, Jc, Ed, 1996: P. 7768-7777.
11. Augustsson, C. And A. Nils Malmgren, *Nm Epoxy Handbook*. 2004: Nils Malmgren Ab.
12. *Dow Liquid Epoxy Resins Product Literature* Available From: Epoxy.Dow.Com/Resources/Literature.Htm At The Date Of Filing Of The Present Disclosure.

13. Martell, A. E. And R. D. Hancock, *Metal Complexes In Aqueous Solutions*. 1996: Plenum Press New York.

14. Fréchet, J. M. J. And D. A. Tomalia, *Dendrimers And Other Dendritic Polymers*. 2001: Wiley New York.

15. Tomalia, D. A., S. Henderson, And M. Diallo, *Dendrimers—An Enabling Synthetic Science To Controlled Organic Nanostructures, In Handbook Of Nanoscience, Engineering And Technology*, W. A. Goddard Iii., Et Al., Editors. 2007, Crc Press Boca Raton, Fla.: Boca Raton, Fla. P. 24.1-24.47.

16. *Kaist Eews Initiative*. Available From: Http://Eews.Kaist.Ac.Kr/New/Work/Index.Htm.

17. Diallo, M. S., *Water Treatment By Dendrimer Enhanced Filtration*, 2008.

18. Diallo, M. S., *Water Treatment By Dendrimer-Enhanced Filtration: Principles And Applications*, In *Nanotechnology Applications For Clean Water*, N. Savage, Et Al., Editors. 2008, William Andrew Applied Science Publishers. P. 143-155.

19. Diallo, M. S., Et Al., *Dendritic Chelating Agents*. 2. *U(Vi) Binding To Poly(Amidoamine) And Poly(Propyleneimine) Dendrimers In Aqueous Solutions*. Environ Sci Technol, 2008. 42(5): P. 1572-9.

20. Diallo, M. S., Et Al., *Dendritic Anion Hosts: Perchlorate Uptake By G5-Nh2 Poly(Propyleneimine) Dendrimer In Water And Model Electrolyte Solutions*. Environ Sci Technol, 2007. 41(18): P. 6521-7.

21. Diallo, M. S., Et Al., *Dendrimer Enhanced Ultrafiltration*. 1. *Recovery Of Cu (Ii) From Aqueous Solutions Using Pamam Dendrimers With Ethylene Diamine Core And Terminal Nh2 Groups*. Environmental Science & Technology, 2005. 39(5): P. 1366-1377.

22. Diallo, M. S., Et Al., *Dendritic Chelating Agents*. 1. *Cu(Ii) Binding To Ethylene Diamine Core Poly(Amidoamine) Dendrimers In Aqueous Solutions*. Langmuir, 2004. 20(7): P. 2640-51.

23. Maiti, P. K. And W. A. Goddard Iii, *Solvent Quality Changes The Structure Of G8 Pamam Dendrimer, A Disagreement With Some Experimental Interpretations*. The Journal Of Physical Chemistry B, 2006. 110(51): P. 25628-25632.

24. Maiti, P. K., Et Al., *Effect Of Solvent And Ph On The Structure Of Pamam Dendrimers*. Macromolecules, 2005. 38(3): P. 979-991.

25. Lin, S. T., Et Al., *Thermodynamic Stability Of Zimmerman Self-Assembled Dendritic Supramolecules From Atomistic Molecular Dynamics Simulations*. The Journal Of Physical Chemistry B, 2004. 108(28): P. 10041-10052.

26. Li, Y., S. T. Lin, And W. A. Goddard Iii, *Efficiency Of Various Lattices From Hard Ball To Soft Ball: Theoretical Study Of Thermodynamic Properties Of Dendrimer Liquid Crystal From Atomistic Simulation*. Journal Of The American Chemical Society, 2004. 126(6): P. 1872-1885.

27. Frechet, J., Et Al., *Extraction Of Anions From Solutions And Mixtures Using Hyperbranched Macromolecules*, 2009.

28. Ulbricht, M., *Advanced Functional Polymer Membranes*. Polymer, 2006. 47(7): P. 2217-2262.

29. Mészáros, R., Et Al., *Interaction Of Sodium Dodecyl Sulfate With Polyethyleneimine: Surfactant-Induced Polymer Solution Colloid Dispersion Transition*. Langmuir, 2003. 19(3): P. 609-615.

30. Koper, G. J. M. And M. Borkovec, *Proton Binding By Linear, Branched, And Hyperbranched Polyelectrolytes*. Polymer, 2010. 51(24): P. 5649-5662.

31. Zhao, Y. H., Et Al., *Porous Membranes Modified By Hyperbranched Polymers: I. Preparation And Characterization Of Pvdf Membrane Using Hyperbranched Polyglycerol As Additive. Journal Of Membrane Science*, 2007. 290(1): P. 222-229.

32. Chiang, Y. C., Et Al., *Nanofiltration Membranes Synthesized From Hyperbranched Polyethyleneimine*. Journal Of Membrane Science, 2009. 326(1): P. 19-26.

33. Kotte, M. R., M. Cho, And M. S. Diallo, *A Facile Route To The Preparation Of Mixed Matrix Polyvinylidene Fluoride Membranes With <I> In</I>-<I> Situ</I> Generated Polyethyleneimine Particles*. Journal Of Membrane Science, 2014. 450: P. 93-102.

34. Barrett, E. P., L. G. Joyner, And P. P. Halenda, *The Determination Of Pore Volume And Area Distributions In Porous Substances. I. Computations From Nitrogen Isotherms*. Journal Of The American Chemical Society, 1951. 73(1): P. 373-380.

35. Bormashenko, Y., Et Al., *Vibrational Spectrum Of Pvdf And Its Interpretation*. Polymer Testing, 2004. 23(7): P. 791-796.

36. Elimelech, M. And W. A. Phillip, *The Future Of Seawater Desalination: Energy, Technology, And The Environment*. Science, 2011. 333(6043): P. 712-7.

37. Callow, J. A. And M. E. Callow, *Trends In The Development Of Environmentally Friendly Fouling-Resistant Marine Coatings*. Nat Commun, 2011. 2: P. 244.

38. Shannon, M. A., Et Al., *Science And Technology For Water Purification In The Coming Decades*. Nature, 2008. 452(7185): P. 301-10.

39. Tiraferri, A., Et Al., *Highly Hydrophilic Thin-Film Composite Forward Osmosis Membranes Functionalized With Surface-Tailored Nanoparticles*. Acs Appl Mater Interfaces, 2012. 4(9): P. 5044-53.

40. Park, S. J., Et Al., *Nanofiltration Membranes Based On Polyvinylidene Fluoride Nanofibrous Scaffolds And Crosslinked Polyethyleneimine Networks*. Journal Of Nanoparticle Research, 2012. 14(7): P. 1-14.

41. Li, J. H., Et Al., *Fabrication And Characterization Of A Novel Tio<Sub> 2</Sub> Nanoparticle Self-Assembly Membrane With Improved Fouling Resistance*. Journal Of Membrane Science, 2009. 326(2): P. 659-666.

42. Shim, Y., Et Al., *Effects Of Natural Organic Matter And Ionic* Species *On Membrane Surface Charge*. Environ Sci Technol, 2002. 36(17): P. 3864-71.

43. Lee, J.-H., Et Al., *Effects Of No And So2 On Growth Of Highly-Co2-Tolerant Microalgae*. Journal Of Microbiology And Biotechnology, 2000. 10(3): P. 338-343.

44. Hwang, T., Et Al., *Harvesting Of<I> Chlorella</I>* Sp. *Kr-1 Using A Cross-Flow Membrane Filtration System Equipped With An Anti-Fouling Membrane*. Bioresource Technology, 2013. 139: P. 379-382.

45. Ramakrishna, S., Et Al., *An Introduction To Electrospinning And Nanofibers*. Vol. 90. 2005: World Scientific.

46. Yung, L., Et Al., *Fabrication Of Thin-Film Nanofibrous Composite Membranes By Interfacial Polymerization Using Ionic Liquids As Additives*. Journal Of Membrane Science, 2010. 365(1): P. 52-58.

The invention claimed is:

1. A filtration membrane comprising:

hyperbranched polymeric molecules covalently cross-linked to form polymeric microparticles and/or nanoparticles embedded in a polymer matrix, wherein the polymer matrix comprises a porous polymeric aggregate formed by a base polymer and a polymeric network formed by a functionalizing polymer;

wherein the polymeric microparticles and/or nanoparticles are attached to the functionalizing polymer forming the polymeric network of the polymer matrix, and wherein the functionalizing polymer is selected from poly(acrylic acid), poly(styrenesulfonate), polymethacrylic acid (PMAA), polyvinyl acid, and/or copolymers thereof.

2. The filtration membrane according to claim 1, wherein the porous polymeric aggregate is formed by a polymer according to Formula (I):

(I)

$$-\!\!\left[(Q)_m(Y)_l(Z)_k\right]_j\!\!-$$

wherein:

Q, Y, and Z comprise saturated aliphatic hydrocarbon, aromatic hydrocarbon, or unsaturated aliphatic hydrocarbons;

m, l, and k independently are integers ranging between 0-50;

at least one of m, l, k is not equal to zero;

j is an integer ranging between 50-500; and at least one of Q (when Q≠0), Y (when Y≠0), or Z (when Z≠0), comprises a polymer component functional group.

3. The filtration membrane according to claim 2, wherein Q, Y, and Z are independently selected from the group consisting of Formulas II-X:

(II)

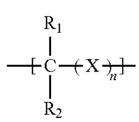

(III)

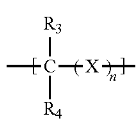

(IV)

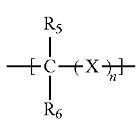

(V)

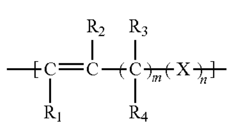

(VI)

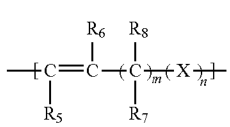

(VII)

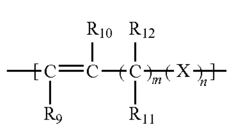

-continued (XVIII)

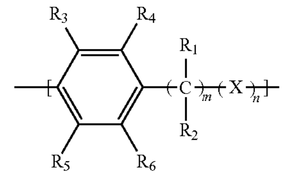

(IX)

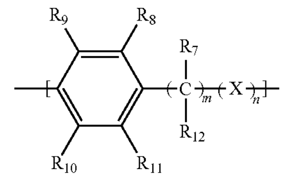

(X)

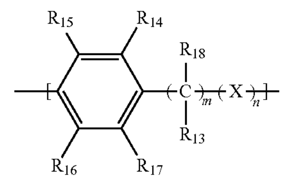

wherein:

n=0 or 1;

m is an integer ranging from 0-15;

X is a functional group comprising an atom selected from O, S, N, P, or F; and $R_1$-$R_{18}$ are independently selected from: hydrogen; $C_1$-$C_{20}$ linear, branched, saturated, unsaturated, or aryl hydrocarbon which are either substituted or unsubstituted with O, N, B, S, P; or substituted O, N, B, S, or P.

4. The filtration membrane according to claim 1, wherein the polymeric microparticles and/or nanoparticle comprises a cross-linked dendritic polymer.

5. The filtration membrane according to claim 4, wherein the crosslinked dendritic polymer is a dendritic macromolecule according to general formula (XI)

(XI)

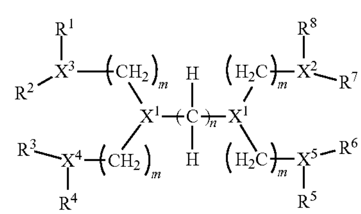

wherein:

n and m are integers ranging from 2 to 5;

$R^1$-$R^8$ are independently selected from hydrogen or hyperbranched polymer moieties;

$X^1$ is N; and $X^2$-$X^5$ are selected from amine, amide, imide, and carbamate.

6. The filtration membrane according to claim 4, wherein the crosslinked dendritic polymer is a dendritic macromolecule according to general formulas XII and XIII:

(XII)

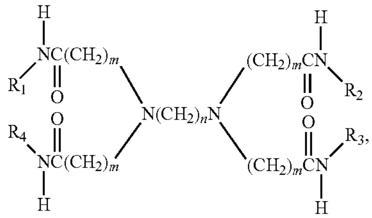

(XIII)

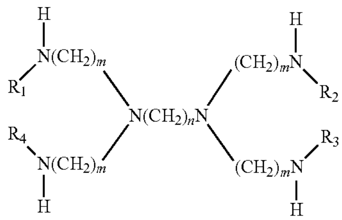

wherein n and m are integers from 2-5, and wherein $R_1$-$R_4$ can be independently hydrogen or hyperbranched polymer moieties.

7. The filtration membrane according to claim 4, wherein the crosslinked dendritic polymer is a dendritic macromolecule according to general formula:

(XV)

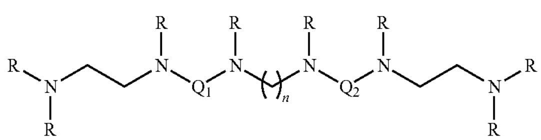

where n is an integer ranging from 2-5, each of $Q_1$ and $Q_2$ comprises hyperbranched polymer moiety, and R is selected from hydrogen, an alkyl group, or a 2-hydroxyalkyl group.

8. The filtration membrane according to claim 4, wherein the crosslinked dendritic polymer is a polyimine.

9. The filtration membrane according to claim 8, wherein the polyimine is poly(ethyleneimine).

10. The filtration membrane according to claim 4, wherein the cross-linked dendritic polymer is present in a concentration of greater than about 20 weight %.

11. The filtration membrane according to claim 4, wherein the cross-linked dendritic polymer is present in a concentration of greater than about 40 weight %.

12. A method of making a filtration membrane with embedded dendritic microparticles and/or nanoparticles according to claim 1, the method comprising:

providing a base polymer substantially soluble in a base polymer solvent;

providing a polymeric particle precursor having a portion substantially soluble in the base polymer solvent and a portion substantially insoluble in the base polymer solvent the polymeric particle precursor able to provide a dispersion of segregated domains in the base polymer solvent;

mixing the base polymer with the polymeric particle precursor, and the base polymer solvent to provide a blend;

mixing the blend with a functionalizing polymer selected from poly(acrylic acid), poly(styrenesulfonate), polymethacrylic acid (PMAA) and polyvinyl acid and a crosslinker and/or an initiator capable of reacting with the polymeric particle precursor, for a time and under a condition to permit the in situ formation of the dendritic microparticles and/or nanoparticles which are covalently crosslinked dendritic polymeric microparticles and/or nanoparticles and attaching the functionalizing polymer thus providing a dope solution; and casting the dope solution to provide the filtration membrane with embedded dendritic molecules covalently cross-linked to form the dendritic polymeric microparticles and/or nanoparticles.

13. The method of claim 12, wherein contacting mixing the blend is performed by mixing the blend with the crosslinker and/or an initiator capable of reacting with the polymeric particle precursor, and mixing the blend comprising the crosslinker and/or an initiator capable of reacting with the polymeric particle precursor, with the functionalizing polymer to provide the dope solution.

14. A filtration membrane comprising a plurality of nanofibers and/or microfibers each nanofiber comprising polymeric nanoparticles embedded therein, each microfiber comprising polymeric nanoparticles and/or microparticles embedded therein, the polymeric nanoparticles and/or microparticles formed by hyperbranched polymeric molecules covalently cross-linked;

wherein each nanofiber and microfiber of the plurality of nanofibers and/or microfibers comprises a base polymer and a functionalizing polymer, the functionalizing polymer selected from poly(acrylic acid), poly(styrenesulfonate), polymethacrylic acid (PMAA) and polyvinyl acid, the functionalizing polymers attaching the polymeric nanoparticles and/or microparticles to form a polymeric network in the nanofibers and/or microfibers; and wherein the polymeric nanoparticles and/or microparticles and/or polymeric network present a reactive site on the nanofibers and/or microfibers to allow selective filtration of a chemical capable of interaction with the reactive site.

15. The filtration membrane of claim 14, wherein the plurality of nanofibers and/or microfibers are arranged in a mesh structure forming a layer comprised in the membrane, alone or in combination with additional layers.

16. The filtration membrane of claim 14, wherein the plurality of nanofibers and/or microfibers are arranged in a substantially parallel configuration.

17. The filtration membrane of claim 14, wherein one or more nanofibers and/or microfibers of the plurality of the nanofibers and/or microfibers are hollow.

18. A process for providing a nanofiber or microfiber comprising providing a base polymer substantially soluble in a base polymer solvent;

providing a particle precursor having a portion substantially soluble in the base polymer solvent and a portion substantially insoluble in the base polymer solvent the polymeric particle precursor able to provide a dispersion of segregated domains in the base polymer solvent, mixing a base polymer with a polymeric particle precursor, and the base polymer solvent to provide a blend, mixing the blend with a functionalizing polymer selected from poly(acrylic acid), poly(styrenesulfonate), polymethacrylic acid (PMAA) and polyvinyl acid and a crosslinker and/or an initiator capable of reacting with the polymeric particle precursor, for a time and under a condition to permit the in situ formation of covalently crosslinked dendritic polymeric microparticles and/or nanoparticles and attaching the functionalizing polymer thus providing a dope solution; and electrospraying and/or electrospinning the liquid mixture to provide a nanofiber or microfiber having embedded therein polymeric nanoparticles and/or microparticles formed by dendritic polymeric molecules covalently crosslinked.

19. A polymeric membrane obtained by the method of claim 18.

20. A bicomposite membrane, the bicomposite membrane comprising a plurality of nanofibers and/or microfibers attached to a polymer matrix, the polymer matrix formed by a porous polymeric aggregate comprising a polymeric network component embedded in the polymeric aggregate and presented on polymeric microparticles and/or nanoparticles, the polymeric microparticles and/or nanoparticles formed by hyperbranched polymeric molecules covalently cross-linked to one another and attaching attached to the one or more functionalizing polymers selected from poly(acrylic acid), poly(styrenesulfonate), polymethacrylic acid (PMAA), polyvinyl acid, and/or copolymers thereof, the functionalizing polymers forming the polymeric network of the polymer matrix.

21. The filtration membrane according to claim 1, wherein the polymeric microparticles and/or nanoparticles comprise positively charged nitrogen atoms.

22. The filtration membrane according to claim 21, wherein the polymeric microparticles and/or nanoparticles comprise quaternary ammonium groups.

23. The filtration membrane according to claim 4, wherein the crosslinked dendritic polymer is selected from PAMAM, PEI and PPI.

24. The filtration membrane according to claim 3, wherein one or more of R1-R18 of formula II to X are independently selected from $C_1$-$C_{20}$ linear, branched, saturated, unsaturated, or aryl hydrocarbon unsubstituted with N.

* * * * *